US012180786B2

(12) United States Patent
James et al.

(10) Patent No.: US 12,180,786 B2
(45) Date of Patent: Dec. 31, 2024

(54) RETRACTABLE SCREEN SYSTEMS

(71) Applicant: Defender Screens International LLC, Sarasota, FL (US)

(72) Inventors: Arthur James, Sarasota, FL (US); Jan Gross, Sarasota, FL (US)

(73) Assignee: Defender Screens International LLC, Sarasota, FL (US)

( * ) Notice: Subject to any disclaimer, the term of this patent is extended or adjusted under 35 U.S.C. 154(b) by 219 days.

(21) Appl. No.: 17/182,428

(22) Filed: Feb. 23, 2021

(65) Prior Publication Data

US 2021/0262284 A1 Aug. 26, 2021

Related U.S. Application Data

(60) Provisional application No. 62/980,724, filed on Feb. 24, 2020, provisional application No. 62/980,800, (Continued)

(51) Int. Cl.
*E06B 9/58* (2006.01)
*E06B 9/68* (2006.01)

(52) U.S. Cl.
CPC ........ *E06B 9/581* (2013.01); *E06B 2009/587* (2013.01); *E06B 9/68* (2013.01)

(58) Field of Classification Search
CPC ...... E06B 9/581; E06B 9/58; E06B 2009/402; E06B 2009/407; E06B 9/42; E06B 9/44; E06B 2009/587; E06B 9/40
See application file for complete search history.

(56) References Cited

U.S. PATENT DOCUMENTS 3,078,917 A 2/1963 Recchione
3,248,899 A 5/1966 Anderson
(Continued)

FOREIGN PATENT DOCUMENTS

CA 2746178 A1 * 1/2013 ............... E06B 9/42
DE 24 21368 A1 11/1975
(Continued)

OTHER PUBLICATIONS

International Search Report for PCT/US2017/038417 Jul. 18, 2017.

*Primary Examiner* — Daniel P Cahn
*Assistant Examiner* — Jeremy C Ramsey
(74) *Attorney, Agent, or Firm* — Christopher A. Proskey; BrownWinick Law Firm

(57) ABSTRACT

In one or more arrangements, a retractable screen system is provided. The system includes a roller tube having an exterior surface. A screen is connected to the roller tube and an upper edge of the screen. The screen rolls up around the exterior surface of the roller tube when the roller tube is rotated in a first direction, thereby retracting the screen, and unroll the screen from roller tube when the roller tube is rotated the opposite direction, thereby deploying the screen. In one or more arrangements, the retractable screen system has a roller tube that may be adjusted in length, circumference, and/or shape of the roller edge, for example, to help prevent or mitigate undesirable artifacts that may otherwise become visible stretching of screen material, wrinkling/creasing of screen material, sagging of a roller tube, uneven weight distribution or tension, and/or, bunching of screen materials on a roller tube.

41 Claims, 104 Drawing Sheets

Related U.S. Application Data filed on Feb. 24, 2020, provisional application No. 62/980,667, filed on Feb. 24, 2020, provisional application No. 62/980,826, filed on Feb. 24, 2020.

(56) References Cited

U.S. PATENT DOCUMENTS

| | | | | |
|---|---|---|---|---|
| 4,884,617 | A | 12/1989 | Coenraets | |
| D310,775 | S | 7/1990 | Ruonala | |
| 4,993,468 | A | 2/1991 | Hackman | |
| 5,351,742 | A | 10/1994 | Lichy | |
| 5,479,979 | A | 1/1996 | Hayashiguchi | |
| 5,526,865 | A | 6/1996 | Coenraets | |
| 5,638,883 | A | 6/1997 | Schulte | |
| 5,944,086 | A | 8/1999 | Gruben | |
| 5,957,187 | A | 9/1999 | Gruben | |
| 6,021,837 | A | 2/2000 | Miller | |
| 6,065,525 | A | 5/2000 | Wells | |
| 6,112,799 | A | 9/2000 | Mullet | |
| 6,230,782 | B1 | 5/2001 | Reichert | |
| 6,263,949 | B1 | 7/2001 | Guthrie, Jr. | |
| 6,598,648 | B1 | 7/2003 | Schulte | |
| 6,873,461 | B1 | 3/2005 | McPherson, Jr. | |
| 6,964,289 | B2 | 11/2005 | Schulte | |
| 7,028,741 | B2 | 4/2006 | Coenraets | |
| 7,034,682 | B2 | 4/2006 | Beggs | |
| 7,360,575 | B2 | 4/2008 | Weiss | |
| 7,726,377 | B2 | 6/2010 | Okachi | |
| 7,793,702 | B2 | 9/2010 | Biewer | |
| 8,006,737 | B2 * | 8/2011 | Popa | E04F 10/0666 242/573 |
| 8,051,993 | B1 * | 11/2011 | Tu | E06B 9/44 211/123 |
| 8,371,355 | B2 | 2/2013 | Santoro | |
| 8,607,841 | B2 | 12/2013 | Hayashiguchi | |
| 8,616,261 | B2 | 12/2013 | Miller | |
| 9,194,178 | B2 | 11/2015 | Andre De La Porte | |
| 9,458,666 | B2 | 10/2016 | Murray | |
| 9,689,201 | B2 | 6/2017 | Riemelmoser et al. | |
| 9,719,292 | B1 | 8/2017 | James | |
| 10,036,195 | B2 | 7/2018 | Iglesias Ballester | |
| 10,036,198 | B2 * | 7/2018 | James | E06B 9/00 |
| 10,260,279 | B2 | 4/2019 | Nakae | |
| 10,619,376 | B2 | 4/2020 | Hoffmann | |
| 10,662,705 | B2 | 5/2020 | Hall | |
| 10,927,597 | B2 | 2/2021 | James | |
| 11,028,639 | B2 | 6/2021 | Ouyang | |
| D936,388 | S | 11/2021 | Schwandt | |
| 11,326,395 | B2 | 5/2022 | Heissenberg | |
| 11,421,474 | B2 | 8/2022 | James | |
| 2002/0066845 | A1 | 6/2002 | Pitlor | |
| 2003/0051410 | A1 | 3/2003 | Cloutier | |
| 2003/0136527 | A1 | 7/2003 | Weiss | |
| 2004/0154753 | A1 | 8/2004 | Tagtow et al. | |
| 2006/0137836 | A1 | 6/2006 | Harbison | |
| 2006/0256434 | A1 | 11/2006 | Shopp | |
| 2008/0141599 | A1 | 6/2008 | Akdag | |
| 2008/0179021 | A1 | 7/2008 | Biewer | |
| 2009/0078377 | A1 | 3/2009 | Ohara | |
| 2012/0012260 | A1 | 1/2012 | Elinson | |
| 2012/0325416 | A1 | 12/2012 | Hayashiguchi | |
| 2013/0174990 | A1 | 7/2013 | Asbury | |
| 2015/0041076 | A1 | 2/2015 | Andre De La Porte | |
| 2015/0345215 | A1 | 12/2015 | Roberts | |
| 2016/0108666 | A1 | 4/2016 | Lewan | |
| 2016/0245005 | A1 | 8/2016 | Tsuchiyama et al. | |
| 2016/0369556 | A1 | 12/2016 | Fleishman | |
| 2017/0044826 | A1 | 2/2017 | Nakae | |
| 2017/0175441 | A1 | 6/2017 | Drifka | |
| 2017/0254141 | A1 | 9/2017 | Iglesias Ballester | |
| 2018/0038160 | A1 | 2/2018 | James | |
| 2018/0187482 | A1 | 7/2018 | Berman | |
| 2018/0283096 | A1 * | 10/2018 | Nelson | E06B 9/72 |
| 2018/0313149 | A1 | 11/2018 | James | |
| 2020/0386047 | A1 | 12/2020 | James | |
| 2021/0172248 | A1 | 6/2021 | James | |
| 2021/0262284 | A1 | 8/2021 | James | |
| 2022/0136322 | A1 | 5/2022 | Hebeisen et al. | |

FOREIGN PATENT DOCUMENTS

| | | | | |
|---|---|---|---|---|
| DE | 102016120299 | A1 * | 4/2018 | |
| EP | 1873348 | A2 | 1/2008 | |
| EP | 3095950 | | 11/2016 | |
| EP | 3095950 | A1 | 11/2016 | |
| FR | 2886332 | A1 * | 12/2006 | E06B 9/54 |
| GR | 20090100073 | | 9/2010 | |
| TW | 455145 | | 9/2001 | |
| WO | 2014/043745 | A | 3/2014 | |

* cited by examiner

SECTION A-A
SECTION B-B
600
600/622
620/622
614
608
216
606
610
612
620
622
202
1.675
.640
.045
.595
.096
.460
1.370
1.300
2.875
15.00°
1.00°
A
B

RETRACTABLE SCREEN SYSTEMS

REFERENCE TO RELATED PATENT APPLICATIONS

This patent application claims priority to U.S. Provisional Patent Application 62/980,667 filed on Feb. 24, 2020 and titled ENDCAP ASSEMBLY FOR RETRACTABLE SCREEN SYSTEMS.

This patent application also claims priority to U.S. Provisional Patent Application 62/980,826 filed on Feb. 24, 2020 and titled CIRCUMFERENCE ADJUSTMENT SYSTEM FOR RETRACTABLE SCREEN SYSTEMS.

This patent application also claims priority to U.S. Provisional Patent Application 62/980,724 filed on Feb. 24, 2020 and titled SOUND DAMPENING SYSTEM FOR SELF-TENSIONING MAGNETIC TRACKS.

This patent application also claims priority to U.S. Provisional Patent Application 62/980,800 filed on Feb. 24, 2020 and titled ANCHOR SYSTEM FOR RETRACTABLE SCREEN SYSTEMS, all of which are hereby fully incorporated by reference herein in their entirety.

This application is also related to U.S. patent application Ser. No. 16/932,069 filed Jul. 17, 2020 and titled SELF-TENSIONING MAGNETIC TRACKS AND TRACK ASSEMBLIES; U.S. patent application Ser. No. 16/024,972 filed Jul. 2, 2018 and titled SELF-TENSIONING MAGNETIC TRACKS AND TRACK ASSEMBLIES; U.S. patent application Ser. No. 15/646,223 filed Jul. 11, 2017 and titled SELF-TENSIONING MAGNETIC TRACKS AND TRACK ASSEMBLIES, now U.S. Pat. No. 10,036,198; U.S. patent application Ser. No. 15/227,345 filed Aug. 3, 2016 and titled SELF-TENSIONING MAGNETIC TRACKS AND TRACK ASSEMBLIES, now U.S. Pat. No. 9,719,292; all of which are hereby fully incorporated by reference herein in their entirety.

TECHNICAL FIELD

The disclosed embodiments relate generally to the field of tracks and track assemblies for retractable screens, and more particularly, to adjustable roller tube assemblies, self-tensioning magnetic tracks and track assemblies, and anchor systems for motorized retractable screens.

Overview

Over the past two decades, motorized retractable screens have gained popularity due to their utility and versatility for temporarily enclosing spaces. For example, many restaurants and other businesses having patios/outdoor areas utilize retractable screens to temporarily enclose these areas thereby creating environmentally controlled areas that are shielded from inclement weather conditions (e.g., windy and/or cold weather conditions).

While these retractable screens have great versatility and utility, several problems exist with the currently marketed screens and tracks/track assemblies. For example, the currently marketed tracks and track assemblies are fixed tracks that maintain the screen in a tight, aesthetically pleasing manner once the screen has been deployed. Although these fixed tracks/track assemblies maintain the screen in a tight, aesthetically pleasing manner, these fixed tracks allow for very little play (e.g., expansion and/or contraction) of the screen during, for example, high wind conditions. Consequently, during high wind conditions, these screens may (1) twist, buckle, and/or warp the fixed tracks/track assemblies, (2) damage the screen, or (3) any combination thereof. These problems lead to frequent, costly repairs and/or replacement of the fixed tracks/track assemblies and screens. Another problem with current retractable screen system is that stretching of screen material, wrinkling/creasing of screen material, sagging of a roller tube, uneven weight distribution or tension, and/or, bunching of screen materials on a roller tube may cause undesirable artifacts to become visible in the screen.

SUMMARY

In one or more arrangements, a retractable roller shade system is presented that includes tracks and track assemblies that overcome the problems of currently marketed fixed tracks and fixed track screen assemblies. In one of more embodiments, the tracks and track screen assemblies overcome these problems by utilizing a self-tensioning magnet arrangement that allows for expansion and contraction of a screen/shade attached thereto. When compared to currently marketed fixed tracks and fixed track screen assemblies, this self-tensioning magnet arrangement advantageously results in less frequent maintenance of the disclosed tracks/track assemblies while simultaneously increasing screen lifespan.

In one or more arrangements, a set of tracks and track assemblies utilize a novel arrangement of magnets in the track assemblies that allow a screen attached thereto to expand while under high wind pressure/conditions. Specifically, in the track and track assemblies, magnets having opposite polarity separate from one another allowing for screen expansion while subjected to high wind pressure. However, after the high wind pressure subsides, the magnetic attraction of the separated magnets pulls the separated magnets into close proximity relative to one another while concurrently tensioning the screen to provide for an aesthetically pleasing, tight screen.

As another feature, in one or more embodiments, tracks and track assemblies do not have dimensional limitations of screens that can be used in these tracks/track assemblies, and screens covering extremely wide and tall openings, including dimensions of up to 30 feet wide by 24 feet high, may be used with the disclosed tracks and track assemblies.

In one or more arrangements, a magnetic track assembly includes an elongate channel having an open side, an end wall, and two parallel sidewalls; a first magnet disposed within the elongate channel near an interior side of the end wall; a compartment defined within the elongate channel spaced from the first magnet; and a screen receiver disposed within the compartment and including a second magnet arranged facing the first magnet, wherein the first and second magnets are of opposite polarity and the screen receiver is loosely disposed within the compartment such that a magnetic bond is intact between the first and second magnets when the first and second magnets are close together and the magnetic bond is broken when the first and second magnets are pulled apart.

In one or more arrangements, the screen receiver includes an elongate C-shaped channel opening in a direction opposite the first magnet such that the C-shaped channel is accessible through the open side of the elongate channel. The screen receiver, and more particularly the C-shaped channel opening, are in some implementations adapted to receive an interlock attached to the screen. Such interlock may include, but is not limited to a keder interlock, a zipper interlock, a rope, a beaded chain, or any similar interlock known in the art associated with the disclosed retractable screens.

In one or more arrangements, the screen receiver includes an elongate channel opening configured to receive and hold a low profile interlock attached to the screen. In one or more arrangements, the low profile interlock includes at least one lock member connected to a side of the screen. The lock member has an inner side and an outer side. The outer side of the lock member is connected to the screen. The inner side of the lock member is free. When the screen is in a retracted position, the inner side of the lock member lays flat with the screen; wherein when in a deployed position, the inner side of the lock member extends away from the screen and engages with the channel opening of the screen receiver.

In one or more arrangements, a retractable screen system is provided. The system includes a roller tube having an exterior surface. First and second end caps are operably connected to the ends of the tube. Each end cap has an exterior surface extending from an inner end to an outer end. A screen is connected to the roller tube and an upper edge of the screen. The screen wraps around the exterior surface of the roller tube. A first side of the screen extends past a first end of the roller tube and a second side of the screen extends past a second end of the roller tube. The exterior surface of the first end cap and the exterior surface of the second end cap curve from the exterior surface of the roller tube to a smaller diameter thereby providing a smooth transition for the screen and preventing creases in the screen when the screen wraps around the roller tube. In addition, adjustment of the position of these end caps relative to the ends of the roller tube allows for adjusting where the interlock lands on the curved exterior surface of the end caps thereby affecting the rate at which the screen is raised and the manner in which the interlock stacks up on itself as the screen is raised.

In one or more arrangements, a retractable screen system is provided that includes a roller tube having an exterior surface. A screen is connected to the roller tube at an upper edge of the screen. The screen wraps around the exterior surface of the roller tube and extends past the ends of the roller tube. The system includes one or more length adjustment members configured and arranged to adjust an effective length of the roller tube, and thereby adjust how much of the screen extends past an end of the roller tube. First and second end caps are connected to ends of the roller tube. The first and second end caps, each have an exterior surface with a curved shape thereby providing a smooth transition for the screen and preventing creases in the screen when the screen wraps around the roller tube. The adjustability also allows for adjustment of the rate at which each end of the screen is raised, which is useful when an opening is not perfectly square.

In one or more arrangements, a retractable screen system is provided. The system includes a roller tube having an exterior surface and a screen having a top edge attached to the roller tube. The screen is configured to wrap around the roller tube when the roller tube is rotated in a first direction. The screen is configured to unwrap from around the roller tube when the roller tube is rotated in a second opposite direction. The system also includes a circumference adjustment assembly operably connected to the roller tube. The circumference adjustment assembly is configured to adjust effective circumference of the roller tube at a position where the adjustment member is attached to the circumference adjustment assembly.

In one or more arrangements, a retractable screen system is provided. The system includes a roller tube having an exterior surface and a screen having a top edge attached to the roller tube. The screen is configured to wrap around the roller tube when the roller tube is rotated in a first direction. The screen is configured to unwrap from around the roller tube when the roller tube is rotated in a second opposite direction. A bottom bar assembly is connected to a bottom edge of the screen. An anchor system having one or more base plates is positioned below the bottom bar. When the screen is moved to fully deployed position, the base plate and the bottom bar mechanically interlock with one another as well as magnetically attract to one another thereby securing the bottom bar in position.

Additional features, aspects and advantages provided by some various embodiments are set forth in the detailed description which follows, and in part will be readily apparent to those skilled in the art from the specification, figures and claims described herein.

DETAILED DESCRIPTION

Figure 1:
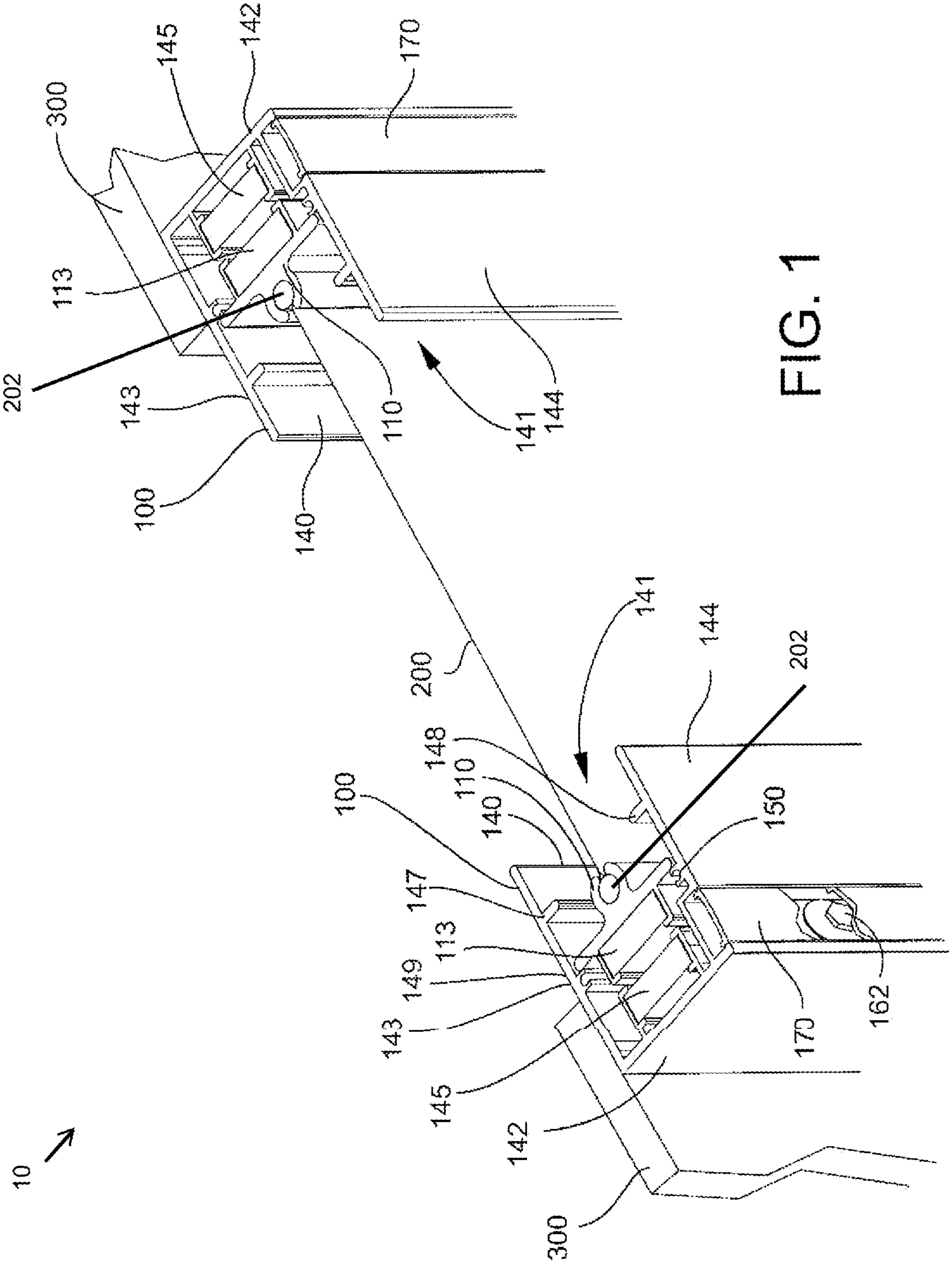
FIG. 1 is a perspective view of the assembled magnetic track assembly having a motorized retractable screen attached thereto in which the screen has a tight, aesthetically pleasing appearance, in accordance with one or more embodiments.

In the following detailed description of the embodiments, reference is made to the accompanying drawings which form a part hereof, and in which is shown by way of illustration specific embodiments in which the disclosure may be practiced. The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure. It will be understood by those skilled in the art that various changes in form and details may be made without departing from the principles and scope of the invention. It is intended to cover various modifications and similar arrangements and procedures, and the scope of the appended claims therefore should be accorded the broadest interpretation so as to encompass all such modifications and similar arrangements and procedures. For instance, although aspects and features may be illustrated in or described with reference to certain figures or embodiments, it will be appreciated that features from one figure or embodiment may be combined with features of another figure or embodiment even though the combination is not explicitly shown or explicitly described as a combination. In the depicted embodiments, like reference numbers refer to like elements throughout the various drawings.

It should be understood that any advantages and/or improvements discussed herein may not be provided by some various disclosed embodiments, or implementations thereof. The contemplated embodiments are not so limited and should not be interpreted as being restricted to embodiments which provide such advantages or improvements. Similarly, it should be understood that various embodiments may not address all or any objects of the disclosure or objects of the invention that may be described herein. The contemplated embodiments are not so limited and should not be interpreted as being restricted to embodiments that address such objects of the disclosure or invention. Furthermore, although some disclosed embodiments may be described relative to specific materials, embodiments are not limited to the specific materials or apparatuses but only to their specific characteristics and capabilities and other materials and apparatuses can be substituted as is well understood by those skilled in the art in view of the present disclosure.

It is to be understood that the terms such as "left, right, top, bottom, front, back, side, height, length, width, upper, lower, interior, exterior, inner, outer, and the like as may be used herein, merely describe points of reference and do not limit the present invention to any particular orientation or configuration.

As used herein, the term "or" includes one or more of the associated listed items, such that "A or B" means "either A or B". As used herein, the term "and" includes all combinations of one or more of the associated listed items, such that "A and B" means "A as well as B." The use of "and/or" includes all combinations of one or more of the associated listed items, such that "A and/or B" includes "A but not B," "B but not A," and "A as well as B," unless it is clearly indicated that only a single item, subgroup of items, or all items are present. The use of "etc." is defined as "et cetera" and indicates the inclusion of all other elements belonging to the same group of the preceding items, in any "and/or" combination(s).

As used herein, the singular forms "a," "an," and "the" are intended to include both the singular and plural forms, unless the language explicitly indicates otherwise. Indefinite articles like "a" and "an" introduce or refer to any modified term, both previously-introduced and not, while definite articles like "the" refer to a same previously-introduced term; as such, it is understood that "a" or "an" modify items that are permitted to be previously-introduced or new, while definite articles modify an item that is the same as immediately previously presented. It will be further understood that the terms "comprises," "comprising," "includes," and/or "including," when used herein, specify the presence of stated features, characteristics, steps, operations, elements, and/or components, but do not themselves preclude the presence or addition of one or more other features, characteristics, steps, operations, elements, components, and/or groups thereof.

It will be understood that when an element is referred to as being "connected," "coupled," "mated," "attached," "fixed," etc. to another element, it can be directly connected to the other element, and/or intervening elements may be present. In contrast, when an element is referred to as being "directly connected," "directly coupled," "directly engaged" etc. to another element, there are no intervening elements present. Other words used to describe the relationship between elements should be interpreted in a like fashion (e.g., "between" versus "directly between," "adjacent" versus "directly adjacent," "engaged" versus "directly engaged," etc.). Similarly, a term such as "operatively", such as when used as "operatively connected" or "operatively engaged" is to be interpreted as connected or engaged, respectively, in any manner that facilitates operation, which may include being directly connected, indirectly connected, electronically connected, wirelessly connected or connected by any other manner, method or means that facilitates desired operation. Similarly, a term such as "communicatively connected" includes all variations of information exchange and routing between two electronic devices, including intermediary devices, networks, etc., connected wirelessly or not. Similarly, "connected" or other similar language particularly for electronic components is intended to mean connected by any means, either directly or indirectly, wired and/or wirelessly, such that electricity and/or information may be transmitted between the components.

It will be understood that, although the ordinal terms "first," "second," etc. may be used herein to describe various elements, these elements should not be limited to any order by these terms unless specifically stated as such. These terms are used only to distinguish one element from another; where there are "second" or higher ordinals, there merely must be a number of elements, without necessarily any difference or other relationship. For example, a first element could be termed a second element, and, similarly, a second element could be termed a first element, without departing from the scope of example embodiments or methods.

Similarly, the structures and operations discussed herein may occur out of the order described and/or noted in the figures. For example, two operations and/or figures shown in succession may in fact be executed concurrently or may sometimes be executed in the reverse order, depending upon the functionality/acts involved. Similarly, individual operations within example methods described below may be executed repetitively, individually, or sequentially, to provide looping or other series of operations aside from single operations described below. It should be presumed that any embodiment or method having features and functionality described below, in any workable combination, falls within the scope of example embodiments.

As used herein, various disclosed embodiments may be primarily described in the context of retractable roller shades. However, the embodiments are not so limited. It is appreciated that the embodiments may be adapted for use in various other applications, which may be improved by the disclosed structures, arrangements and/or methods. The support system is merely shown and described as being used in the context of retractable roller shades for ease of description and as one of countless examples.

Disclosed are magnetic tracks and track assemblies that utilize a novel magnet arrangement in the track assemblies that allow magnets to separate thereby allowing an attached screen to expand while under high wind pressure, and after the high wind pressure subsides, magnetic attraction of these separated magnets pulls the separated magnets into close proximity relative to one another thereby tensioning the attached screen to provide an aesthetically pleasing, tight screen. Thus, the novel magnet arrangement of the disclosed magnetic tracks/track assemblies provide a "self-tensioning" system that operates effectively while accounting for fluctuations in weather conditions that ensures increased screen and track assembly lifespan while currently reducing frequent maintenance (and/or replacement) associated with currently marketed screens, track/track assemblies, or a combination thereof.

Exemplary magnetic tracks/track assemblies 100 are depicted, for example, in FIGS. 1-8. For example, FIG. 1 depicts a perspective view of two assembled magnetic track assemblies 100 having a parallel arrangement respective to one another with a motorized, retractable screen 200 positioned between and attached to each assembly. The motorized, retractable screen 200 is readily deployed and retracted between the two magnetic track assemblies while, in certain preferred aspects, all portions of the assembly remain vertically stationary during screen deployment and retraction. The magnetic track assembly 100 further has sufficient length to extend vertically along a vertical structure 300 (e.g., a column or a doorway) to ensure that the screen 200 may vertically span the entire length of the vertical structure 300 thereby creating a temporarily enclosed space when the screen is deployed.

Figure 2:
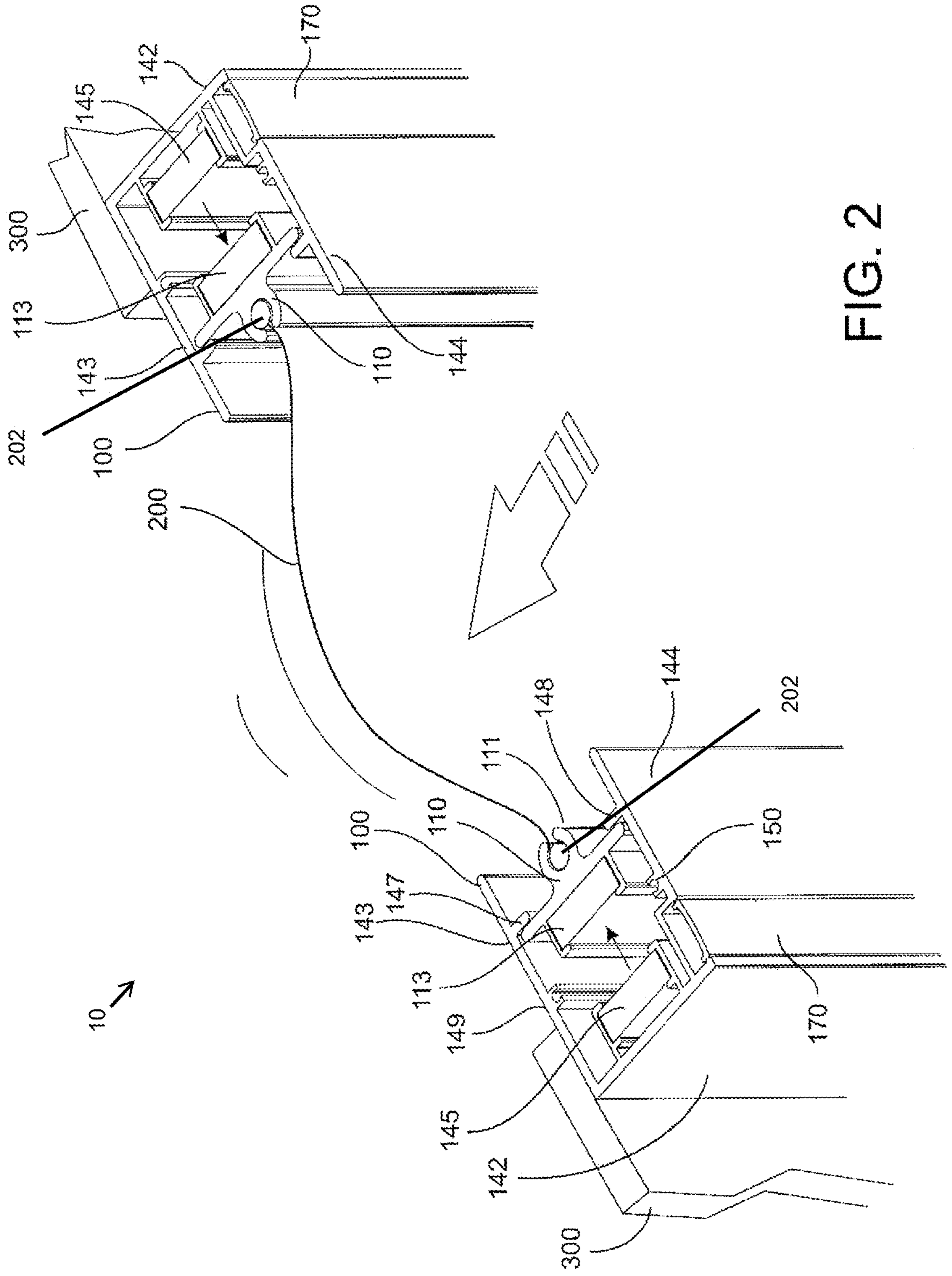
FIG. 2 further depicts the magnetic track assembly and a motorized retractable screen of FIG. 1 during inclement weather in which the magnets of each track assembly separate allowing the screen to expand, in accordance with one or more embodiments.

FIG. 2 shows a perspective view of FIG. 1 further demonstrating the novel magnet arrangement that provides the above discussed "self-tensioning" system when the magnets 113, 145 are separated from one another during, for example, inclement weather conditions. As shown in FIGS. 1 and 2, the magnetic track assembly 100 includes a screen receiver 110 and an elongate channel 140 having an open side 141, an end wall 142, and two parallel sidewalls 143, 144. The elongate channel 140 further includes a magnet 145 having a predetermined polarity attached to the interior of its end wall 142 and a compartment 146 formed by a plurality of partitions 147, 148, 149, 150 that extend inwardly towards the interior of the elongate channel 140. The compartment 146 is adapted to securely receive the removable screen receiver 110 while allowing for movement therein.

Figure 6:
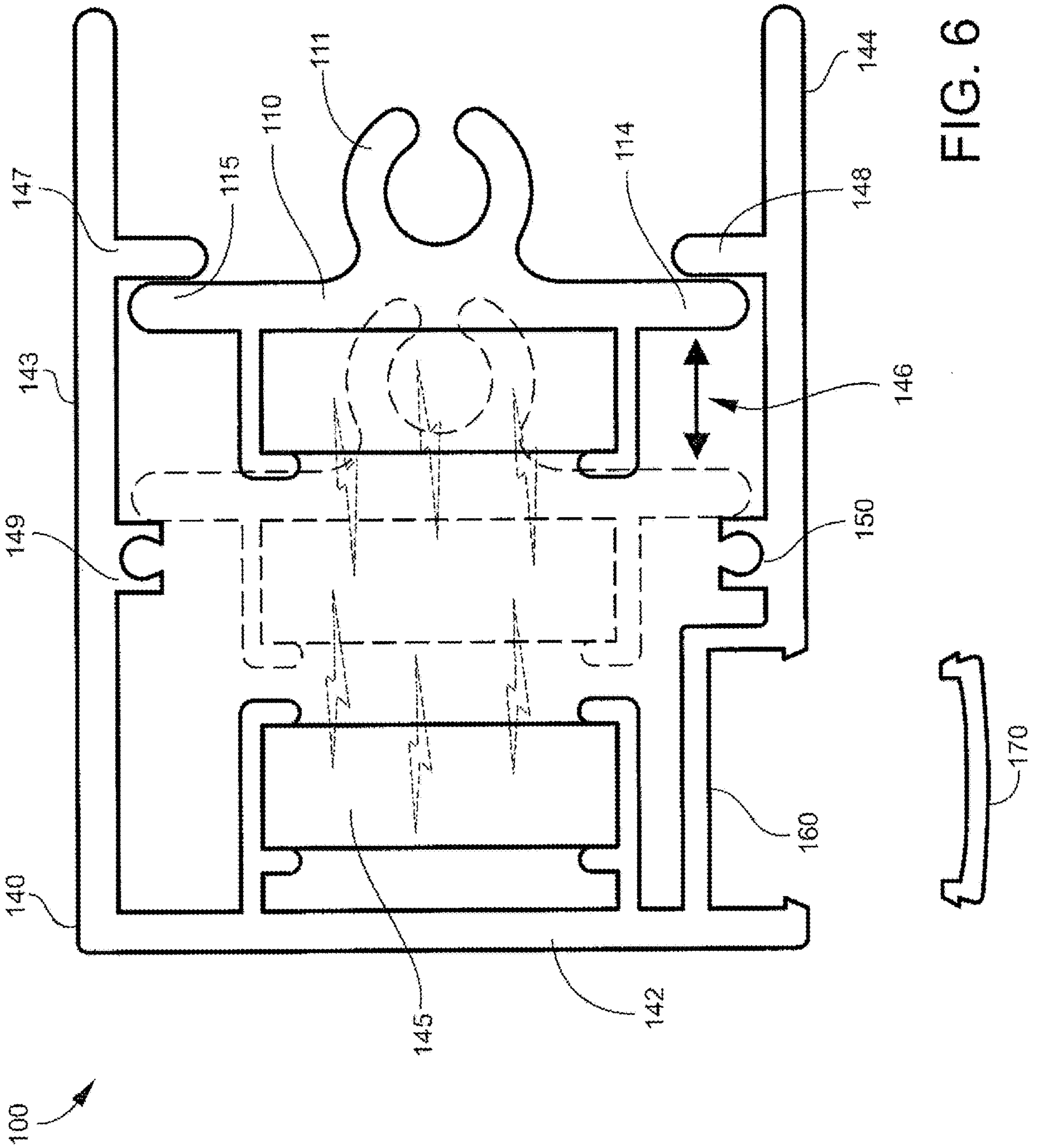
FIG. 6 is a top view of the magnetic track assembly showing the screen receiver including a magnet arranged thereon positioned in the compartment of the elongate channel, in accordance with one or more embodiments.
Figure 7:
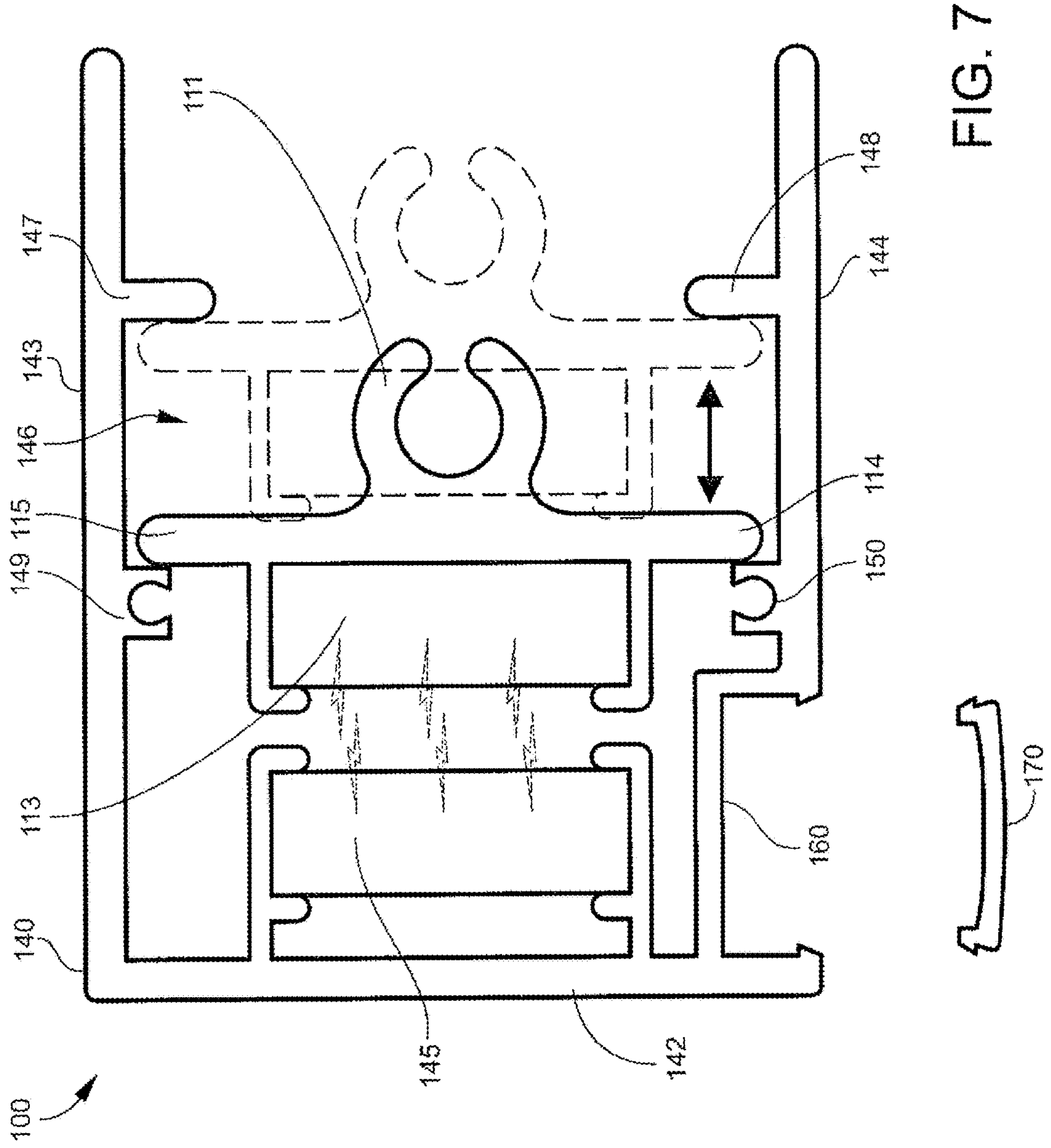
FIG. 7 is a top view of the magnetic track assembly showing the screen received positioned in the compartment of the elongate channel and the magnet arranged on the screen receiver extending beyond the compartment in a direction towards a magnet arranged on an end wall of the elongate channel, in accordance with one or more embodiments.

As further shown in FIGS. 1 and 2, the screen receiver 110 is adapted to receive a screen 200 on one side of the screen receiver 110 while having a magnet 113 arranged on an opposite side. For example, in certain aspects, the screen receiver 110 includes a C-shaped channel 111 formed thereon that receives an interlock 202 of the screen 200 (e.g., a screen keder interlock, a zipper interlock, a rope, a beaded chain, or any similar interlock 202 known in the art) while providing sufficient clearance such that the screen may easily move through the C-shaped channel—the screen being easily deployed and retracted as desired through the C-shaped channel. On a side 112 opposite the C-shaped channel, the screen receiver 110 includes a magnet 113 arranged thereon having an opposite polarity of magnet 145 attached to the interior of end wall 142. The screen receiver 110 is preferably adapted to be removably positioned in the compartment 146 of the elongate channel 140 such that magnet 113 of the screen receiver 110 and magnet 145 arranged on the interior of end wall 142 are in close proximity and attract one another, thereby creating a magnetic bond when the magnets 113, 145 are in close proximity, as shown in FIGS. 1 and 7, but the magnetic bond is temporarily broken when the magnets are separated/pulled apart, as shown, for example, in FIGS. 2 and 6.

For example and as shown in FIG. 1, when the track assemblies 100 are fully assembled and have a screen 200 attached there between, for example, two track assemblies, screen 200 is pulled tight (i.e., has a tight, aesthetically pleasing look) when magnets 113, 145 of the assembly are in close proximity and have an intact magnetic bond. However, as shown in FIG. 2, during inclement weather (e.g., high wind conditions), the screen receiver 110 is configured to move within compartment 146 allowing the magnetic bond between magnets 113, 145 to be broken in one or both screen assemblies, thereby allowing for screen expansion. Once the inclement weather subsides (e.g., high wind conditions), magnets 113, 145 of each assembly are arranged in close enough proximity such that the opposite magnetic polarities attract one another, thus once again pulling the screen tight 200 between the two assemblies, thus providing the screen with a tight, aesthetically pleasing look.

Figure 3:
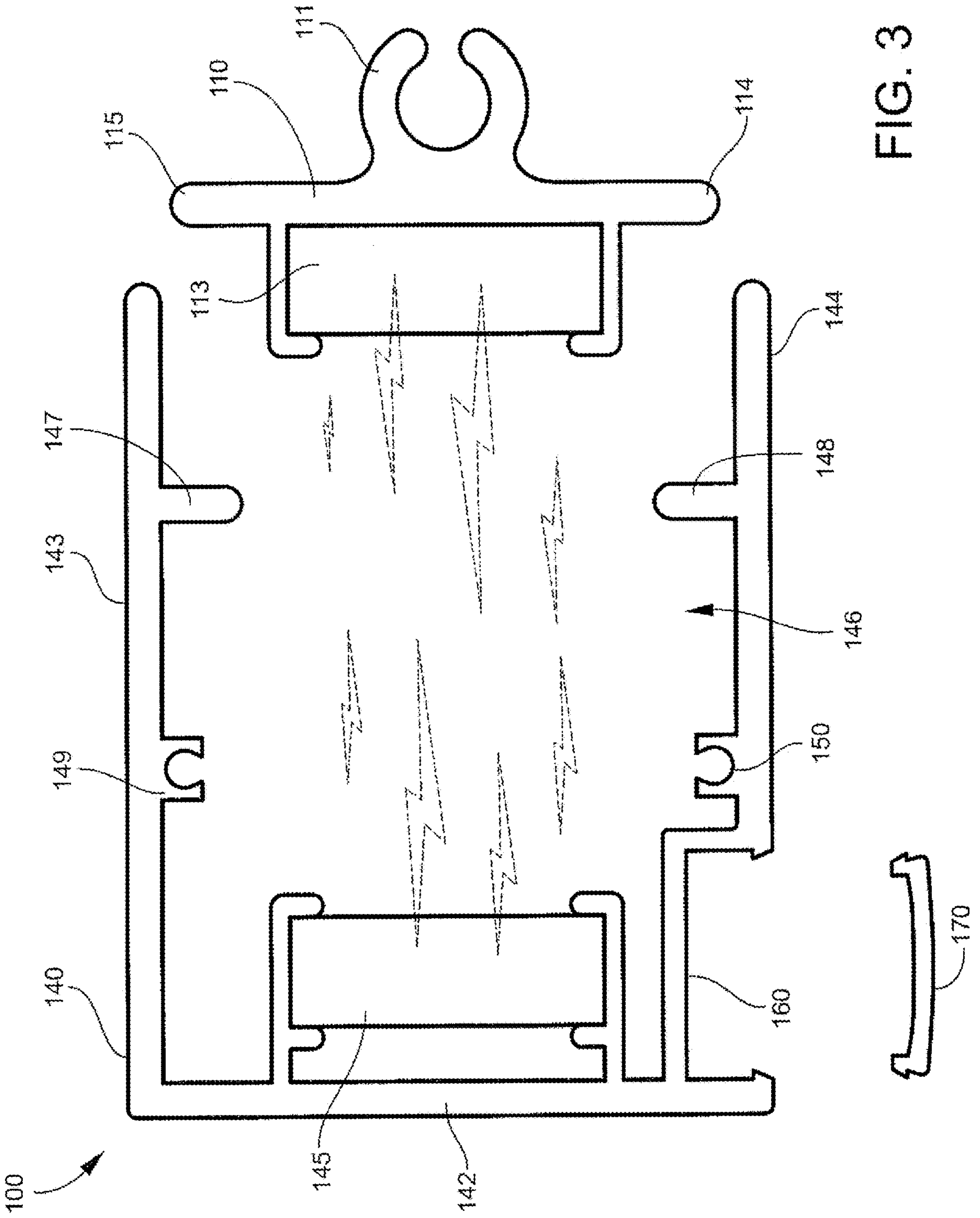
FIG. 3 is a top view of the magnetic track assembly showing the screen receiver outside of the opening of the elongate channel, in accordance with one or more embodiments.

FIGS. 3-8 depict sequential views of assembling the magnetic track assembly 100 by positioning the screen receiver 110 in the elongate channel 140, and once assembled, how screen receiver 110 may laterally move in compartment 146, vertically move, or a combination thereof in the elongate channel 140 during inclement weather. FIG. 3 specifically depicts a top view of the magnetic track assembly 100 in which the screen receiver 110 and elongate channel 140 are two separate components. As shown, in a disassembled state, the screen receiver 110 is initially outside of the elongate channel 140, but during assembly of the magnetic track assembly 100, the screen receiver 110 is securely (but removably) positioned in the elongate channel 140.

Figure 4:
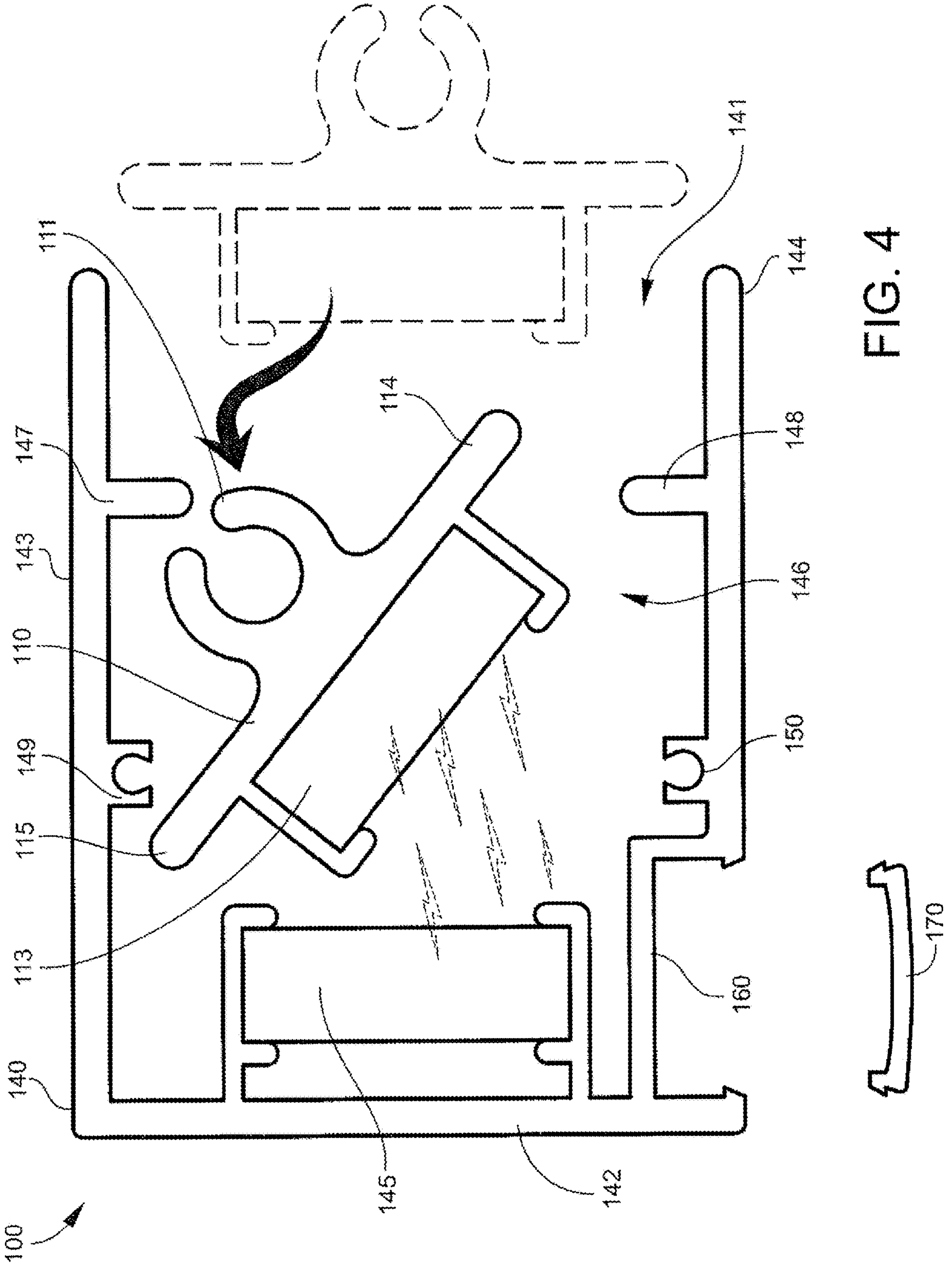
FIG. 4 is a top view of the magnetic track assembly showing the screen receiver being positioned inside the elongate channel, in accordance with one or more embodiments.

As shown in FIG. 4, the screen receiver 110 is positioned in the compartment 146 of the elongate channel 140 by initially turning the screen receiver 110 at an angle (e.g., diagonally) relative to the two parallel sidewalls 143, 144 of the elongate channel 140. Next, the screen receiver 110 is advanced inside the elongate channel 140 in a direction towards the magnet 145 arranged on the interior of end wall 142. As further shown in FIG. 4, one end 115 of screen receiver 110 is advanced beyond the end of the compartment 146 nearest to end wall 142 while the opposite end 114 of screen receiver 110 remains outside of the opposite end of the compartment 146 nearest to the opening 141 of the elongate channel 140.

Figure 5:
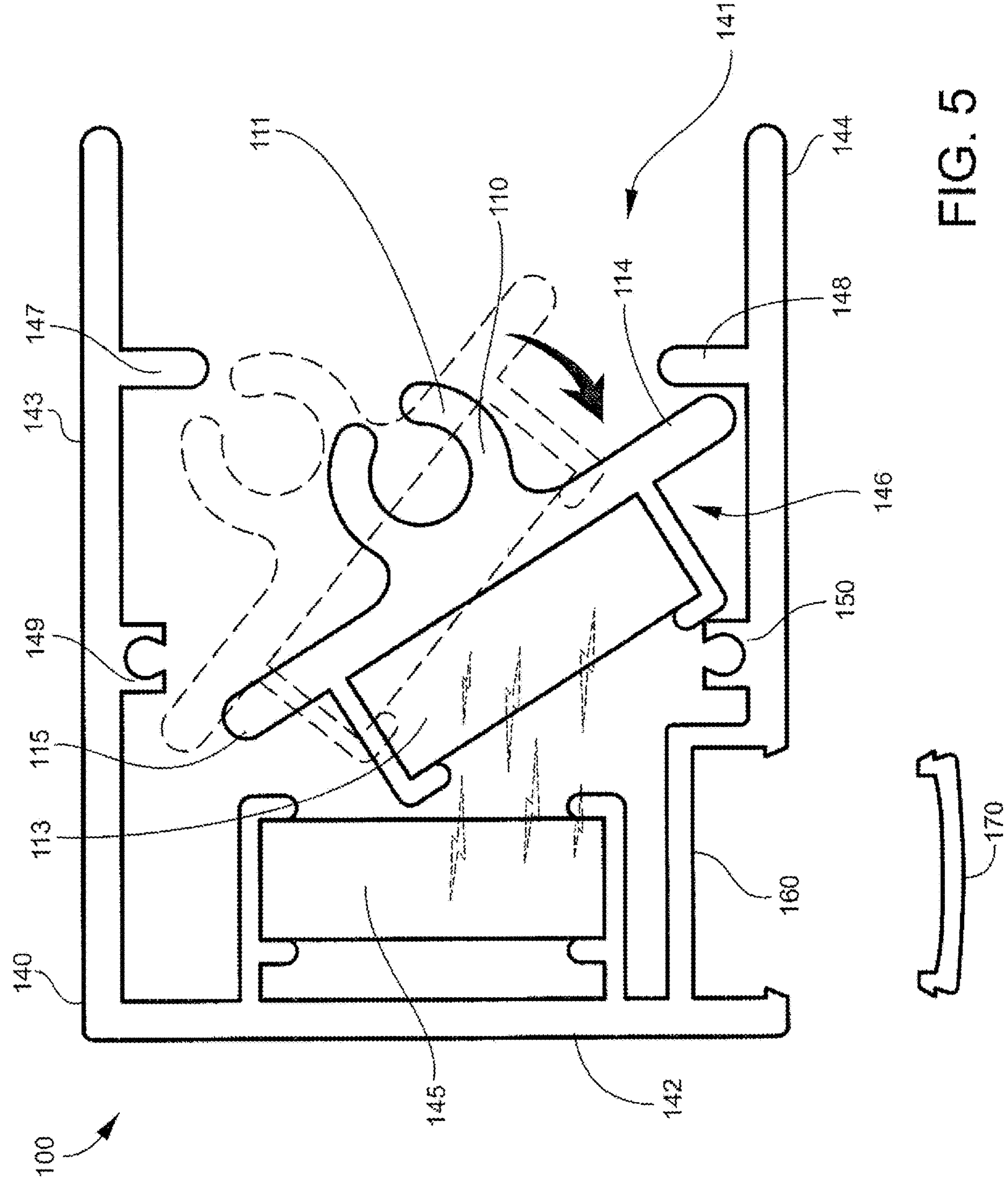
FIG. 5 is another top view of the magnetic track assembly showing the screen receiver being positioned and moved within the elongate channel, in accordance with one or more embodiments.

Next and as further shown in FIG. 5, the screen receiver 110 is advanced in the compartment and moved such that end 114 of the screen receiver 110 is positioned within the compartment 146 and is adjacent relative to partition 148 and parallel sidewall 144 thereby securing end 114 of screen receiver 110 in the compartment. As shown in FIGS. 5 and 6, sufficient clearance exists between end 115 of the screen receiver 110 and partition 149 of parallel sidewall 143 to adjust the screen receiver 110 and secure the screen receiver 110 in the compartment 146. As shown in FIGS. 6 and 7, when the screen receiver 110 is secured in compartment 146, ends 114, 115 of screen receiver 110 are preferably parallel relative to the partitions 147, 148, 149, 150 that form compartment 146. In certain aspects, the partitions extend inward less than half a distance between the two parallel sidewalls 143, 144.

As further shown in FIGS. 6 and 7, clearance exists between ends 114, 115 of screen receiver 110 and each corresponding parallel sidewall 143, 144 to allow lateral movement (horizontal movement) of the screen receiver 110 between the parallel sidewalls 143, 144. As further shown in FIGS. 6 and 7, the screen receiver 110 may also move between partitions 147, 148 (front partitions of compartment) and partitions 149, 150 (back partitions) within compartment 146 in a direction extending from end wall 142 to opening 141 (and vice versa). For example, FIG. 7 specifically depicts the magnet 113 of the screen receiver 110 being in close proximity to magnet 145 arranged on end wall 142 such that a magnetic bond is intact between the magnets. When having this arrangement and having a screen 200 received through the screen receiver 110, the screen would be pulled tight having a tight, aesthetically pleasing look. As further shown in FIG. 7, when the magnets 113, 145 are in close proximity such that the magnetic bond is intact, the magnet 113 arranged on screen receiver 110 is outside of the compartment 146 extending in a direction towards the interior of end wall 142.

However, as shown in FIGS. 2 and 6, the magnetic bond between magnets 113, 145 may be broken, for example, during inclement weather. For example, when a screen 200 is received through screen receiver 110, the screen is allowed to "expand" during, for example, inclement weather including high wind conditions. As shown in FIGS. 2 and 6 in view of FIG. 7, during high wind conditions, the screen 200 may apply force to the screen receiver 110 such that the magnetic bond between the magnets 113, 145 is broken and screen receiver 110 moves within the compartment in a direction away from end wall 142 towards the opening 141 of the elongate channel 140. As further shown in FIG. 6, when the magnetic bond is broken, magnet 113 arranged on screen receiver 110 is temporarily in compartment 146, and in certain aspects, ends 114, 115 of the screen receiver 110 may contact the partitions 147, 148 of the compartment nearest the opening 141 of elongate channel 140, thereby securely remaining in the compartment. Thus, in view of the above disclosures, FIGS. 6 and 7 demonstrate how screen receiver 110 moves within compartment 146 thereby allowing for screen expansion during inclement weather conditions and screen contraction/tightening once the inclement weather subsides.

Figure 8:
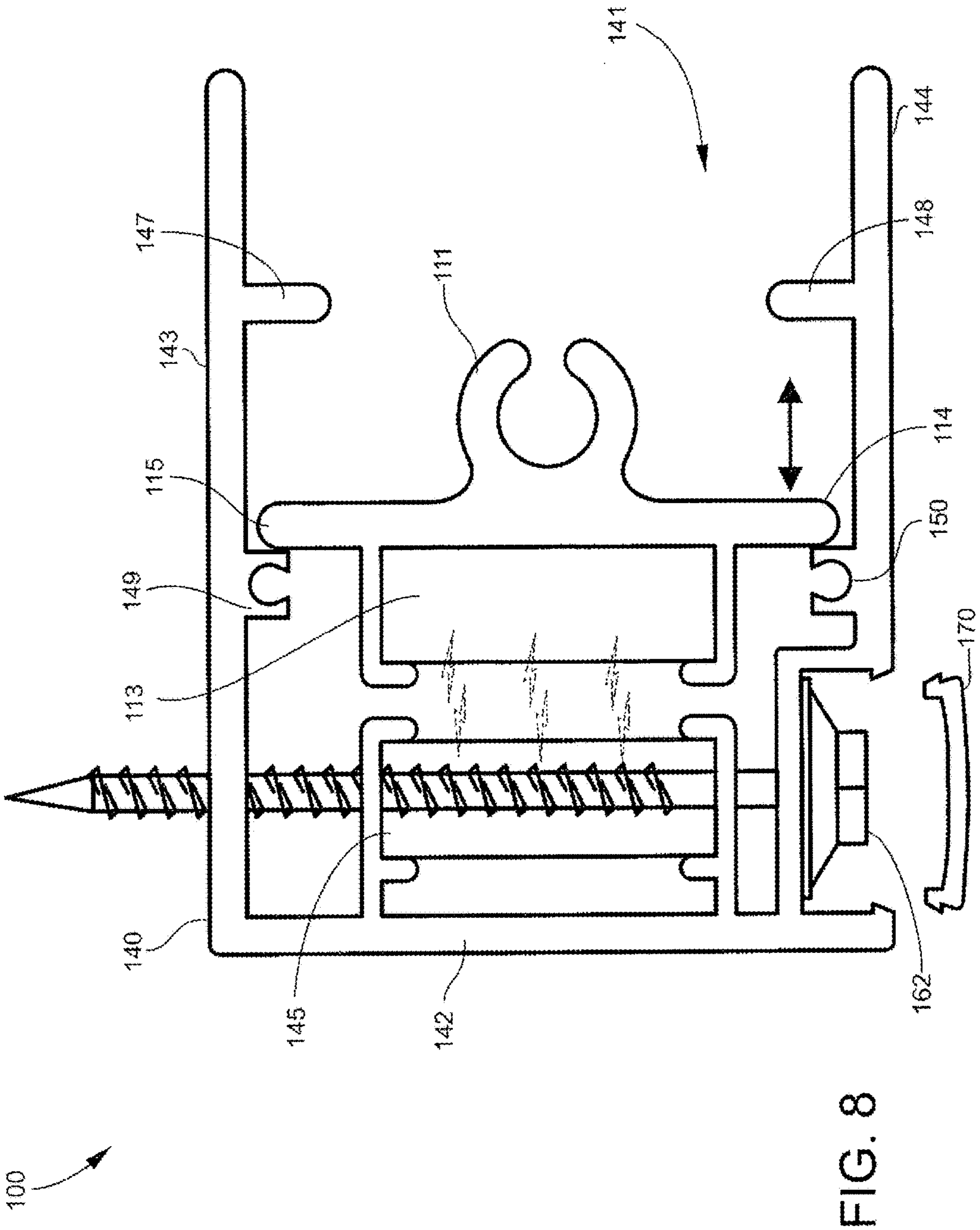
FIG. 8 is the top view of FIG. 7 further showing a fastener extending through the parallel sidewalls of the elongate channel for attaching the magnetic track assembly to a desired surface, in accordance with one or more embodiments.

As further shown in FIGS. 1 and 8, the magnetic track assembly 100, and more specifically the elongate channel 140, may be permanently fixed to a vertical structure 300 such as a column or a doorway. For example, elongate channel 140 may include a plurality of through holes 161 on each parallel sidewall in which a through hole on one sidewall 144 is aligned with a complimentary through hole on the second sidewall 143. The through holes allow the elongate channel 140 to be permanently fixed to a vertical structure by advancing a fastener 162 (e.g., a screw) through the aligned through holes into the vertical structure 300, thereby fixing the elongate channel 140 to the vertical structure 300. As further depicted in FIGS. 3-8, in certain aspects, the elongate channel 140 includes a secondary channel 160 disposed along one 144 of the two parallel sidewalls opening in a direction perpendicular to the open side 141 of the elongate channel 140. The secondary channel 160 forms a recess having through holes arranged thereon that are aligned with through holes on the other parallel side. After advancing the fastener 162 through the through holes, the fastener head is fully disposed within the recess formed by the secondary channel 160 and preferably does not extend beyond the outermost surface of the parallel sidewall 144 on which the secondary channel is formed. As further shown in FIG. 8, the magnetic track assembly 100 further includes a removable elongate cover 170 that fits with the secondary channel 160 to conceal the fastener head in the secondary channel. In certain aspects, the elongate cover 170 extends the entire length of the secondary channel and may be configured for a snap fit, interference fit, or sliding engagement with the secondary channel 160.

Figure 9:
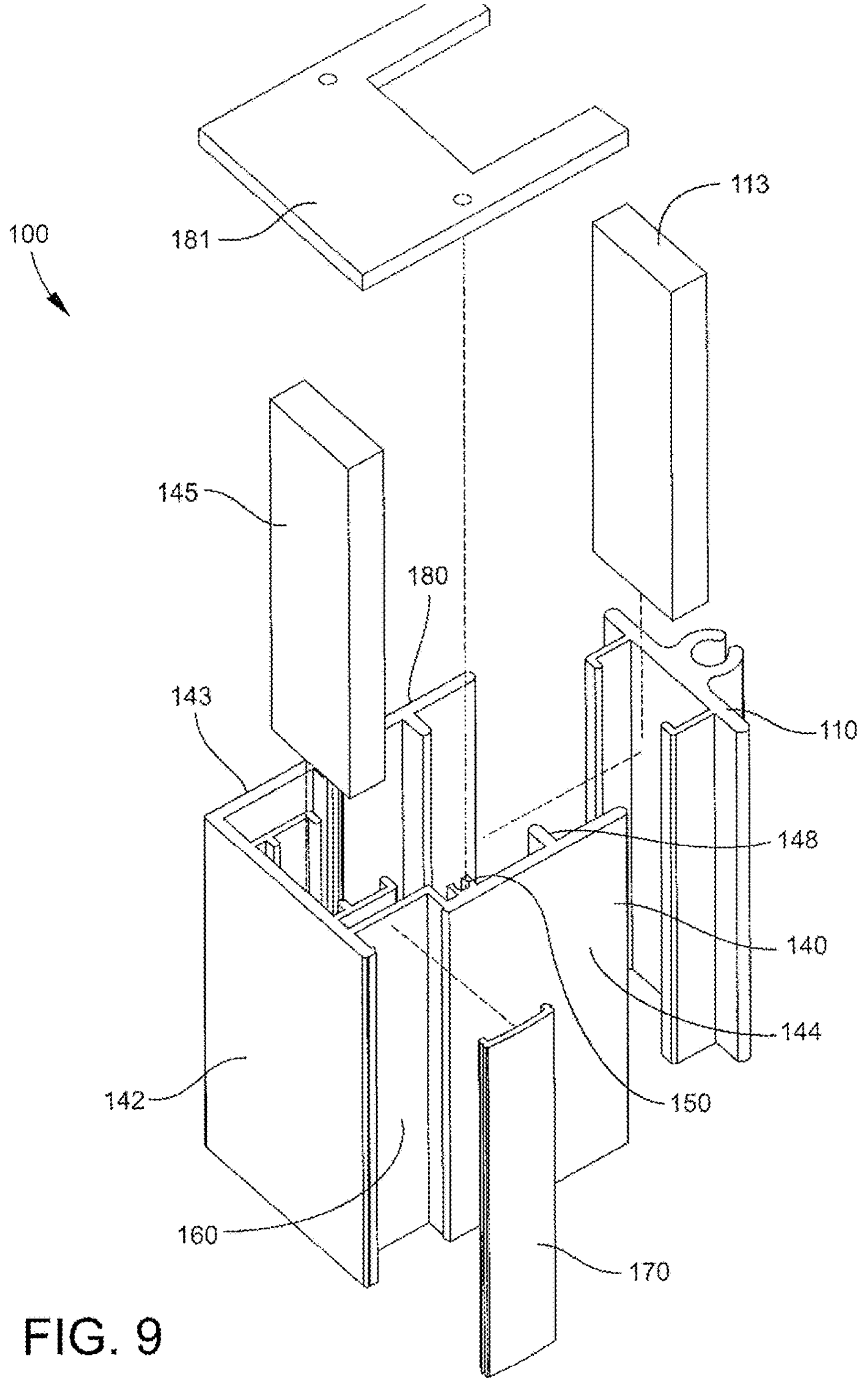
FIG. 9 depicts an exploded view of the magnetic track assembly, in accordance with one or more embodiments.
Figure 10:
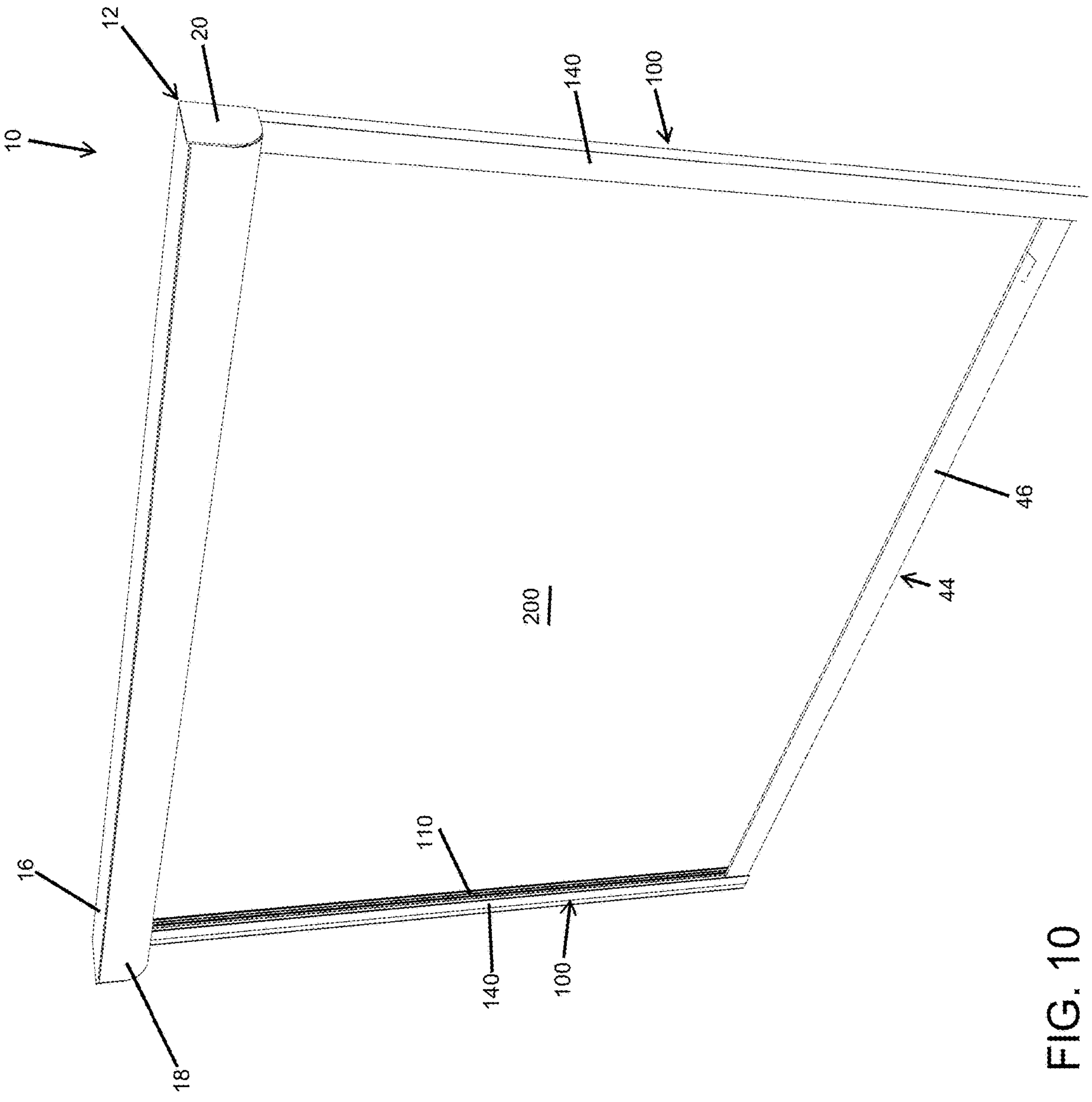
FIG. 10 is a front perspective view of an assembled motorized screen system having a magnetic track assembly, in accordance with one or more embodiments; the view showing a housing positioned at the upper end of the motorized screen system; the view showing a screen deployed to the fully closed position; the view showing a pair of magnetic track assemblies having elongate channels and screen receivers therein positioned adjacent the outward sides of the screen; the view showing a bottom bar assembly connected to the lower end of the screen.
Figure 11:
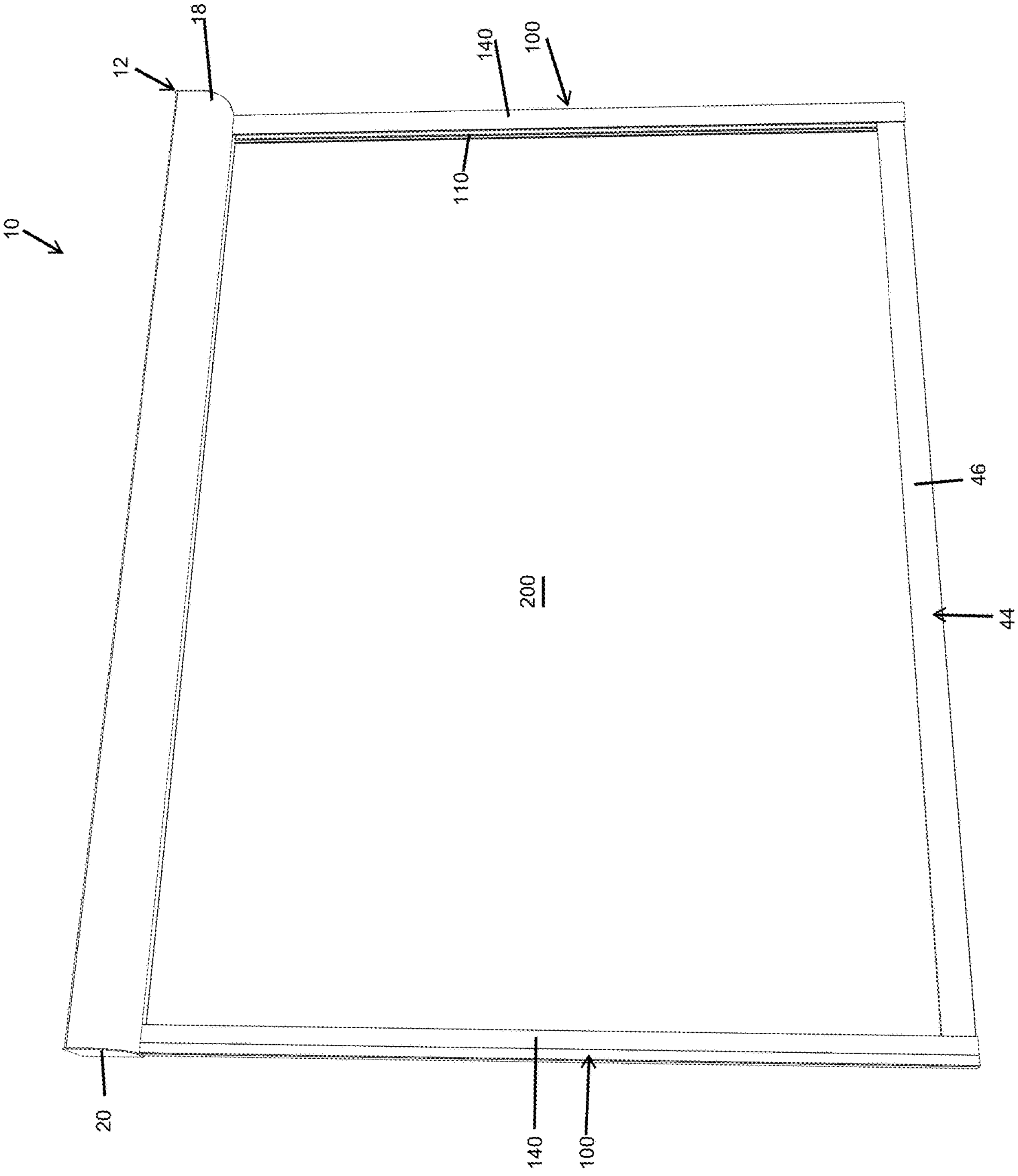
FIG. 11 is another front perspective view of an assembled motorized screen system having a magnetic track assembly as is shown in FIG. 10, in accordance with one or more embodiments.
Figure 12:
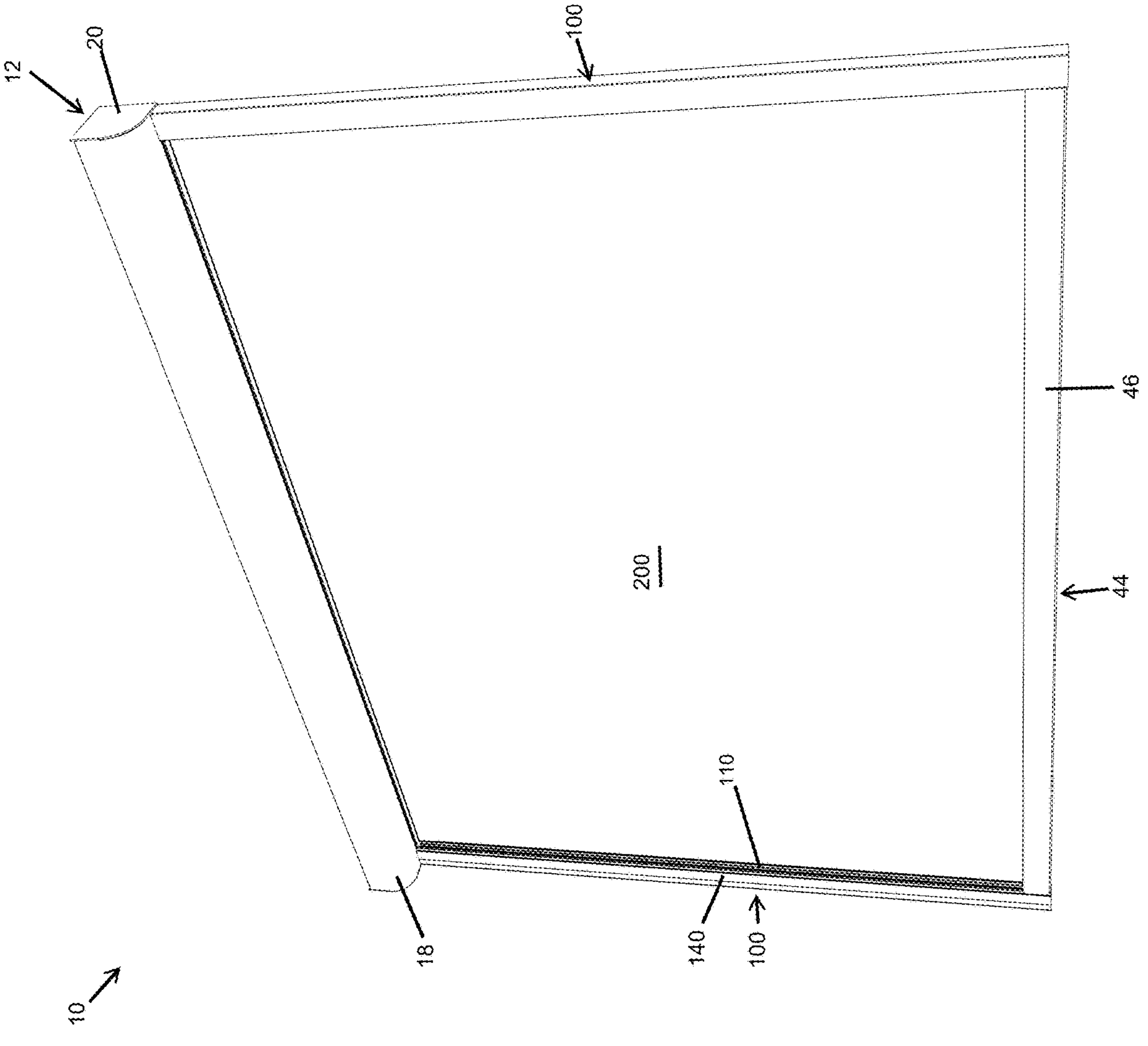
FIG. 12 is another front perspective view of an assembled motorized screen system having a magnetic track assembly as is shown in FIGS. 10-11, in accordance with one or more embodiments.
Figure 13:
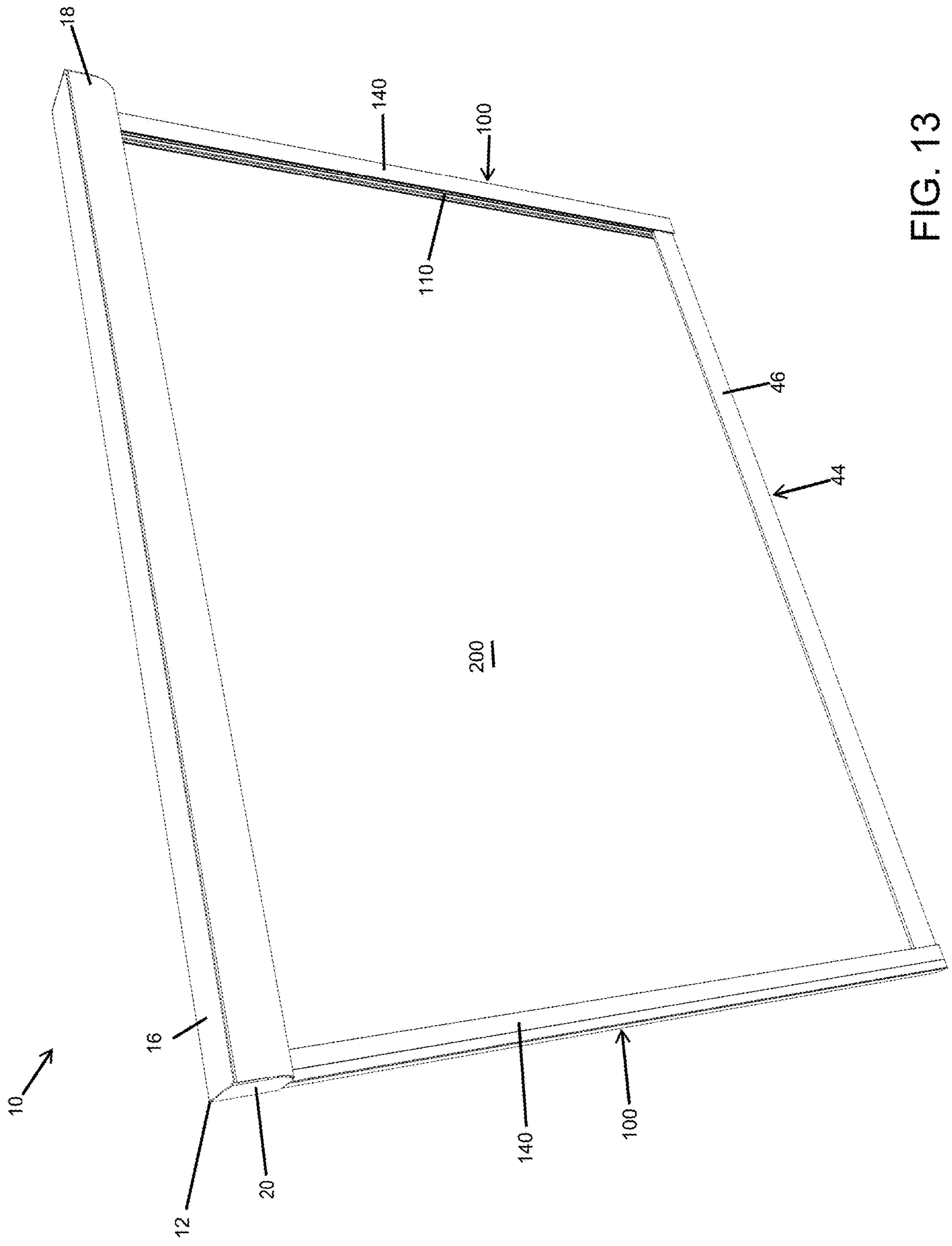
FIG. 13 is another front perspective view of an assembled motorized screen system having a magnetic track assembly as is shown in FIGS. 10-12, in accordance with one or more embodiments.

FIG. 9 depicts an exploded view of the magnetic track assembly 100. To provide the magnetic track assembly 100 with a more aesthetically pleasing look, top end 180 and/or bottom end (not shown) may be covered with top cover 181 and bottom cover (not shown), respectively. For example, as shown in any of FIG. 9, through holes may be formed on, for example, partitions 149, 150 of compartment 146. These through holes extend parallel relative to one another along the longitudinal axis of the elongate channel 140. In certain aspects, top cover 181 is fastened to the top 180 of the elongate channel 140 after positioning the screen receiver 110 therein, and top cover 181 may further secure screen receiver 110 in the elongate channel 140 while concurrently restricting vertical movement of the screen receiver 110 in the elongate channel 140. As further shown in FIG. 9, in certain aspects, top cover 181 includes recessed/cut out portions that align with an end of screen receiver 110 such that the screen received in screen receiver 110 does not contact the top cover. This arrangement allows the screen to be easily deployed and retracted without contacting the top cover.

The screen receiver 110, the elongate channel 140, elongate cover 170, and/or top cover 181 (and bottom cover) may be formed of metal, a thermoplastic resin, or a combination thereof. For example, in certain aspects, the screen receiver 110, the elongate channel 140, elongate cover 170, and/or top cover 181 (and bottom cover) may be formed of a molded thermoplastic/thermoplastic resin sufficient to withstand harsh weather conditions and the movements disclosed herein.

It should be further noted that the screen receiver 110 disclosed herein may be adapted to receive a keder type interlock 202 through, for example, a C-shaped channel 111. However, the screen receiver 110 may have any desired predetermined shape (e.g., triangular, square, rectangular shape, or any other shape) that can receive screen 200 there through. As eluded to above, the screen receiver 110 may be adapted to receive a zipper interlock, a rope, a beaded chain, or any similar interlock 202 known in the art associated with the disclosed retractable screens.

Alternative Arrangement(s):

With reference to FIGS. 10-60 various alternative arrangements of motorized screen systems 10 having magnetic track assemblies 100 are presented. Some components of motorized screen system 10 having magnetic track assemblies 100 presented in FIGS. 10-60 are similar to those of motorized screen system 10 having magnetic track assemblies 100 presented in FIGS. 1-9 and therefore all of the teaching presented herein with respect to FIGS. 1-9 applies equally to and is incorporated into the teaching presented in FIGS. 10-60 unless specifically stated otherwise.

Housing 12:

In the arrangement shown, as one example, motorized screen system 10 having magnetic track assemblies 100 includes a housing 12. Housing 12 is formed of any suitable size, shape and design and is configured to house and hold various components of the system 10 so as to facilitate function of the system 10 as well as to provide an aesthetically pleasing appearance, as is further described herein. In the arrangement shown, as one example, housing 12 includes a rear member 14, a top member 16, a front member 18 and end caps 20 having bracket members 22 among other components, features, and elements.

Rear Member 14:

In the arrangement shown, as one example, housing 12 includes a rear member 14. Rear member 14 is formed of any suitable size, shape and design and is configured to form a portion of housing 12 and enclose the rear side of housing 12. In the arrangement shown, as one example, rear member 14 is a generally planar shaped member that extends a length between opposing ends. In the arrangement shown, as one example, when housing 12 is installed in a rear-mount application, fasteners 204, such as screws or bolts or the like extend through rear member 14 and into the structure to which housing 12 is installed. In the arrangement shown, as one example, the upper end of rear member 14 connects to the rearward side of top member 16 and the outward ends of rear member 14 connect to end caps 20.

Top Member 16:

In the arrangement shown, as one example, housing 12 includes a top member 16. Top member 16 is formed of any suitable size, shape and design and is configured to form a portion of housing 12 and enclose the upper side of housing 12. In the arrangement shown, as one example, top member 16 is a generally planar shaped member that extends a length between opposing ends. In the arrangement shown, as one example, when housing 12 is installed in a top-mount application, fasteners 204, such as screws or bolts or the like extend through top member 16 and into the structure to which housing 12 is installed. In the arrangement shown, as one example, the rearward end of top member 16 connects to the upper end of rear member 14, the forward end of top member 16 connects to the upper end of front member 18 and the outward ends of top member 16 connect to end caps 20.

Front Member 18:

In the arrangement shown, as one example, housing 12 includes a front member 18. Front member 18 may also be referred to or known as in the industry as a fascia. Front member 18 is formed of any suitable size, shape and design and is configured to form a portion of housing 12 and enclose the front side of housing 12. In the arrangement shown, as one example, front member 18 is an elongated member that includes a generally planar portion that forms the upper front side of the front member 18 and a generally planar portion that forms the lower side of the front member 18. In the arrangement shown, the generally planar front portion and the generally planar lower portion extend in approximate perpendicular alignment to one another. In the arrangement shown, a curved corner section connects the lower end of the generally planar front portion and the forward end of the generally planar lower portion. However, any other shape is hereby contemplated for use as front member 18 such as a 380-degree corner section, which provides a different aesthetic appearance. In the arrangement shown, as one example, the upper end of front member 18 connects to the forward end of top member 16 and the outward ends of top member 16 connect to end caps 20.

In the arrangement shown, as one example, rear member 14, top member 16, front member 18 and end caps 20 may connect to one another using connection members 24, such as joints that facilitate the selective connection to and removal from one another. These connection members 24 may be formed of a joint, snap-fit arrangement, hinge, fastener, interlocking features, or any other arrangement of connecting two components together.

End Caps 20:

In the arrangement shown, as one example, housing 12 includes an end cap 20 positioned at each outward end of housing 12. End caps 20 are formed of any suitable size, shape and design and are configured to form a portion of housing 12 and enclose the outward ends of housing 12. In the arrangement shown, as one example, end caps 20 are generally planar shaped members that connect to the outward ends of rear member 14, top member 16 and front member 18 and enclose the outward ends of housing 12. In the arrangement shown, as one example, when housing 12 is installed in a side-mount application, fasteners 204, such as screws or bolts or the like extend through end caps 20 and into the structure to which housing 12 is installed. In the arrangement shown, as one example, the interior sides of end caps 20 include bracket members 22. Bracket members 22 are formed of any suitable size, shape and design and are configured to facilitate connection of roller tube assembly 26 to housing 12.

In the arrangement shown, as one example, once assembled housing 12 forms a hollow interior 28 that houses and holds roller tube assembly 26 therein. In the arrangement shown, as one example, an opening 30 is positioned between the rearward lower end of front member 18, the forward lower end of rear member 14 and the interior sides of end caps 20. This opening 30, which may also be referred to as a slot, allows for passage of screen 200 to pass there through while the screen 200 is opened and closed.

Any other size, shape, design, or configuration is hereby contemplated for use as housing 12. In an alternative arrangement, no housing 12 is used and instead in this arrangement, roller tube assembly 26 is connected to and/or held in place by connection to end caps 20 and/or bracket members 22 alone without the use of rear member 14, top member 16 and/or front member 18.

Roller Tube Assembly:

In the arrangement shown, as one example, motorized screen system 10 having magnetic track assemblies 100 includes a roller tube assembly 26. Roller tube assembly 26 is formed of any suitable size, shape and design and is configured to connect to housing 12 as well as facilitate the connection to screen 200 to housing 12 while facilitating the opening and closing of screen 200.

In the arrangement shown, as one example, roller tube assembly 26 includes a roller tube 32. Roller tube 32 is formed of any suitable size, shape, or design and is configured to connect with an upper end of screen 200 and facilitate rolling of screen 200 thereon. In the arrangement shown, as one example, roller tube 32 is a generally elongated cylindrical member that extends a length between opposing ends 34. In the arrangement shown, as one example, connection members 36 extend outward from ends 34 and facilitate connection to collars 38 that fit over and connect to connection members 36.

In the arrangement shown, as one example, roller tube 32 and/or collars 38 have a generally cylindrical exterior surface 68 of approximate equal diameter and shape and configuration. In the arrangement shown, as one example roller tube 32 and collars 38 include one or more receivers 40 on or in their exterior surface 68. Receivers 40 are formed of any suitable size, shape and design and are configured to facilitate connection of the upper end of screen 200 to roller tube assembly 26.

More specifically, in one arrangement receiver 40 is formed of the exact same or a similar shape to the C-shaped channel 111 of screen receiver 110 as is described herein with respect to screen receiver 110. In this arrangement, the upper end of screen 200 includes an interlock that is similar to, if not exactly the same as, the interlock 202 described herein that is present at the sides of screen 200 as is shown in FIGS. 1 and 2. This interlock at the upper end of screen 200 is slid into the receiver 40 of roller tube assembly 26, or more specifically, roller tube 32 and/or collars 38. When the interlock of the upper end of screen 200 is in place within the receiver 40 of roller tube assembly 26, the upper end of screen 200 is locked in place on roller tube assembly 26. As such, in this arrangement, when roller tube assembly 26 rotates in a first rotational direction the screen 200 wraps around the exterior surface 68 of the roller tube assembly 26 thereby opening the screen 200, and when the roller tube assembly 26 rotates in a second rotational direction, opposite the first rotational direction, the screen 200 unwraps from around the roller tube assembly 26 thereby closing the screen 200.

To be clear, just like interlock 202 at the sides of screen 200, the interlock at the upper end of screen 200 may be formed of any form of an interlock including, but not limited to a keder interlock, a zipper interlock, a rope, a beaded chain, or any similar interlock known in the art associated with the disclosed retractable screens. Similarly, receiver 40 may be formed of any corresponding size, shape and design and is configured to receive and hold the interlock at the upper end of screen 200. In the arrangement shown, as one example, the interlock at the upper end of screen 200 is a rounded or generally cylindrical member when viewed from the side and the receiver 40 is a similarly shaped rounded or generally cylindrical opening in roller tube assembly 26 (roller tube 32 and collars 38) that connects to a slot that allows the passage of the screen 200 through the slot while retaining the interlock within the generally cylindrical opening in the roller tube assembly 26.

In the arrangement shown, as one example, two different shaped receivers 40 are shown in the exterior surface 68 of roller tube 32 and collars 38. However any number of receivers 40 are hereby contemplated for use in the exterior surface 68 of roller tube 32 and collars 38 such as one, two, three, four, five, six or more. Alternatively it is hereby contemplated that no receivers 40 are used and instead screen 200 is connected to roller tube assembly 26 by any other manner, method or means.

Also, in the arrangement shown, roller tube assembly 26 includes a hollow interior as well as a plurality of structural features that provide roller tube assembly 26 with structural rigidity while minimizing material usage and weight.

Motor Assembly 42:

In the arrangement shown, as one example, motorized screen system 10 having magnetic track assemblies 100 includes a motor assembly 42. Motor assembly 42 is formed of any suitable size, shape and design and is configured to facilitate motorized operation of motorized screen system 10.

Motor assembly 42 may be formed of any form of a motor and may be connected to roller tube assembly 26 in any manner that facilitates rotation of roller tube assembly 26. In the arrangement shown, as one example, motor assembly 42 is an electric motor that is positioned within the hollow interior of roller tube assembly 26 adjacent an end of roller tube assembly 26. Positioning motor assembly 42 within the hollow interior of roller tube assembly 26 provides a sleek arrangement wherein motor assembly 42 is contained within other components of the motorized screen system 10 thereby minimizing the size and space requirements for the system 10.

In one arrangement, as is shown, motor assembly 42 is a self-contained assembly including a motor, gear assembly, drive wheel and electronic controller assembly, among other components. In this self-contained assembly arrangement, with the installation of a single component, the motor assembly 42, within roller tube assembly 26 the system 10 is motorized which provides convenience, minimal installation, ease of use and an aesthetic appearance. In one arrangement, motor assembly 42 is controlled by passing control signals to the motor assembly 42 through a wired connection. In another arrangement, motor assembly 42 is controlled by wireless control by passing control signals to the motor assembly 42 through a wireless connection to an antenna connected to motor assembly. In another arrangement, motor assembly 42 is controlled by passing control signals to the motor assembly 42 through a wired connection, as well as by wireless control by passing control signals to the motor assembly 42 through a wireless connection to an antenna connected to motor assembly.

In one arrangement, motor assembly 42 is connected to an external power source by a wired connection such as by connection to line power of a house or building thereby providing motor assembly 42 an unlimited power source. Alternatively, motor assembly 42 is connected to a battery power source, a solar module or solar cell, or any combination thereof such as connection to line power with battery back-up and a solar cell for recharging the batteries is hereby contemplated for use.

In the arrangement shown, as one example, once the roller tube assembly 26 is assembled, with motor assembly 42 therein, the roller tube assembly 26 is installed within the hollow interior 28 of housing 12. In doing so, the outward ends of roller tube assembly 26 are connected to the bracket members 22 of end caps 20 and the roller tube assembly 26 is able to rotate within the hollow interior 28 of housing 12 thereby raising and/or lowering the screen 200 through opening 30, thereby raising and/or lowering bottom bar assembly 44 along with screen 200.

Figure 38:
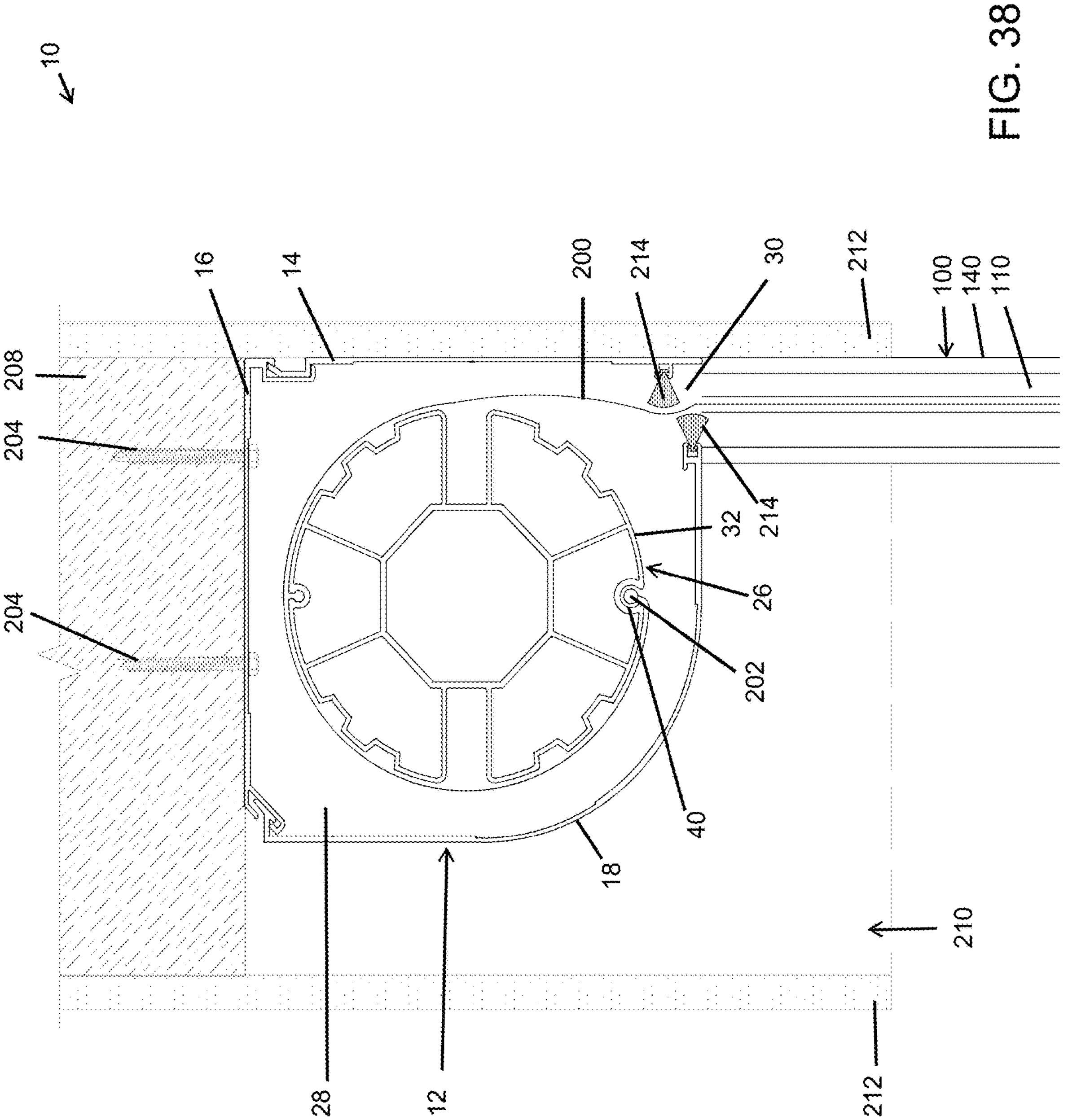
FIG. 38 is a side elevation view of the roller tube assembly positioned within the hollow interior of the housing of a motorized screen system having a magnetic track assembly as is shown in FIGS. 10-37, in accordance with one or more embodiments; the view taken from the side as is shown in FIG. 36, the view showing a 5½ housing with roller tube; the view showing the housing installed in the hollow interior of a pocket formed by walls that extend down from a frame member; the view showing the top member of the housing installed onto the frame member using a plurality of fasteners; the view showing the screen installed onto the roller tube by way of the insertion of an interlock positioned at the upper end of the screen material into a receiver in the exterior surface of the roller tube assembly thereby holding the upper end of the screen material to the roller tube; the view showing the screen material passing through the opening in the lower end of the housing adjacent the lower end of rear member and the lower rearward end of front member; the view showing a sealing member, which is shown as a piece of woolpile, on each side of the opening that seals the opening in the housing by engaging the screen material; the view showing the forward positioned sealing member connected to the lower rearward end of front member; the view showing the rearward positioned sealing member connected to the lower forward end of rear member; the view showing the screen material connected to the screen receiver positioned within the elongate channel of the magnetic track assembly as the screen material extends downward from the housing.
Figure 39:
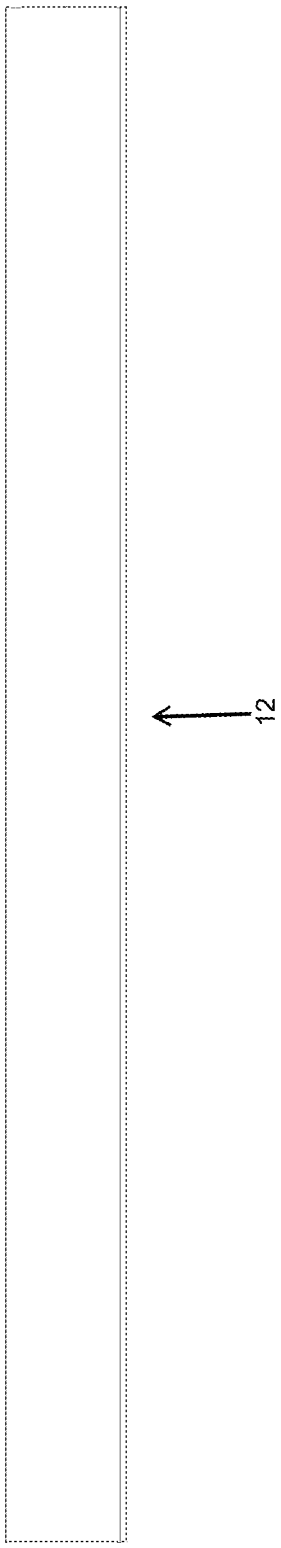
FIG. 39 is a top elevation view of the housing of a motorized screen system having a magnetic track assembly as is shown in FIGS. 10-38, in accordance with one or more embodiments; the view showing a 7 inch housing with roller tube.
Figure 40:
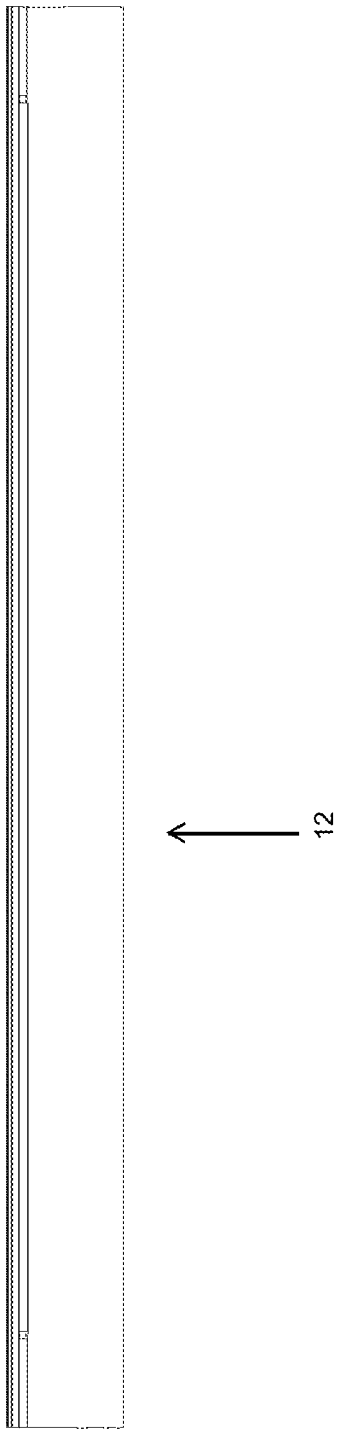
FIG. 40 is a bottom elevation view of the housing of a motorized screen system having a magnetic track assembly as is shown in FIGS. 10-39, in accordance with one or more embodiments; the view showing a 7 inch housing with roller tube.
Figure 41:
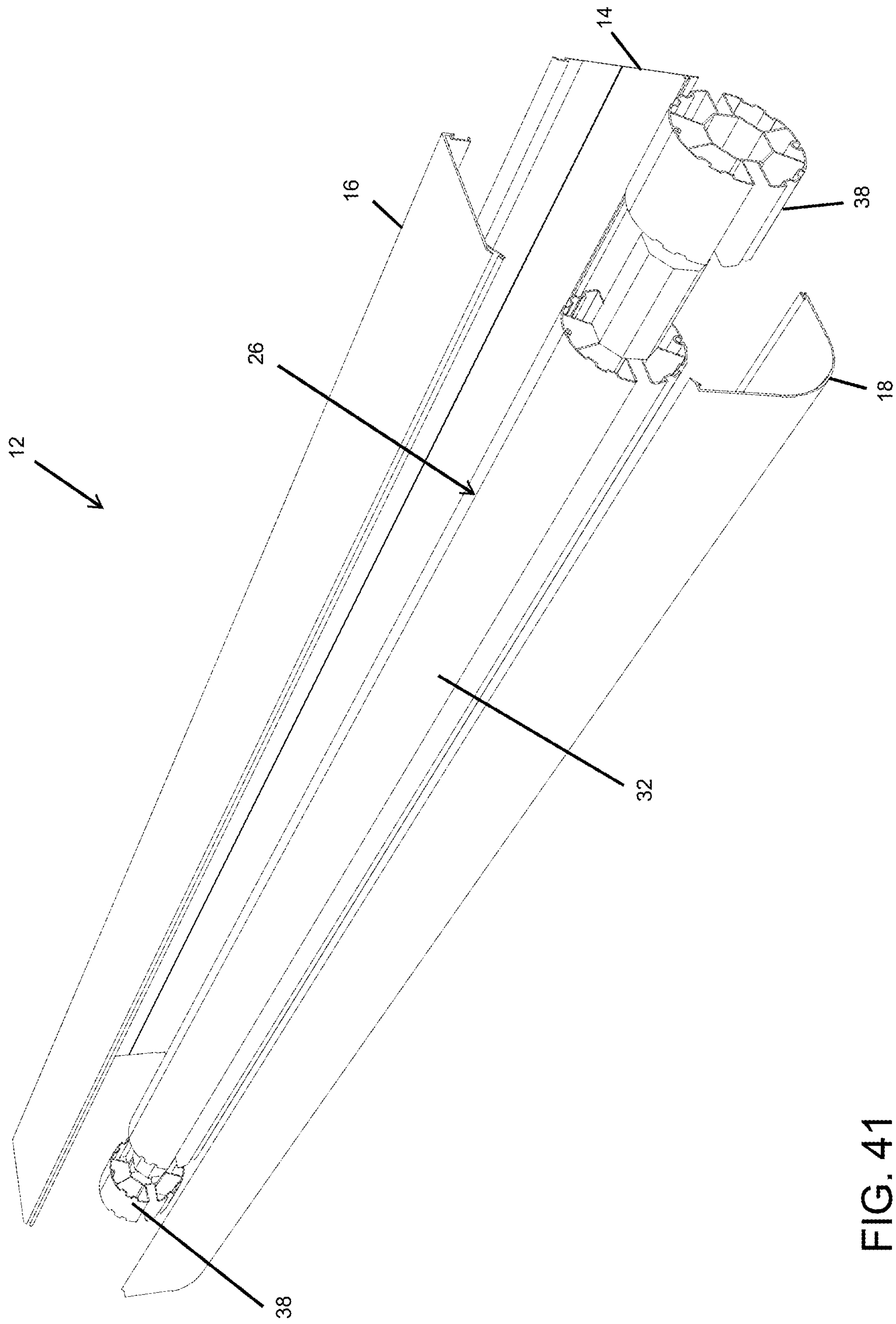
FIG. 41 is an exploded perspective view of a motorized screen system having a magnetic track assembly as is shown in FIGS. 10-40, in accordance with one or more embodiments; the view showing a 7 inch housing with roller tube; the view showing the housing exploded with a rear member, top member and front member; the view showing a roller tube assembly positioned within the housing.
Figure 42:
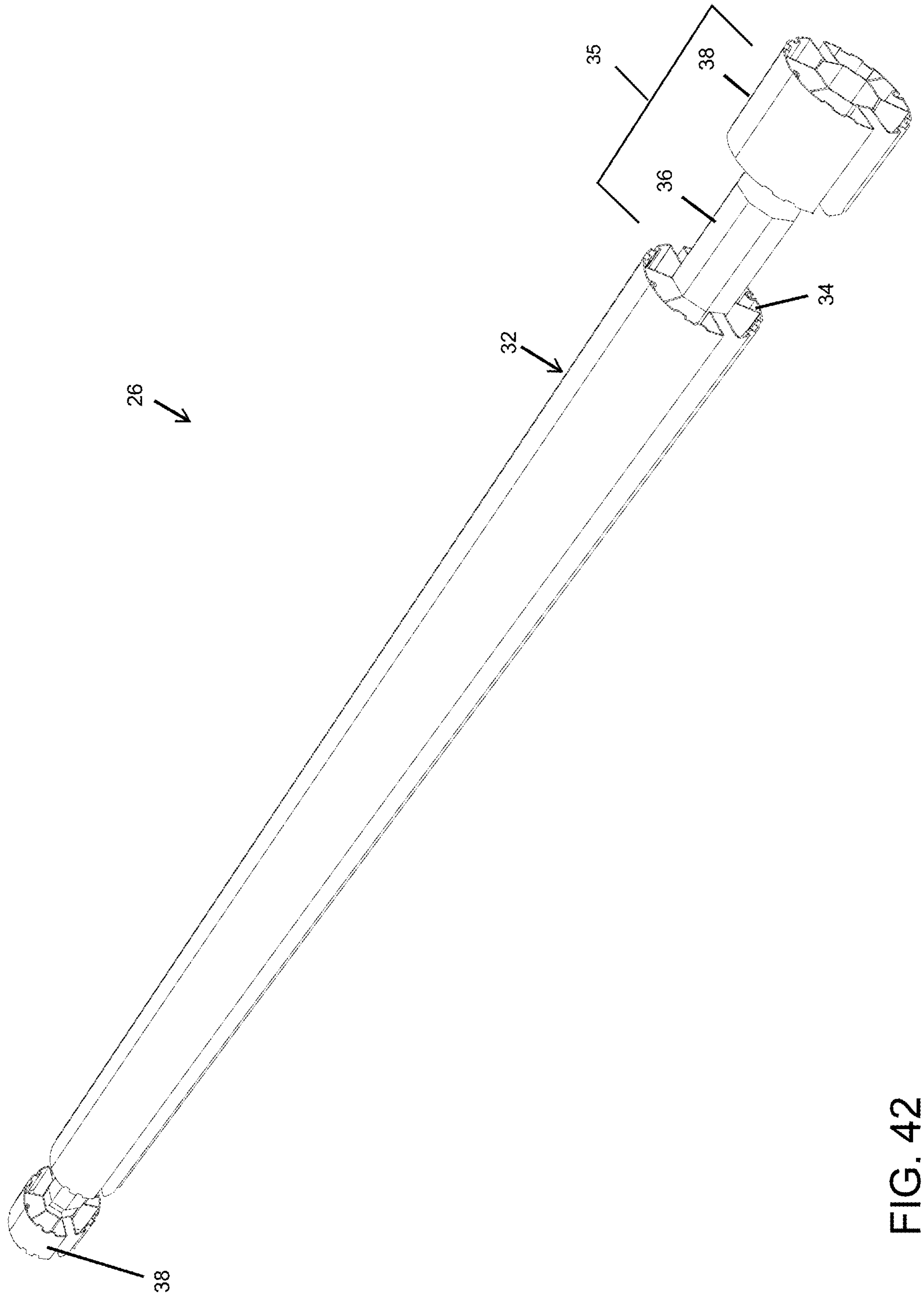
FIG. 42 is a perspective view of a motorized screen system having a magnetic track assembly as is shown in FIGS. 10-41, in accordance with one or more embodiments; the view showing a roller tube assembly for a 7 inch housing; the view showing the collars (also known as collars or doughnuts) exploded from the connection members of the roller tube assembly.
Figure 43:
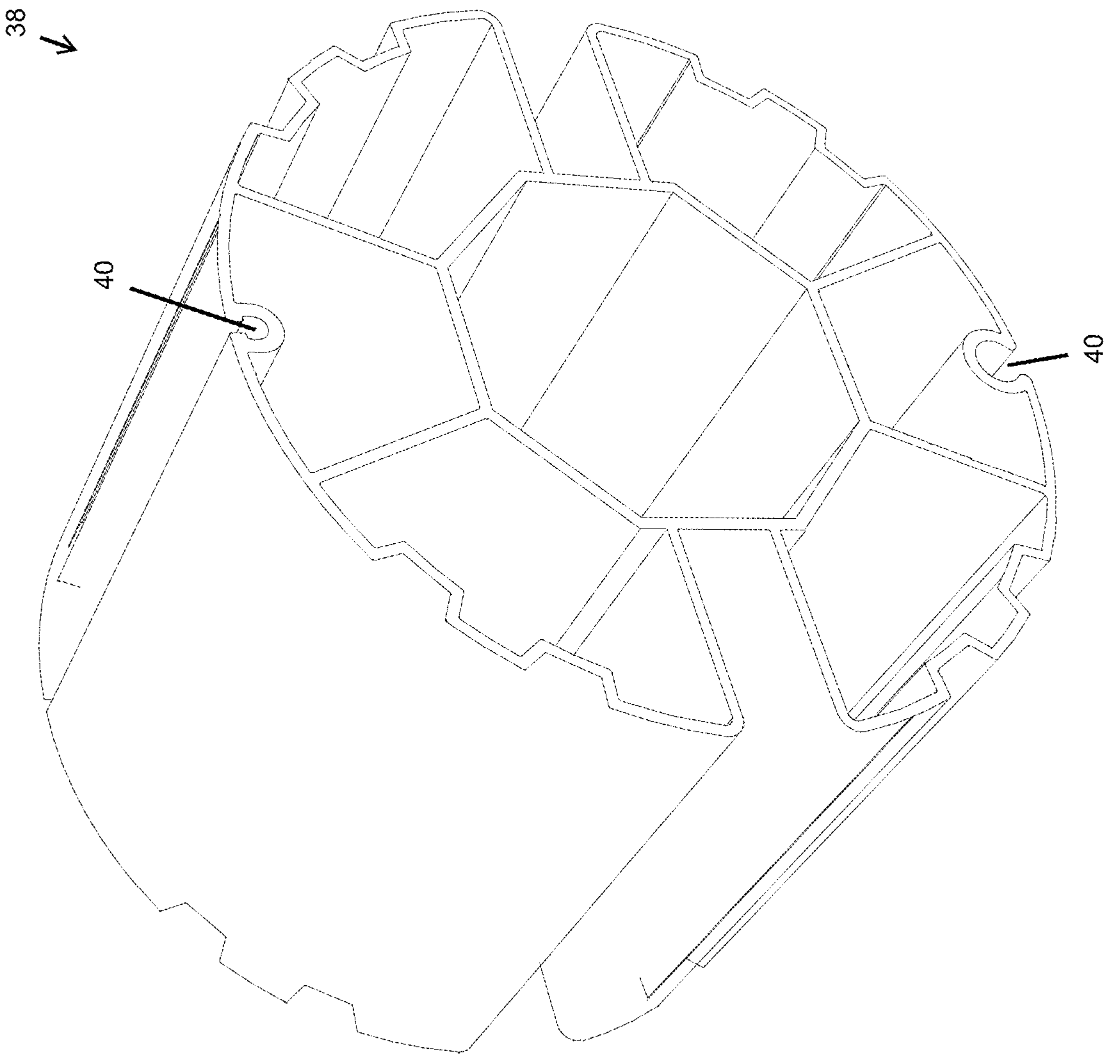
FIG. 43 is a perspective view of the collars (also known as doughnuts) of the roller tube assembly of a motorized screen system having a magnetic track assembly as is shown in FIGS. 10-42, in accordance with one or more embodiments; the view showing a collar for use with a 7 inch housing.
Figure 44:
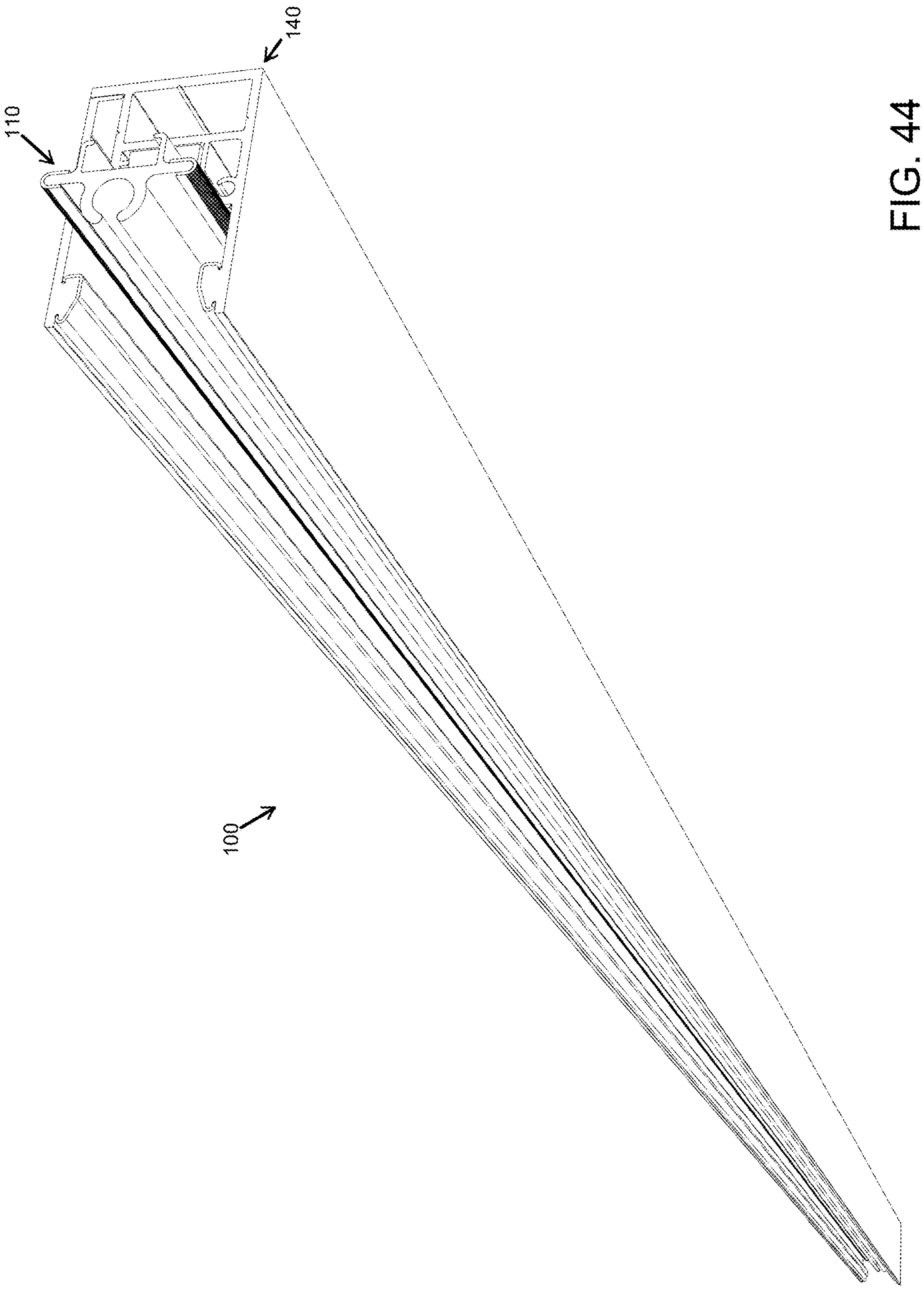
FIG. 44 is a perspective view of an assembled magnetic track assembly for a retractable screen system having a magnetic track assembly as is shown in FIGS. 10-43, in accordance with one or more embodiments; the view showing the screen receiver positioned within the compartment of an elongate channel.
Figure 45:
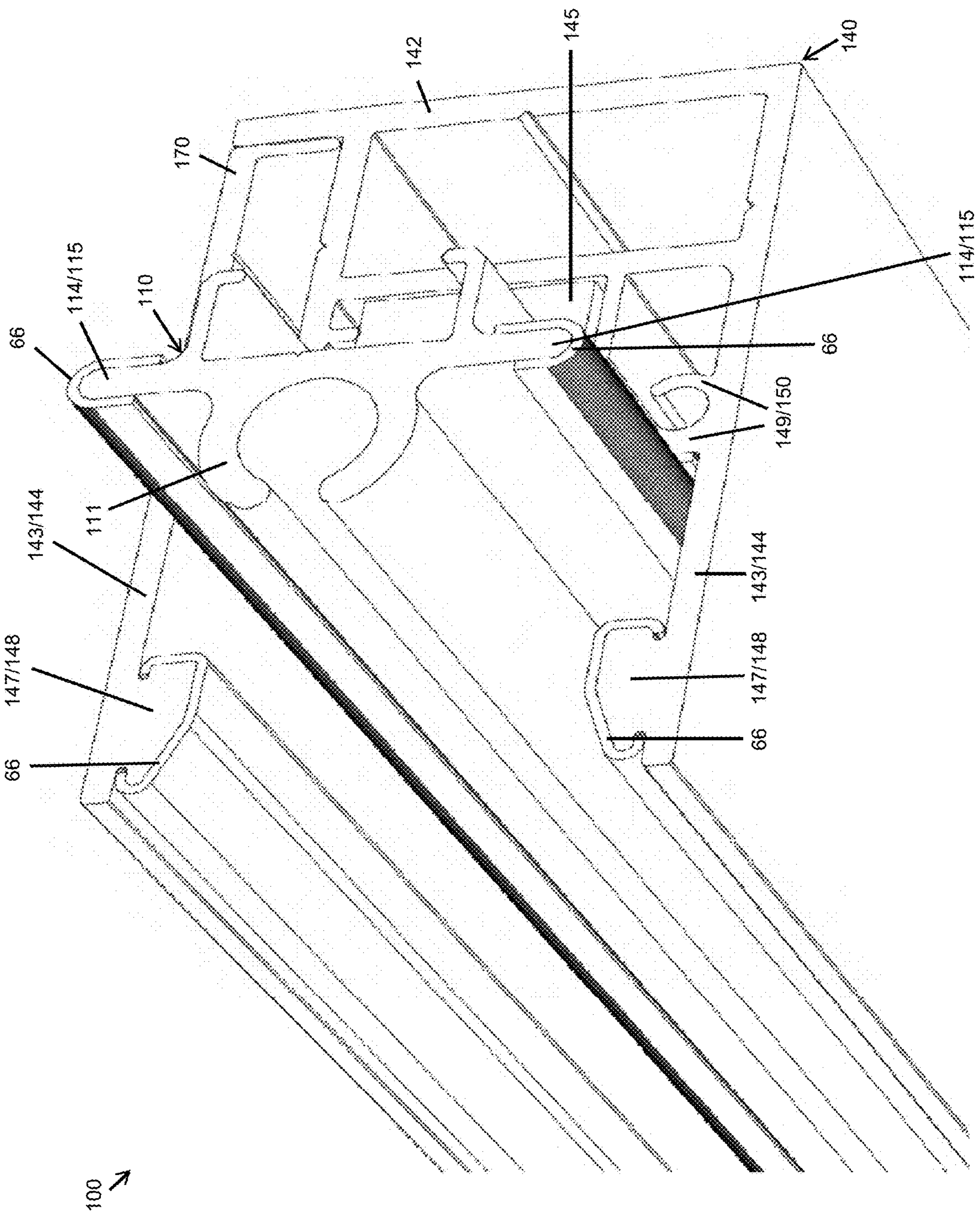
FIG. 45 is a close-up perspective view of an end of an assembled magnetic track assembly as is shown in FIG. 44, in accordance with one or more embodiments; the view showing the screen receiver positioned within the compartment of an elongate channel; the view showing a liner positioned over inward most partitions, or front partitions; the view showing a liner positioned over the outward most partitions, or back partitions; the view showing a liner positioned over the outward ends of screen receiver.
Figure 46:
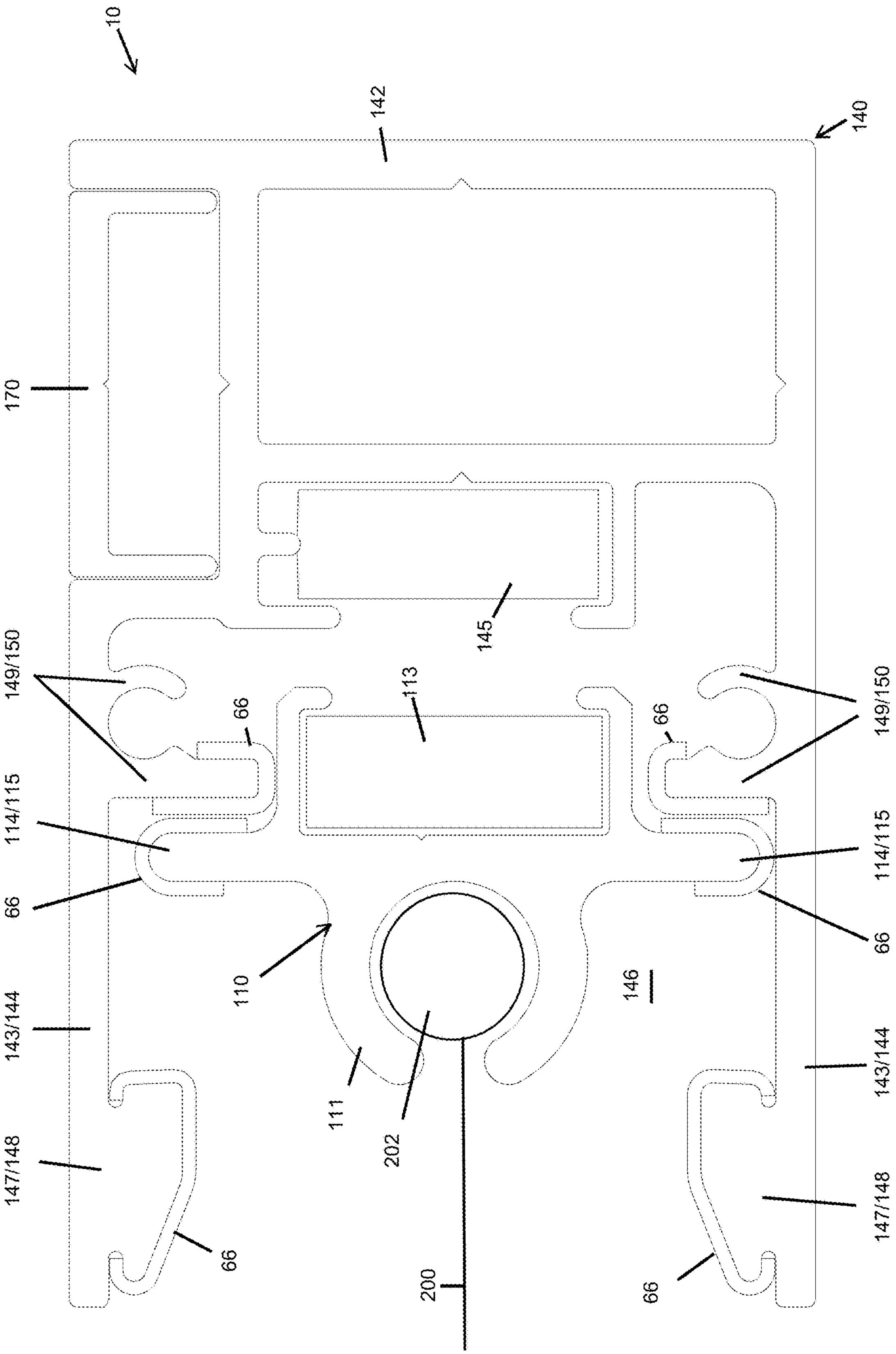
FIG. 46 is a close-up top elevation view of an end of an assembled magnetic track assembly as is shown in FIGS. 44 and 45, in accordance with one or more embodiments; the view showing the screen receiver positioned within the compartment of an elongate channel; the view showing a liner positioned over inward most partitions, or front partitions; the view showing a liner positioned over the outward most partitions, or back partitions; the view showing a liner positioned over the outward ends of screen receiver; the view showing the screen receiver in a fully outward position with opposing magnets as close to one another as is allowable by the arrangement.
Figure 47:
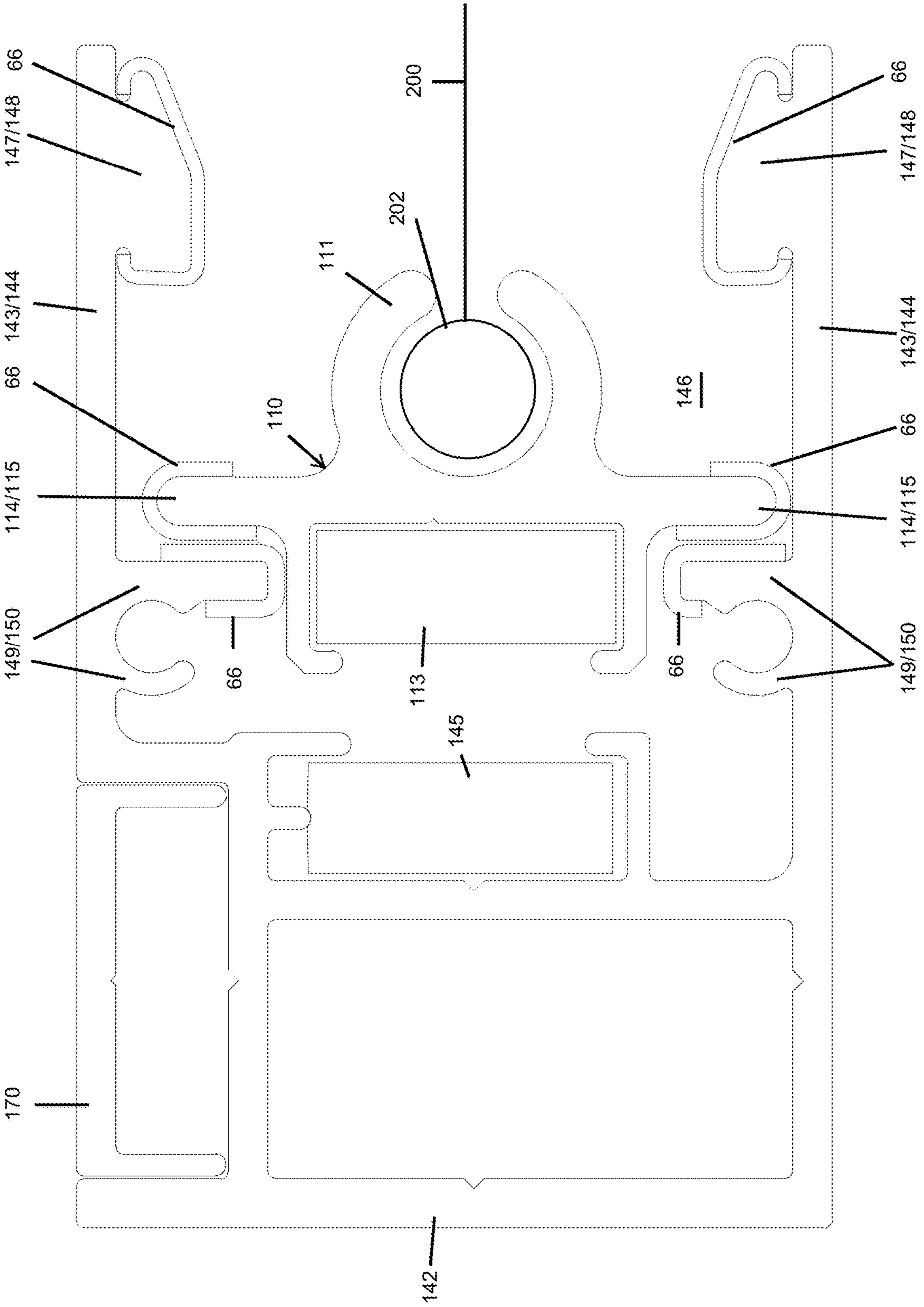
FIG. 47 is a close-up bottom elevation view of an end of an assembled magnetic track assembly as is shown in FIGS. 44 and 45, in accordance with one or more embodiments; the view showing the screen receiver positioned within the compartment of an elongate channel; the view showing a liner positioned over inward most partitions, or front partitions; the view showing a liner positioned over the outward most partitions, or back partitions; the view showing a liner positioned over the outward ends of screen receiver; the view showing the screen receiver in a fully outward position with opposing magnets as close to one another as is allowable by the arrangement.
Figure 48:
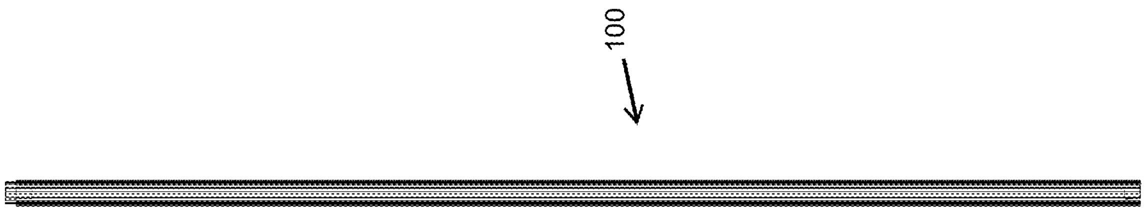
FIG. 48 is an elevation view an assembled magnetic track assembly as is shown in FIGS. 44-47, in accordance with one or more embodiments; the view looking from inward to outward, the view showing the screen receiver positioned within the elongate channel.
Figure 49:
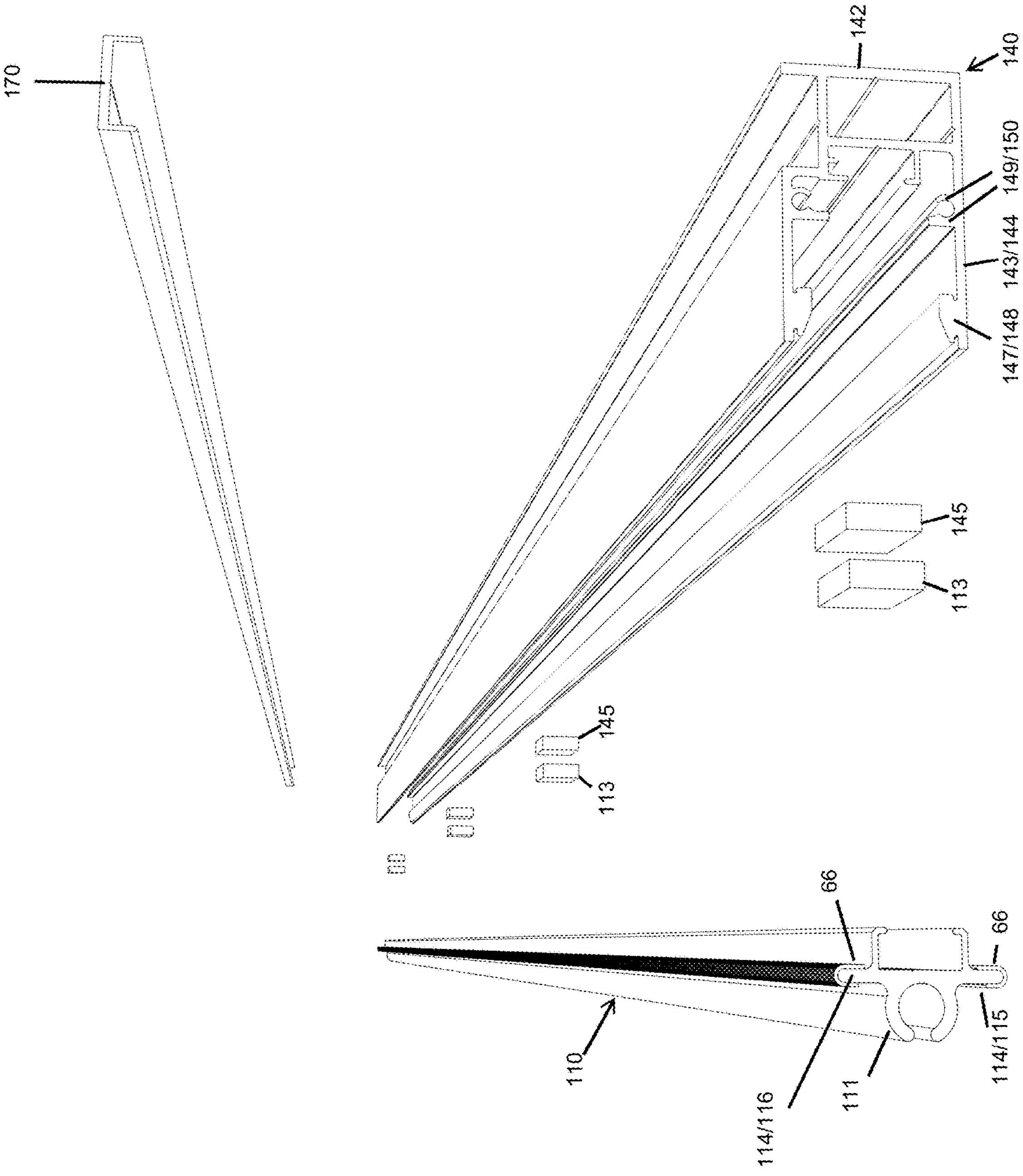
FIG. 49 is an exploded perspective view of a magnetic track assembly as is shown in FIGS. 44-48, in accordance with one or more embodiments; the view showing the screen receiver positioned outside of the compartment of an elongate channel; the view showing a liner positioned over the outward ends of screen receiver.

With reference to FIG. 38, in the arrangement shown as one example, roller tube assembly 26 is shown positioned within the hollow interior 28 of the housing 12 of a motorized screen system 10 having magnetic track assemblies 100. In the arrangement shown, as one example, the housing 12 installed in the hollow interior of a pocket 210 formed by walls 212 that extend down on a forward side and a rearward side from a frame member 208 positioned at the upper side of housing 12. The view showing the top member 16 of housing 12 installed onto frame member 208 using a plurality of fasteners 204 that extend through top member 16 and into frame member 208. The view showing the screen 200 installed onto the roller tube 32 by way of the insertion of an interlock 202 positioned at the upper end of the screen material 200 and into a receiver 40 in the exterior surface 68 of the roller tube 32 thereby holding the upper end of the screen material 200 to the roller tube 32. The view showing the screen material 200 passing through the opening 30 in the lower end of the housing 12 adjacent the lower end of rear member 14 of housing 12 and the lower rearward end of front member 18 of housing 12. The view showing a sealing member 214, which is shown as a piece of woolpile, on each side of the opening 30 that seals the opening 30 in the housing 12 by engaging the screen material 200. The view showing the forward positioned sealing member 214 connected to the lower rearward end of front member 18 of housing 12 and the rearward positioned sealing member 214 connected to the lower forward end of rear member 14. That is, as is shown, as one example, when woolpile is used as sealing member 214, outwardly extending fibers of the woolpile connected to the front member 18 of housing 12 brush and thereby seal the forward facing surface of screen material 200, while outwardly extending fibers of the woolpile connected to the rear member 14 of housing 12 brush and thereby seal the rearward facing surface of screen material 200. The view showing the screen material 200 connected to the screen receiver 110 positioned within the elongate channel 140 of the magnetic track assembly 10 as the screen material 200 extends downward from the housing 12.

Bottom Bar Assembly:

In the arrangement shown, as one example, motorized screen system 10 having magnetic track assemblies 100 includes a bottom bar assembly 44. Bottom bar assembly 44 is formed of any suitable size, shape and design and is configured to connect to the lower end of screen 200 while providing sufficient weight to the lower end of screen 200 to facilitate smooth opening and closing while also keeping the lower end of screen 200 flat and straight.

In the arrangement shown, as one example, bottom bar assembly 44 includes a bottom bar 46 that is formed of an elongated member that extends a length between opposing ends 48 and includes a hollow interior 50 that is configured to receive a weight bar 52 (not shown) therein that adds weight to the bottom bar assembly 44. The lower end of bottom bar 46 includes a channel 54 that is configured to receive and hold a sealing member 56 therein that is configured to seal the lower end of bottom bar 46 to the ground when the bottom bar 46 is in a fully lowered or closed position. Sealing member 56 may be formed of any device that facilitates a seal such as a piece of woolpile, a strip of foam, a rubber strip, or any form of a sealing member or other compressible member that helps to facilitate a seal when the bottom bar 46 is in a fully lowered position.

In the arrangement shown, as one example, bottom bar assembly 44 includes a receiver 58. Receiver 58 is formed of any suitable size, shape and design and is configured to facilitate connection of the lower end of screen 200 to bottom bar assembly 44. More specifically, in one arrangement, receiver 58 is formed of the exact same or a similar shape as C-shaped channel 111 of screen receiver 110, and/or the receiver 40 as is described herein with respect to screen receiver 110 and/or roller tube assembly 26, respectively. In this arrangement, the lower end of screen 200 includes an interlock that is similar to, if not exactly the same as, the interlock 202 described herein that is present at the sides of screen 200 as is shown in FIGS. 1 and 2, as well as the upper end of screen 200. This interlock at the lower end of screen 200 is slid into the receiver 58 of bottom bar assembly 44, or more specifically, bottom bar 46. When the interlock of the lower end of screen 200 is in place within the receiver 58 of bottom bar assembly 44, the lower end of screen 200 is locked in place on bottom bar assembly 44. As such, in this arrangement, when roller tube assembly 26 rotates in a first rotational direction, screen 200 wraps around the exterior surface 68 of the roller tube 32, thereby opening screen 200 and raising the bottom bar assembly 44, and when the roller tube assembly 26 rotates in a second rotational direction, opposite the first rotational direction, the screen 200 unwraps from around the roller tube assembly 26 thereby closing the screen 200 and lowering the bottom bar assembly 44.

To be clear, just like interlock 202 at the sides of screen 200, the interlock at the lower end of screen 200 may be formed of any form of an interlock including, but not limited to a keder interlock, a zipper interlock, a rope, a beaded chain, or any similar interlock known in the art associated with the disclosed retractable screens. Similarly, receiver 58 may be formed of any corresponding size, shape and design and is configured to receive and hold the interlock at the lower end of screen 200. In the arrangement shown, as one example, the interlock at the lower end of screen 200 is a rounded or generally cylindrical member when viewed from the side and the receiver 58 is a similarly shaped rounded or generally cylindrical opening in bottom bar assembly 44 (or bottom bar 46) that connects to a slot that allows the passage of the screen 200 through the slot while retaining the interlock within the generally cylindrical opening in the bottom bar assembly 44.

In the arrangement shown, as one example, only a single receiver 58 shown in the bottom bar assembly 44. However any number of receivers 58 are hereby contemplated for use in the bottom bar assembly 44 such as one, two, three, four, five, six or more. Alternatively it is hereby contemplated that no receivers 58 are used and instead screen 200 is connected to bottom bar assembly 44 by any other manner, method or means.

In the arrangement shown, as one example, weight bar probes 60 are attached to the outward edges of the lower end of screen 200. These weight bar probes 60 are then inserted within the hollow interior 50 of bottom bar 46. In the arrangement shown, as one example, weight bar probes 60 include a slot 62 that receives the lower end of the interlock of screen 200 at the outward sides of screen 200. In the arrangement shown, as one example, weight bar probes 60 are tightened to screen 200 using fasteners 64 such as screws or bolts or the like thereby securing the weight bar probes 60 in place on the lower end of screen 200. In one arrangement, the attachment of weight bar probes 60 to the lower end of screen 200 helps to facilitate a tight and/or taut lower end of screen 200.

Figure 54:
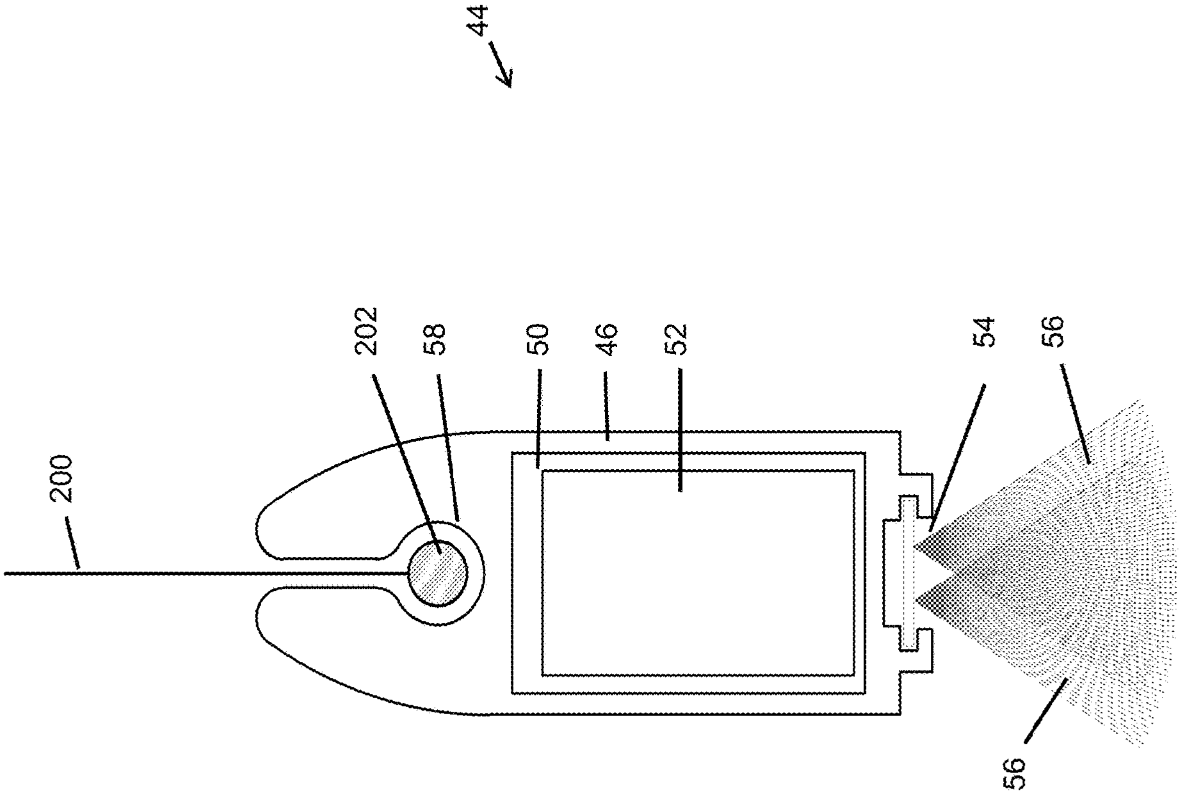
FIG. 54 is an elevation view of an end of the bottom bar shown in FIGS. 51-53, in accordance with one or more embodiments; the view showing the weight bar positioned within the hollow interior of the bottom bar; the view showing an interlock of the screen material connected to the receiver in the upper end of the bottom bar; the view showing a sealing member, which is shown as woolpile, positioned within the channel in the lower end of the bottom bar that seals the lower end of the bottom bar when it is in a closed position.

With reference to FIG. 54, in the arrangement show, as one example, a weight bar 52 is positioned within the hollow interior 50 of the bottom bar 46 of bottom bar assembly 44. In the arrangement shown, as one example, an interlock 202 of the screen material 200 is connected to the receiver 58 in the upper end of the bottom bar 46. In the arrangement shown, as one example, a sealing member 56, which is shown as woolpile, is positioned within channel 54 in the lower end of the bottom bar 46 that seals the lower end of the bottom bar 46 when it is in a closed position.

Track Assemblies Having Elongate Channels, Screen Receivers and Pads:

In the arrangement shown, as one example, motorized screen system 10 having magnetic track assemblies 100 shown in FIGS. 10-49 are similar to that presented herein with respect to FIGS. 1-9. As such, as is mentioned herein, the all of the teaching presented with respect to FIGS. 1-9 applies to and is incorporated into what is shown in FIGS. 10-49, unless specifically stated otherwise.

Spacing of Magnets:

One difference between the arrangement shown in FIGS. 1-9 and that shown in FIGS. 10-49 is that the magnets 113, 145 are spaced at a closer distance to one another when the screen receiver 110 is at a fully inward position. In one arrangement, magnets 113, 145 are formed of a chrome plated neodymium magnet that are extremely powerful and have a useful life of over 400 years. While these chrome plated neodymium magnets work very well for use as magnets 113, 145, these chrome plated neodymium magnets are extremely expensive. As such, by placing magnets 113, 145 at a minimum distance between one another a greater amount of magnetic attraction is generated between opposing magnets 113, 145 as compared to spacing the magnets 113, 145 at a greater distance to one another. As more force may be generated between the two magnets 113, 145 by placing them closer together in a fully attracted position, less magnets 113, 145 may be used, or a greater distance may be placed between vertically spaced sets of magnets 113, 145 along the vertical length of track assemblies 100. As less magnets 113, 145 may be used by placing the magnets 113, 145 closer together while still generating the same or similar attractive force this reduces the cost of the system 10 while not reducing functionality. Note, however, in some arrangements it is desirable to leave some space, even if it is a minimal space, between opposing magnets 113, 145 as this space, even a minimal space, provides a smoother release or break when force is applied to the screen 200.

One Magnet Placed Opposite a Piece of Magnetic Material:

As another way to reduce the cost of magnets 113, 145, in an alternative arrangement, only a single magnet 113, 145 is used. That is, instead of having two magnets 113, 145 aligned with one another that attract toward one another with one magnet 113 attached to the screen receiver 110 and one magnet 145 attached with the elongate channel 140, only a single magnet 113, 145 is used. In this arrangement, a single magnet 113, 145 is attached to one of the screen receiver 110 or elongate channel 140 opposite a piece of magnetic material, such as a piece of ferrous material (such as steel, iron, or the like) attached to the other of the screen receiver 110 or elongate channel 140. In this arrangement, when the aligned magnet 113, 145 comes within close proximity of the piece of magnetic material (such as a piece of ferrous material such as steel, iron, or the like), the magnet 113, 145 and piece of magnetic material attract toward one another through magnetic attraction thereby providing the desired self-tightening of the screen 200 with the use of less magnets 113, 145.

In one arrangement, the piece of magnetic material is formed of the same size and shape as the opposing magnet 113, 145, the main difference being that the piece of magnetic material is not a magnet nor permanently magnetized. As the piece of magnetic material is not a magnet, the cost of the piece of magnetic material is substantially less than magnet 113, 145

Notably, in one arrangement, the screen receiver 110 and elongate channel 140 are formed of a material that is non-magnetic in nature such as aluminum or a composite material such as plastic, fiberglass or the like that does not form a magnetic bond with a magnet. As such, the addition of the piece of magnetic material, aligned opposite with the position of the magnet 113, 145 on the other component, forms a magnetic track assembly 100 where the screen receiver 110 and elongate channel 140 are magnetically attracted to one another which facilitates the self-tightening of screen 200.

Using a combination of magnets 113, 145 and opposing magnetic materials, in one arrangement, the magnets 113, 145 are all connected to one of the screen receivers 110 or elongate channel 140, while the pieces of magnetic material are all connected to the other of the screen receiver 110 or elongate channel 140. In another arrangement, the magnets 113, 145 and pieces of magnetic material switch between being connected to the screen receiver 110 and the elongate channel 140. That is, in one arrangement, for each set of magnets 113, 145 and magnetic materials, the magnet 113, 145 and piece of magnetic material switch sides. Any other arrangement or combination is hereby contemplated for use, as is any combination of opposing magnets 113, 145 in some spots of the magnetic track assembly 100 (such as top, bottom, or middle) and the use of magnets 113, 145 on one side and a piece of magnetic material on the other side. That is, as one example, the top and bottom of magnetic track assembly 100 have opposing magnets 113, 145 whereas between the top and bottom of magnetic track assembly 100 a magnet 113, 145 is on one side opposite a piece of magnetic material. Again, any combination or arrangement of magnets 113, 145 and magnetic materials is hereby contemplated for use Liner: One of the substantial benefits of the motorized screen system 10 is that it allows the inward movement of the outward sides of screen 200 when a force is applied to the screen 200, such as when a strong wind blows upon screen 200, while also retaining a taut screen 200. This is accomplished by the unending and unrelenting magnetic attraction between screen receivers 110 and elongate channels 140. This unending and unrelenting magnetic attraction between screen receivers 110 and elongate channels 140 pulls screen receivers 110 outward and into elongate channels 140 thereby tightening screen 200.

In a natural state, the magnetic attraction between the magnets 113, 145 of screen receivers 110 and elongate channels 140 pulls the screen receivers outward and into the elongate channels 140 thereby pulling the sides of the screen 200 outward as well. In this outward most position, the outward ends 114, 115 of screen receiver 110 are directly engaged with the outward most partitions, or back partitions 149, 150. This engagement stops the outward movement of screen receivers 110. However, when a force is applied to screen 200, the force of the magnetic attraction between screen receiver 110 and elongate channel 140 is overcome and thereby pulling the screen receiver 110 inward or away from the end wall 142 of elongate channel 140 toward the inward most partitions, or front partitions 147, 148. This inward movement of screen receiver 110 continues until the outward ends 114, 115 of screen receiver 110 are directly engaged with the inward most partitions, or front partitions 147, 148. This engagement stops the inward movement of screen receivers 110.

The outward ends 114, 115 of screen receiver 110 remain engaged with the inward most partitions, or front partitions 147, 148 until the force on screen 200 reduces and the force of the magnetic attraction between screen receiver 110 and elongate channel 140 again pulls the screen receiver 110 into the elongate channel 140. This outward movement of screen receiver 110 continues until the outward ends 114, 115 of screen receiver 110 again are engaged with the outward most partitions, or back partitions 149 150, at which point the magnetic attraction between screen receiver 110 and elongate channel 140 continues to hold until another greater force is applied to screen 200.

This process repeats itself over and over again with screen receivers 110 moving laterally within compartment 146 between a fully outward position, wherein the outward ends 114, 115 of screen receiver 110 are directly engaged with the outward most partitions, or back partitions 149, 150, and a fully inward position, wherein the outward ends 114, 115 of screen receiver 110 engages the inward most partitions, or front partitions 147, 148. While it is desirable to allow for the inward movement of screen receivers 110 when a force is applied to the screen 200, each time the screen receiver 110 engages the inward most partitions or front partitions 147, 148 and each time the screen receiver 110 engages the outward most partitions or back partitions 149, 150 an undesirable noise is generated, such as a clicking or clacking or the like noise. On a blustery day, where screen 200 is repeatedly engaged by force or wind, this repeated noise can become very bothersome or annoying. This noise is exasperated or made worse in the arrangement when the screen receiver 110 and/or elongate channel 140 are formed of a metallic material, such as aluminum or the like. This metal-on-metal engagement between screen receiver 110 and the partitions 147, 148, 149 and 150 of elongate channel 140 can be sharp, high-pitched, and loud, especially when abrupt and/or fast movements of screen 200 occur.

In one arrangement as is shown, to alleviate or reduce this noise, all or a portion of inward most partitions, or front partitions 147, 148 and/or all or a portion of outward most partitions or back partitions 149, 150 are covered by a pad 66.

Pad 66 is formed of any suitable size, shape and design and is configured to reduce the noise generated when a force (such as wind) is applied to or removed from screen 200 thereby causing movement of screen receiver 110 within compartment 146 of elongated channel 140. More specifically, in one arrangement, pad 66 is configured to reduce the noise generated when the outward ends 114, 115 of screen receiver 110 engages the inward most partitions, or front partitions 147, 148. In another arrangement, pad 66 is configured to reduce the noise generated when the outward ends 114, 115 of screen receiver 110 engages the outward most partitions, or back partitions 149, 150. In yet another arrangement, pad 66 is configured to reduce the noise generated when the outward ends 114, 115 of screen receiver 110 engages the inward most partitions, or front partitions 147, 148 as well as when the outward ends 114, 115 of screen receiver 110 engages the outward most partitions, or back partitions 149, 150.

In one arrangement, pad 66 is formed of a noise-reducing non-metallic material such as rubber, plastic, synthetic rubber, fiberglass, an ultra-high molecular weight material (UHMW), a composite material, a foam material, a compressible material, or any combination thereof. In one arrangement, pad 66 is partially compressible, or is not as rigid as the metallic material that forms screen receiver 110 and/or elongate channel 140 (which includes partitions 147, 148, 149 and 150). In one arrangement, the presence of the non-metallic and/or partially compressible material of pad 66 positioned between the engaging screen receiver 110 and elongate channel 140 reduces the noise generated by eliminating the metal-on-metal contact and/or by decelerating the engagement between the engaging screen receiver 110 and elongate channel 140.

Liner On Inward Most Partitions or Front Partitions:

In the arrangement shown, as one example, a pad 66 is positioned to fit around all or a portion of inward most partitions, or front partitions 147, 148. In this arrangement, pad 66 extends in a generally continuous manner along the vertical length of inward most partitions or front partitions 147, 148 which themselves extend all or a portion of the length of elongate channel 140. In the arrangement shown, as one example, the outward facing surface of inward most partitions or front partitions 147, 148 (the portion that faces screen receiver 110 when screen receiver 110 is positioned within compartment 146) is generally flat and flush and in a planar spaced relation to the inward facing surface of the outward ends 114, 115 of screen receiver 110. This causes a flat and flush engagement between the inward facing surface of the outward ends 114, 115 of screen receiver 110 and the outward facing surface of inward most partitions or front partitions 147, 148 which serves as an abrupt stop-surface to the inward motion of screen receiver 110.

This abrupt stop is good for setting a defined stop-point for the inward motion of screen receiver 110, as well as being good for allowing for a clean release once the force on screen 200 subsides (thereby allowing screen receiver 110 to return to a fully outward and taut position). However, this abrupt stop causes the generation of loud noise (or louder than may be desirable) when it occurs.

When this engagement occurs, with pad 66 between inward facing surface of the outward ends 114, 115 of screen receiver 110 and the outward facing surface of inward most partitions or front partitions 147, 148, the noise is greatly reduced due to the elimination of metal-on-metal contact, slowed deceleration, a muffling effect, among other physical principals. The slightly slowed deceleration can also have an effect of reducing the wear and tear on the components of the system 10, such as screen 200, screen receiver 110, elongate channel 140 and the like.

It is worth noting that while the outward facing surfaces of inward most partitions or front partitions 147, 148 are generally flat, the inward facing surfaces are angled. That is, in the arrangement shown, the outward facing surfaces of inward most partitions or front partitions 147, 148 are generally perpendicular to the vertical length of track assemblies 100, compartment 146 and screen receiver 110. These flat and perpendicular surfaces facilitate a clear, defined and clean stop surface for screen receiver 110 when it moves inward. In contrast, the inward facing surfaces of inward most partitions or front partitions 147, 148 are generally angled inward toward the center of the hollow interior of compartment 146 positioned within elongate channel 140. These angled surfaces, or chamfered surfaces help facilitate the insertion of screen receiver 110 within the compartment 146 within elongate channel 140.

As is described further herein, screen receiver 110 may be inserted within compartment 146 after the elongate channel 140 is installed by rotating screen receiver 110 at an angle to elongate channel 140 and moving screen receiver 110 within compartment 146. The angled interior facing surfaces of inward most partitions or front partitions 147, 148 help to facilitate this insertion. Once screen receiver 110 is positioned within compartment 146 of elongate channel 140 the screen receiver 110 is again rotated back to be in parallel alignment with the elongate channel 140. In this position, the outward facing surfaces of inward most partitions or front partitions 147, 148 prevent the escape of screen receiver 110 from the compartment 146 of elongate channel 140.

In the arrangement shown, as one example, pad 66 fits around and is frictionally held in place around the inward most partitions or front partitions 147, 148 through the dimensions, shape and tolerances of pad 66 and inward most partitions or front partitions 147, 148. In the arrangement shown, as one example, pad 66 is formed of a generally slender layer of material, that is of generally consistent shape or thickness that extends from an inward end to an outward end. In the arrangement shown, as one example, a groove is positioned at the intersection of the interior-facing surface of parallel sidewalls 143, 144 and inward most partitions or front partitions 147, 148. In the arrangement shown, as one example, the inward end and outward end of pad 66 is received with or engages these grooves thereby frictionally holding pad 66 onto inward most partitions or front partitions 147, 148. Any other manner, method or means of connecting two components together is hereby contemplated for use between inward most partitions or front partitions 147, 148 and pad 66 such as the use of adhesives, fasteners, snap-fit features, over-molding or any other manner, method or means.

Liner On Outward Most Partitions or Rear Partitions:

In the arrangement shown, as one example, a pad 66 is positioned to fit around all or a portion of outward most partitions, or back partitions 149, 150. In this arrangement, pad 66 extends in a generally continuous manner along the vertical length of outward most partitions, or back partitions 149, 150 which themselves extend all or a portion of the length of elongate channel 140. In the arrangement shown, as one example, the inward facing surface of outward most partitions, or back partitions 149, 150 (the portion that faces screen receiver 110 when screen receiver 110 is positioned within compartment 146) is generally flat and flush and in planar spaced relation to the outward facing surface of the outward ends 114, 115 of screen receiver 110. This causes a flat and flush engagement between the outward facing surface of the outward ends 114, 115 of screen receiver 110 and the inward facing surface of outward most partitions, or back partitions 149, 150 which serves as an abrupt stop-surface to the outward motion of screen receiver 110.

This abrupt stop is good for setting a defined stop-point for the outward motion of screen receiver 110, as well as being good for allowing for a clean release once the force on screen 200 is applied (thereby allowing screen receiver 110 to move inward). However, this abrupt stop causes the generation of loud noise (or louder than may be desirable) when it occurs.

When this engagement occurs, with pad 66 between outward facing surface of the outward ends 114, 115 of screen receiver 110 and the inward facing surface of outward most partitions, or back partitions 149, 150, the noise is greatly reduced due to the elimination of metal-on-metal contact, slowed deceleration, a muffling effect, among other physical principals. The slightly slowed deceleration can also have an effect of reducing the wear and tear on the components of the system 10, such as screen 200, screen receiver 110, elongate channel 140 and the like.

In the arrangement shown, as one example, pad 66 fits around and is frictionally held in place around the outward most partitions, or back partitions 149, 150 through the dimensions, shape and tolerances of pad 66 and outward most partitions, or back partitions 149, 150. In the arrangement shown, as one example, pad 66 is formed of a generally slender layer of material, that is of generally consistent shape or thickness that extends from an inward end to an outward end. In the arrangement shown, as one example, the liner reaches around a portion of outward most partitions, or back partitions 149, 150 thereby frictionally holding itself upon outward most partitions, or back partitions 149, 150. Any other manner, method or means of connecting two components together is hereby contemplated for use between outward most partitions, or back partitions 149, 150 and pad 66 such as the use of adhesives, fasteners, snap-fit features, over-molding or any other manner, method or means.

Liner On Outward Ends of Screen Receiver:

In the arrangement shown, as one example, a pad 66 is positioned to fit around all or a portion of outward ends 114, 115 of screen receiver 110. This includes all or a portion of the inward facing surface of outward ends 114, 115 of screen receiver 110 and/or all or a portion of the outward facing surface of outward ends 114, 115 of screen receiver 110. In this arrangement, pad 66 extends in a generally continuous manner along the vertical length of the outward ends 114, 115 of screen receiver 110 which themselves extend all or a portion of the length of screen receiver 110.

In the arrangement shown, as one example, the inward facing side and outward facing side of the outward ends 114, 115 of screen receiver 110 includes a generally flat surface and rounded ends. The generally flat inward facing surface of the outward ends 114, 115 of screen receiver 110 is configured to engage the generally flat outward facing surface of inward most partitions or front partitions 147, 148 when screen receiver 110 is in a fully inward position (such as when a force is applied to screen 200). The generally flat outward facing surface of the outward ends 114, 115 of screen receiver 110 is configured to engage the generally flat inward facing surface of outward most partitions or back partitions 149, 150 when screen receiver 110 is in a fully outward position (such as when no force is applied to screen 200).

This causes a flat and flush engagement between the outward facing surface of the outward ends 114, 115 of screen receiver 110 and the inward facing surface of outward most partitions, or back partitions 149, 150 which serves as an abrupt stop-surface to the outward motion of screen receiver 110. This causes a flat and flush engagement between the inward facing surface of the outward ends 114, 115 of screen receiver 110 and the outward facing surface of inward most partitions or front partitions 147, 148 which serves as an abrupt stop-surface to the inward motion of screen receiver 110.

This abrupt stop is good for setting a defined stop-point for the outward motion as well as the inward motion of screen receiver 110, as well as being good for allowing for a clean release once the forces change. However, this abrupt stop causes the generation of loud noise (or louder than may be desirable) when it occurs.

When this engagement occurs, with pad 66 between outward facing surface and/or inward facing surface of the outward ends 114, 115 of screen receiver 110, the noise is greatly reduced due to the elimination of metal-on-metal contact, slowed deceleration, a muffling effect, among other physical principals. The slightly slowed deceleration can also have an effect of reducing the wear and tear on the components of the system 10, such as screen 200, screen receiver 110, elongate channel 140 and the like.

In the arrangement shown, as one example, pad 66 fits around and is frictionally held in place around the outward ends 114, 115 of screen receiver 110 through the dimensions, shape and tolerances of pad 66 and outward ends 114, 115 of screen receiver 110. In the arrangement shown, as one example, pad 66 is formed of a generally slender layer of material, that is of generally consistent shape or thickness that extends from an inward end to an outward end. In the arrangement shown, as one example, the liner reaches around a portion of outward ends 114, 115 of screen receiver 110 thereby frictionally holding itself upon outward ends 114, 115 of screen receiver 110. Any other manner, method or means of connecting two components together is hereby contemplated for use between outward ends 114, 115 of screen receiver 110 and pad 66 such as the use of adhesives, fasteners, snap-fit features, over-molding or any other manner, method or means.

Various Arrangements and Combinations of Pads:

Various pads 66 have been described herein. These pads 66 have been described as being positioned to fit around all or a portion of inward most partitions, or front partitions 147, 148, around all or a portion of outward most partitions, or back partitions 149, 150, and/or around all or a portion of outward ends 114, 115 of screen receiver 110. Any combination of these pads 66 are hereby contemplated for use. As one example, it is hereby contemplated for use that pads 66 may only be used in association with inward most partitions, or front partitions 147, 148. As another example, it is hereby contemplated for use that pads 66 may only be used in association with outward most partitions, or back partitions 149, 150. As another example, it is hereby contemplated for use that pads 66 may only be used in association with outward ends 114, 115 of screen receiver 110.

In one arrangement, only one of screen receiver 110 and inward most partitions, or front partitions 147, 148 or outward most partitions, or back partitions 149, 150 include a pad 66 thereon when engagement occurs. This is desirable as this reduces the noise generated as one layer of pad 66 is positioned between the metal components of screen receiver 110 and elongate channel 140.

Figure 14:
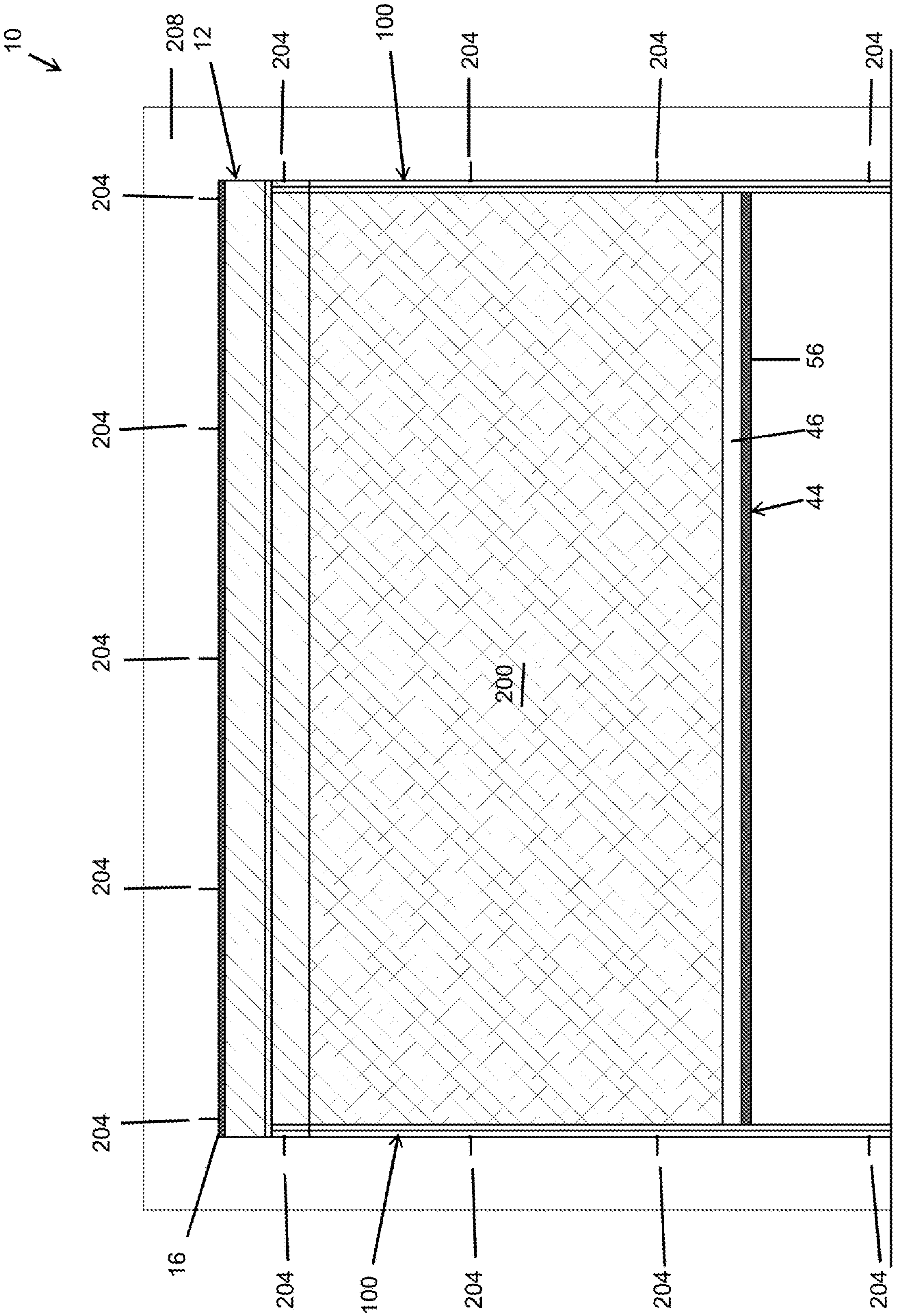
FIG. 14 is a front elevation view of an assembled motorized screen system having a magnetic track assembly as is shown in FIGS. 10-13, in accordance with one or more embodiments; the view showing a housing positioned at the upper end of the motorized screen system; the view showing a screen deployed approximately three-quarters of the way to the fully closed position; the view showing a pair of magnetic track assemblies having elongate channels and screen receivers therein positioned adjacent the outward sides of the screen; the view showing a bottom bar assembly connected to the lower end of the screen; the view showing the housing and the magnetic track assemblies installed into a frame member positioned around the motorized screen system having a magnetic track assembly.

In another arrangement, both of screen receiver 110 and inward most partitions, or front partitions 147, 148 or outward most partitions, or back partitions 149, 150 include a pad 66 thereon when engagement occurs. This is desirable as this reduces the noise generated as two layers of pad 66 are positioned between the metal components of screen receiver 110 and elongate channel 140. This arrangement may reduce the noise generated greater than only having a single layer of pad 66. With reference to FIG. 14 in the arrangement shown, as one example, a front elevation view of an assembled motorized screen system 10 having a magnetic track assembly 100 having housing 12 positioned at the upper end of the motorized screen system 10 is presented. The view shows a screen 200 deployed approximately three-quarters of the way to the fully closed position. The view shows a pair of magnetic track assemblies 100 having elongate channels 140 and screen receivers 110 therein positioned adjacent the outward sides of the screen 200. The view shows a bottom bar assembly 44 connected to the lower end of the screen 200. The view shows the housing 12 and the magnetic track assemblies 100 installed into a frame member 208 positioned around the motorized screen system 10 by a plurality of fasteners 204. That is, a plurality of fasteners 204 are passed through elongate channels 140 and into the frame members 208 positioned at the sides of motorized screen system 10. That is, a plurality of fasteners 204 are passed through top member 16 of housing 12 and into the frame member 208 positioned at the top side of motorized screen system 10. The view showing the screen material as a single piece of screen material that is consistent from housing 12 to bottom bar 46, and from side to side.

Figure 15:
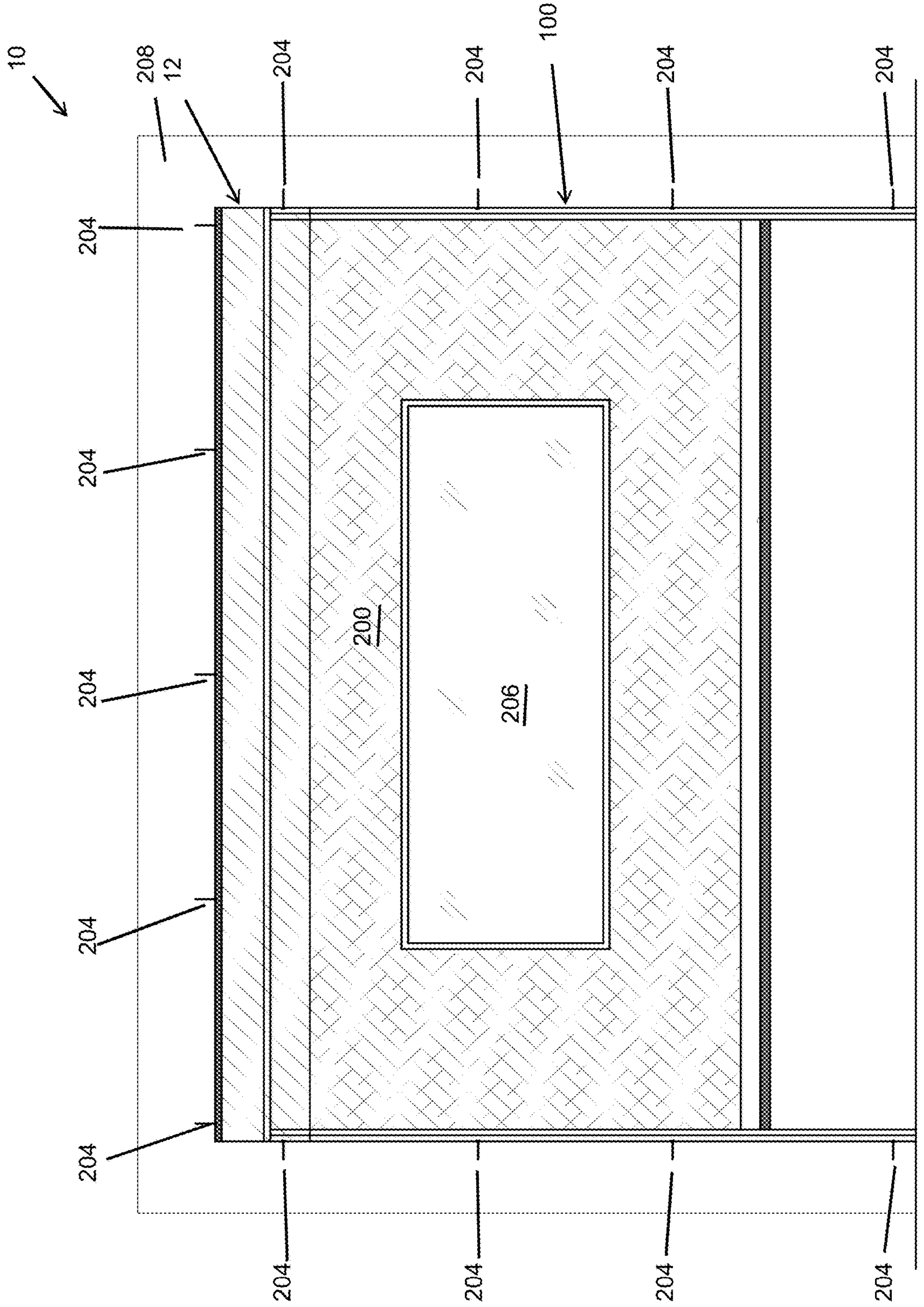
FIG. 15 is a front elevation view of an assembled motorized screen system having a magnetic track assembly as is shown in FIGS. 10-14, in accordance with one or more embodiments; the view showing a housing positioned at the upper end of the motorized screen system; the view showing a screen deployed approximately three-quarters of the way to the fully closed position; the view showing a pair of magnetic track assemblies having elongate channels and screen receivers therein positioned adjacent the outward sides of the screen; the view showing a bottom bar assembly connected to the lower end of the screen; the view showing the housing and the magnetic track assemblies installed into a frame member positioned around the motorized screen system having a magnetic track assembly; the view showing a window positioned within the screen.
Figure 16:
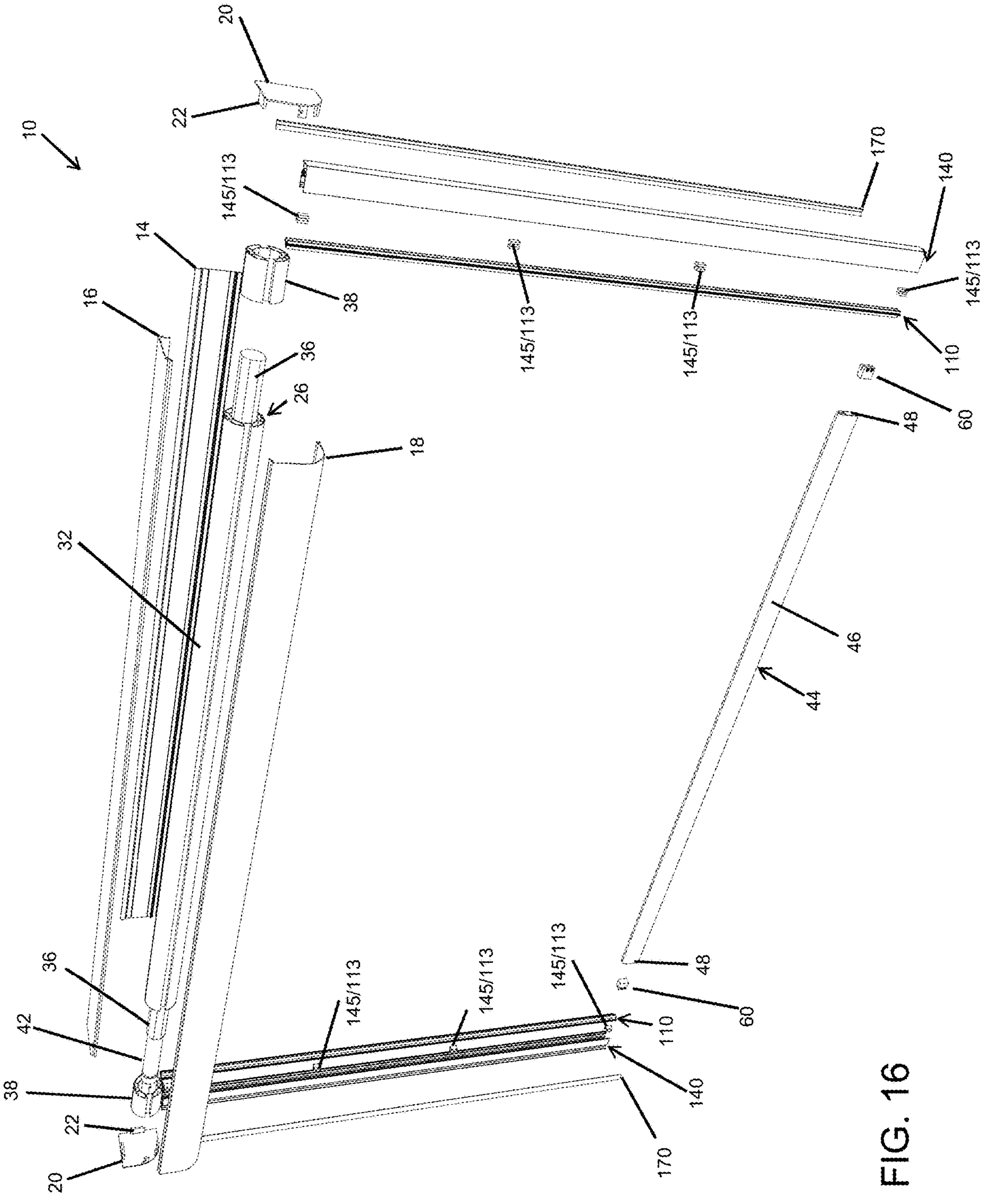
FIG. 16 is front perspective exploded view of a motorized screen system having a magnetic track assembly as is shown in FIGS. 10-15, in accordance with one or more embodiments; the view showing a housing positioned at the upper end of the motorized screen system; the view showing the housing having a rear member, a top member, a front member and end caps having bracket members; the view showing a pair of magnetic track assemblies having elongate channels and screen receivers positioned adjacent the outward sides of the screen; the view showing a bottom bar assembly configured to connect to the lower end of the screen; the view showing a roller assembly having a roller tube and a motor assembly configured to be positioned within the hollow interior of the housing; the view showing connection members (or axles) extending outward from the ends of the roller tube, these connection members configured to receive collars thereon that allow for adjustment of the overall length of the roller tube to provide adjustment regarding how the screen is to be raised and where the interlock lands relative to the roller tube.
Figure 17:
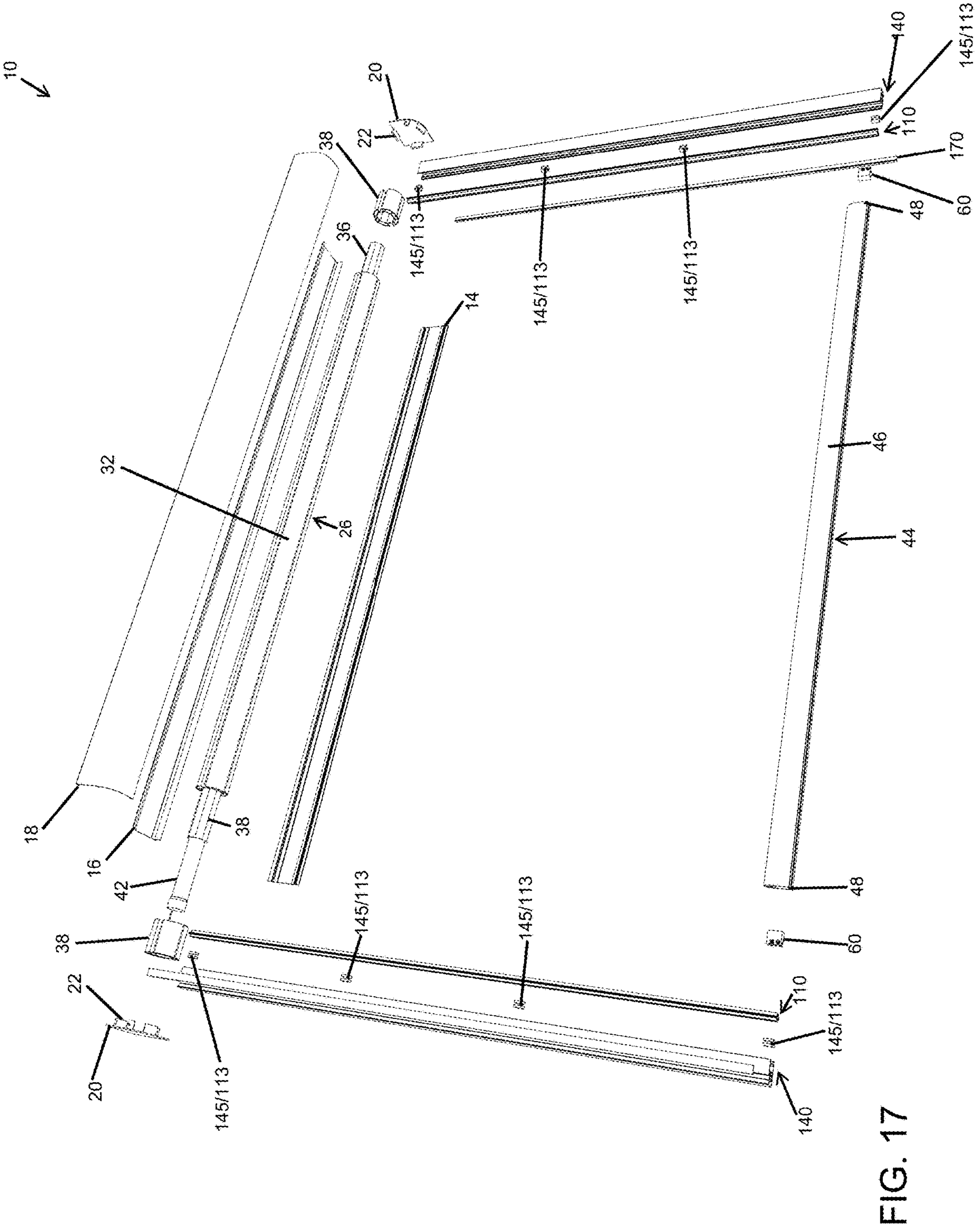
FIG. 17 is another front perspective exploded view of a motorized screen system having a magnetic track assembly as is shown in FIGS. 10-16, in accordance with one or more embodiments.
Figure 18:
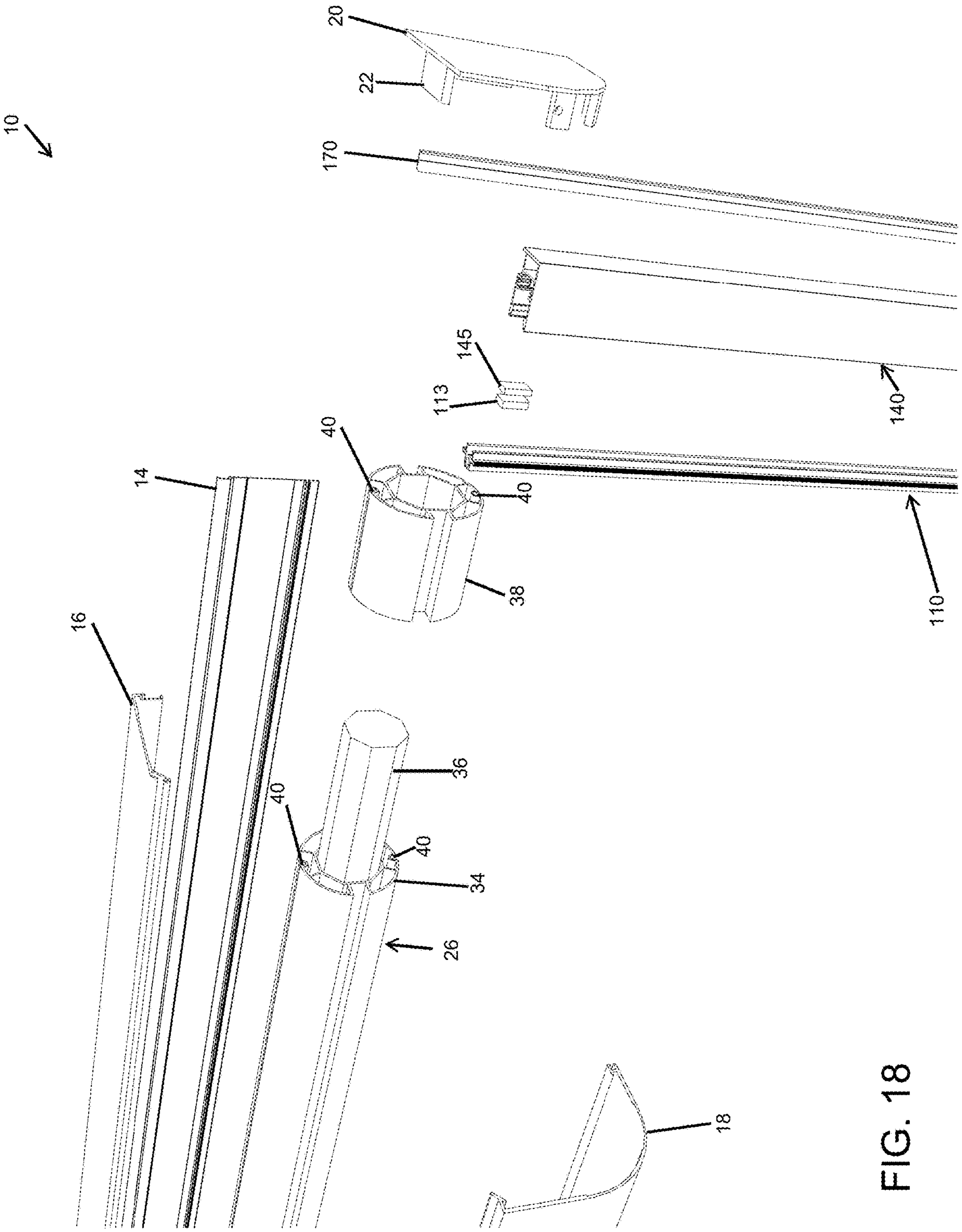
FIG. 18 is a close-up perspective exploded view of a motorized screen system having a magnetic track assembly as is shown in FIGS. 10-17, in accordance with one or more embodiments; the view showing a close-up of the upper right hand corner of the FIG. 16.
Figure 19:
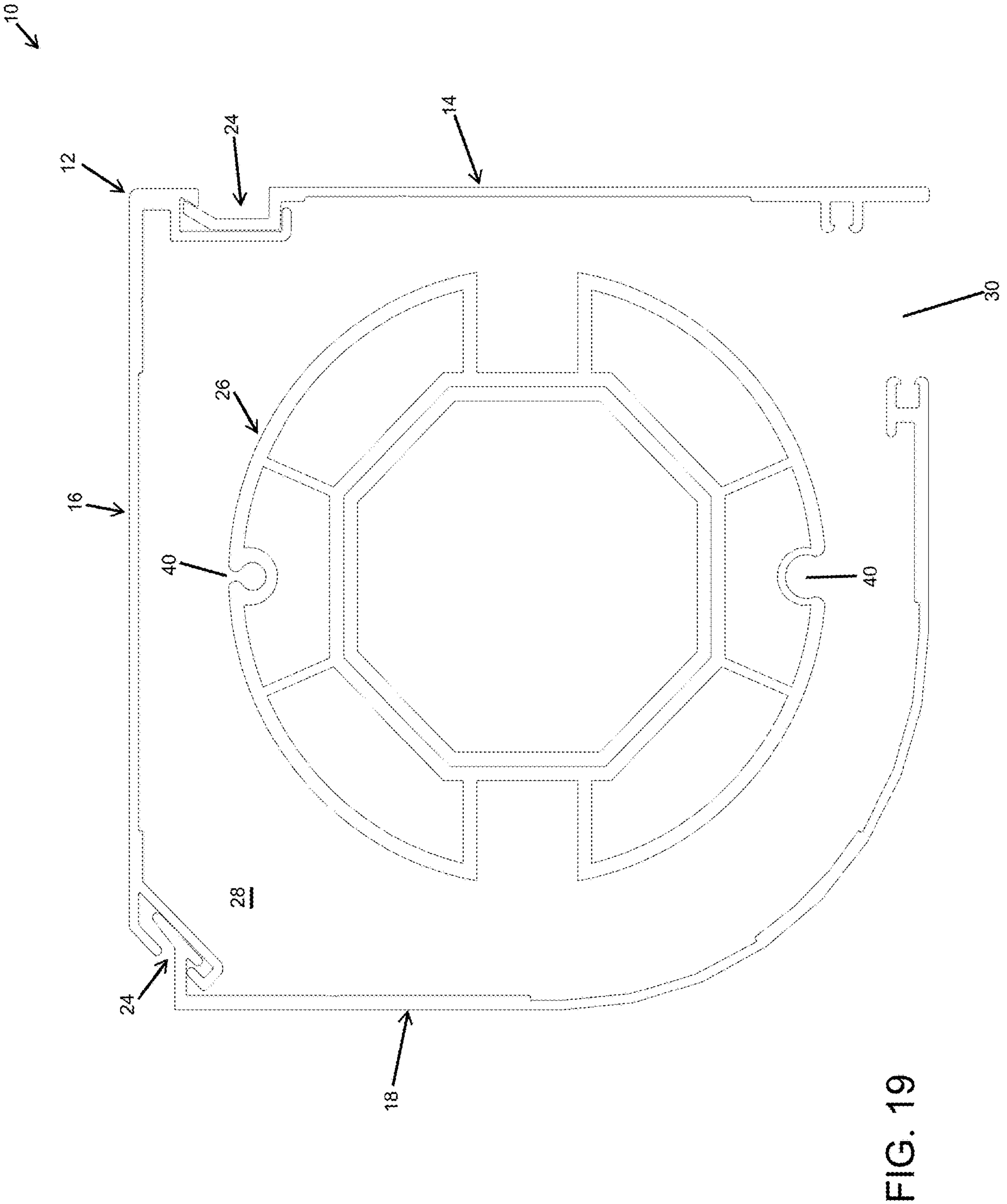
FIG. 19 is a side elevation view of a motorized screen system having a magnetic track assembly as is shown in FIGS. 10-18, in accordance with one or more embodiments; the view showing the housing with a roller tube assembly positioned within the hollow interior of the housing; the view showing a 5½ inch housing with roller tube.
Figure 20:
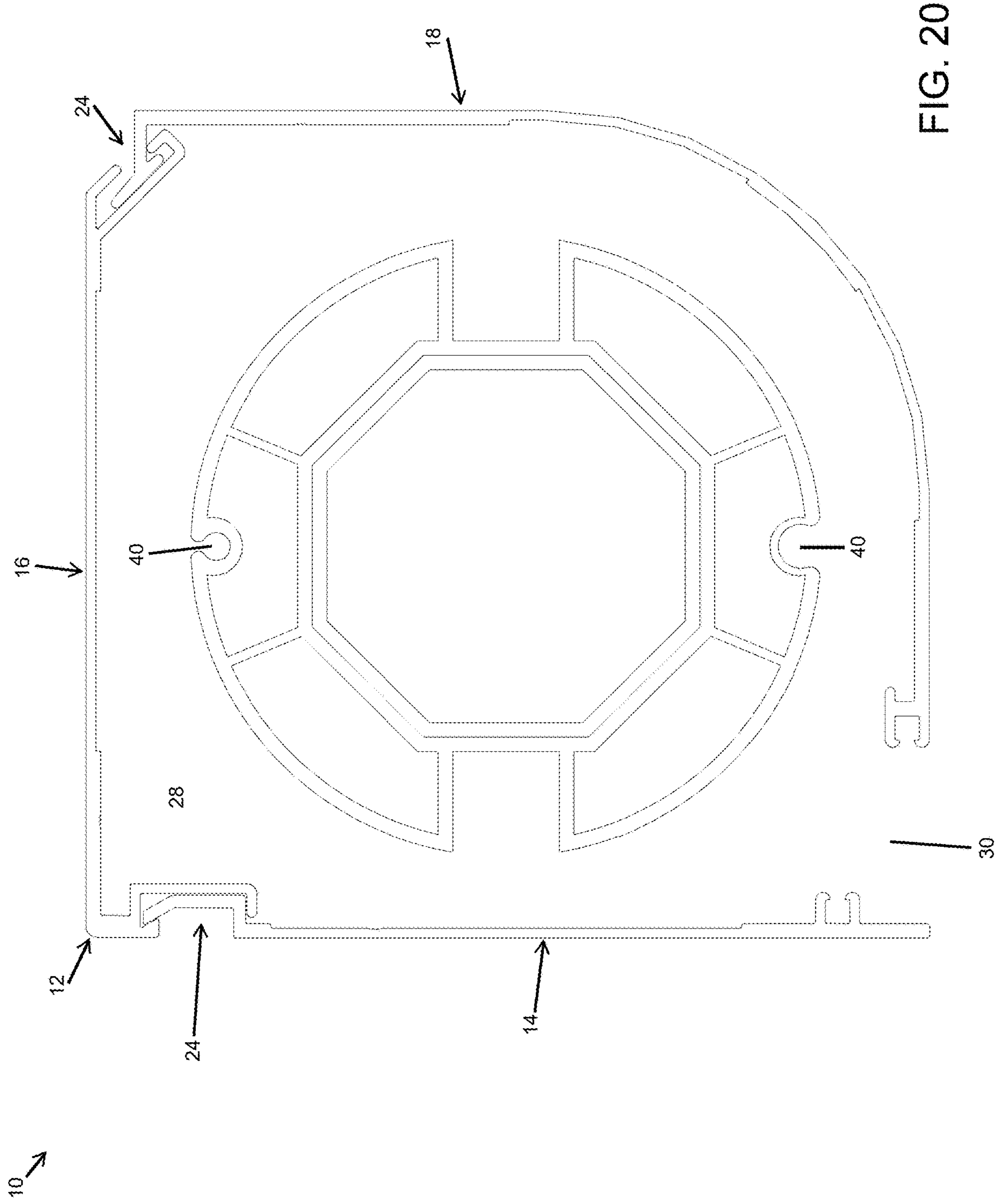
FIG. 20 is another side elevation view of a motorized screen system having a magnetic track assembly as is shown in FIGS. 10-19, in accordance with one or more embodiments; the view showing the housing with a roller tube assembly positioned within the hollow interior of the housing; the view showing the opposite end as is shown in FIG. 19; the view showing a 5½ inch housing with roller tube.
Figure 21:
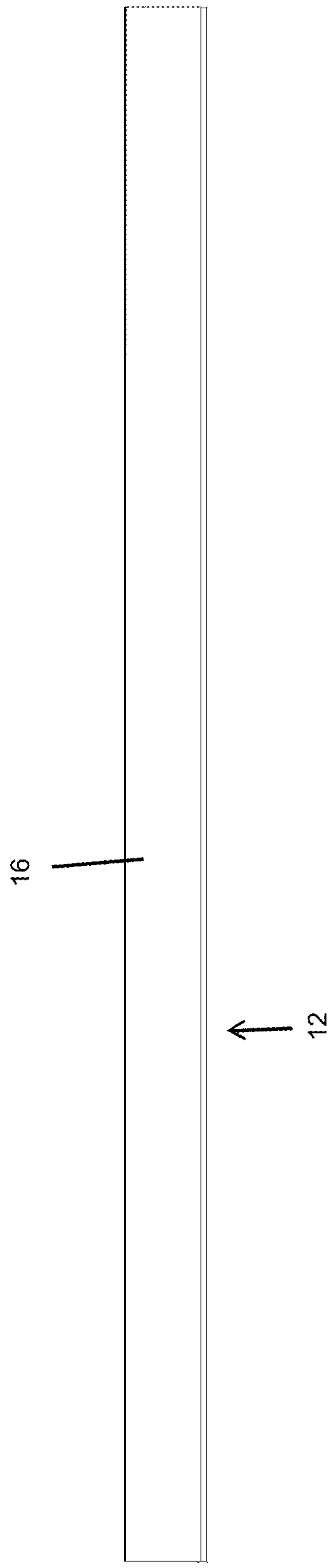
FIG. 21 is a top elevation view of the housing of a motorized screen system having a magnetic track assembly as is shown in FIGS. 10-20, in accordance with one or more embodiments; the view showing a 5½ inch housing.
Figure 22:
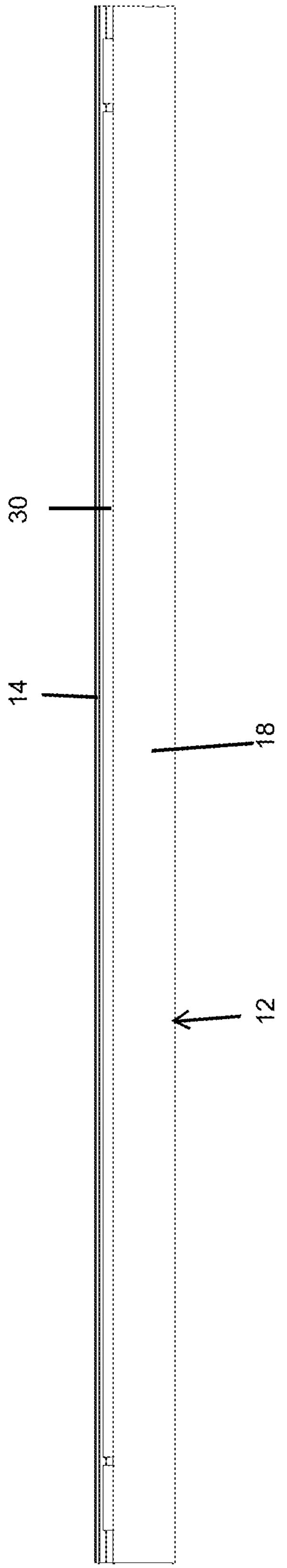
FIG. 22 is a bottom elevation view of the housing of a motorized screen system having a magnetic track assembly as is shown in FIGS. 10-21, in accordance with one or more embodiments; the view showing a 5½ inch housing.
Figure 23:
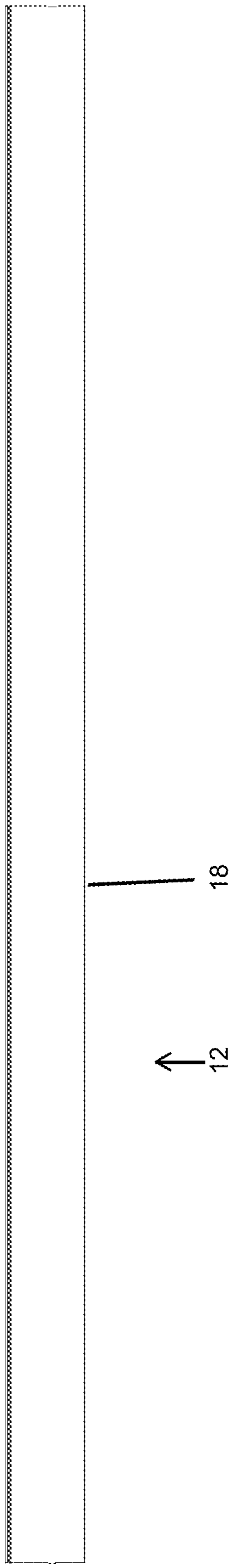
FIG. 23 is a front elevation view of the housing of a motorized screen system having a magnetic track assembly as is shown in FIGS. 10-22, in accordance with one or more embodiments; the view showing a 5½ inch housing.
Figure 24:
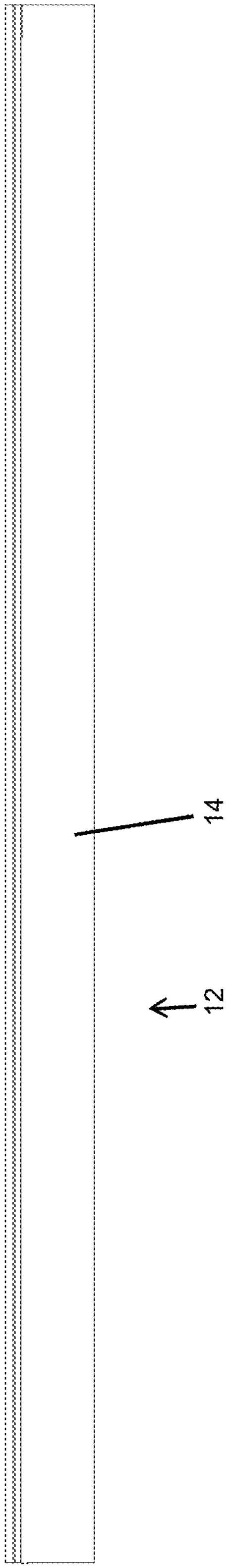
FIG. 24 is a rear elevation view of the housing of a motorized screen system having a magnetic track assembly as is shown in FIGS. 10-23, in accordance with one or more embodiments; the view showing a 5½ inch housing.
Figure 25:
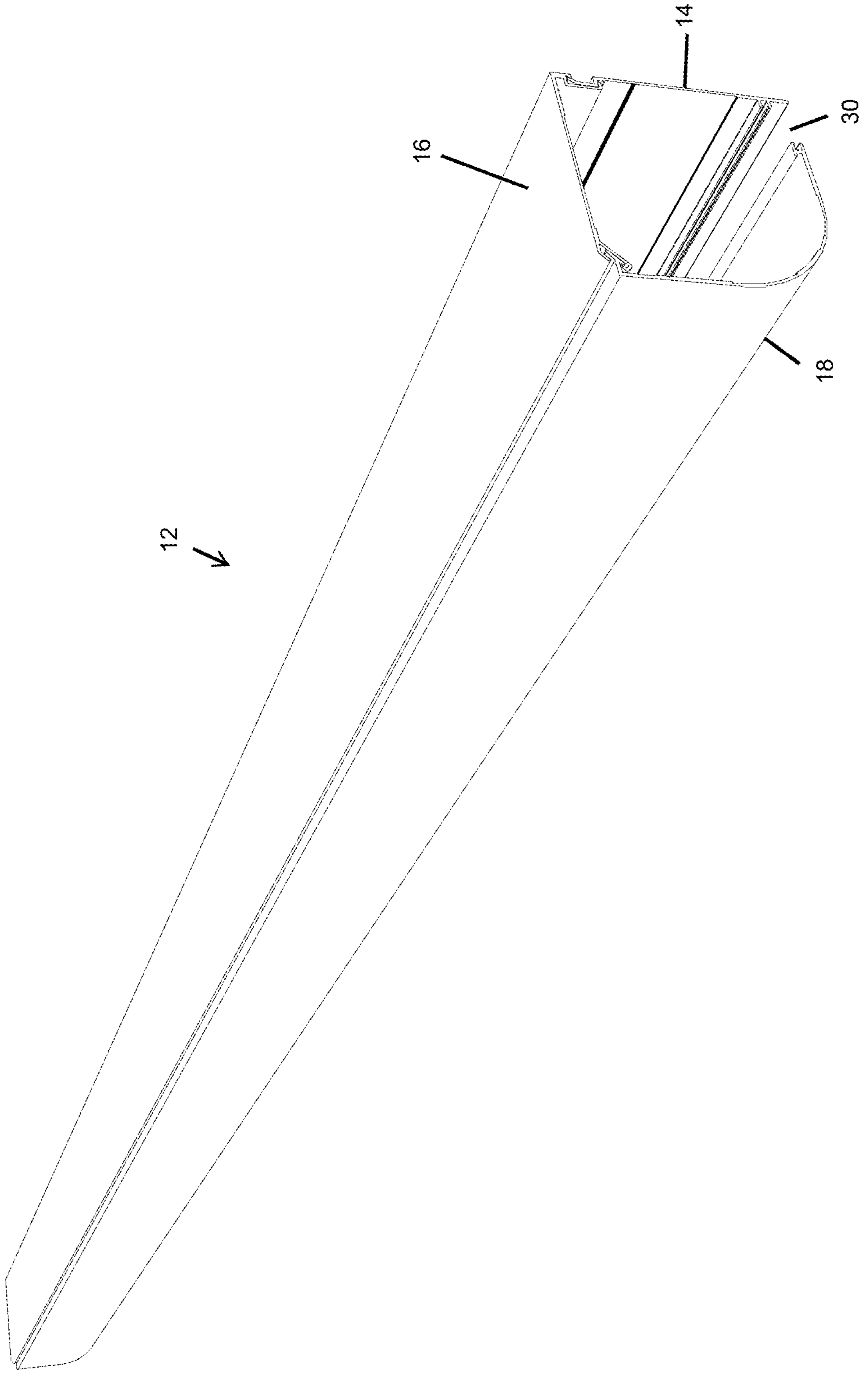
FIG. 25 is a perspective view of the housing of a motorized screen system having a magnetic track assembly as is shown in FIGS. 10-24, in accordance with one or more embodiments; the view showing a 5½ inch housing.
Figure 26:
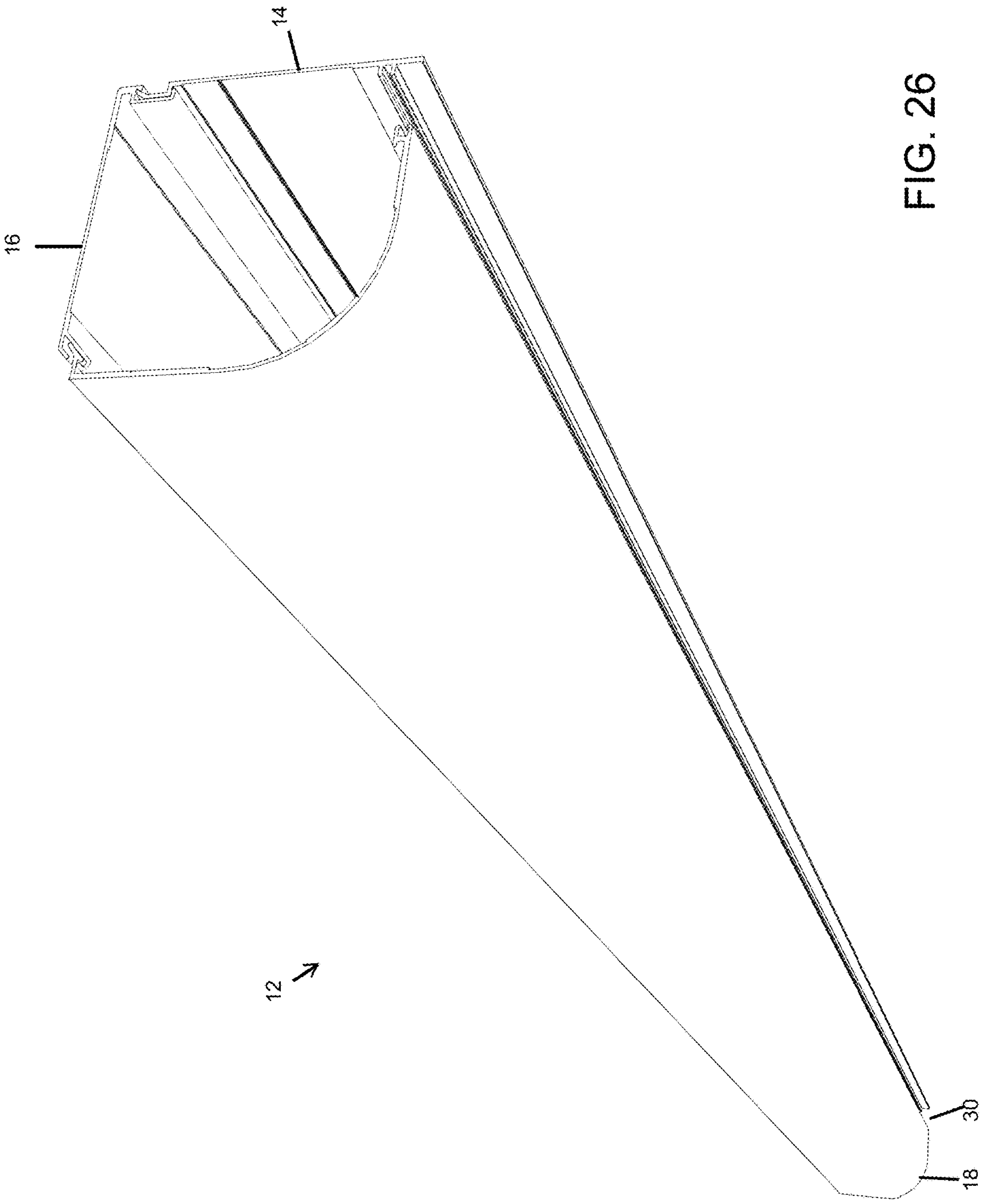
FIG. 26 is another perspective view of the housing of a motorized screen system having a magnetic track assembly as is shown in FIGS. 10-25, in accordance with one or more embodiments; the view showing a 5½ inch housing.
Figure 27:
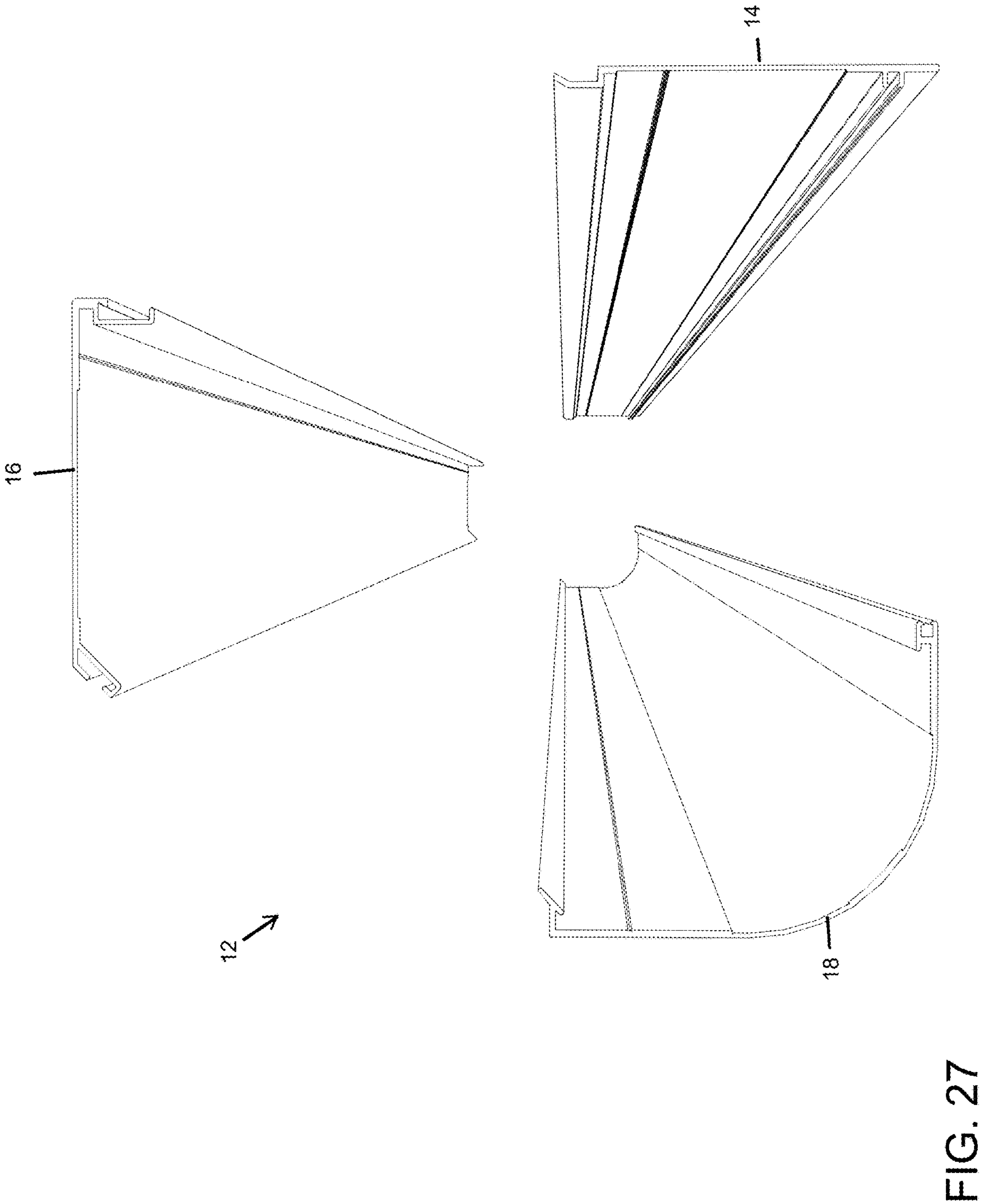
FIG. 27 is a perspective exploded view of the housing of a motorized screen system having a magnetic track assembly as is shown in FIGS. 10-26, in accordance with one or more embodiments; the view showing a 5½ inch housing.
Figure 28:
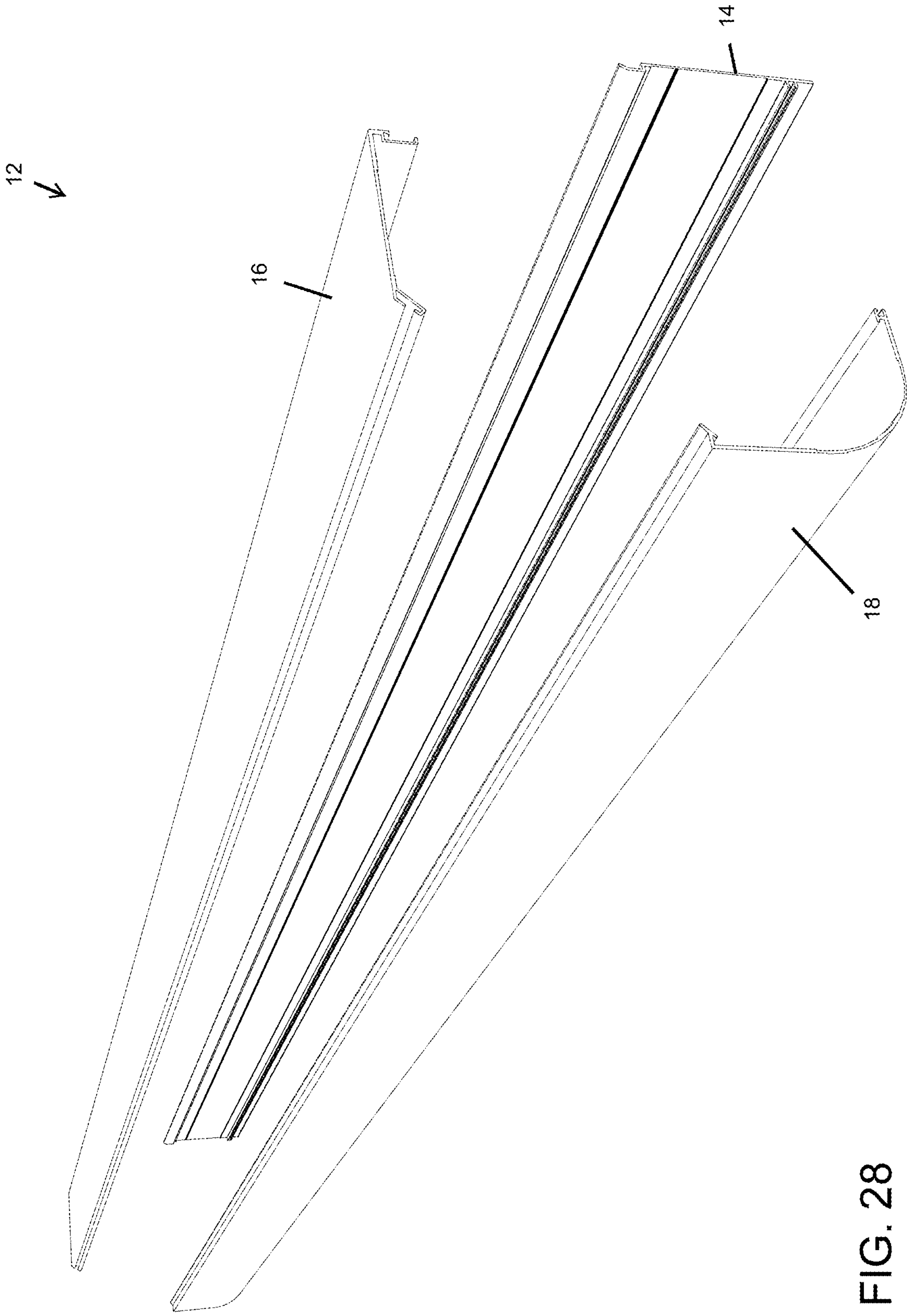
FIG. 28 is another perspective exploded view of the housing of a motorized screen system having a magnetic track assembly as is shown in FIGS. 10-27, in accordance with one or more embodiments; the view showing a 5½ inch housing.
Figure 29:
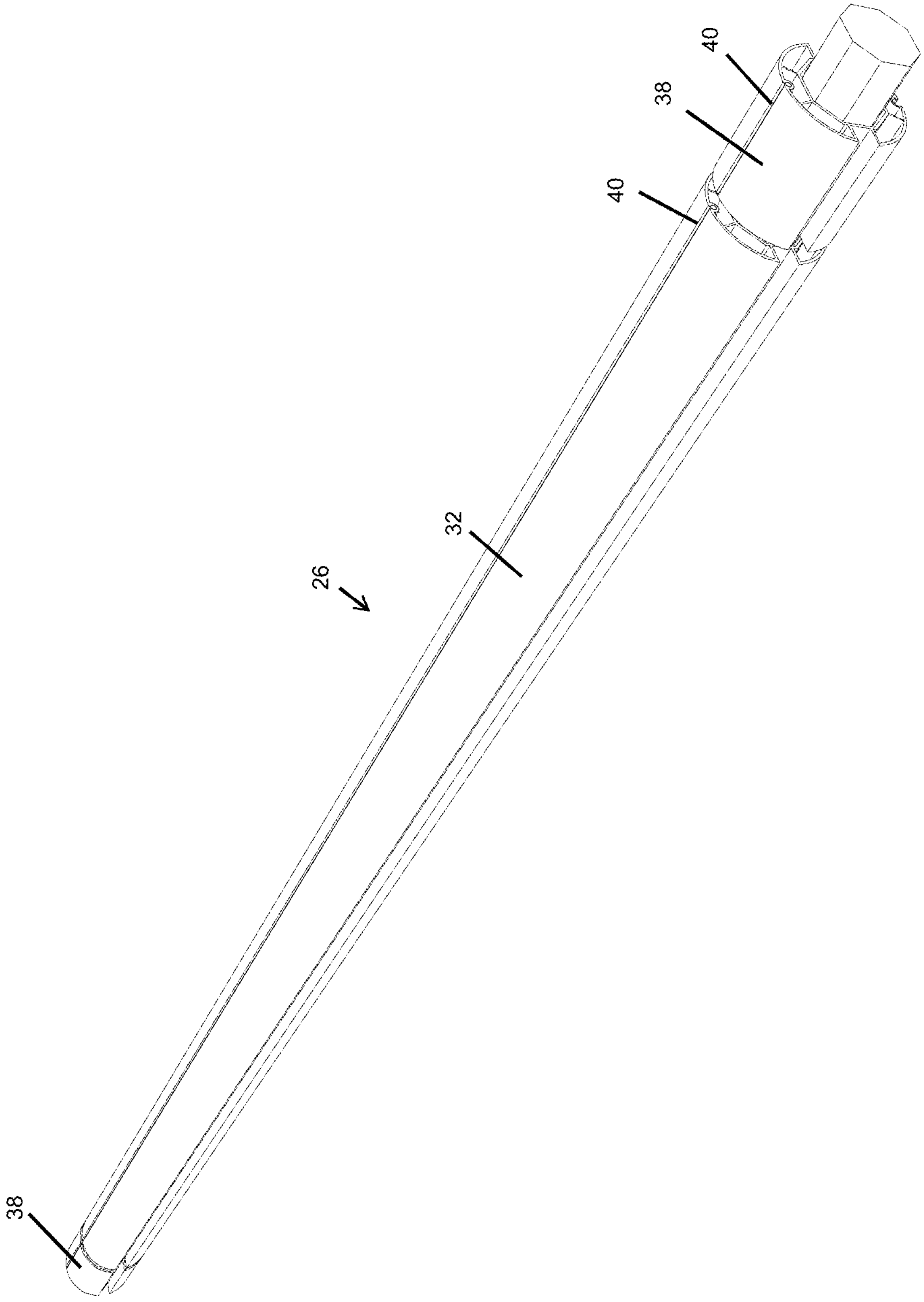
FIG. 29 is a perspective view of the roller tube assembly of a motorized screen system having a magnetic track assembly as is shown in FIGS. 10-28, in accordance with one or more embodiments; the view showing a roller tube assembly for a 5½ inch housing.
Figure 30:
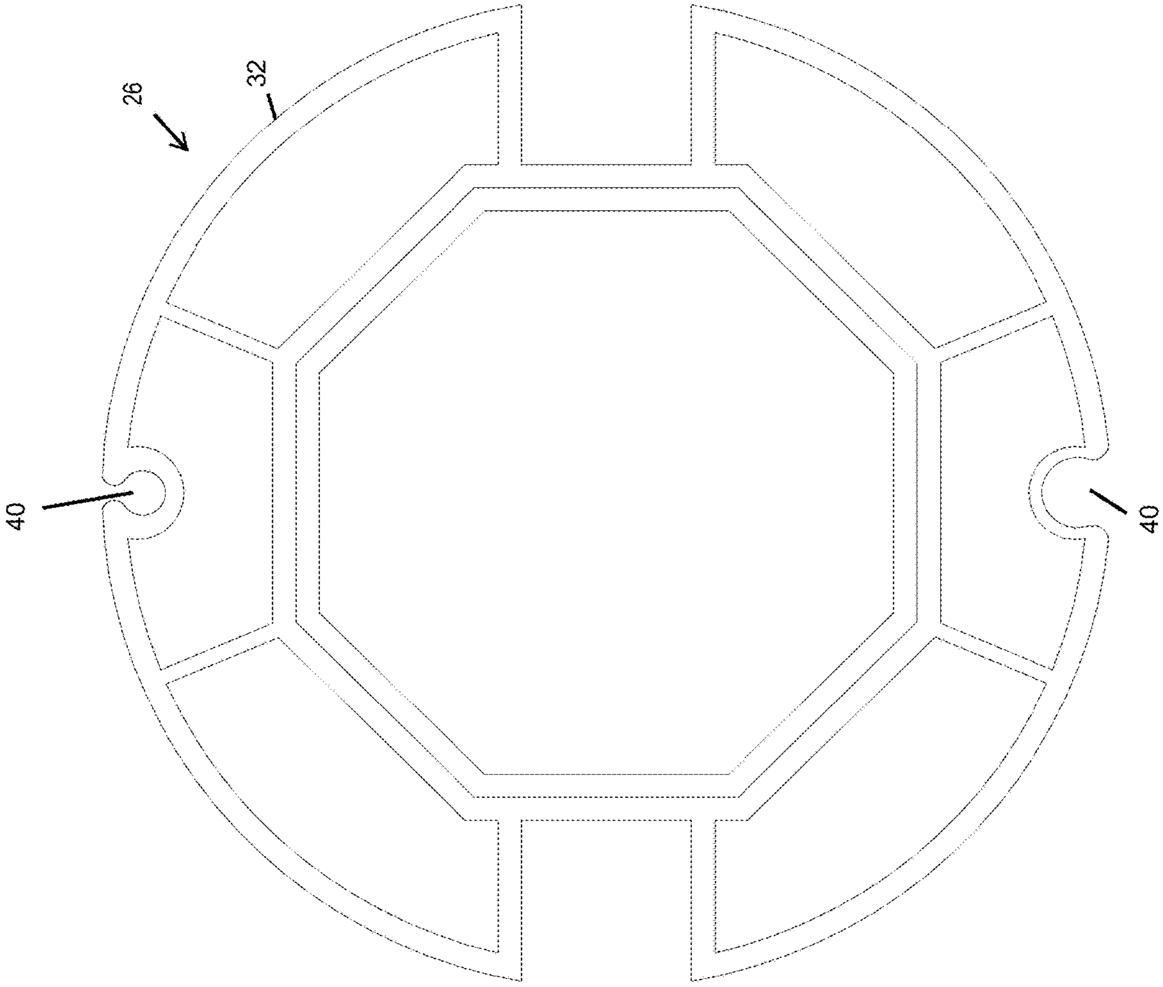
FIG. 30 is a side elevation view of the roller tube assembly of a motorized screen system having a magnetic track assembly as is shown in FIGS. 10-29, in accordance with one or more embodiments; the view showing a roller tube assembly for a 5½ inch housing.
Figure 31:
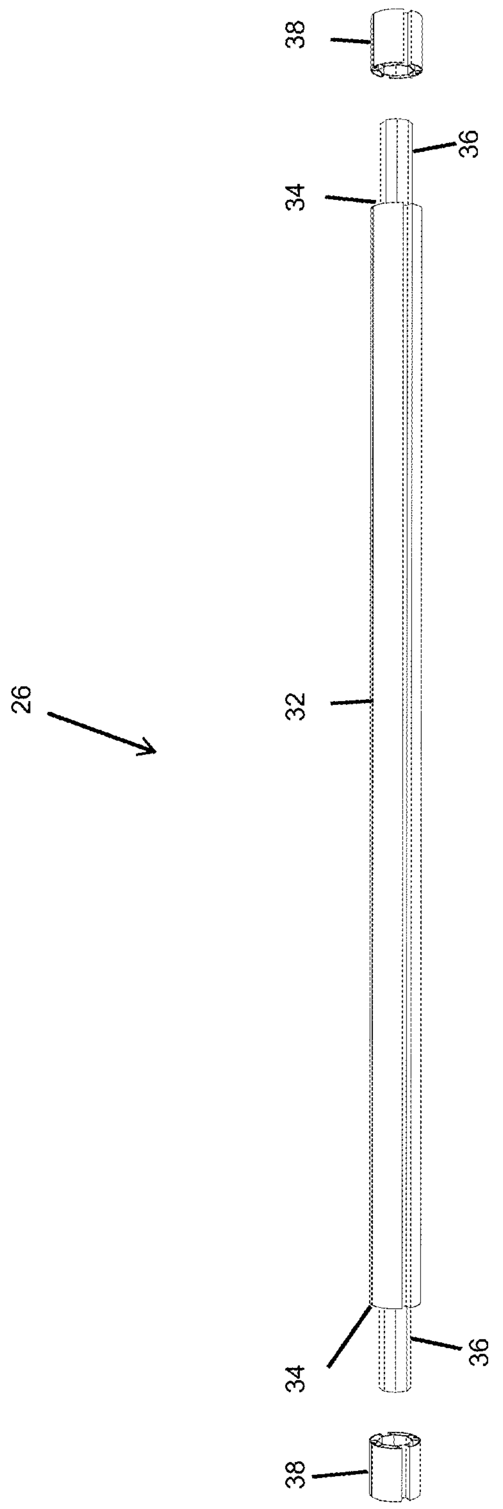
FIG. 31 is a perspective view of the roller tube assembly of a motorized screen system having a magnetic track assembly as is shown in FIGS. 10-30, in accordance with one or more embodiments; the view showing the collars (also known as doughnuts) exploded from the connection members of the roller tube assembly; the view showing a roller tube assembly for a 5½ inch housing.
Figure 32:
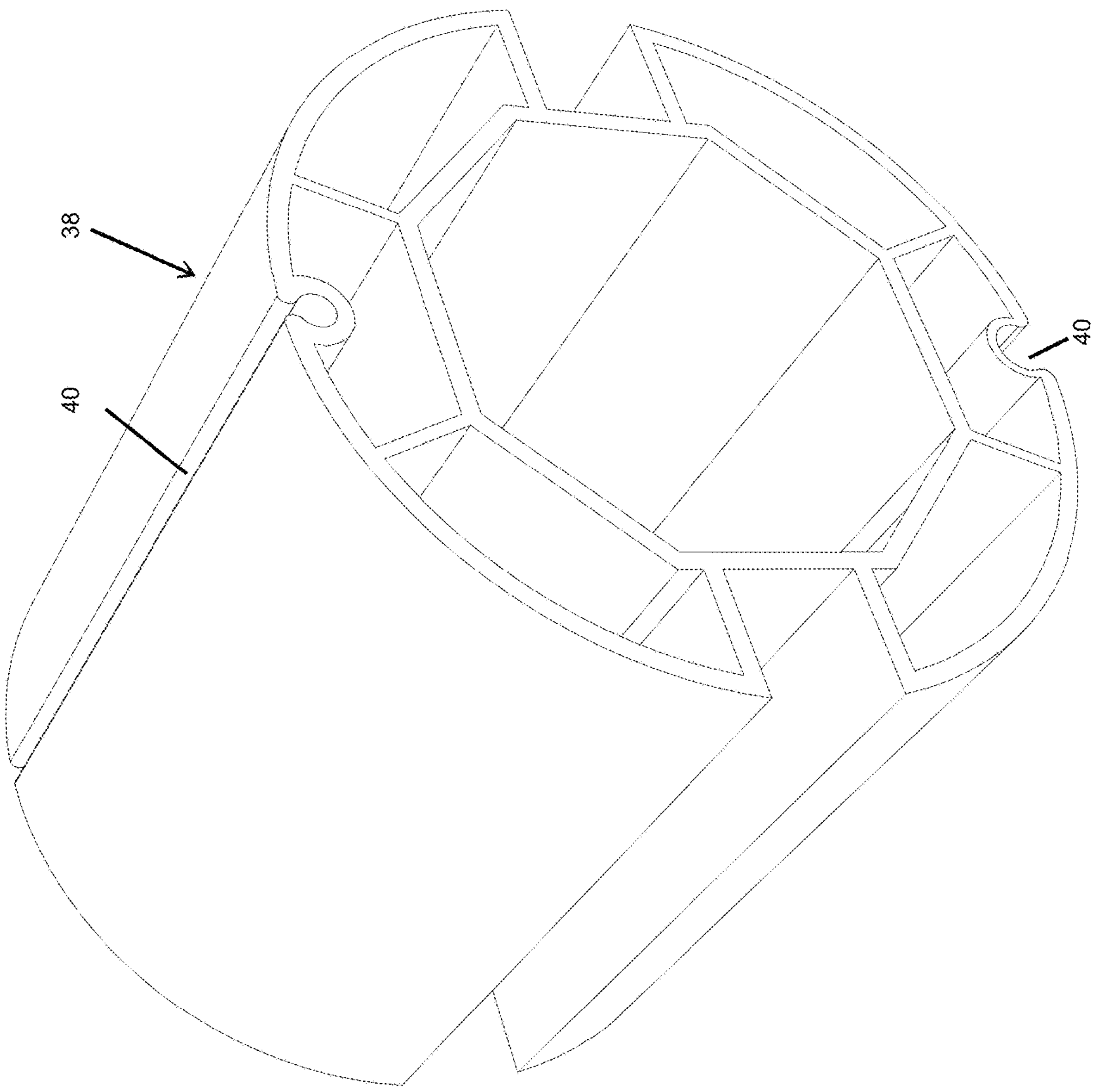
FIG. 32 is a perspective view of the collars (also known as doughnuts) of the roller tube assembly of a motorized screen system having a magnetic track assembly as is shown in FIGS. 10-31, in accordance with one or more embodiments; the view showing collar for a 5½ inch housing.
Figure 33:
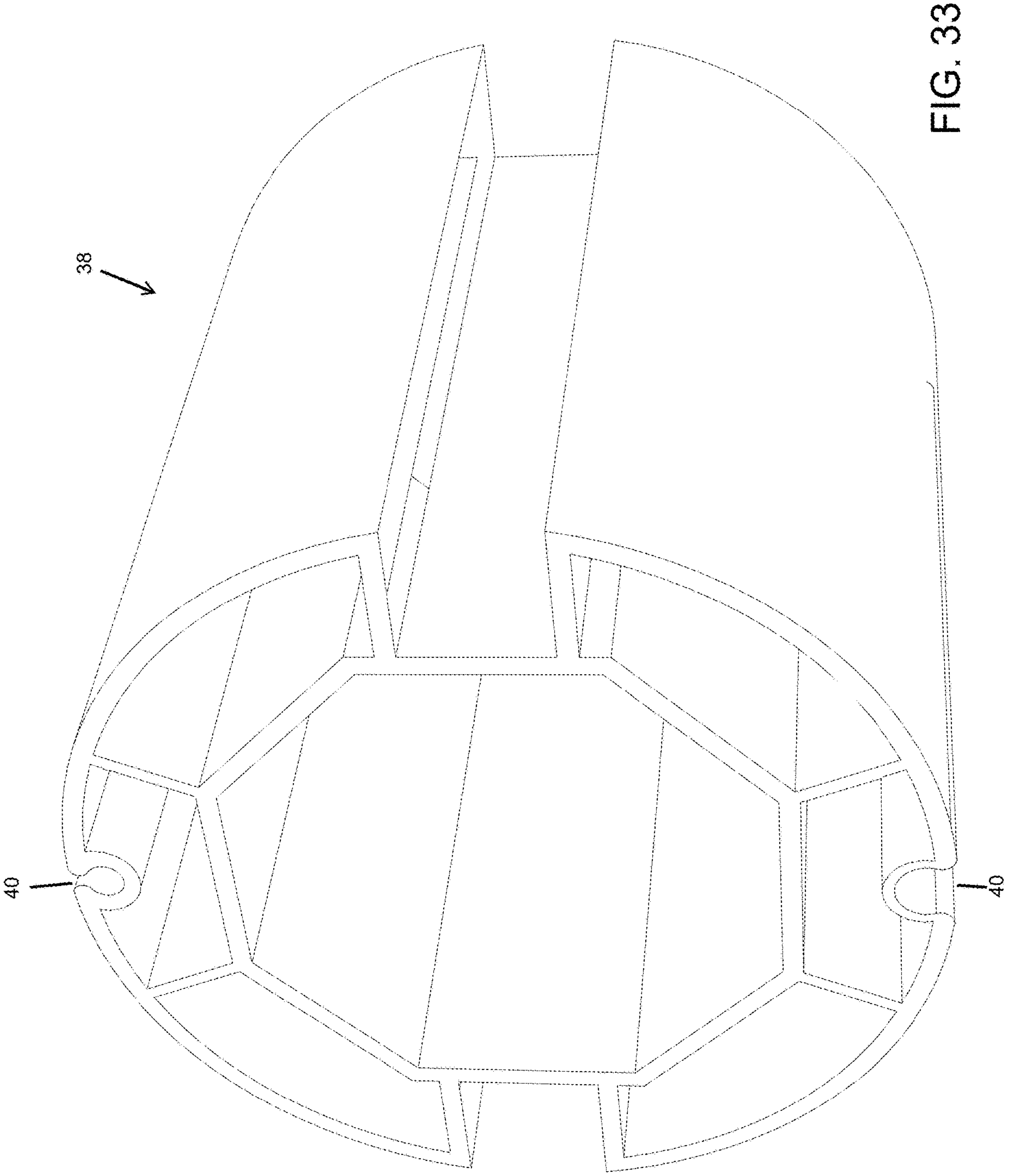
FIG. 33 is another perspective view of the collars (also known as doughnuts) of the roller tube assembly of a motorized screen system having a magnetic track assembly as is shown in FIGS. 10-32, in accordance with one or more embodiments; the view showing a 5½ inch housing with roller tube.
Figure 34:
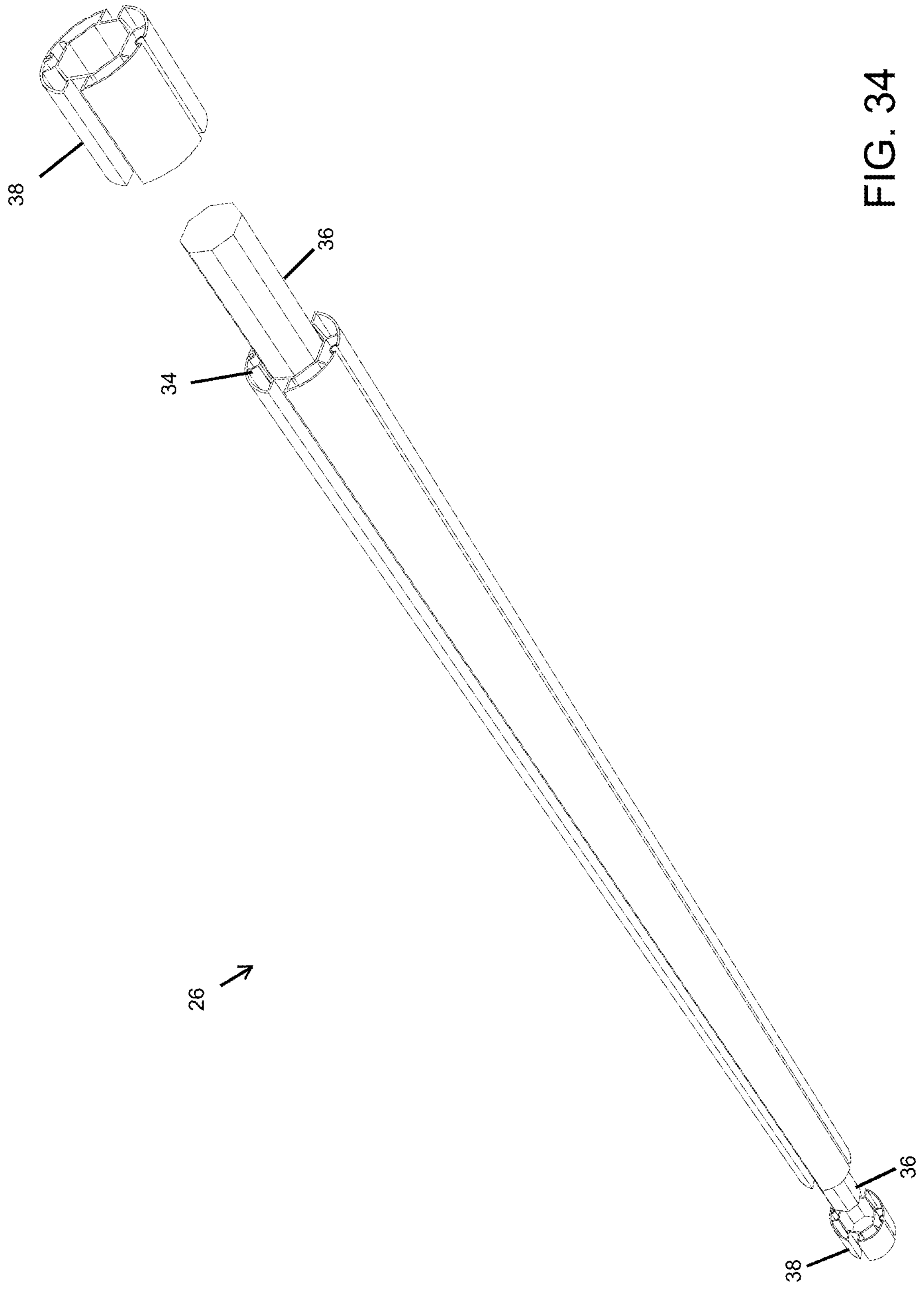
FIG. 34 is another perspective view of the roller tube assembly of a motorized screen system having a magnetic track assembly as is shown in FIGS. 10-33, in accordance with one or more embodiments; the view showing the collars (also known as doughnuts) exploded from the connection members of the roller tube assembly; the view showing a 5½ inch housing with roller tube.
Figure 35:
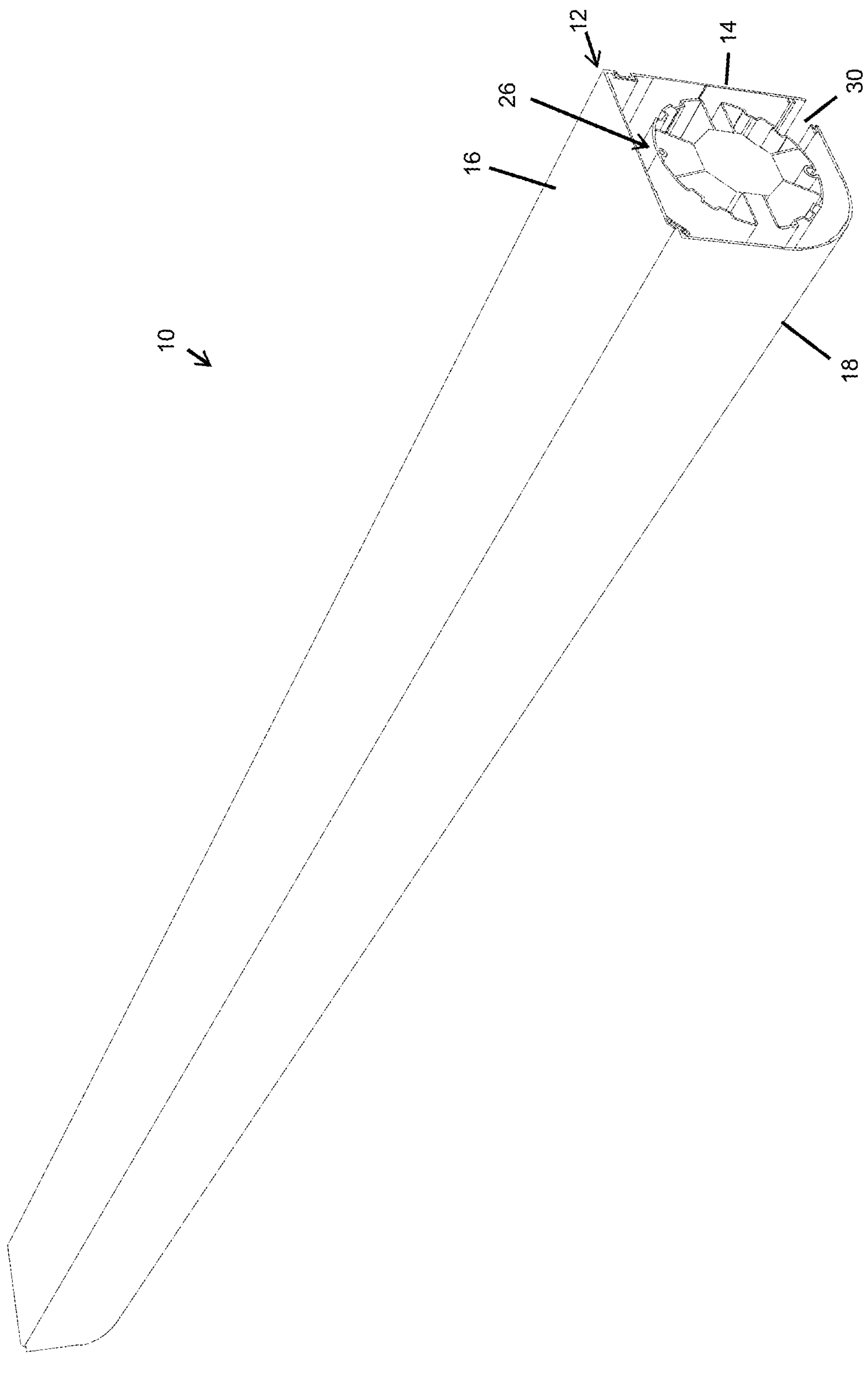
FIG. 35 is a perspective view of the roller tube assembly positioned within the hollow interior of the housing of a motorized screen system having a magnetic track assembly as is shown in FIGS. 10-34, in accordance with one or more embodiments; the view showing a 7 inch housing with roller tube.
Figure 36:
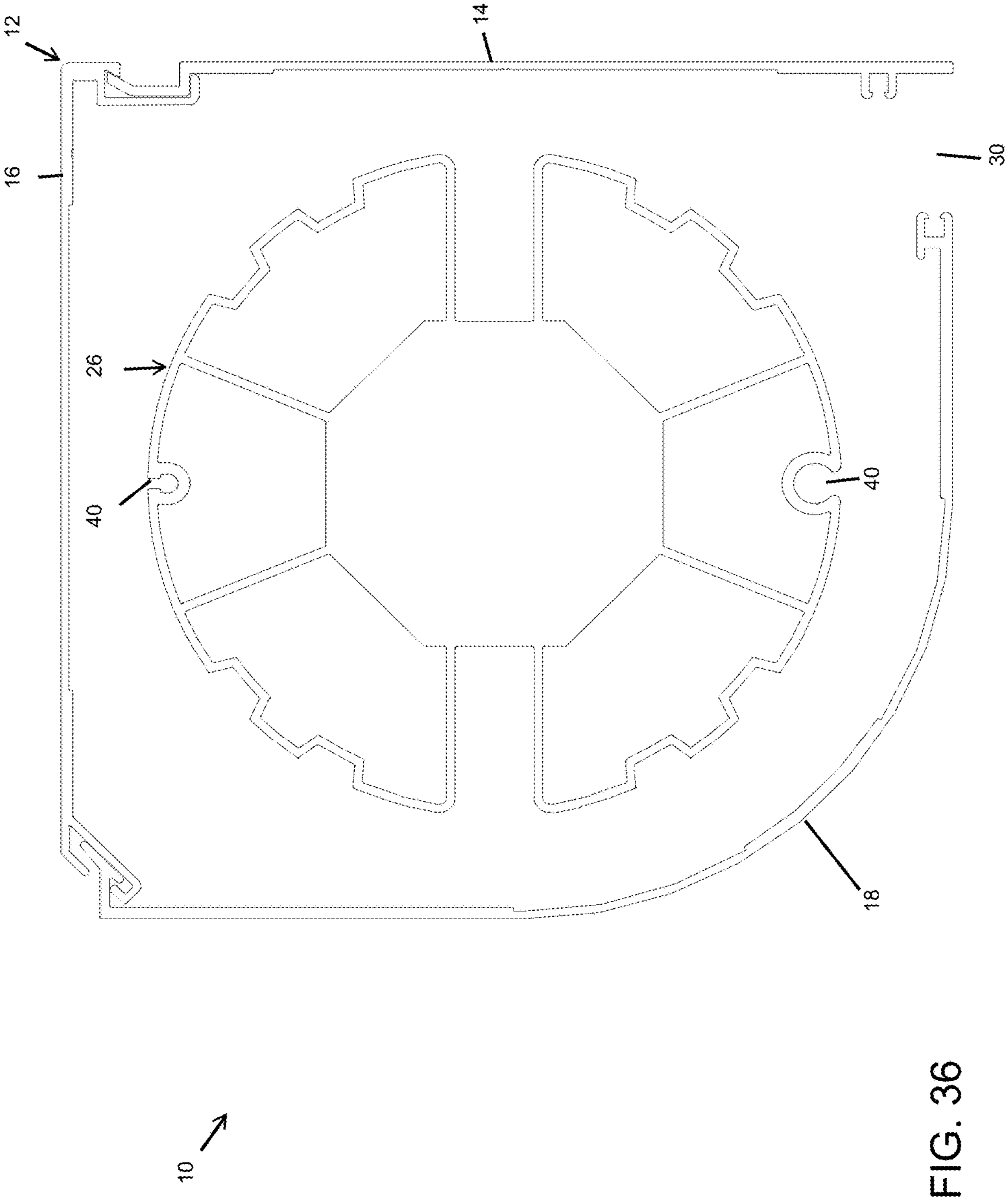
FIG. 36 is a side elevation view of the roller tube assembly positioned within the hollow interior of the housing of a motorized screen system having a magnetic track assembly as is shown in FIGS. 10-35, in accordance with one or more embodiments; the view showing a 7 inch housing with roller tube.
Figure 37:
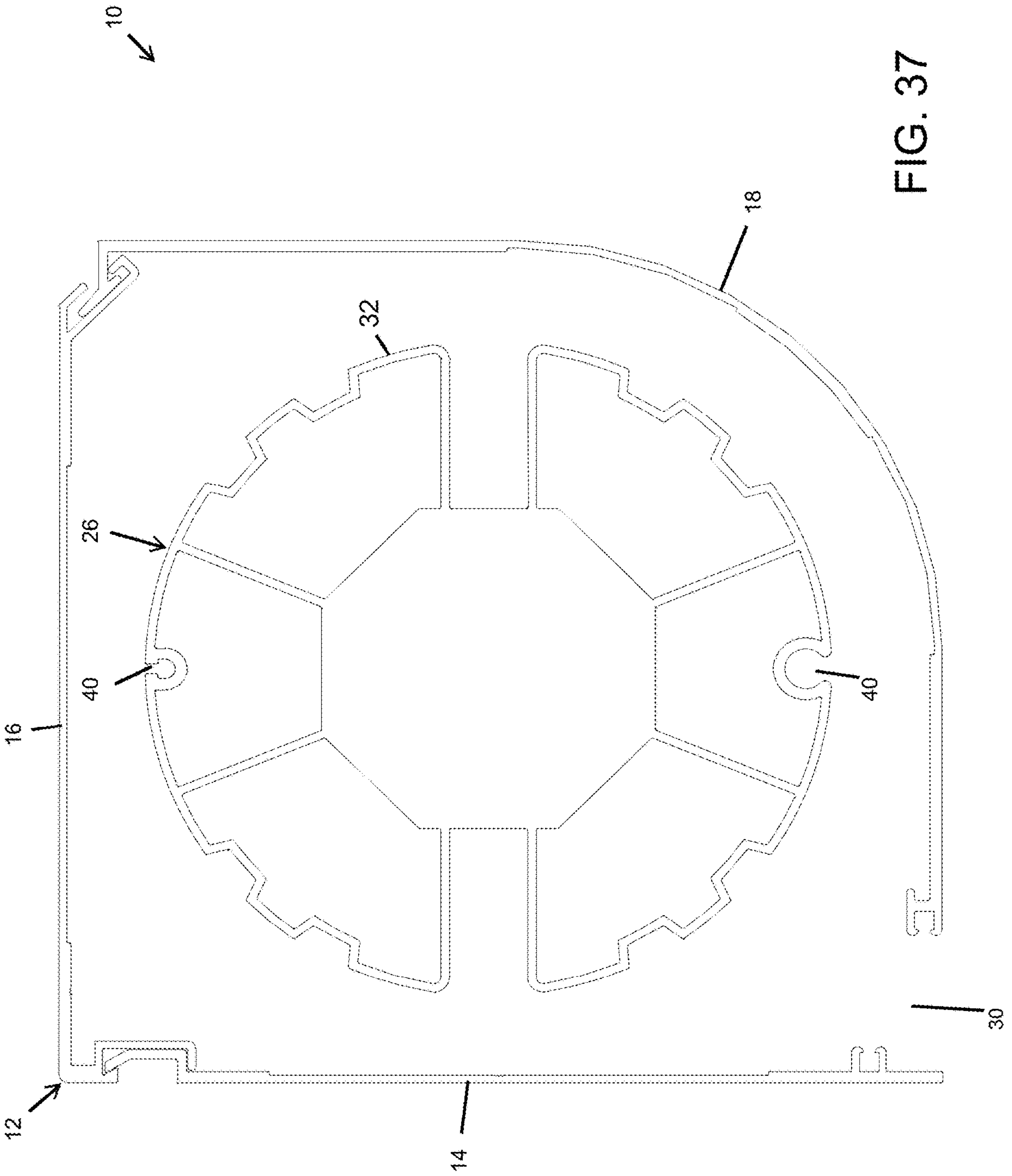
FIG. 37 is a side elevation view of the roller tube assembly positioned within the hollow interior of the housing of a motorized screen system having a magnetic track assembly as is shown in FIGS. 10-36, in accordance with one or more embodiments; the view taken from an opposite side as is shown in FIG. 34, the view showing a 7 inch housing with roller tube.

With reference to FIG. 15 a similar arrangement is shown with the difference being that the screen 200 includes a window 206 positioned within the material that forms the screen 200. In one arrangement, screen 200 is formed of a mesh material while window 206 is formed of a transparent or translucent flexible plastic material. However any other material is hereby contemplated for use with screen 200 and/or window 206.

Figure 50:
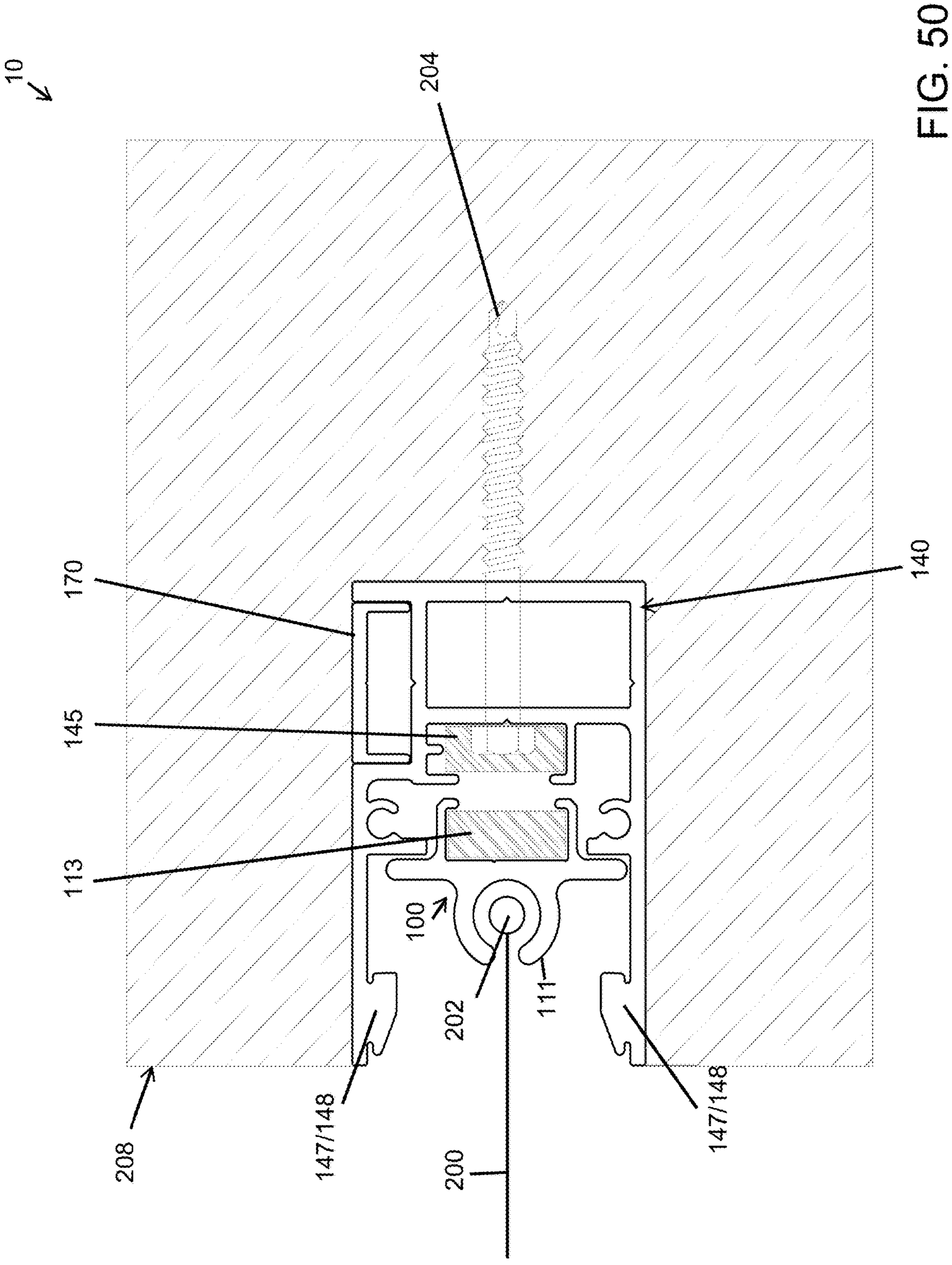
FIG. 50 is an end elevation assembled view of a magnetic track assembly as is shown in FIGS. 44-49, in accordance with one or more embodiments; the view showing the assembled magnetic track assembly positioned within a groove in a frame member so as to provide a low profile appearance; the view showing a fastener extending through the elongate channel and into the frame member; the view showing the screen receiver positioned within the hollow compartment of elongate channel; the view showing the interlock of the screen material connected to the C-shaped channel of the screen receiver; the view showing the pads shown in FIGS. 46 and 47 removed.
Figure 51:
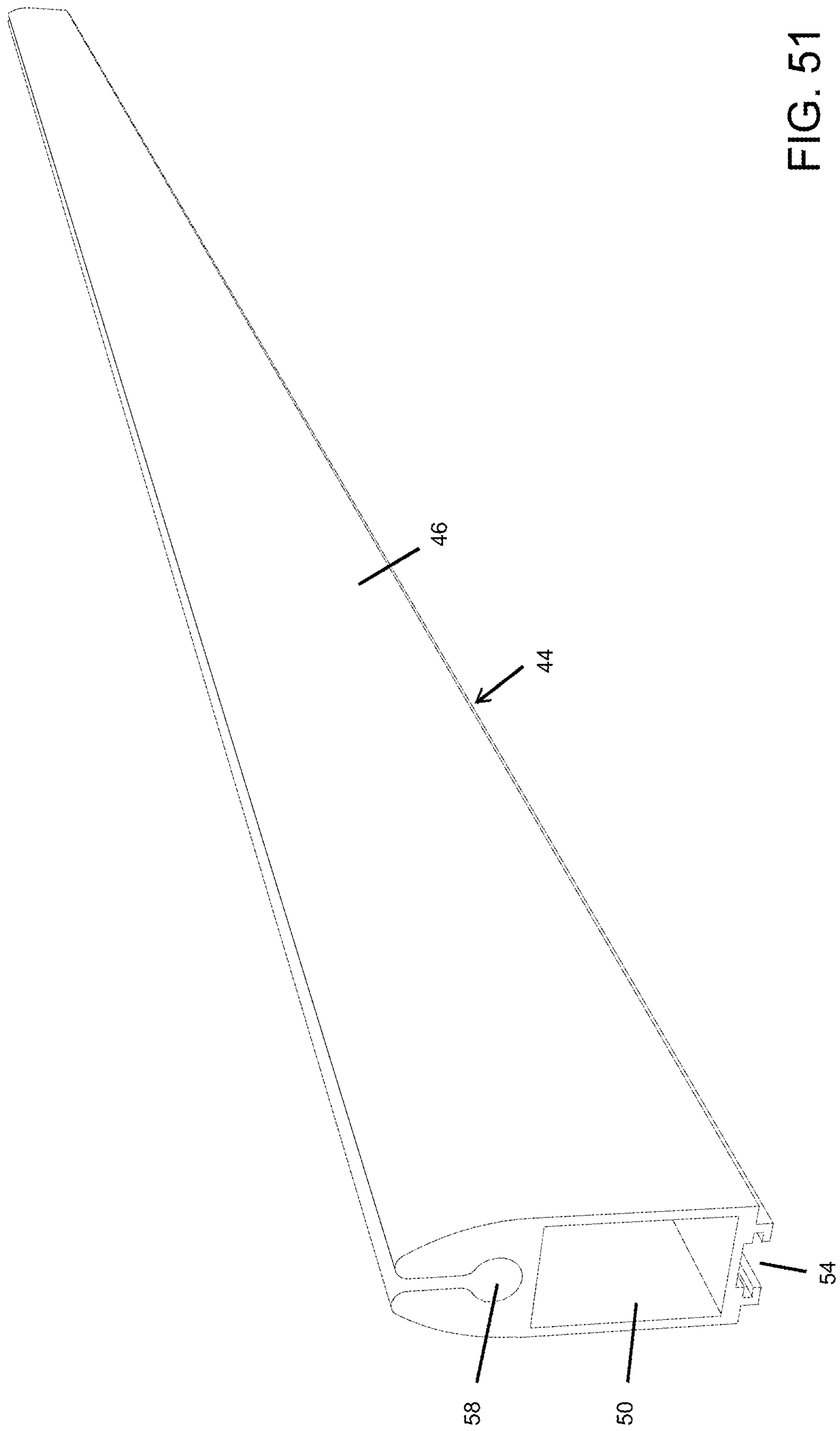
FIG. 51 is a perspective view of a bottom bar used in association with the motorized screen system shown in FIGS. 1-50, in accordance with one or more embodiments.
Figure 52:
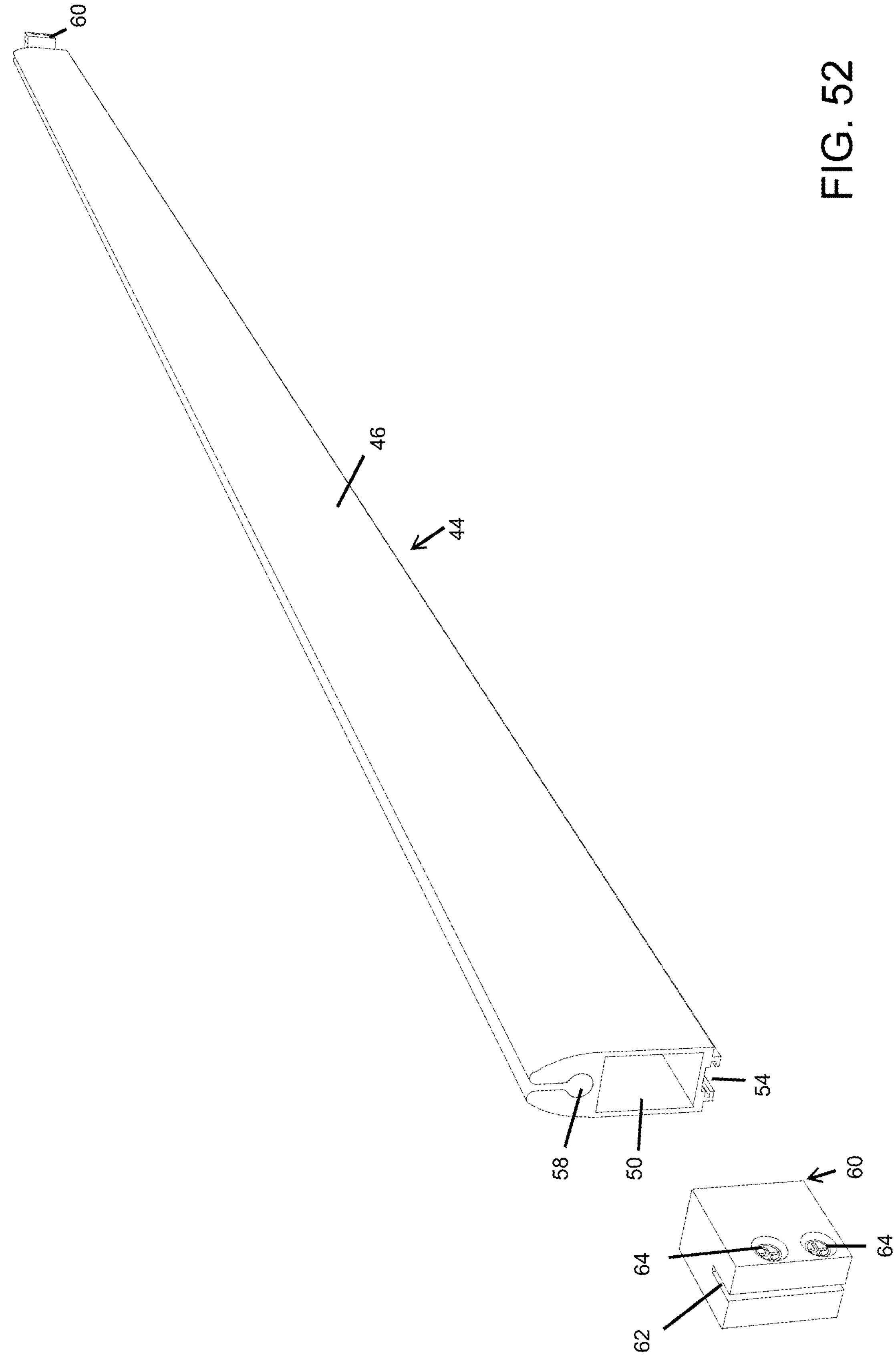
FIG. 52 is a perspective view of a bottom bar assembly shown in FIG. 51, in accordance with one or more embodiments; the view showing the weight bar probes as well as the bottom bar.
Figure 53:
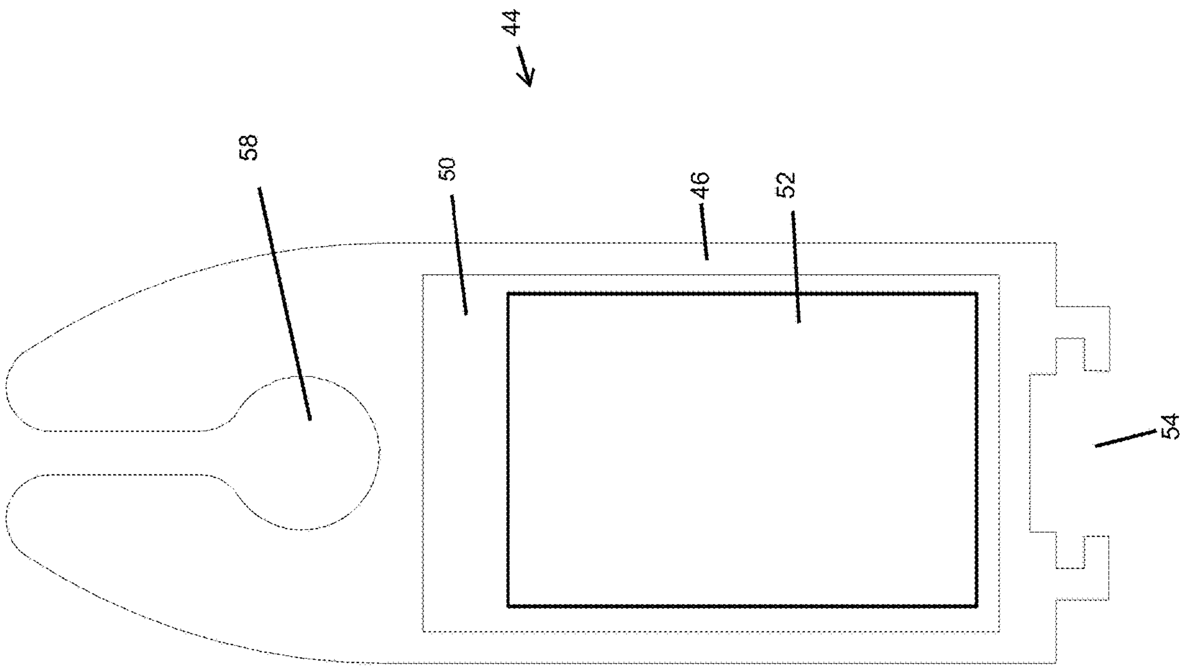
FIG. 53 is an elevation view of an end of the bottom bar shown in FIGS. 51-52, in accordance with one or more embodiments.

With reference to FIG. 50, in the arrangement shown, as one example, an assembled magnetic track assembly 100 is shown positioned within a groove in a frame member 208 so as to provide a low profile appearance, or hidden appearance of magnetic track assembly 100. In the arrangement shown, as one example, a fastener 204 is shown extending through the elongate channel 140 and into the frame member 208 thereby affixing the two components together. In the arrangement shown, as one example, screen receiver 110 is positioned within the hollow compartment 146 of elongate channel 140. The view showing the interlock 202 of the screen material 200 connected to the C-shaped channel 111 of the screen receiver 110. The view showing pads 66 removed.

In Operation:

As force is applied to screen 200 the force of the magnetic attraction is overcome and the screen receiver 110 moves inward pulled by the engagement of interlock 202 with c-shaped channel 111. As the screen receiver 110 moves inward, the inward facing surfaces of the outward ends 114, 115 engage the outward facing surfaces of inward most partitions, or front partitions 147, 148. When no pads 66 are present, a loud noise or louder than is desired, is generated. When one pad 66 is present between the engagement between screen receiver 110 and elongate channel 140 the noise generated is reduced by the elimination of metal-on-metal contact and/or by the reduced deceleration and compressible nature of pad 66. When two pads 66 are present between the engagement between screen receiver 110 and elongate channel 140 the noise generated is reduced even further by the elimination of metal-on-metal contact and/or by the reduced deceleration and compressible nature of two layers of pad 66.

Hurricane Bracket 220:

In one arrangement, system 10 is used in association with a hurricane bracket 220. Hurricane bracket 220 is formed of any suitable size, shape and design and is configured to strengthen system 10 so that it can withstand hurricane strength winds.

In many applications of system 10, hurricanes and other wind events are present. To combat damage from hurricanes, as well as to meet hurricane building codes, in one arrangement, a hurricane bracket 220 is used which strengthens magnetic track assembly 100, or more specifically elongate channel 140, so that it will not deform and allow screen receiver 110 to escape the hollow compartment 146 of elongate channel 140 even under the strongest of winds.

Figure 55:
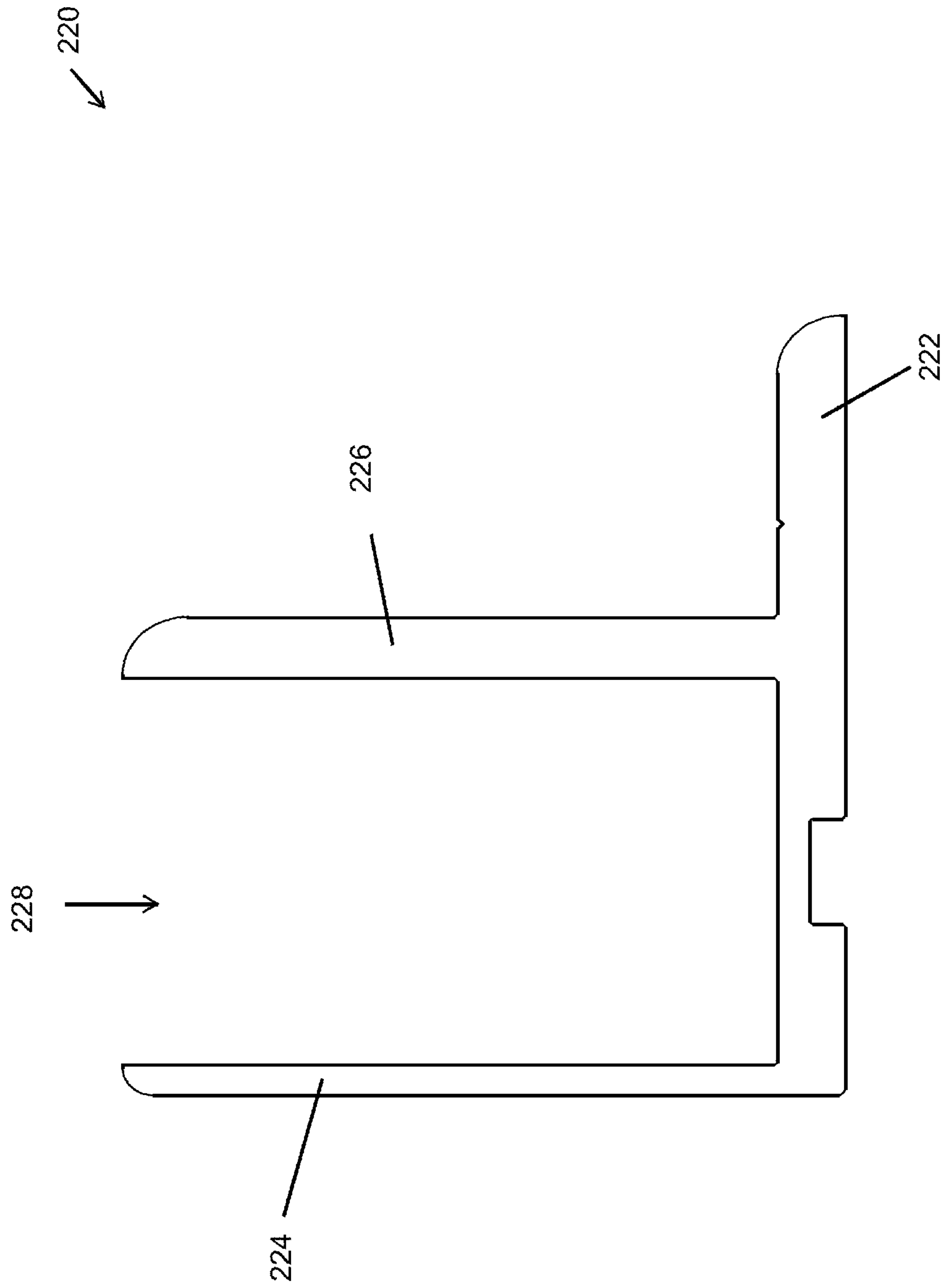
FIG. 55 is an end elevation view of a hurricane bracket for use with the motorized screen system shown in FIGS. 1-54, in accordance with one or more embodiments; the view showing the hurricane bracket having an end wall, a forward wall and a rearward wall that form a hollow interior that is sized and shaped to receive a magnetic track assembly therein and is configured to provide strength and rigidity to the magnetic track assembly so as to strengthen it to be hurricane proof.

With reference to FIG. 55, as one example, a hurricane bracket 220 is presented having an end wall 222, a forward wall 224 and a rearward wall 226 that form a hollow interior 228 that is sized and shaped to receive a magnetic track assembly 100 therein with close and tight, and in some cases frictional engagement and/or locking engagement, and is configured to provide strength and rigidity to the magnetic track assembly 100 so as to strengthen it to be hurricane proof. In the arrangement shown, as one example, forward wall 224 and rearward wall 226 are spaced apart just far enough to receive the width of magnetic track assembly 100 therein. In the arrangement shown, as one example, forward wall 224 and rearward wall 226 have a length that is just long enough to extend to and/or past the length of the forward and rearward sides of magnetic track assembly 100 therein. In this way, when hurricane bracket 220 is used, magnetic track assemblies 100 are wholly or fully received within the hollow interior 228 of hurricane bracket 220. In one arrangement, hurricane bracket 220 extends the entire length of elongate channel 140 from its upper end to its lower end.

In the arrangement shown, as one example, end wall 222 extends a length rearward of rearward wall 226 so as to provide additional surface area to engage frame member 208 upon installation as well as to provide increased resistance to rotation upon strong winds as well as to provide additional areas to pass fasteners 204 through hurricane bracket 220 and into frame member 208 for additional strength. In an alternative arrangement, end wall 222 may extend past the forward side of forward wall 224 (that is the parts can be reversed with the outward extension of end wall 222 extending into or outward from the building the hurricane bracket 220 is attached to). In yet another alternative arrangement, end wall 222 may extend past the forward side of forward wall 224 as well as the rearward side of rearward wall 226 to provide even greater surface area and strength. Any other size, shape and/or configuration is hereby contemplated for use with hurricane bracket 220.

Figure 56:
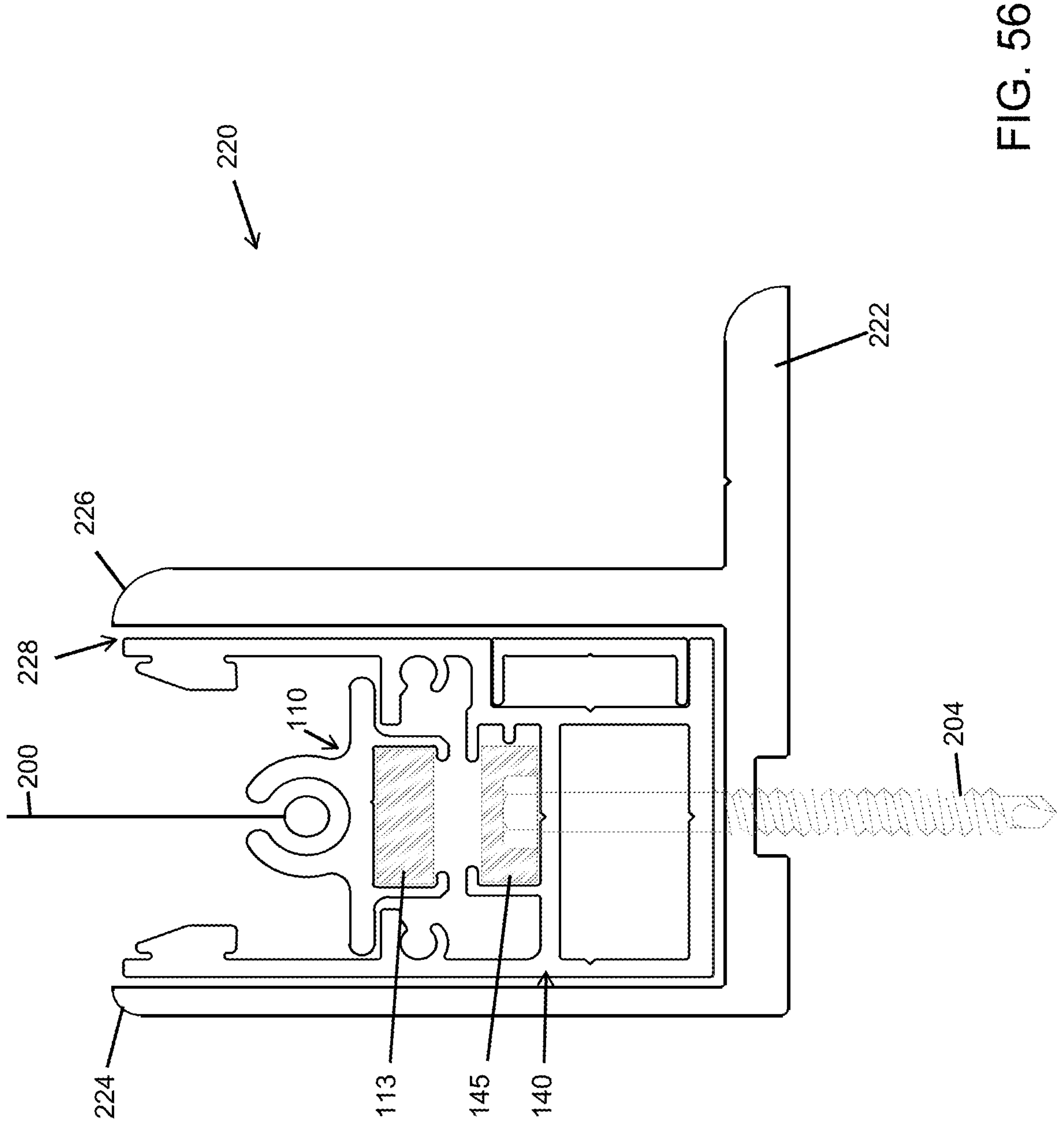
FIG. 56 is an end elevation view of the hurricane bracket shown in FIG. 55, in accordance with one or more embodiments; the view showing an assembled magnetic track assembly having an elongate channel and a screen receiver positioned within the hollow interior of the hurricane bracket; the view showing screen material connected to the screen receiver.
Figure 57:
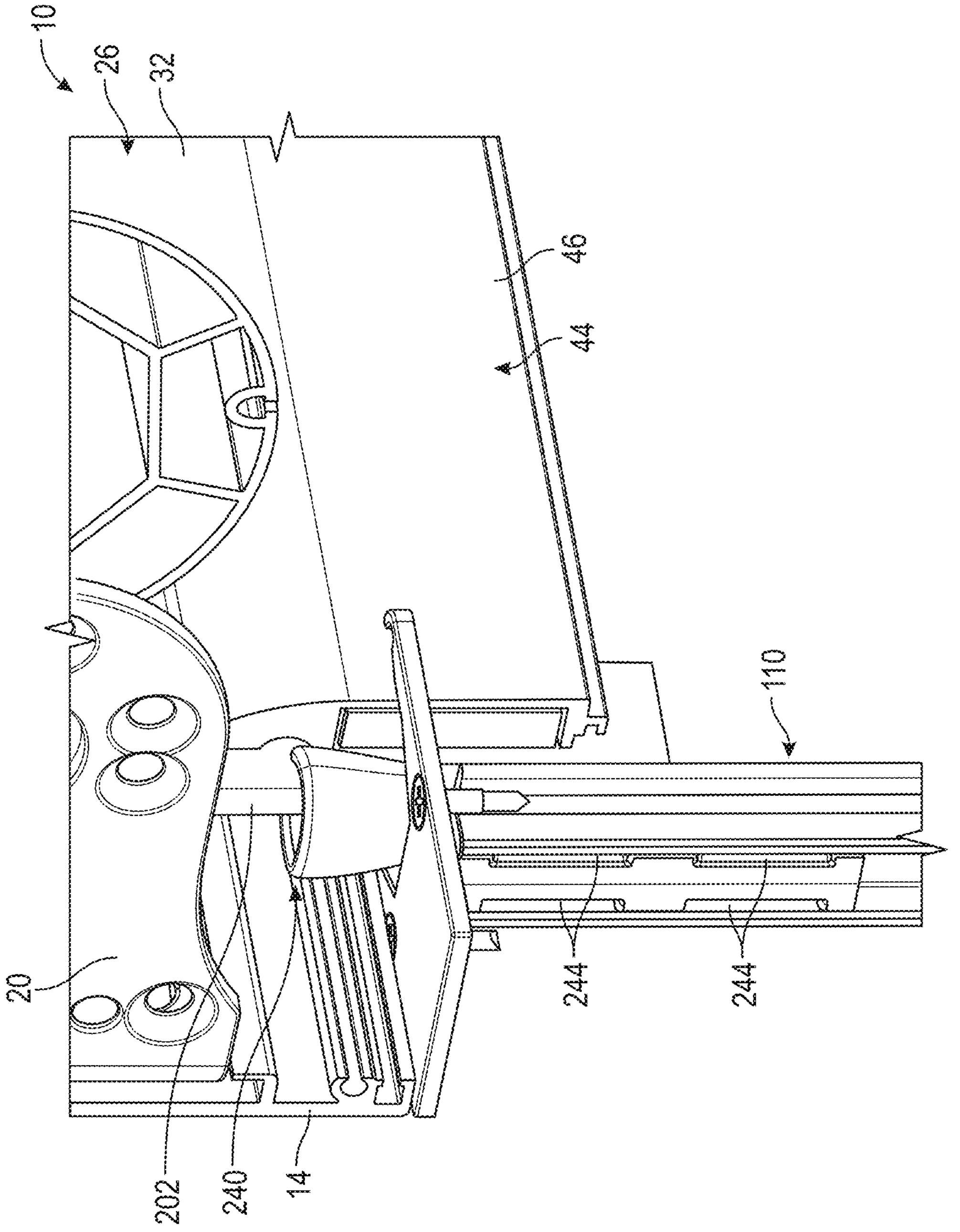
FIG. 57 is a perspective assembled view of the motorized screen system shown in FIGS. 1-56, in accordance with one or more embodiments; the view showing a funnel connected to the upper end of the screen receiver so as to facilitate the insertion of the interlock of screen material into the C-shaped channel of the screen receiver; the view showing the funnel having an arm that fits within the slot in the exterior-facing side of the screen receiver that receives the magnets of the screen receiver.
Figure 58:
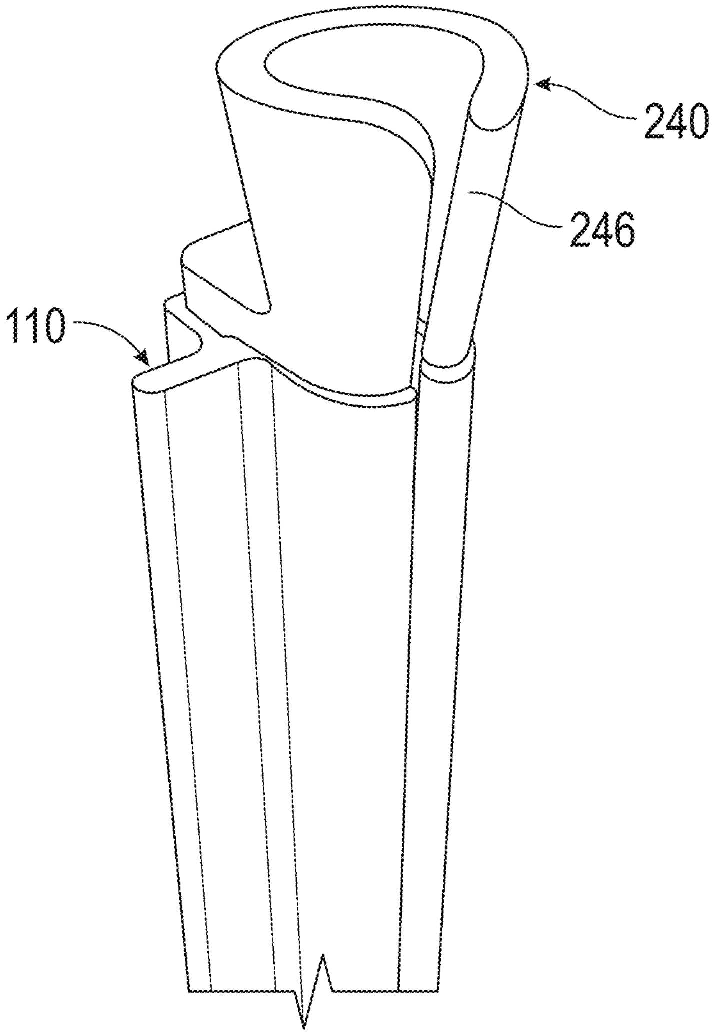
FIG. 58 is a perspective view of the funnel shown in FIG. 57, in accordance with one or more embodiments; the view showing the screen receiver removed from the elongate channel thereby showing the open upper end of the funnel with a slot therein that connects to the slot in the C-shaped channel of the screen receiver so as to facilitate the insertion of the interlock of screen material into the C-shaped channel of the screen receiver.
Figure 59:
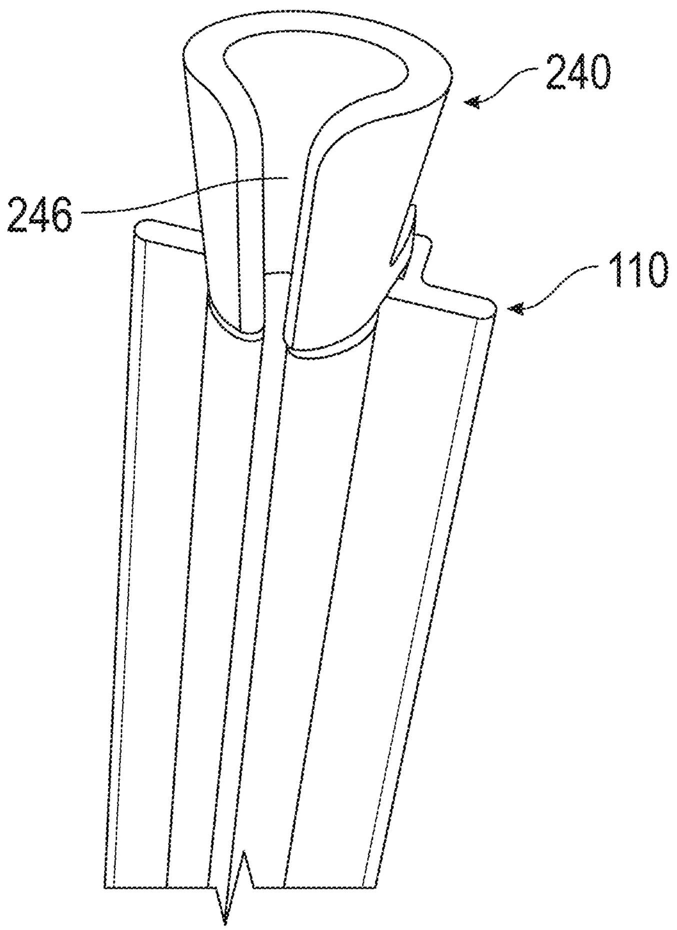
FIG. 59 is another perspective view of the funnel shown in FIG. 57-58, in accordance with one or more embodiments; the view showing the screen receiver removed from the elongate channel thereby showing the open upper end of the funnel with a slot therein that connects to the slot in the C-shaped channel of the screen receiver so as to facilitate the insertion of the interlock of screen material into the C-shaped channel of the screen receiver.
Figure 60:
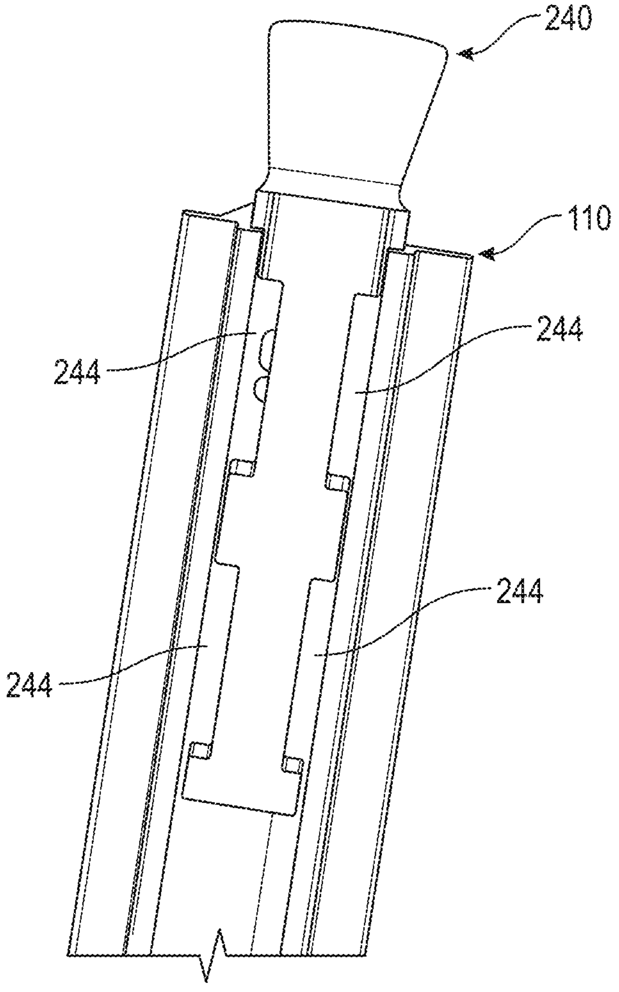
FIG. 60 is another perspective view of the funnel shown in FIG. 57-58, in accordance with one or more embodiments; the view showing the screen receiver removed from the elongate channel; the view showing the funnel having an arm that fits within the slot in the exterior-facing side of the screen receiver that receives the magnets of the screen receiver.

With reference to FIG. 56, as one example, hurricane bracket 220 is shown with a magnetic track assembly 100 having an elongate channel 140 and a screen receiver 110 positioned within the hollow interior 228 of the hurricane bracket 220. The view showing screen material 200 connected to the screen receiver 110. The view showing a fastener 204 extending through the end wall 142 of elongate channel 140 and through the end wall 222 of hurricane bracket 220 thereby affixing both the magnetic track assembly 100 and hurricane bracket 220 to frame member 208.

In one arrangement, when hurricane bracket 220 is used, an extra-strength screen material 200 is used that is strong enough to withstand hurricane force winds. In one arrangement, a ballistic material such as Kevlar, an aramid, an ultra-high-molecular-weight polyethylene, or a similarly strong material is used as screen material 200 such that the strength of the screen material 200 matches the strength of the combined magnetic track assembly 100 and hurricane bracket 220.

Alternative Hurricane Brackets 220:

With reference to FIGS. 100-107, alternative hurricane brackets 220 are presented. Components of hurricane brackets 220 shown in FIGS. 100-107 are similar to those discussed with reference to the hurricane bracket 220 shown in FIGS. 55-56 and therefore the teaching presented herein with respect to FIGS. 55-56 may be applied to the hurricane brackets 220 described with reference to FIGS. 100-107, unless specifically stated otherwise.

With reference to FIGS. 100-104, one alternative hurricane bracket 220 arrangement is presented. In this example arrangement, hurricane bracket 220 has an end wall 222, a forward wall 224 and a rearward wall 226 that form a generally U-shaped member having a hollow interior 228 that is sized and shaped to receive a magnetic track assembly 100 therein with close and tight, and in some cases frictional engagement and/or locking engagement, and is configured to provide strength and rigidity to the magnetic track assembly 100 so as to strengthen it to be hurricane proof. The hurricane bracket 220 shown in FIGS. 100-104 is similar to the hurricane bracket 220 shown in FIGS. 55 and 56. However, in the arrangement shown in FIGS. 100-104, end wall 222 does not extend outward beyond rearward wall 226. The shorter end wall 222 in this example arrangement may permit magnetic tracks assemblies 100 and hurricane bracket 220 to be mounted to a structure in a position where a feature of the structure is located in close proximity to the hurricane bracket 220 on the rearward side. That is, the removal of extension of end wall 222 without sacrificing strength expands the potential applications. By surrounding elongate channel 140 on three sides as this hurricane bracket does, this increases the strength, rigidity and durability of magnetic track assembly 100 such that is may withstand hurricanes. This configuration of hurricane bracket 220 is configured to be mounted in an end-mount arrangement where fasteners 204 extend through the hollow interior of elongate channel 140 and hurricane bracket 220 and into the structure thereby securing the hurricane bracket 220 and elongate channel 140 to the structure in an end mount arrangement. This may be performed within a slot of the structure.

With reference to FIGS. 105-107, another example hurricane bracket 220 is presented having an end wall 222 and a rearward wall 226 that form a generally L-shaped bracket that is sized and shaped to connect with and provide strength and rigidity to the magnetic track assembly 100 so as to strengthen it to be hurricane proof. In this example arrangement, hurricane bracket 220 is configured to facilitate connection of magnetic track assembly 100 to a structure with forward side or rearward side of magnetic track assembly 100 in contact with the structure. In this example arrangement, hurricane bracket 220, include a recessed channel 230 in rearward wall 226 (or forward wall depending upon interior exterior mounting) proximate to end wall 222. In this example arrangement, fasteners 204 may be driven through hurricane bracket 220 at any location in the channel, through magnetic track assembly 100, and into a structure to facilitate installation of magnetic track assembly 100 and hurricane bracket 220.

In the example arrangement shown in FIGS. 105-1407, hurricane bracket 220 includes a cover 232 configured to be inserted in the recessed channel 230. Cover 232 is formed of any suitable size, shape or design and is configured to conceal fasteners 204 and channel 230 and provide an aesthetically pleasing appearance. In the arrangement shown, as one example, cover 232 has a generally planar exterior surface configured to be flush with rearward wall 226 when fully inserted into channel 230. In this example arrangement, cover 232 has opposing sidewalls that extend in a perpendicular direction from the exterior surface into channel 230. In this example arrangement the sidewalls of the cover 232 engage sidewalls of the channel 230 to secure cover 232 in place within channel 230 by frictional engagement. However, in various arrangements, cover 232 may be secured within channel 230 using various means and/or methods including but not limited to, for example, frictional fittings, adhesive bonding, chemical bonding, welding, stitching, sewing, fasteners (e.g., staples, screws, nails, bolts, rivets, etc.), and/or any other connection means or method).

In this example arrangement, because forward wall 224 is omitted, hurricane bracket 220 may be used to reenforce an existing installed magnetic track assembly 100 without needing to first remove the magnetic track assembly 100. Rather, hurricane bracket 220 may be placed over an installed magnetic track assembly 100 and fasteners 204 driven through hurricane bracket 220 and magnetic track assembly 100, as previously described, to strengthen and reenforce magnetic track assembly 100.

Funnel:

In one arrangement, system 10 is used in association with funnel 240. Funnel 240 is formed of any suitable size, shape and design and is configured help facilitate the insertion of screen material 200 into the C-shaped channel 111 of screen receiver 110, or more specifically to help facilitate the insertion of the interlock 202 of screen material 200 into the C-shaped channel 111 of screen receiver 110.

In the arrangement shown, as one example, a funnel 240 is shown connected to the upper end of the screen receiver 110 so as to facilitate the insertion of the interlock 202 of screen material 200 into the C-shaped channel 111 of the screen receiver 110. In the arrangement shown, as one example, the upper end of funnel 240 is generally cone shaped and is angled such that it widens as it extends upward. In the arrangement shown, as one example, funnel 240 includes an arm 242 that extends downward from the lower end of the cone of funnel 240 that fits within the slot in the exterior-facing side of the screen receiver 110 that receives the magnets of the screen receiver 110. The engagement between the arm 242 within the slot of screen receiver 110 affixes funnel 240 to screen receiver 110.

In the arrangement shown, as one example, the sides of arm 242 of funnel 240 includes a plurality of recesses 244 that allow the edges of the slot that arm 242 is inserted into to be crimped inward thereby locking funnel 240 in place and preventing funnel 240 from coming off of screen receiver 110. However, any other manner, method or means of connecting funnel 240 to screen receiver 110 is hereby contemplated for use such as fastening, screwing, bolting, welding, crimping, pinning, adhering, friction fitting or the like.

In the arrangement shown, as one example the cone at the upper end of funnel 240 includes a slot 246. In the arrangement shown, as one example, when arm 242 of funnel 240 is inserted within the slot of screen receiver 110, the slot 246 of funnel 240 aligns with the slot in C-shaped channel 111 of screen receiver 110 thereby providing access for interlock 202 of screen material 200 into the slot of screen receiver 110.

The installation of funnel 240 eases the insertion of screen material 200 and interlock 202 into screen receiver 110. In addition, by adding funnel 240 as a second separate piece, which is preferably made out of a smooth yet durable plastic, this reduces the cost of the system 10 while improving performance and longevity.

Further Alternative Arrangements:

With reference to FIGS. 62-70 various alternative arrangements of retractable screen systems 10 having magnetic track assemblies 100 are presented. Some components of motorized screen system 10 having magnetic track assemblies 100 presented in FIGS. 62-70 are similar to those of retractable screen system 10 having magnetic track assemblies 100 presented in FIGS. 1-60 and therefore the teaching presented herein with respect to FIGS. 1-60 may be applied to and is incorporated into the teaching presented in FIGS. 62-70 unless specifically stated otherwise.

Figure 61:
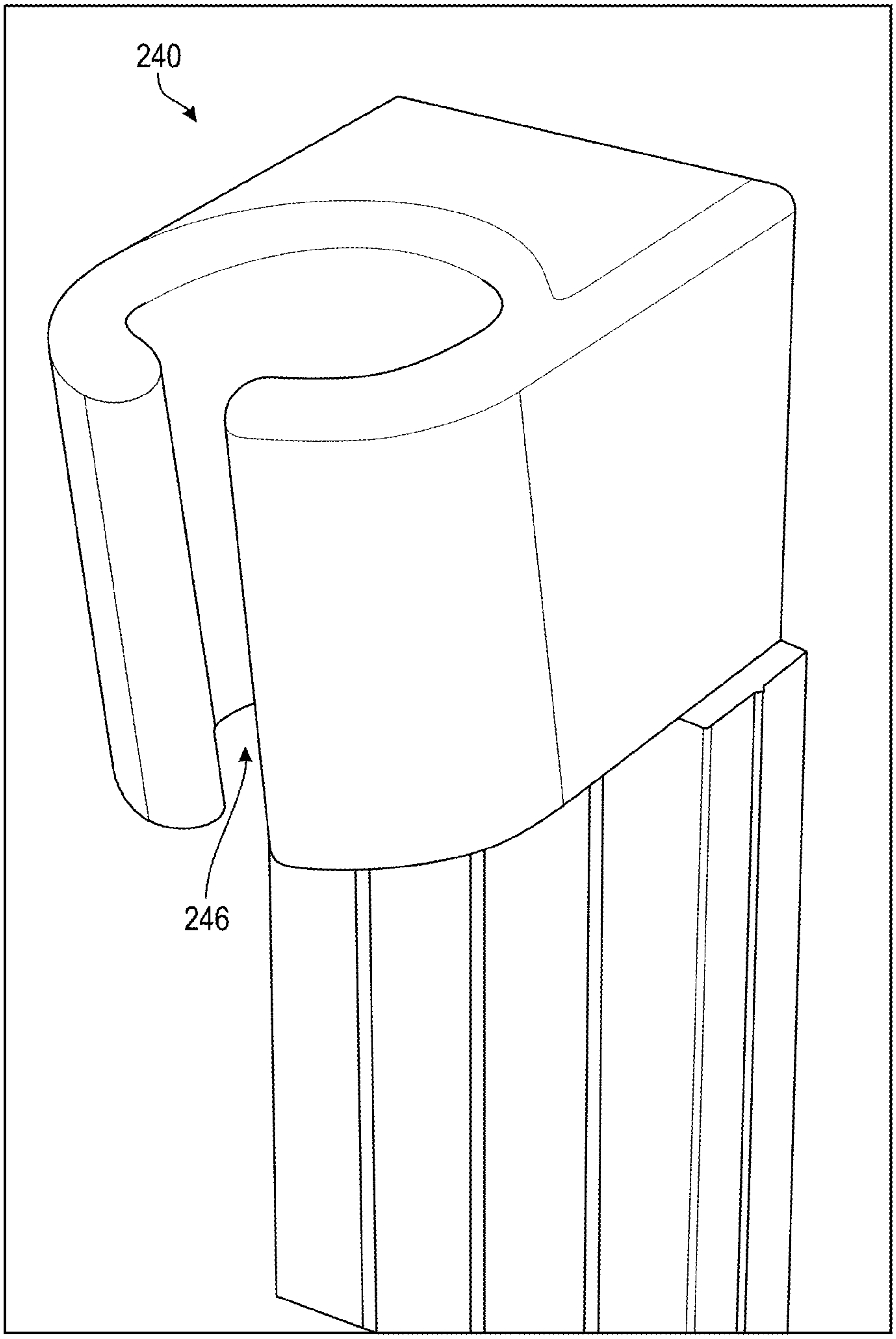
FIG. 61 shows a perspective view of a funnel for a magnetic track assembly, in accordance with one or more arrangements.
Figure 62:
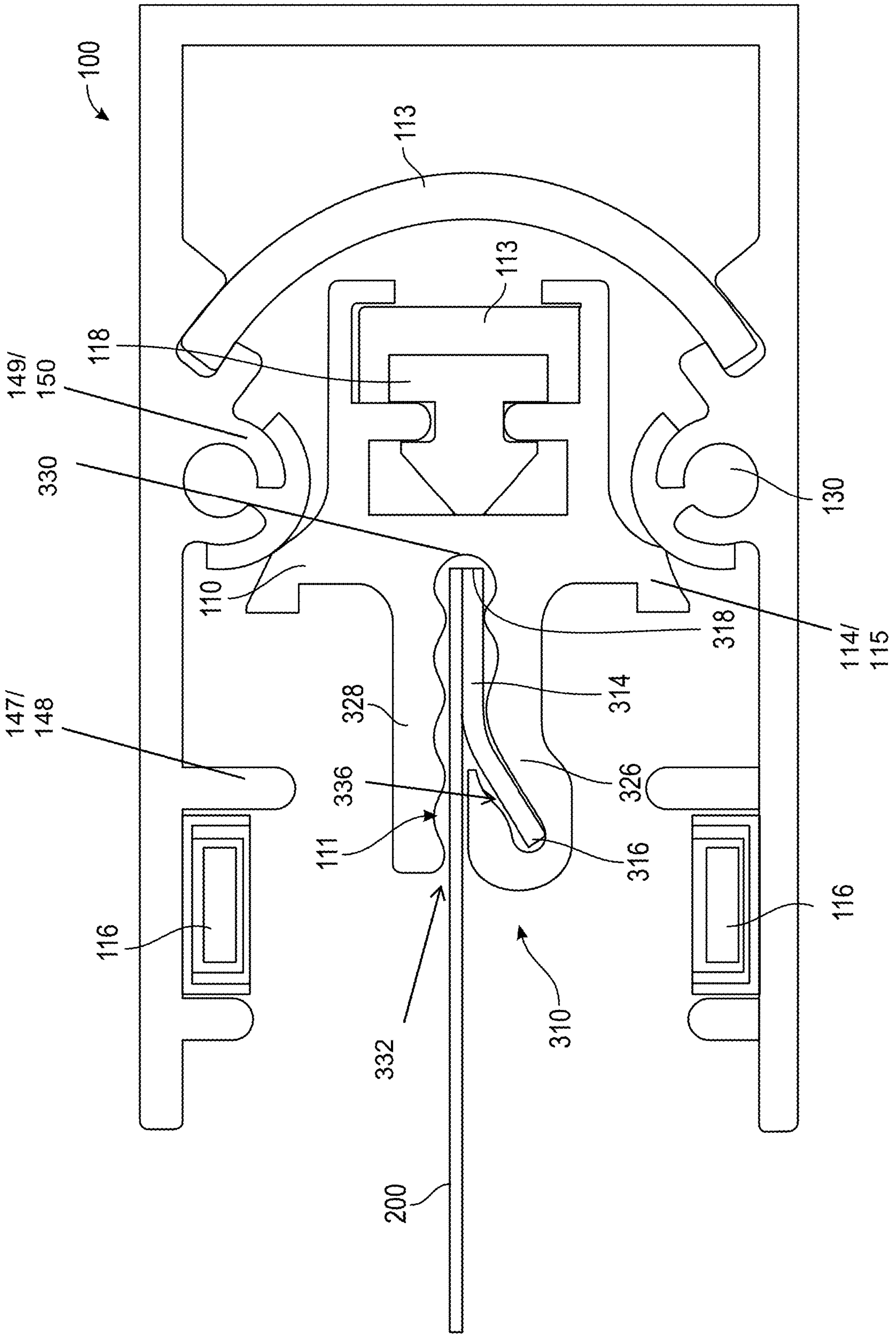
FIG. 62 shows a top view of a magnetic track assembly having a screen receiver configured to receive a screen having a low profile interlock, in accordance with one or more embodiments; the view also showing a curved magnet positioned within the elongate channel; the view showing lights extending along the interior surface of the elongate channel outward of the screen receiver on each side of the screen.
Figure 63:
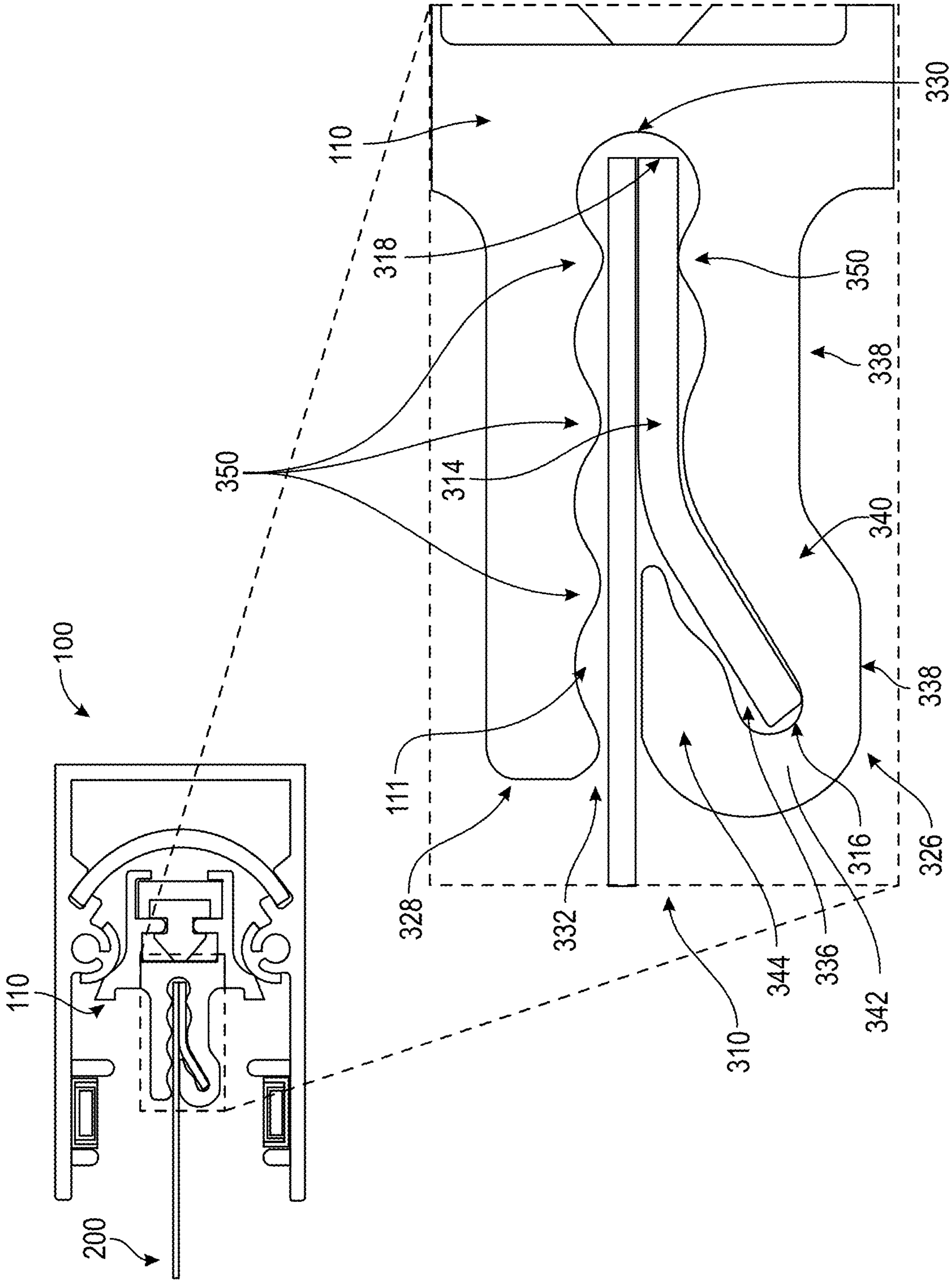
FIG. 63 shows a top view of a magnetic track assembly having a screen receiver configured to receive a screen having a low profile interlock arrangement, in accordance with one or more embodiments; the view showing a close-up of the channel of the screen receive and the low profile interlock; the view showing the low profile interlock arrangement extending from one side of the screen; the view showing the low profile interlock connected at its outer end to the screen and its inner end free and separated from the screen, this free inner end held within the secondary channel of the screen receiver.
Figure 64:
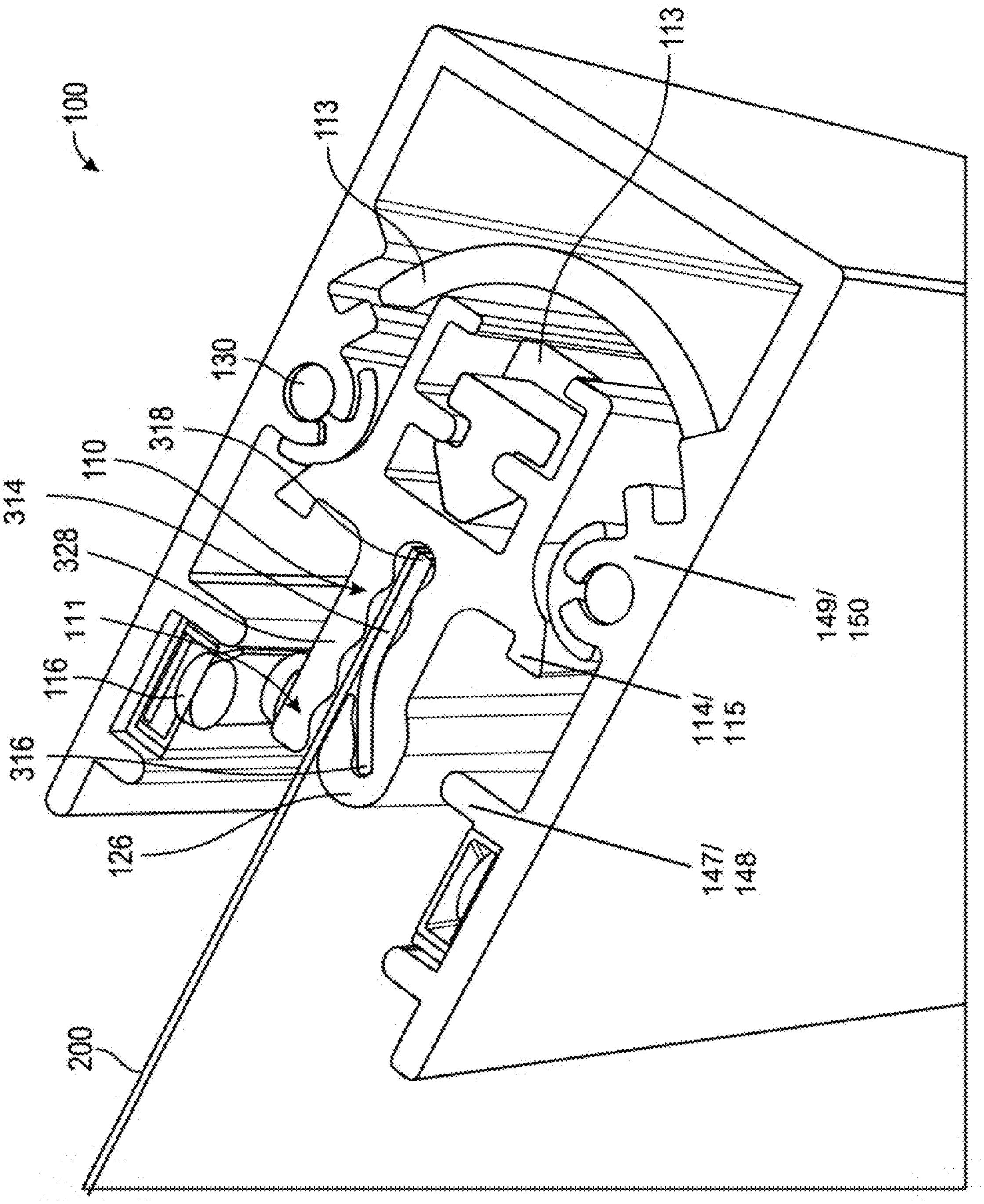
FIG. 64 shows a rearward right side perspective view of a magnetic track assembly having a screen receiver configured to receive a screen having a low profile interlock arrangement on one side of the screen, in accordance with one or more embodiments; the view showing the low profile interlock having one lock member held within a secondary channel of the screen receiver.

Improved Track System with Low Profile Interlock:

As described with reference to FIGS. 1-61, some example arrangements for a retractable screen system 10 include magnetic track assemblies 100 and a roller tube assembly 26. Roller tube assembly 26 is formed of any suitable size, shape and design and is configured to connect to housing 12 as well as facilitate the connection of screen 200 to housing 12 while facilitating the opening and closing of screen 200. Roller tube assembly 26 includes a roller tube 32 upon which screen 200 may wrap around to facilitate opening or closing of screen 200. For instance, when roller tube assembly 26 rotates in a first rotational direction, screen 200 wraps around the exterior surface of the roller tube assembly 26 thereby opening the screen 200, and when roller tube assembly 26 rotates in a second rotational direction, opposite the first rotational direction, screen 200 unwraps from around roller tube assembly 26 thereby closing screen 200. As described with reference to the arrangements shown in FIGS. 1-61, for example, roller tube 32 is a generally elongated cylindrical member that extends a length between opposing ends 34. Connection members 36 or an axle may extend outward from ends 34 and facilitate connection to collars 38 that fit over and connect to connection members 36. In the arrangement shown in FIGS. 1-61, for example, roller tube 32 and/or collars 38 have a generally cylindrical exterior surface 68 of approximate equal diameter and shape and configuration. In the arrangement shown, as one example roller tube 32 and collars 38 includes one or more receivers 40 on or in their exterior surface 68 to facilitate connection of the upper end of screen 200 to roller tube assembly 26.

As described with reference to FIGS. 1-61, for example, some arrangements of retractable screen system 10 may utilize an interlock 202 (e.g., a keder interlock, a zipper interlock, a rope, a beaded chain, or any similar interlock known in the art) to connect the upper end of screen 200 to receiver 40 of roller tube 32. Similarly, the arrangements of retractable screen system 10 may utilize an interlock 202 alongside edges of screen 200 to connect screen 200 to a magnetic track assembly 100. For example as shown in FIGS. 1 and 2, circular shaped interlocks 202 of screen 200 are inserted in c-shaped channel 111 of screen receivers 110 of magnetic track assemblies 100. Screen 200 may be retracted by rotating roller tube 32 and thereby rolling screen 200 up around an exterior surface 68 of roller tube 32. However, circular shaped interlock 202 is generally much thicker than screen 200, for example, in order to be held in place by c-shaped channel 111 of screen receivers 110. Due to the thickness of circular shaped interlocks 202, screen 200 may bunch up at the screen edge when rolled up. Such bunching may cause undesirable wrinkles, creases, and/or other visible artifact on screen 200.

Low Profile Interlock 310:

In one or more embodiments, a retractable screen system 10 is configured with a low profile interlock 310, in lieu of tube-shaped or c-shaped interlock 202, for connecting screen 200 to a screen receiver 110 of a magnetic track assembly 100. Teachings related to c-shaped interlock 202 as described with reference to the arrangements shown in FIGS. 1-61 apply equally to low profile interlock 310 except as expressly described herein. Low profile interlock 310 is formed of any suitable size, shape, or design and is configured to maintain connection with screen receiver 110 of magnetic track assembly 100, permit low profile interlock 310 to slide within screen receiver 110, and provide a low profile when rolled around roller tube 32. In the arrangement shown, as one example, low profile interlock 310 includes one or more lock members 314 connected to an end of screen 200.

Lock Member 314:

Lock member 314 is formed of any suitable size, shape, or design, and is configured to engage a portion of screen receiver 110 and thereby hold low profile interlock 310 within screen receiver 110. In the arrangement shown, as one example, lock member 314 has a generally planar shape extending along the side edge of screen 200 from an inner side 316 to an outer side 318. In this example arrangement, inner side 316 is oriented away from the side edge of screen 200 and outer side 318, oriented toward the side edge of screen 200. A portion of lock member 314 proximate to outer side 318 is connected to the side edge of screen 200. In this example arrangement, inner side 316 of lock member 314 is not attached to screen 200 and may be moved against or away from screen 200.

In one or more embodiments, a top edge of screen 200 may be connected to a roller tube 32. When rotated in one direction, screen 200 is wrapped around roller tube 32 to retract screen 200. When rotated in the other direction, screen 200 is unwrapped from roller tube 32 to deploy screen 200. When screen 200 is in a fully retracted position, inner side 316 of lock member 314 lays flat against screen 200 as the screen 200 wraps around itself, providing a lower profile in comparison to circular shaped interlock 202. When screen 200 is deployed, screen 200 and lock member 314 are inserted in channel 111 of screen receiver 110 so inner side 316 of lock member 314 extends away from screen 200 and is mechanically engaged with a portion of screen receiver 110 that prevents screen 200 from being laterally pulled out of the screen receiver 110. When significant lateral forces are not placed on screen 200, screen 200 and lock member 314 of low profile interlock 310 may move in a direction parallel to the length of magnetic track assembly 100, thereby permitting screen 200 to be deployed or retracted.

In different embodiments, various materials known in the art may be used to implement lock member 314. In some various implementations, materials may include but are not limited to, for example, natural fibers (e.g., cotton), carbon fiber, Kevlar, nylon, modacrylic olefin, acrylic, polyester, or other synthetic fiber, and/or plastic sheeting. In some embodiments, lock member 314 may be implemented using several materials blended and/or layered together to form a composite. A successful material is flexible in that it may wrap around itself when screen 200 wraps around the roller tube 32 yet rigid when forces are applied along the inner side 316 to outer side 318 width of lock member 314. Successful materials my include plastics, nylons, vinyl, composites or any combination thereof. Lock member 314 may be attached to screen 200 using various techniques known in the art, and/or various combinations thereof such as adhesive bonding, chemical bonding, welding, stitching, sewing, staples, rivets, and/or any other connection means or any combination thereof.

Screen Receiver 110:

In one or more arrangements of system 10 having low profile interlock 310, screen receiver 110 is configured and arranged to facilitate operation with low profile interlock 310. In various arrangements, screen receiver 110 of magnetic track assembly 100 is formed of any suitable size, shape, or design, and is configured to receive and hold screen 200 and lock member 314 of low profile interlock 310, or any other shaped interlock implemented in system 10. In the arrangement shown in connection with low profile interlock 310, as one example, screen receiver 110 has a channel 111 that extends from a closed back end 330 to an open front end 332 and defined by a first sidewall 326 and a second sidewall 328.

In this example arrangement, first sidewall 326 and second sidewall 328 of channel 111 are formed of any suitable size, shape, or design, and is configured to engage lock member 314 when inserted into channel 111 to keep screen 200 and lock member 314 secure within channel 111 of screen receiver 110. In one or more arrangements, the first sidewall 326 extends around the inner side 316 of the lock member 314 and back toward the outer side 318 with a portion positioned between lock member 314 and screen 200.

In the arrangement shown, the first sidewall 326 includes a straight portion 338, an angled portion 340, a curved portion 342, and a wedge shaped portion 344. In this example arrangement, straight portion 338 extends inward from the back end 330 of channel 111 toward the open front end 332 of channel 111 to angled portion 340. In this example arrangement, angled portion 340 extends further inward from straight portion 338 toward front end 332 at angled away relative to second sidewall 328. In this example arrangement, curved portion 342 extends from angled portion 340, around inner side 316 of lock member 314, to wedge portion 344. In this example arrangement, wedge shaped portion 344 extends outward from curved portion 342, in between lock member 314 and screen 200, back toward the outer side 318 of lock member 314. In this example arrangement, second sidewall 328 defining channel 111 has a generally planar shape extending inward from the back end 330 of channel 111 toward the open front end 332 of channel 111.

In this example arrangement, channel 111 is formed by the space between first sidewall 326 and second sidewall 328. The first sidewall 326 also forms a secondary channel 336 angling outward from channel 111 and is configured to receive and hold the free inner side 316 of lock member 314 therein. If forces pull screen 200 laterally away from channel 111, the inner side 316 of lock member 314 engages with the first sidewall 326 of screen receiver 110 to provide an opposing force sufficient to keep screen 200 and lock member 314 secure within channel 111 of screen receiver 110. That is, when the screen 200 is pulled, the inner side 316 of lock member 314 is forced into the dead end of the secondary channel 336 of first sidewall 326. The strength and rigidity of lock member 314 prevents further movement as the free inner side 316 of lock member 314 is rigid enough to prevent collapse, and outer side 318 of lock member 314 which is attached to the outer edge of screen 200 is held within the back end 330 of channel 111.

In different arrangements, various portions of sidewall 326 may engage with various portions of lock member 314 and/or screen 200 to provide an opposing force(s). For example, in some implementations, forces pulling screen 200 laterally away from channel 111 may cause the inner side 316 of lock member 314 to engage with the curved portion 342 of sidewall 326 to provide an opposing force sufficient to keep screen 200 and lock member 314 secure within channel 111. Additionally or alternatively, in some embodiments, the wedge portion 344 of sidewall 326 that extends back towards outer side 318 of lock member 314 may engage with a portion of lock member 314, where lock member 314 connects with screen 200. In some implementations, leverage of the opposing force may cause lock member 314 to push screen 200 against second sidewall 328. Compressive forces between lock member 314 and sidewall 328 thereby assist to hold screen 200 in place within channel 111 of screen receiver 110. This action may be similar to that employed by Chinese finger cuffs. In some arrangements, one or more sidewalls 326/128 may include features 350 (e.g., ribbing, teeth, spikes) configured to help grip screen 200 and/or lock member 314 when it is pressed against the features 350.

Figure 65:
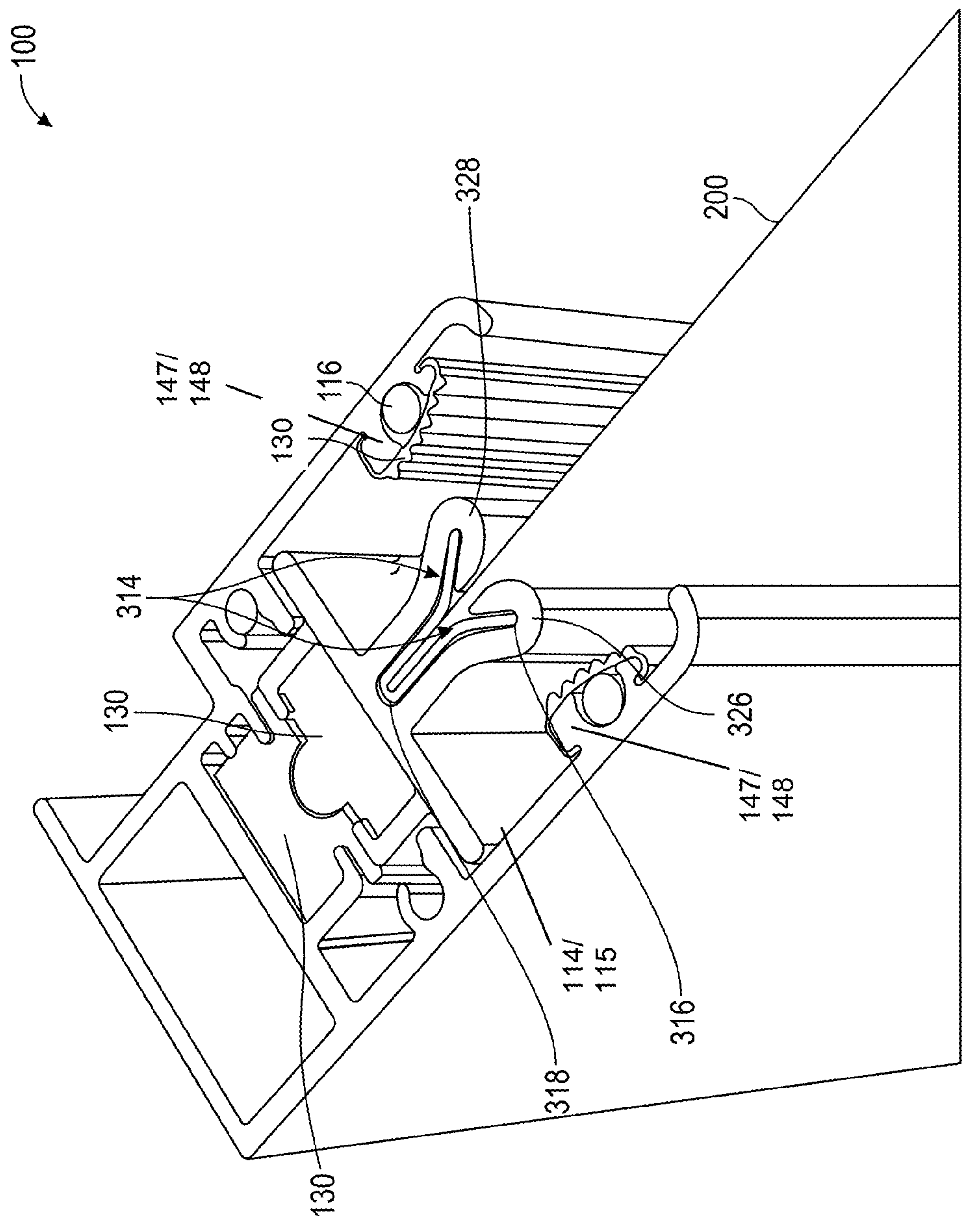
FIG. 65 shows a forward left side perspective view of another magnetic track assembly having a screen receiver configured to receive a screen having a low profile interlock arrangement, in accordance with one or more embodiments; the view showing the low profile interlock having two lock members, one on each side of the screen; the view showing the outer end of the lock members connected to the outer side of the screen and its inner end free and separated from the screen, this free inner end held within the secondary channel of the screen receiver; the view also showing a nesting sound dampening mechanism or pad arrangement positioned within the elongate channel and the screen receiver, the pad connected to the elongate channel having a semicircular recess that receives a semicircular protrusion of the pad connected to the screen receiver, the nesting features of these pads reduce noise, provide alignment and increase surface area of contact thereby increasing friction which reduces the potential for the screen receiver to slide relative to the elongate channel; the view also showing lights extending along the interior surface of the elongate channel outward of the screen receiver on each side of the screen, these lights positioned behind a translucent or clear pad that reduces noise when the screen receiver moves to a fully extended position away from the end wall of the elongate channel.
Figure 66:
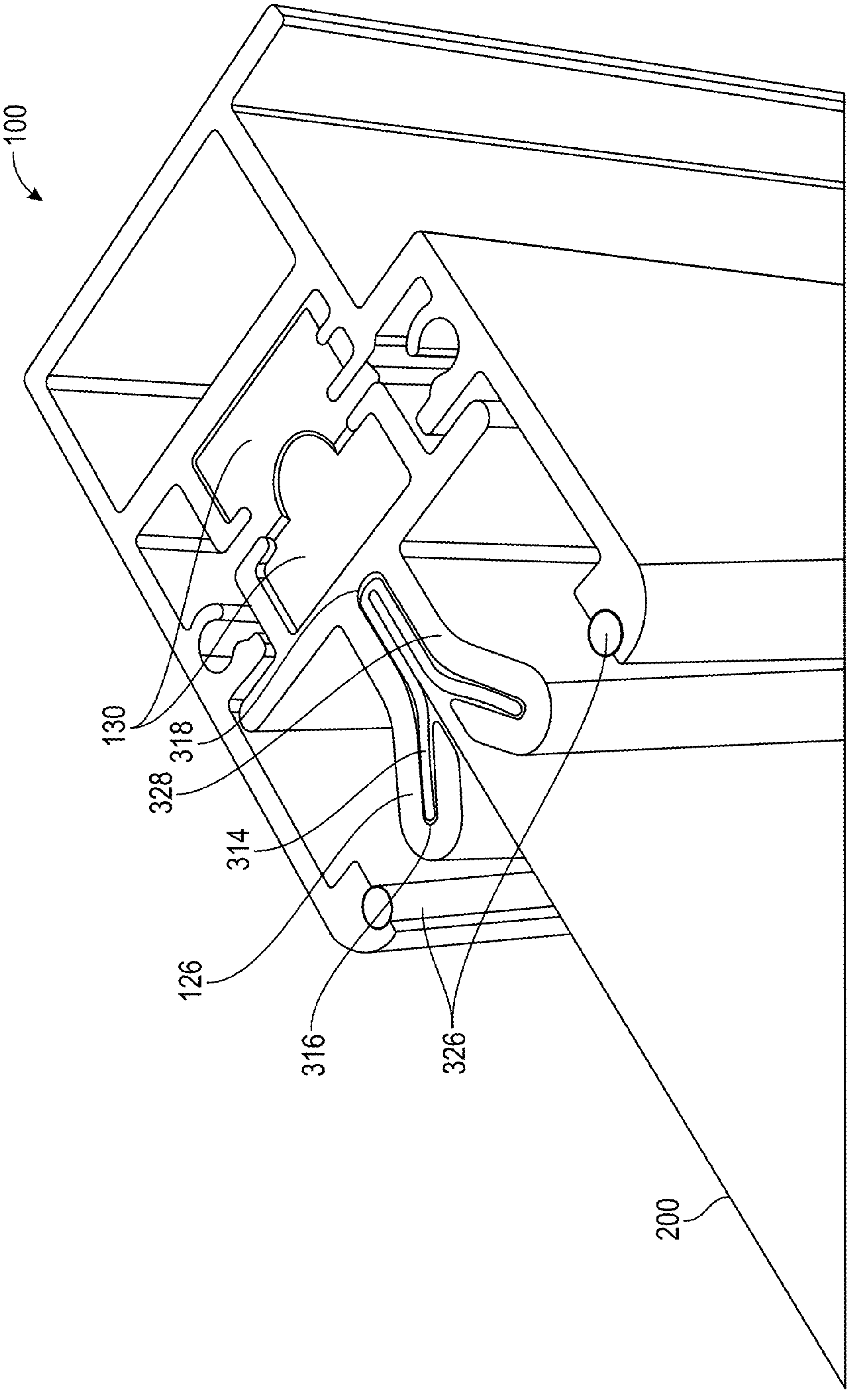
FIG. 66 shows a rearward left side perspective view of another magnetic track assembly, similar to that shown in FIG. 65, having a screen receiver configured to receive a screen having a low profile interlock arrangement, in accordance with one or more embodiments the view showing the low profile interlock having two lock members.

In one or more embodiments, low profile interlock 310 may include a first lock member 314 attached on one side of screen 200 (e.g., a front side) and a second lock member 314 attached to the opposite side of screen 200 (e.g., a back side). As shown in FIGS. 65 and 66, for example, in one or more embodiments, two lock members 314 are respectfully attached on the front and back of screen 200. Each of lock members 314 has an outer side 318 attached to screen 200 and an inner side 316 that is detached from screen 200. In this arrangement, the first sidewall 326 of screen receiver 110 extends over and around the inner side 316 of one of the lock members 314, as previously described. In this example arrangement, second sidewall 328 is shaped similar to first sidewall 326, where second sidewall 328 extends over and around the inner side 316 of the other lock member 314. When screen 200 is pulled laterally away from magnetic track assembly 100 the oppositely positioned lock members 314 will engage one or both sidewalls 326 and 328 of screen receiver 110 and keep screen 200 secure within channel 111 of screen receiver 110, as previously described. This arrangement of having two lock members 314 may be stronger and more rigid as compared to having only one lock member 314 however it comes at the cost of doubling the number of parts (two lock members 314 instead of one) and doubling the thickness at the edge of the screen 200.

In the arrangement shown, as on example, the interior surface of channel 111 has an undulating surface. This undulating surface causes less surface area of contact to occur between channel 111 and low profile interlock 310 thereby reducing friction and wear making it easier to open and close the screen 200.

Exemplary Embodiments

In one or more embodiments, a track system is provided that comprises: a screen; a lock member; the lock member connected to a first side of the screen; the lock member having an inner side and an outer side; wherein the outer side of the lock member is connected to the screen; wherein the inner side of the lock member is free; wherein when in a retracted position, the inner side of the lock member lays flat with the screen; and wherein when in a deployed position, the inner side of the lock member extends away from the screen.

In one or more implementations, the outer side of the lock member is sewn to the screen.

In one or more implementations, the outer side of the lock member is welded to the screen.

In one or more implementations, the outer side of the lock member is adhered to the screen.

In one or more implementations, the system further comprises: a screen receiver having a channel; wherein the channel is configured to receive the lock member; and wherein the inner side of the lock member restricts movement of the lock member in a channel to a path substantially parallel to a length of the channel.

In one or more implementations, the system further comprises: a second lock member having an inner side and an outer side; wherein the outer side of the second lock member is connected to the screen; wherein the inner side of the second lock member is free; wherein when in a retracted position, the inner side of the second lock member lays flat with the screen; and wherein when in a deployed position, the inner side of the second lock member extends away from the screen.

In one or more implementations, the system further comprises: a second lock member having an inner side and an outer side; wherein the outer side of the second lock member is connected to the screen; wherein the inner side of the second lock member is free; wherein when in a retracted position, the inner side of the second lock member lays flat with the screen; wherein when in a deployed position, the inner side of the second lock member extends away from the screen; and wherein the inner side of the second lock member restricts movement of the lock member in a channel to a path substantially parallel to a length of the channel.

In one or more embodiments, a retractable screen system is provided that comprises: a roller tube; the roller tube extending a length between opposing ends; a screen; the screen extending a length between a first side and a second side; the screen extending a height between an upper side and a lower side; a lock member; the lock member connected to the first side of the screen; the lock member having an inner side and an outer side; wherein the outer side of the lock member is connected to the screen; wherein the inner side of the lock member is free; wherein the upper end of the screen is connected to the roller tube; wherein the screen is configured to move between a retracted position and a deployed position wherein when in the retracted position the screen is wrapped around the roller tube, and wherein when in the deployed position the screen is held within a channel of a screen receiver; wherein when in a retracted position, the inner side of the lock member lays flat with the screen; and wherein when in a deployed position, the inner side of the lock member extends away from the screen.

In one or more implementations, wherein the inner side of the lock member restricts movement of the lock member in the channel to a path substantially parallel to a length of the channel.

In one or more implementations, wherein when in a deployed position, the inner side of the lock member extends away from the screen and is received in a secondary channel of a screen receiver thereby preventing inward movement of the screen.

In one or more implementations, wherein the outer side of the lock member is sewn to the screen.

In one or more implementations, wherein the outer side of the lock member is welded to the screen.

In one or more implementations, wherein the outer side of the lock member is adhered to the screen.

In one or more embodiments, a low profile track system is provided that comprises: a screen; the screen extending a length between a first side and a second side; the screen extending a height between an upper side and a lower side; a lock member attached along one side of a plurality of sides including the first side, the second side, the upper side, and the lower side of the screen; wherein the lock member includes a strip of material extending a length along the one side of the screen between a first end and a second end; the strip of material extending a width from an outer side to an inner side; wherein a portion the strip of material adjacent to the outer side is operatively connected to a portion of the screen adjacent to the one side; wherein a portion the strip of material adjacent to the inner side is detached from the screen; a first track assembly; the first track assembly positioned adjacent the one side of the screen; the first track assembly having an elongate channel and a screen receiver; the screen receiver having a channel defined between by first sidewall and a second sidewall; the first and second sidewalls each extending a length between a first end of the first track assembly and a second end of the first track assembly and extending from an open front end of the channel to a closed back end of the channel; and wherein the first sidewall of the channel is configured and arranged to, when the lock member is inserted in the channel, extend over the strip of material of the lock member, further extend around the inner side of the strip of the material, and further extend back toward the outer side between the strip of material and the screen.

In one or more implementations, wherein: the lock member includes a second strip of material extending the length along the one side of the screen between the first end and the second end; and the second strip of material extending a width from an outer side to an inner side; the second sidewall of the channel is configured and arranged to, when the lock member is inserted in the channel, extend over the second strip of material of the lock member, further extend around the inner side of the second strip of the material, and further extend back toward the outer side of the second strip of material between the strip of material and the screen.

In one or more implementations, wherein the outer side of the strip of material is sewn to the screen.

In one or more implementations, wherein the outer side of the strip of material is welded to the screen.

In one or more implementations, wherein the outer side of the strip of material is adhered to the screen.

Magnetic Coupling and Noise Dampening:

As described with reference to FIGS. 1-61, the arrangements shown in FIGS. 62-70 include an arrangement of magnetic components 113 in magnetic track assemblies 100 that allow screen 200 attached thereto to expand while under high wind pressure/conditions. In some embodiments, magnetic track assembly 100 and screen receiver 110 include a pair of magnetic components 113 (e.g., a pair of magnets having opposite polarity or a magnet paired with a ferrous material or magnetic member). The pair of magnetic components 113 are respectfully coupled to magnetic track assembly 100 and screen receiver 110. The pair of magnetic components 113 may be separated from one another allowing for expansion of screen 200 while subjected to high wind pressure. As described with reference to FIGS. 1-61, magnetic track assembly 100 includes partition member 147 and 148 configured and arranged to prevent screen receiver 110 from being pulled directly out of magnetic track assembly 100 when magnetic components 113 separate. After the high wind pressure subsides, the magnetic attraction pulls the separated pair of magnetic components 113 into close proximity relative to one another while concurrently tensioning screen 200 to provide for an aesthetically pleasing, tight screen 200. However, when magnetic components 113 separate and/or come back together, screen receiver 110 may come into forceful contact with a portion of magnetic track assembly 100. Such contact may create undesirable noise.

Pas 130:

In one of more embodiments, screen receiver 110 and/or magnetic track assembly 100 include one or more pads 130. In one of more embodiments, pads 130 are formed of any suitable size, shape, or design and are configured to prevent screen receiver 110 and magnetic track assembly 100 from coming into direct forceful contact with each other when magnetic components 113 separate or come back into close proximity. In one of more embodiments, pads 130 are configured to prevent direct metal-on-metal contact and instead are configured to put a compressible non-metallic component between the metallic elongate channel 140 and screen receiver 110 thereby reducing noise when contact does occur between elongate channel 140 and screen receiver 110. In some arrangements, pads 130 may be implemented similar to pads 66 described with reference to FIGS. 1-61 and operate in a similar manner to reduce noise during operation. In some various arrangements, system 10 may include pads 130 in addition to or in lieu of pads 66.

Different embodiments may utilize various materials known in the art to implement pads 130. Materials for pads 130 may include, but are not limited to various rubbers, plastics, foams, synthetic or organic textiles (e.g., wool pads), felt, composite materials, nylons, vinyl, ultra-high molecular weight composites or any other suitable material for reducing sound cause by impacts.

In some various arrangements, pads 130 may be attached to screen receiver 110 and/or magnetic track assembly 100 at various positions to prevent screen receiver 110 and magnetic track assembly 100 from coming into direct forceful contact with each other during use. For example, in some arrangements, one or more pads 130 may be positioned between an outward facing surface of screen receiver 110 (e.g., outward facing surface of outward ends 114, 115) and an inward facing surface of elongate channel 140 (e.g., inward facing surfaces of front partitions 147, 148) to reduce sound when screen receiver 110 is pulled outward during operation, for example, by a strong wind.

Additionally or alternatively, in one or more arrangements, one or more pads 130 may be positioned between an inward facing surface of screen receiver 110 and an outward facing surface of elongate channel 140 to reduce sound when screen receiver 110 is pulled back inward by magnetic components 113 during operation.

Additionally or alternatively, in one or more arrangements, one or more pads 130 may be positioned on forward or rearward facing surfaces of screen receiver 110 or elongate channel 140 to reduce noise when screen receiver is move forward or backward, for example, by exceptionally strong or blustery winds.

The pads 130 may be attached to screen receiver 110 and magnetic track assembly 100 using various techniques known in the art, and/or various combinations thereof such as by adhesive bonding, chemical bonding, or mechanical attachments means such as screws, bolts, threading, interlocks, clips, pins, crimping, friction fit, interlocking features, locking features or other coupling devices or any combination thereof. In some embodiments, pads 130 may include one or more connection members 136 having a shape configured to operably connect pad 130 to magnetic track assembly 100.

In some embodiments, pads 130 may be implemented to serve multiple purposes. For instance, in some embodiments, pads 130 may include one or more features configured to operably connect with and hold one or more components in place in magnetic track assembly 100. For example, in some implementations, pads 130 may be configured with features to attach and hold one or more magnetic components 113 in place within screen receiver 110 and/or magnetic track assembly 100. For instance, in one or more arrangements, pads 130 are placed adjacent to magnetic components 113 in magnetic track assembly 100, which may aid in preventing migration of magnetic components 113 during operation. While screen receiver 110 and elongate channel 140 are in contact, pads 130 may provide frictional engagement to prevent screen receiver 110 from migrating (e.g., upward or downward) within elongate channel 140.

Figure 68:
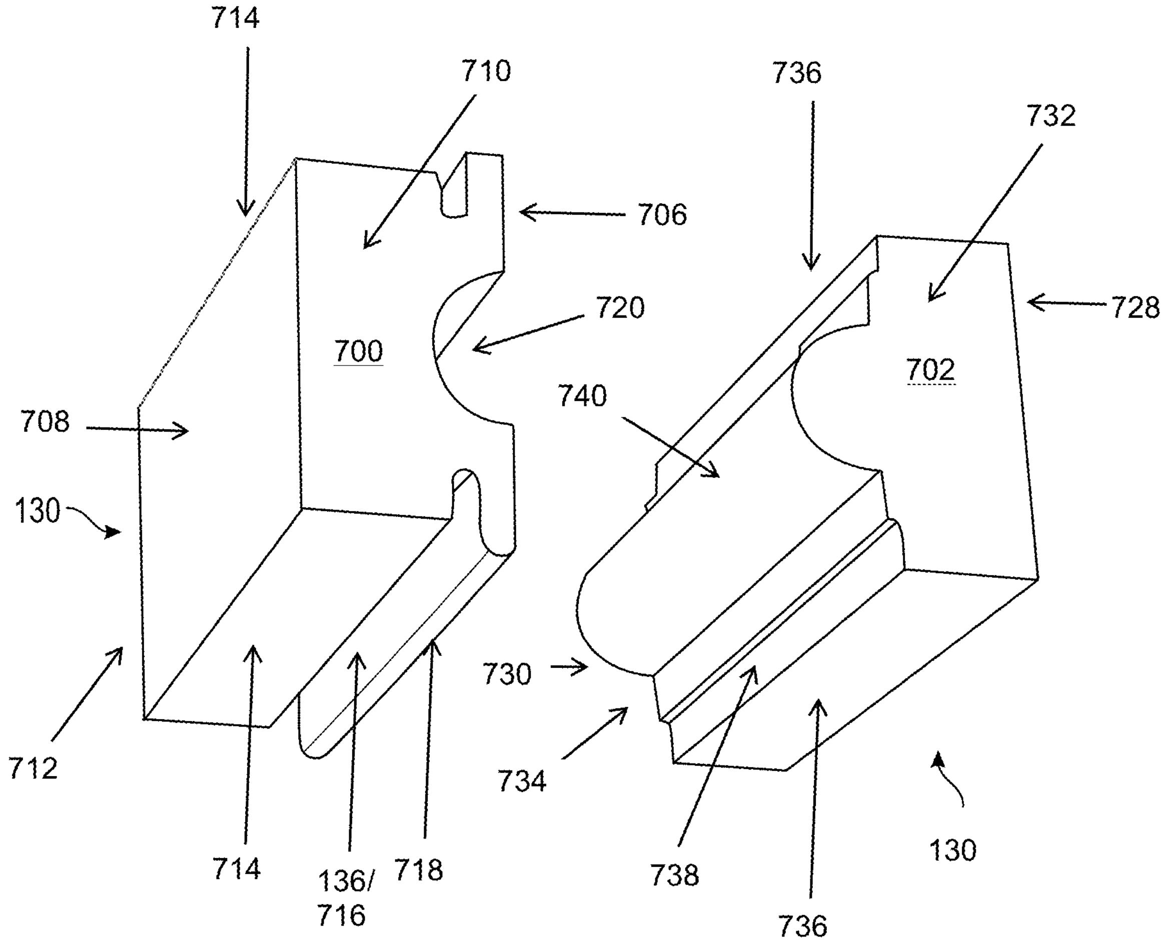
FIG. 68 shows a perspective view of a sound dampening pad arrangement for a magnetic track assembly, in accordance with one or more embodiments, as is shown in use in FIGS. 65 and 66; the view also showing a nesting sound dampening mechanism or pad arrangement that is configured to be positioned within the elongate channel and the screen receiver, one pad having a semicircular recess that receives a semicircular protrusion of the other pad, the nesting features of these pads reduce noise, provide alignment and increase surface area of contact thereby increasing friction which reduces the potential for the screen receiver to slide relative to the elongate channel
Figure 69:
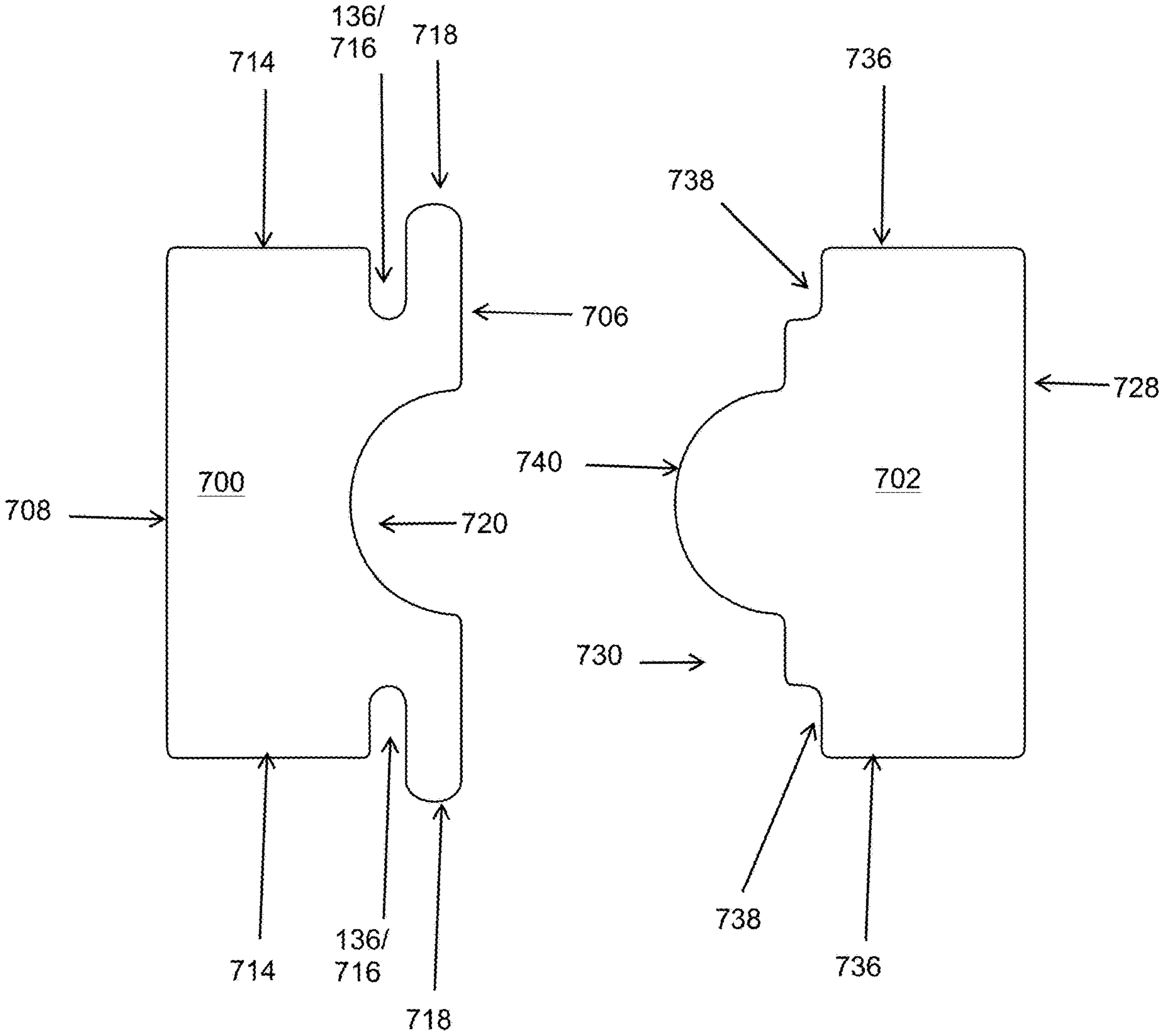
FIG. 69 shows a top view of a sound dampening pad arrangement for a magnetic track assembly, in accordance with one or more embodiments, as is shown in use in FIGS. 65 and 66 and as is shown in FIG. 68.

Pads 130 Having Self-Alignment Features:

In some arrangements, one or more pads 130 may additionally or alternatively include self-alignment features 132 to facilitate realignment of screen receiver 110 in elongate channel 140 when screen receiver 110 and elongate channel 140 are pulled back into contact with each other. As an illustrative example, FIGS. 66, 68, and 69 shows an example set of pads 130 having a set of self-alignment features 132. In this example arrangement, the set of pads 130 includes a screen receiver side pad 702 connected to screen receiver 110 and a track side pad 700 connected to magnetic track 100. Note, these components can be swapped for one another, or a mix can be placed along the length of magnetic track assembly 100, with a mix of each attached to each of the elongate channel 140 and the screen receiver 110 in opposite positions to one another to facilitate nesting and alignment.

Track Side Pad 700:

Track side pad 700 is formed of any suitable size, shape, or design and is configured to facilitate connection with magnetic track assembly 100 and engage with receiver side pad 702 when screen receiver 110 is pulled inward into elongated channel 140. In the arrangement shown, as one example, track side pad 700 has generally rectangular shape having an outward facing surface 706, an inward facing surface 708, a top surface 710, a bottom surface 712, and opposing side surfaces 714.

Connection Features 716:

In this example arrangement, track side pad 700 includes a set of connection features 716. Connection features 716 are formed of any suitable size, shape, or design and are configured to facilitate connection with magnetic track assembly 100. In the arrangement shown, as one example connection features 716 are recessed channels formed in opposing side surfaces 714 of track side pad 700. When track side pad 700 is installed in position in magnetic track assembly 100, protruding partitions of magnetic track assembly 100 extend into the recessed channels of connection features 716 to secure track side pad 700 in place. However, embodiments are not so limited. Rather, it is contemplated that connection between track side pad 700 and magnetic track assembly 100 may be provided by connection features 716 having any other shape or that are positioned on different portions of track side pad. In this example arrangements, track side pad 700 has flanges 718 proximate to the recessed channels of connection features 716. Flanges 718 extend outward to the sides in the outward facing surface 706 to cover outward facing surfaces of the partitions of magnetic track assembly 100 that extend into the recessed channels of connection features 716. In this example arrangement, outward facing surface 706 of track side pad 700 has a self-alignment feature 720 configured to facilitate alignment with receiver side pad 702.

Receiver Side Pad 702:

Receiver side pad 702 is formed of any suitable size, shape, or design and is configured to facilitate connection with screen receiver 110 and engage with track side pad 700 when screen receiver 110 is pulled inward into elongated channel 140. In the arrangement shown, as one example, receiver side pad 702 has a generally rectangular shape having an outward facing surface 728, an inward facing surface 730, a top surface 732, a bottom surface 734, and opposing side surfaces 736.

In this example arrangement, receiver side pad 702 includes a set of connection features 716. Connection features 716 are formed of any suitable size, shape, or design and is configured to facilitate connection with magnetic track assembly 100. In the arrangement shown, as one example, connection features 716 are recessed channels formed in inward facing surface 730 along edges proximate to top surface 732 and bottom surface 734.

When receiver side pad 702 is installed in position on inward facing surface of screen receiver 110, protruding partitions of screen receiver 110 extend inward alongside surfaces 736 and over inward facing surface 730 in the recessed channels of connection features 716 to secure receiver side pad 702 in place on screen receiver 110. However, embodiments are not so limited. Rather, it is contemplated that connection between receiver side pad 702 and screen receiver may be provided by connection features 716 having any other shape or that are positioned on different portions of track side pad 700. In this example arrangement, inward facing surface 730 of receiver side pad 702 has a self-alignment feature 740 configured to facilitate alignment with track side pad 700.

Self-Alignment Features 720 and 740:

Self-alignment features 720 and 710 are formed of any suitable size, shape, or design, and are configured to aid in alignment of screen receiver 110 within magnetic track assembly 100. In the arrangement shown, as one example, pads 700 and 702 have complementary shaped self-alignment features 720 and 740 configured to mate with each other when magnetic track assembly 100 and screen receiver 110 are magnetically pulled together. In this example arrangement, self-alignment features 720 and 740 are shaped to align screen receiver 110 in the center of compartment 146 of magnetic track assembly 100 when elongate channel 140 and screen receiver 110 are magnetically pulled together.

In the arrangement shown, as one example, self-alignment feature 740 of screen receiver side pad 702 has a convex circular protrusion configured to mate with self-alignment feature 720 of track side pad 700, which has a similar but opposite shaped concave circular recess. When screen receiver side pad 702 and track side pad 700 contact each other, the matching convex and concave shapes cause screen receiver 110 to become centered in magnetic track assembly 100. However, embodiments are not so limited. Rather, it is contemplated that in various arrangements, pads 700 and 702 may be implemented with self-alignment features 132 having any other arrangement of shaped protrusions and/or recesses configured to direct screen receiver 110 to a desired position as pads 700 and 702 contact each other.

One of the benefits of having self-alignment feature 740 of screen receiver side pad 702 having a convex circular protrusion configured to mate with self-alignment feature 720 of track side pad 700, which has a similar but opposite shaped concave circular recess, is that this arrangement increases the surface area of contact between screen receiver side pad 702 and track side pad 700 as compared to simply having flat surfaces of engagement. This increased surface area of engagement provides increased friction which prevents the sliding of the screen receiver 110 relative to the elongate channel 140 during high winds and excessive force.

Figure 67C:
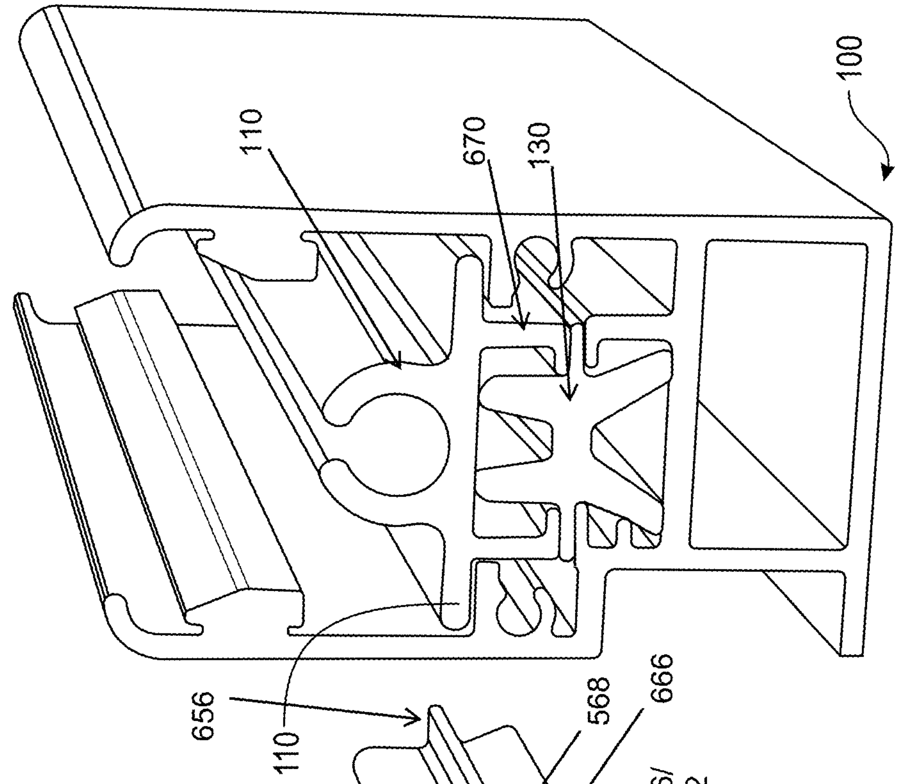
FIG. 67C an forward inward facing top side perspective view of a magnetic track assembly having a pad shown in FIG. 67A, in accordance with one or more embodiments.
Figure 67B:
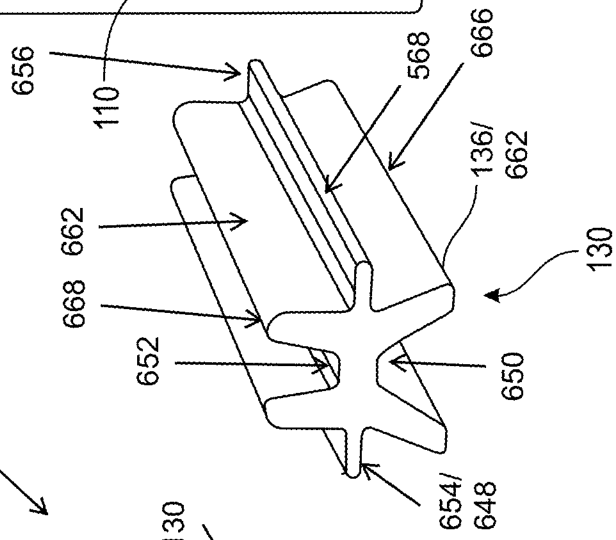
FIG. 67B an inward facing top side perspective view of the pad shown in FIG. 67A, in accordance with one or more embodiments.
Figure 67A:
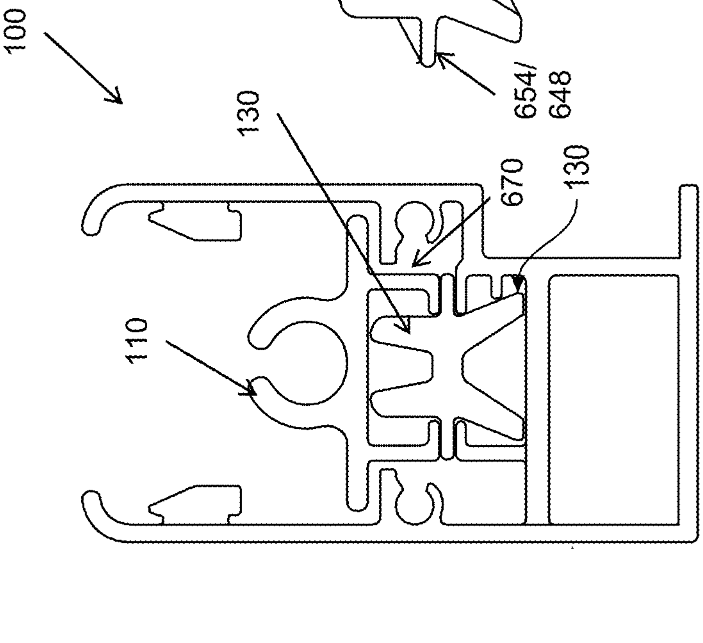
FIG. 67A shows a top side view of a magnetic track assembly having a screen receiver configured to receive a screen having a tube-shaped or c-shaped interlock arrangement, in accordance with one or more embodiments, the view showing the magnetic track assembly with a sound dampening pad arrangement that is held within the slot in the elongate channel that holds the magnets and extends outward therefrom to fit within the slot in the screen receiver that holds the magnets.

Alternative Pad 130 Having Self Alignment Features:

As another illustrative example, FIGS. 67A, 67B, and 67C shows an example single pad 130 arrangement self-alignment features 132. In this example arrangement, pad 130 has a planar portion having an inward facing surface 650 and an outward facing surface 652 extending between a top edge 654, a bottom edge 656, and opposing side edges 658. In this example arrangement pad, 130 includes a pair of connection members 662.

Connection Members 662:

Connection members 662 are formed of any suitable size, shape, or design and are configured to facilitate connection with magnetic track assembly 100. In the arrangement shown, as one example, connection members 662 are a pair of flanges that extend outward from inward facing surface 650 at an angle. In this example arrangement, when pad 130 is connected to magnetic track assembly 100 within elongate channel 140, outward ends 666 of connection member 662 engage partitions of magnetic track assembly 100 to secure pad 130 in place. That is, in the arrangement shown, as one example, the outward ends 666 of connection members 662 frictionally fit within and engage the channel or opening in that receives magnetic components 113 while the planar portion of pad 648 is positioned outside of the inward flanges that partially cover the opening that receives magnets 113. In this way, connection members 662 are frictionally held within elongate channel 140.

Self-Alignment Features 664:

In this example arrangement, pad 130 also includes a pair of self-alignment features 664. Self-alignment features 664 are formed of any suitable size, shape, or design, and are configured to aid in alignment of screen receiver 110 within magnetic track assembly 100 when screen receiver 110 engages pad 130 as it is magnetically pulled back into elongate channel 140. In the arrangement shown, as one example, self-alignment features 664 are a pair of flanges that extend outward from outward facing surface 652 at an angle approximately perpendicular to outward facing surface 652. In this example arrangement, outward ends 668 of self-alignment features 664 have a rounded shape configured to guide side walls of screen receiver 110 into a target placement with self-alignment features 664 located therebetween. In this example arrangement, when screen receiver is fully pulled inward into elongated channel 140 of magnetic track assembly 100, the planar portion 648 of pad 130 is positioned between components of screen receiver 110 and elongate channel 140 to prevent such components from directly contacting each other, hereby dampening noise and preventing metal-on-metal contact.

Multi-Directional Magnetic Coupling

It is recognized that when magnetic components 113 of screen receiver 110 and magnetic track assembly 100 are separated by high wind pressure on screen 200, screen 200 may pull screen receiver 110 outward at a slightly angled orientation. Due to the angled orientation, the attraction between magnetic components 113 may be reduced. As a result, it may take longer for magnetic components 113 to pull screen 200 back to an aesthetically pleasing, tight appearance. In one or more embodiments, one or more of the magnetic components 113 have a curved shape to provide a more uniform attraction between the magnetic components 113 regardless of orientation of screen receiver 110. A curved magnetic member 113 is shown positioned in elongate channel 140 of FIGS. 62 and 64 as one example. In this example, a generally rectangular shaped magnet 113 is positioned in the outward side of screen receiver 110 that is attracted to the curved magnet 113 of the elongate channel 140. Alternatively, in some embodiments, a plurality of several non-curved magnetic components 113 may be attached in several positions (e.g., along a curve) to provide a more uniform attraction between the magnetic components 113 when screen receiver 110 is in various orientations.

Side Lighting 116:

In one or more embodiments, magnetic track assembly 100 may include lighting 116 (e.g., LED blubs or light strips) along one or both sides of magnetic track assembly 100. This is shown as examples in FIGS. 62, 64 and 65. The lighting 116 may provide an aesthetically pleasing side illumination of screen 200 when deployed. The illumination may be on the room-side of the screen 200 for interior illumination and accent, on the out-side of the screen 200 for exterior illumination and accent, or both. Additionally, for some screen materials, illumination of screen 200 can inhibit the ability for an outside observer to see through screen 200 into an illuminated house at night. In some embodiments, power for lighting 116 may be provided from an external power source via low voltage power lines incorporated into magnetic track assembly 100, for example. Additionally or alternatively, in some embodiments, power for lighting 116 may be provided by a battery power source or any other form of power source. In some embodiments, system 10 may include one or more energy harvesters. For instance, in some embodiments, one or more solar cells may be mounted on an outward facing side of housing 12, or tracks or the exterior of the structure magnetic track assembly 100 is attached to. Power generated by the solar cells during the day may be used to recharge a battery for later use to power lighting 116 at night. As another example, in some embodiments, a retractable screen system 10 may include one or more mechanical energy harvesters configured to turn mechanical movement of screen receiver 110 in magnetic track assembly 100 into electricity that can be used to recharge the battery. In some embodiments, lighting 116 may be mounted in recesses of sidewalls 143 of magnetic track assembly 100. Placement of lighting 116 in recesses in sidewalls 143 may help to protect lighting 116 from incurring damage from contact with screen receiver 110 (e.g., in high wind events). Placement of lighting 116 in recesses in sidewalls 143 may help filter, angle or otherwise direct or cover the generated light in a desired manner to provide aesthetically pleasing light. Additionally or alternatively, in some embodiments, magnetic track assembly 100 may include a transparent or translucent guard (e.g., a clear rubber or plastic) over lighting 116 that may filter, angle or otherwise direct or cover the generated light in a desired manner to provide aesthetically pleasing light.

Exemplary Embodiments

In one or more embodiments, a track system is provided that comprises: a screen; the screen extending a length between a first side and a second side; the screen extending a height between an upper side and a lower side; an interlock attached along one side of a plurality of sides including the first side, the second side, the upper side, and the lower side of the screen; the interlock extending a length along the one side of the screen between a first end and a second end; a first track assembly; the first track assembly positioned adjacent the one side of the screen; and the first track assembly having an elongate channel and a screen receiver.

In one or more implementations, the system further comprises: one or more pads configured and arranged to prevent the first track assembly from making direct contact with the screen receiver, thereby reducing noise.

In one or more implementations, the one or more pads have one or more features configured and arranged to operably connect the pad to the track assembly.

In one or more implementations, the one or more pads have one or more features configured and arranged to operably connect a magnetic member to the track assembly.

In one or more implementations, the one or more pads have one or more features configured and arranged to operably connect a magnetic member to the track assembly; wherein the magnetic member has a curved shape.

In one or more implementations, the one or more pads include two pads having complementary features configured and arranged to, when mated, self-align the screen receiver in the first track assembly.

In one or more implementations, the system further comprises: a set of lights coupled to the first track assembly along the length of the channel.

In one or more implementations, the system further comprises: a set of lights coupled to the first track assembly along the length of the channel; wherein the set of lights are light emitting diodes.

In one or more implementations, the system further comprises: a set of lights coupled to the first track assembly along the length of the channel; wherein the set of lights are located in a recess of the first track assembly.

In one or more implementations, the system further comprises: a set of lights coupled to the first track assembly along the length of the channel; and a transparent guard over the set of lights.

In one or more implementations, the system further comprises: a set of lights coupled to the first track assembly along the length of the channel; and a battery power supply connected to the set of lights.

In one or more implementations, the system further comprises: a set of lights coupled to the first track assembly along the length of the channel; a battery power supply connected to the set of lights; and one or more energy harvesters configured and arranged to recharge the battery power supply.

In one or more embodiments, a retractable screen system is provided that comprises: a screen; the screen extending a height between an upper side and a lower side; the screen extending a length between a first side and a second side; a roller tube; the roller tube extending a length between a first end and a second end; wherein the screen includes a first interlock at the first side of the screen; a first track assembly positioned adjacent the first side of the screen; the first track assembly having a first elongate channel and a first screen receiver configured to receive the first interlock; a first magnet associated with one of the elongate channel and the screen receiver of the first track assembly; a first magnetic member associated with the other of the elongate channel and the screen receiver of the first track assembly; wherein a magnetic bond is formed between the first magnet and the first magnetic member of the of the first track assembly; wherein the first interlock includes a strip of material extending a length along the first side of the screen, the strip of material extending a width from an outer side to a respective inner side; wherein a portion the each strip of material adjacent to the outer side is operatively connected to a portion of the screen adjacent to the one side; and wherein a portion the each strip of material adjacent to the inner side is detached from the screen.

In one or more implementations, the system further comprises: one or more pads configured and arranged to prevent the first track assembly from making direct contact with the first screen receiver.

In one or more implementations, the one or more pads have one or more features configured and arranged to operably connect the pad to the track assembly.

In one or more implementations, the one or more pads have one or more features configured and arranged to operably connect the first magnetic member to the track assembly.

In one or more implementations, the first magnetic member has a curved shape.

In one or more implementations, the one or more pads include two pads having complementary features configured and arranged to, when mated, self-align the screen receiver in the first track assembly.

In one or more implementations, the system further comprises: a set of lights coupled to the first track assembly along the length of the channel.

In one or more implementations, the system further comprises: a set of lights coupled to the first track assembly along the length of the channel; wherein the set of lights are light emitting diodes.

In one or more implementations, the system further comprises: a set of lights coupled to the first track assembly along the length of the channel; wherein the set of lights are located in a recess of the first track assembly.

In one or more implementations, the system further comprises: a set of lights coupled to the first track assembly along the length of the channel; and further comprising a transparent guard over the set of lights.

In one or more implementations, the system further comprises: a set of lights coupled to the first track assembly along the length of the channel; and a battery power supply connected to the set of lights.

In one or more implementations, the system further comprises: a set of lights coupled to the first track assembly along the length of the channel; and one or more energy harvesters configured and arranged to recharge the battery power supply.

Further Alternative Arrangements:

With reference to FIGS. 71-79 various alternative arrangements of retractable screen systems 10 having magnetic track assemblies 100 are presented. Some components of motorized screen system 10 having magnetic track assemblies 100 presented in FIGS. 71-79 are similar to those of retractable screen system 10 having magnetic track assemblies 100 presented in FIGS. 1-70 and therefore the teaching presented herein with respect to FIGS. 1-70 may be applied to and is incorporated into the teaching presented in FIGS. 71-79 unless specifically stated otherwise.

Figure 70:
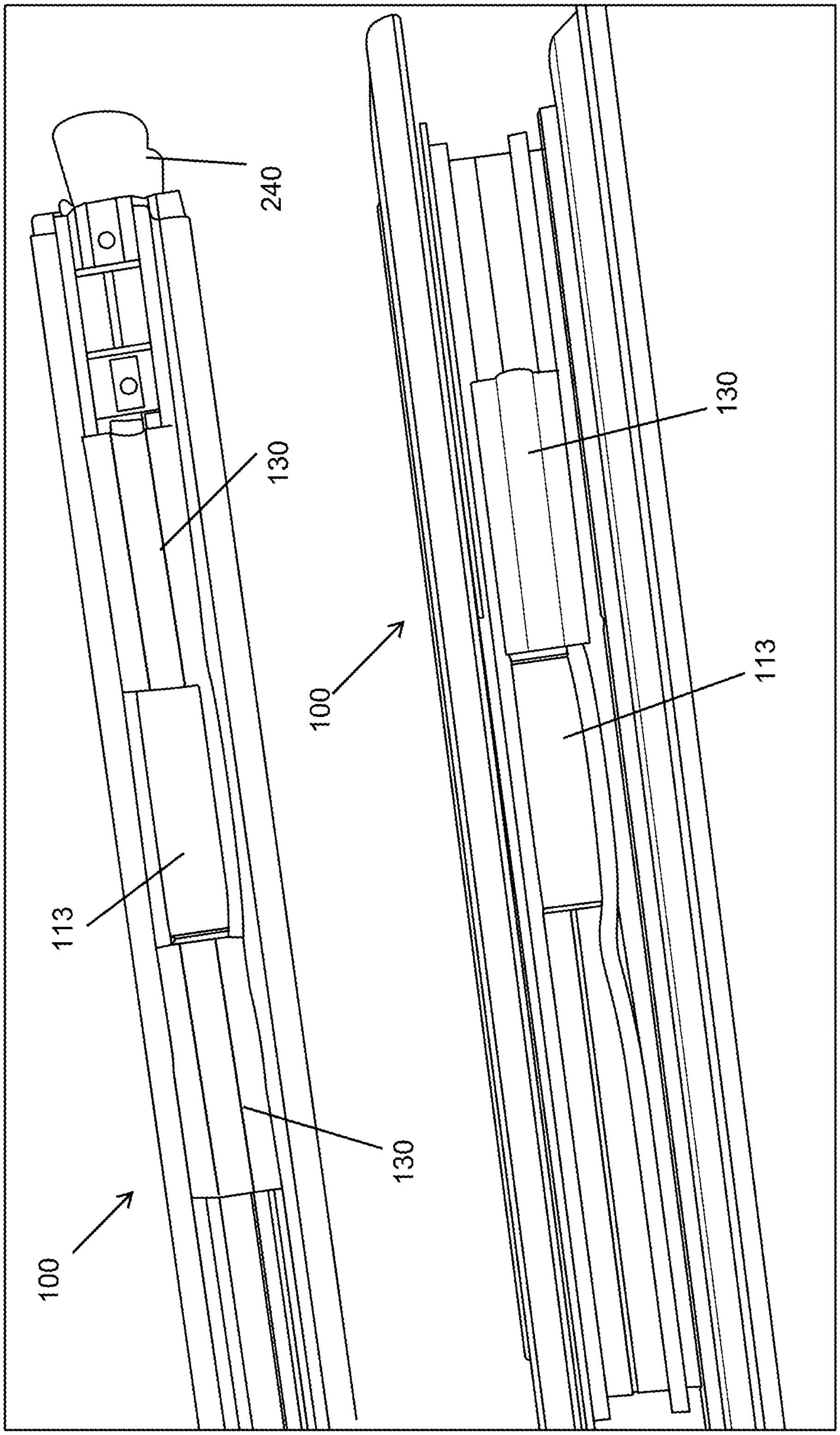
FIG. 70 shows a perspective disassembled view of a magnetic track assembly, in accordance with one or more embodiments; the view showing a screen receiver and magnetic track having sound dampening pads with alignment features therein; the view also showing a nesting sound dampening mechanism or pad arrangement positioned within the elongate channel and the screen receiver, the pad connected to the elongate channel having a semicircular recess that receives a semicircular protrusion of the pad connected to the screen receiver, the nesting features of these pads reduce noise, provide alignment and increase surface area of contact thereby increasing friction which reduces the potential for the screen receiver to slide relative to the elongate channel.

Adjustable Roller Tube Assembly for Mitigation of Defects:

As described with reference to FIGS. 1-70, some example arrangements for a retractable screen system 10 include magnetic track assemblies 100 having a roller tube assembly 26. A problem for some current retractable screen systems is that undesirable artifacts may become visible in screen 200 due to, for example, stretching of fabric, wrinkling/creasing of fabric, sagging of a roller tube, uneven weight distribution or tension, and/or, bunching of screen materials on a roller tube. One or more embodiments provide a retractable screen system 10 having a roller tube 32 that may be adjusted in length, circumference, and/or shape of the roller edge, for example, to help mitigate such undesirable artifacts.

Length Adjustment Members 35:

As described with reference to FIGS. 1-70, for example, some arrangements of retractable screen system 10 may utilize an interlock 202/310 (e.g., a keder interlock, a zipper interlock, a rope, a beaded chain, or any similar interlock known in the art) to connect the upper end of screen 200 to receiver 40 of roller tube 32. Similarly, some arrangements of retractable screen system 10 may utilize interlock 202/310 alongside edges of screen 200 to connect screen 200 to a magnetic track assembly 100. For example, as shown in FIGS. 1 and 2, interlocks 202/310 of screen 200 are inserted into openings of screen receivers 110 of the magnetic track assemblies 100. Screen 200 may be retracted by rotating roller tube 32 and thereby rolling screen 200 up around exterior surface 68 of roller tube 32. However, interlock 202/310 is generally thicker than screen 200, for example, in order to be held in place by screen receivers 110. In some implementations, a seam 216 where interlock 202/310 attaches to screen 200, may have a thickness between that of screen 200 and interlock 202/310. Due to the differences in thickness, interlocks 202/310 and/or seams 216 will add more to circumference when rolled around a tube than will screen 200. If circumference is increased at an edge of screen 200, e.g., by interlock 202/310, each rotation of roller tube 32 will cause more screen 200 to be rolled up at the edge in comparison to other points along roller tube 32, which may create undesirable defects to be visible in screen 200 such as edge wrinkles.

In one or more embodiments, roller tube assembly 26 includes length adjustment members 35 configured to adjust effective length of roller tube 32. As used herein, "effective length" refers to the combined length of a combination of roller tube 32 and any members attached to ends of the roller tube (e.g. length adjustment members 35). As an illustrative example, consider a hypothetical tube extending 48 inches between opposing ends of the hypothetical tube. If a 3 inch length extension member is attached to one end of the hypothetical tube, the effective length of the tube is 51 inches. If that same 3 inch extension member is slid outward two inches, the effective length of the tube is 53 inches.

In the illustrated arrangement, as one example, length adjustment member 35 may be implemented by a collar 38 operably connected to an end 70 of roller tube 32 by a connection member 36 such as an inner tube or axle. In various implementations, the effective length may be adjusted using various mechanisms including, for example, by changing the position where collar 38 is attached to connection member 36 or the position where connection member 36 attaches to roller tube 32. The position at which connection member 36 attaches to roller tube 32 and/or collar 38 may be secured using any manner, method or means known in the art including but not limited to, for example, set screws, compression collar, threading and/or lock nuts, and various combinations thereof. In one or more arrangements, collar 38 may be moved to and secured at an infinite number of positions relative to roller tube 32, thereby facilitating adjustment of effective length to an infinite number of different lengths.

In one or more arrangements, system 10 includes multiple fixed length adjustment member 35 (e.g., collars 38) of different lengths that can be added and/or removed from roller tube 26 to facilitate adjustment of roller tube 32 to various effective lengths, as required. Additionally or alternatively, in one or more arrangements, length adjustment member 35 may be adjustable to in length. For example, in one or more arrangements, length adjustment member 35 may be have a telescopic arrangement allowing length of length adjustment member 35 to be increased or decreased as required.

By adjusting the effective length of roller tube 32, system 10 may be adjusted so screen 200 extends beyond ends 70 of roller tube 32 to accommodate the thicker interlocks 202/310 and/or seams 216 and thereby prevent interlocks 202/310 and/or seams 216 from increasing circumference when rolled up.

Similarly, the effective length of roller tube 32 may be adjusted so that screen 200, seam 216, and/or interlock 202/310 engages the exterior surface of roller tube 26 and/or collar 38 as roller tube 32 is turned. By adjusting the effective length so either screen 200, seam 216, or interlock 202/310 is rolled up as roller tube 32 is turned, the effective rate at which one side of screen 200 is deployed or retracted as roller tube 32 is rotated may be adjusted.

Figure 71A:
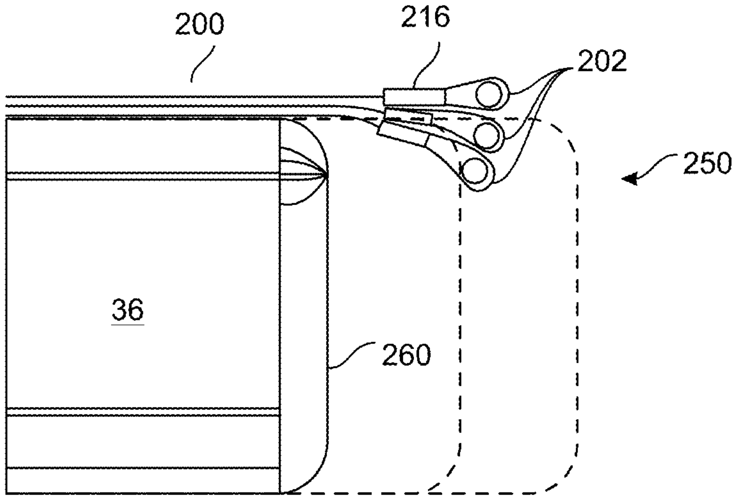
FIG. 71A shows a front view of a roller tube collar, end cap, and attached screen rolled around the roller tube and collar, in accordance with one or more embodiments; the view showing the side profile view of the end cap having an inner end positioned against the outer end of the collar, the inner end having a larger diameter that is approximately the same as the outer diameter of the roller tube and the collar; the view showing the outer end having a smaller diameter than the outer diameter of the roller tube and the collar; the view showing the exterior surface of the end cap curving in a smooth convex manner from the inner end to the outer end, the view illustrating the roller tube collar in a fully retracted position thereby causing the interlock to fold over and around the curved exterior surface of the end cap; the view also shows in dashed lines other potential positions the collar and end cap may be adjusted to along the infinite range of positions between a fully retracted position and a fully extended position; this configuration causes the screen to be raised at a minimum rate or minimum gear ratio.

With reference to FIG. 71A, in an arrangement shown, as one example, in a fully-retracted position 250, the effective length of roller tube 32 is reduced so interlock 202/310 and seam 216 on the side of screen 200 extend beyond the edge of collar 38 (attached to roller to 32 by connection member 36). In this position, screen 200 rolls up flat around an outer circumference of roller tube 32/collar 38. This represents the minimum rate or minimum gear ratio.

Figure 71B:
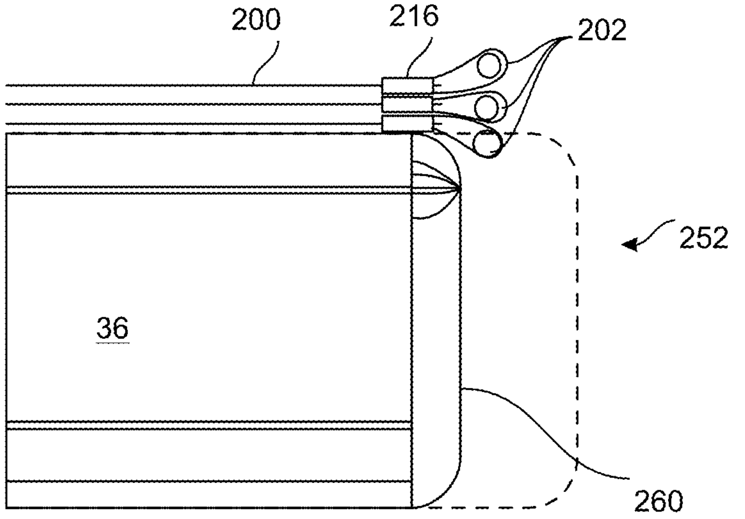
FIG. 71B shows a similar view to FIG. 71A, the view shows a front view of a roller tube collar, end cap, and attached screen rolled around the roller tube and collar, in accordance with one or more embodiments; the view illustrating the roller tube collar in an intermediary position between the fully extended position and the fully retracted position, the view showing the interlock partially supported by the exterior surface of the roller tube collar and the end cap with the outward end of the interlock hanging over and past the end of the end cap thereby causing the interlock to fold over and around the curved exterior surface of the end cap; the view also shows in dashed lines other potential positions the collar and end cap may be adjusted to along the infinite range of positions between a fully retracted position and a fully extended position; this configuration causes the screen to be raised at an intermediate rate or intermediate gear ratio.

With reference to FIG. 71B, in a partially-extended position 252, or intermediary position, the effective length of roller tube 32 is partially extended so interlock 202/310 extends beyond the edge of collar 38 while seam 216 rests on the outer surface of collar 38. In this position, seam 216 rolls up around collar 38 when roller tube 32 is rotated. Since seam 216 is thicker than screen 200, each rotation of roller tube 32 in partially-extended position 252 will roll up more of screen 200 than in fully retracted position 250. In this manner, the effective rate that the screen is rolled up is increased. This represents an intermediate rate or intermediate gear ratio.

Figure 71C:
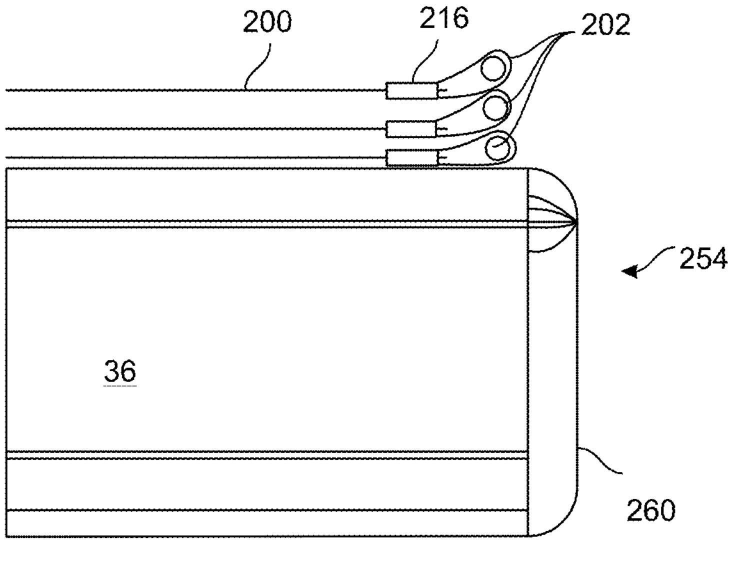
FIG. 71C shows a similar view to FIGS. 71A and 71B, the view shows a front view of a roller tube collar, end cap, and attached screen rolled around the roller tube and collar, in accordance with one or more embodiments; the view illustrating the roller tube collar in a fully extended position, the view showing the interlock fully supported by the exterior surface of the roller tube collar and the end cap with the outward end of the interlock engaging the exterior surface of the roller tube collar; this configuration causes the screen to be raised at a maximum rate or maximum gear ratio.

With reference to FIG. 71C, in a fully-extended position 254, the effective length of roller tube 32 is extended so interlock 202/310 does not extend beyond the edge of collar 38. In this position, the thicker interlock 202/310 is rolled up around collar 38 when roller tube 32 is rotated. Since, interlock 202/310 is thicker than seam 216 and screen 200, each rotation of roller tube 32 in this position 254 will roll up more of screen 200 than in positions 250 or 252. In this manner, the effective rate that the screen is rolled up is further increased. This represents the maximum rate or maximum gear ratio.

While three effective length positions are illustrated, the embodiments are not so limited. Rather, it is contemplated that in one or more embodiments, length adjustment members 35 (e.g., collar 38 and connection member 36) may be adjustable to a greater or lesser number of positions. It is further contemplated that, in one or more embodiments, length adjustment members 35 may be adjustable to an infinite number of positions.

In Operation:

As an illustrative example, porches of homes often have floors sloped away from houses to ensure rainwater flows away from the house. The installation of retractable screen systems 10 on sloped sides of a porch can be a particular challenge as it may be desirable for a bottom of screen 200 to be parallel to the slope of the floor. As a result, the side of screen 200 closer to the house may need to be shorter than the side that is further from the house when screen 200 is deployed in order to be flush with the floor. However, if screen 200 is evenly wrapped around roller tube 32, a portion of screen 200 will remain deployed when the short side is fully retracted. Consistent with one or more embodiments, an installation technician may adjust the effective length of roller tube 32 via length adjustable members 35 so that the thicker seam 216 and/or interlock 202/310 on the longer side of screen 200 rolls up around roller tube 32 when rotated. In this manner, the installation technician can adjust the amount that the longer side of screen 200 will retract more per rotation of roller tube 32, relative to the shorter side thereby balancing out the screen 200 to raise and lower evenly and perfectly.

End Caps 260:

When screen 200 extends beyond roller tube assembly 26 (e.g., end of roller tube 32 or end of collar 38), more space is available to accommodate interlock 202/310 and/or seam 216 when screen 200 is rolled up around roller tube 32/collar 38. However, it has been observed that creases may be formed in screen 200 over time by the end of roller tube assembly 26. It has been surprisingly discovered that providing a curved edge on the ends of roller tube assembly 26 helps to prevent the formation of creases in screen 200, even when rolled up for long durations of time.

In one or more embodiments, a retractable screen system 10 is configured with end caps 260 on ends of collar 38 to provide a curved edge; thereby permitting screen 200 to extend beyond the ends of collar 38 without forming creases in screen 200.

End caps 260 are formed of any suitable size, shape, or design, and are configured to attach to ends 70 of roller tube assembly 26 either by direct connection to the ends of roller tube 26 or to the ends of collars 38. Alternatively, it is hereby contemplated that end caps 260 may be formed as part of roller tube 26 or collars 38. End caps 260 are configured to provide a curved edge on end 70 of roller tube assembly 26. In an arrangement shown, as one example, end caps 260 have an exterior portion 262 and one or more connection members 266.

Exterior portion 262 is formed of any suitable size, shape, or design, and is configured to provide a curved exterior surface 268 for support of portions of screen 200 that overhang roller tube assembly 26. In one arrangement shown, as one example, exterior portion 262 of end cap 260 has a generally cylindrical shaped exterior surface 268 extending from an inner end 270, where end cap 260 connects to roller tube 32 or collar 38 to an outer end 272. In this example arrangement, exterior surface 268 of end cap 260 is flush with the exterior surface of collar 38/roller tube 32 when connected. In this example, exterior surface 268 has a curved shape that reduces in diameter as end cap 260 extends away from inner end 270 to outer end 272. That is, the inner end 270 of end cap 260 has a larger diameter, that generally matches the diameter of the exterior surface of roller tube 26 and/or collar 38, and an outer end 272 has a smaller diameter. In one or more embodiments, the exterior surface 268 of exterior portion 262 is shaped to have a smooth curve substantially free of edges, bevels, and/or other transitions that are sharp enough to cause creases to form in a screen 200 overlaid thereon.

Figure 72B:
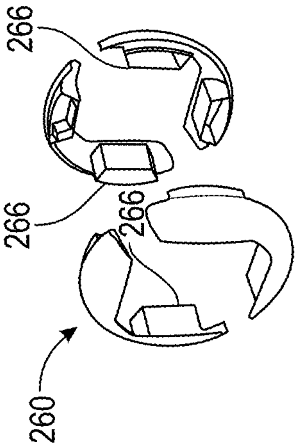
FIG. 72B shows an upper front right perspective view and an upper rear right perspective view of a pair of end caps as is shown in FIG. 72A, in accordance with one or more embodiments.
Figure 72C:
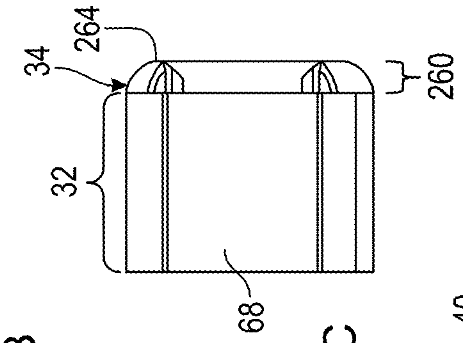
FIG. 72C shows a rear view of the roller tube and end cap shown in in FIG. 72A, in accordance with one or more embodiments.
Figure 72D:
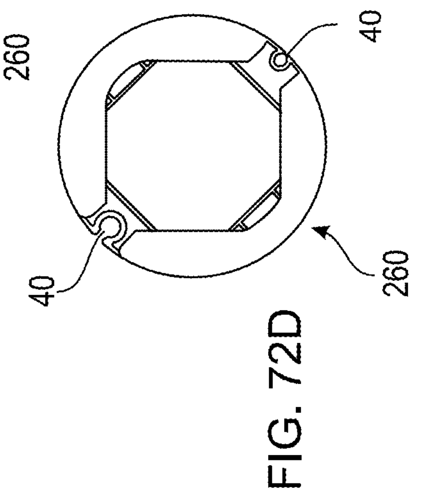
FIG. 72D shows a side view of the roller tube and end cap shown in in FIG. 72A, in accordance with one or more embodiments.
Figure 72A:
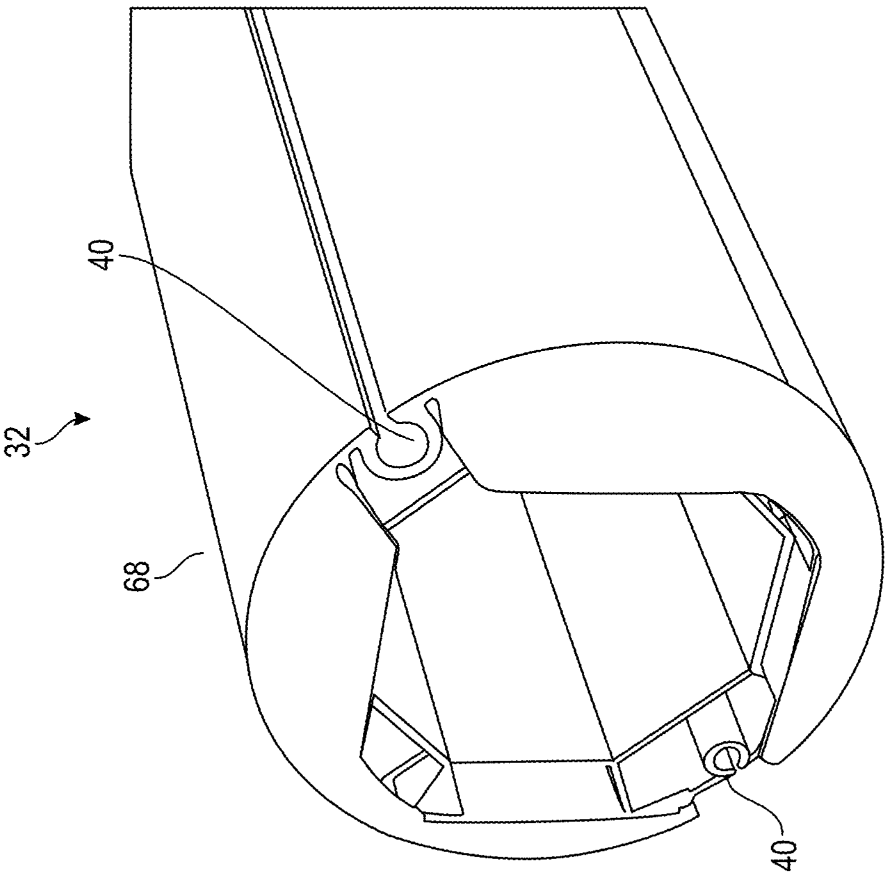
FIG. 72A shows an upper front right perspective view of a roller tube and end cap, in accordance with one or more embodiments; the view showing the end cap having two sections that are separated by openings that provide access for the upper end of the screen to slide into receivers in the roller tube.
Figure 73B:
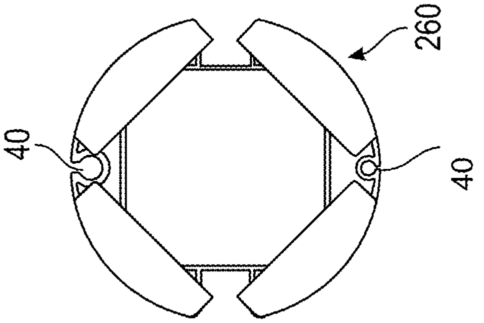
FIG. 73B shows a right side view of the roller tube and end cap shown in FIG. 73A, in accordance with one or more embodiments.
Figure 73A:
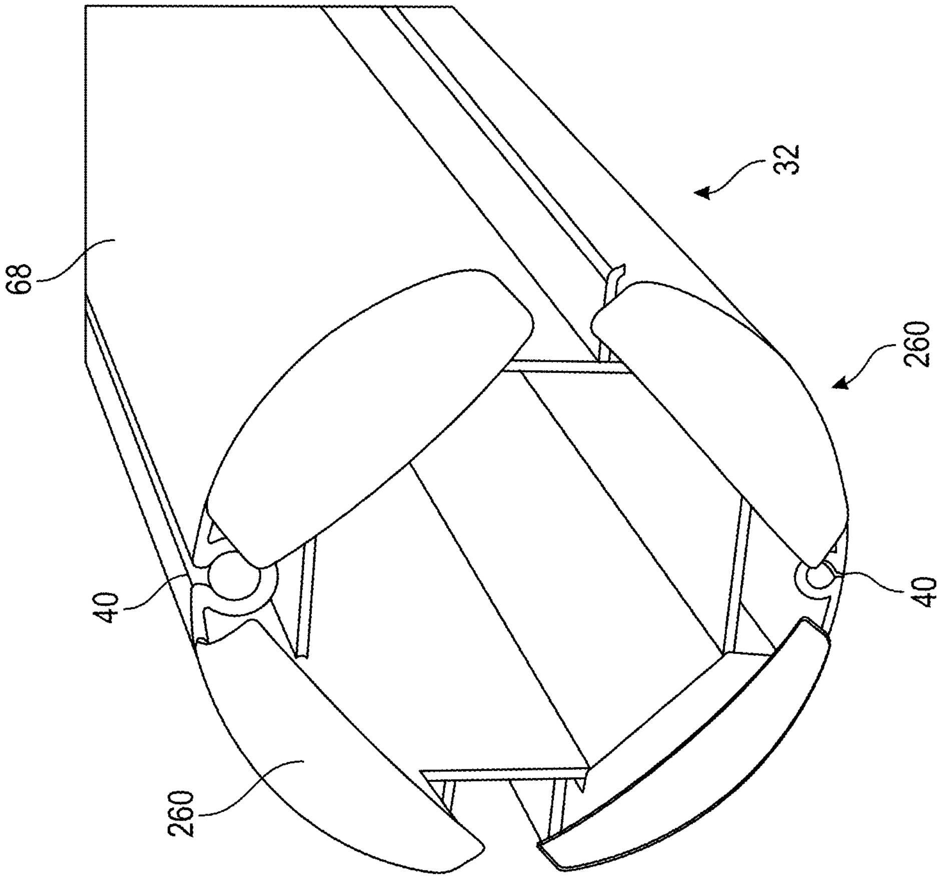
FIG. 73A shows an upper front right perspective view of a roller tube and end cap, in accordance with one or more embodiments; the view showing the end cap having four sections that are separated by openings that provide access for the upper end of the screen to slide into receivers in the roller tube as well as access to slots in the exterior surface of the roller tube.
Figure 74:
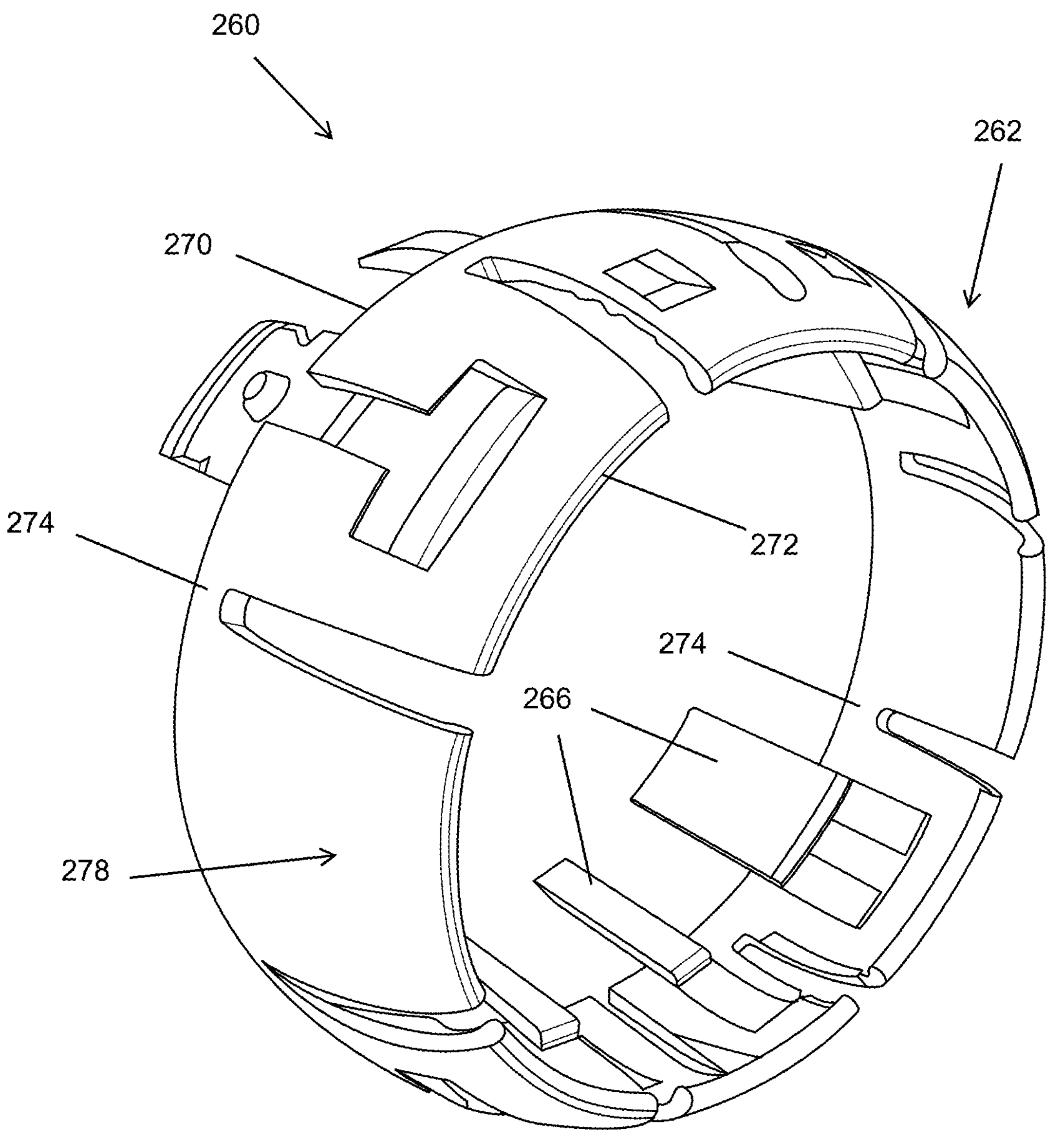
FIG. 74 shows an upper front left perspective view of an end cap having flexible arms, in accordance with one or more embodiments; the view showing the end cap having a plurality of flexible arms extending from the inner end to the outward end and having a curved exterior surface and a hollow interior; the view showing the flexible arms separated by slots that provide relief that allow the arms to flex; the view showing a plurality of connection members that extend away from the flexible fingers and toward the roller tube and collar that mate with features in the outward end of the roller tube or collar thereby connecting the end cap to the roller tube or collar; the view showing the end cap having slots that align with the receivers in the roller tube and collar thereby allowing the screen to be connected to the roller tube through the end cap.
Figure 75:
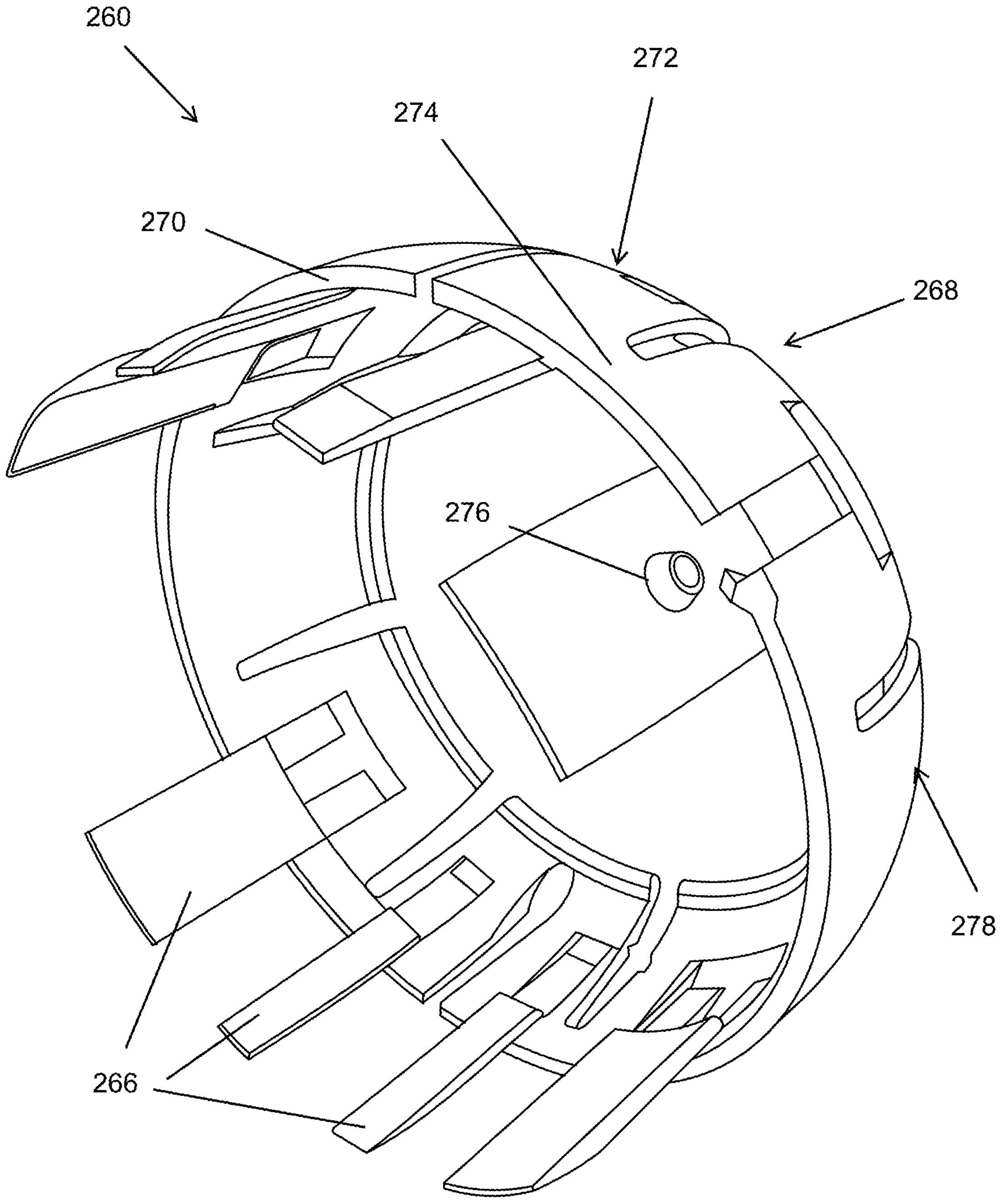
FIG. 75 shows an upper front right perspective view of an end cap having flexible arms as is shown in FIG. 74, in accordance with one or more embodiments.
Figure 76:
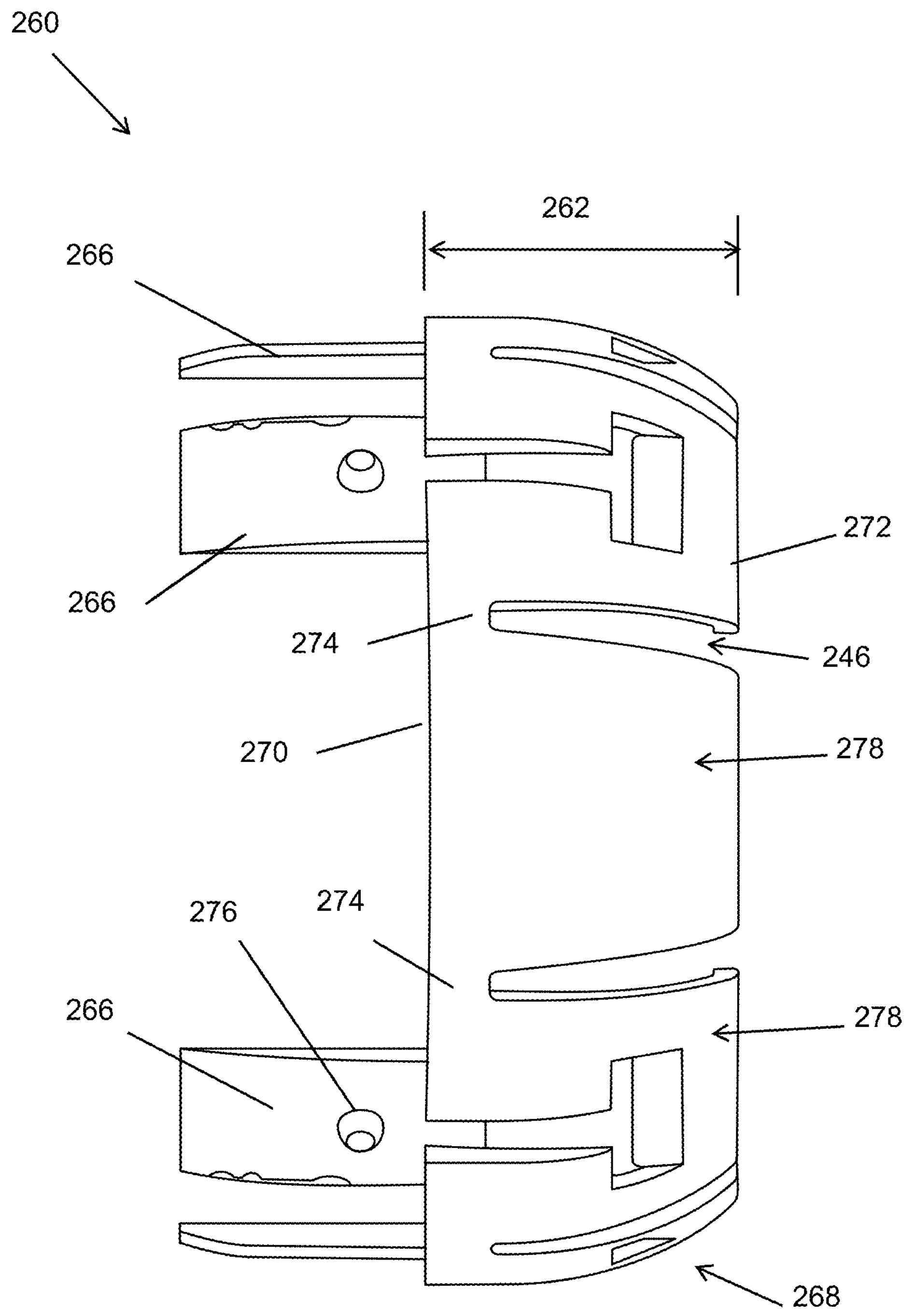
FIG. 76 shows a front view of an end cap having flexible arms, as is shown in FIGS. 74 and 75, in accordance with one or more embodiments.
Figure 77:
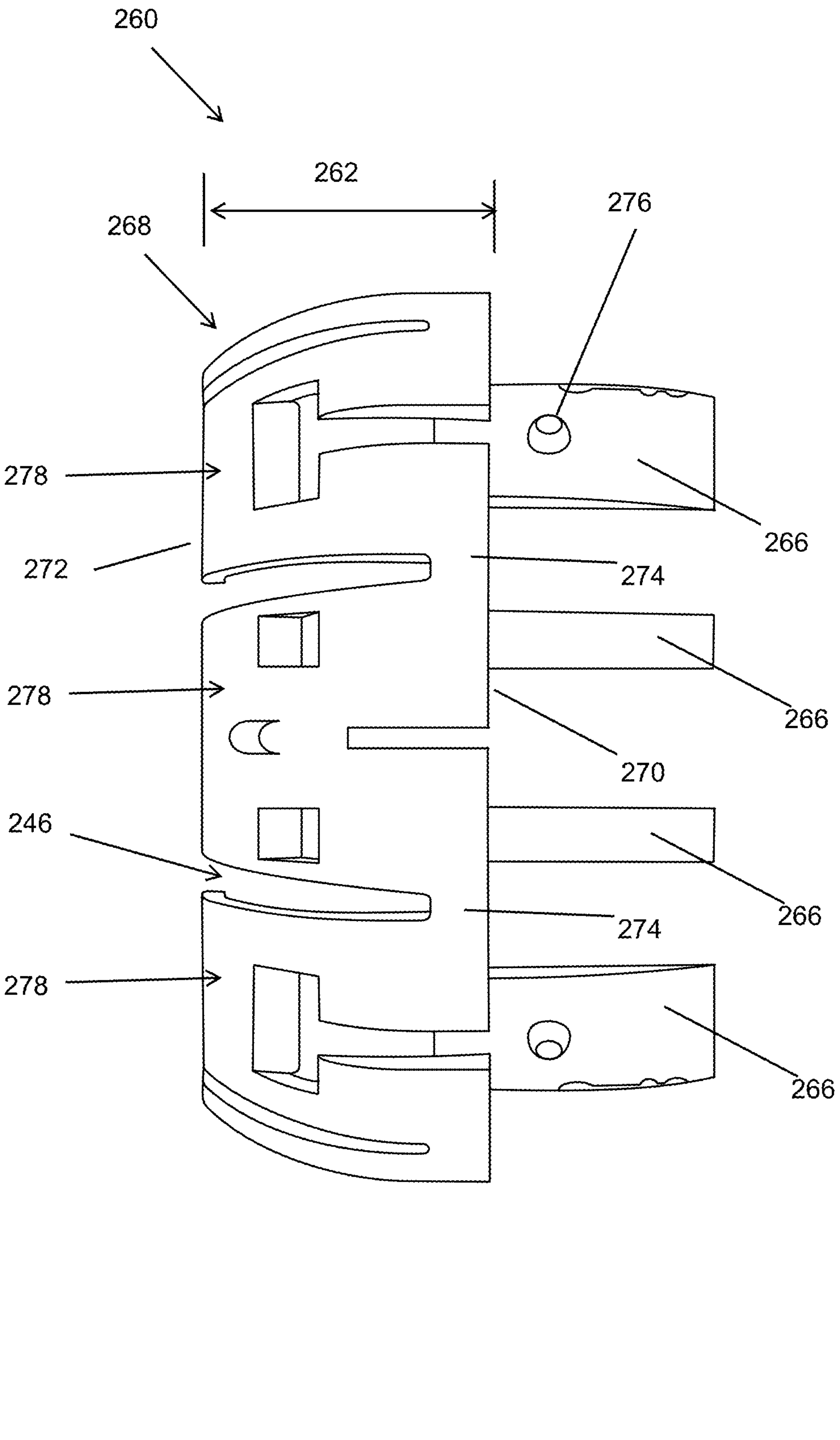
FIG. 77 shows a rear view of an end cap having flexible arms, as is shown in FIGS. 74, 75 and 76, in accordance with one or more embodiments.
Figure 78:
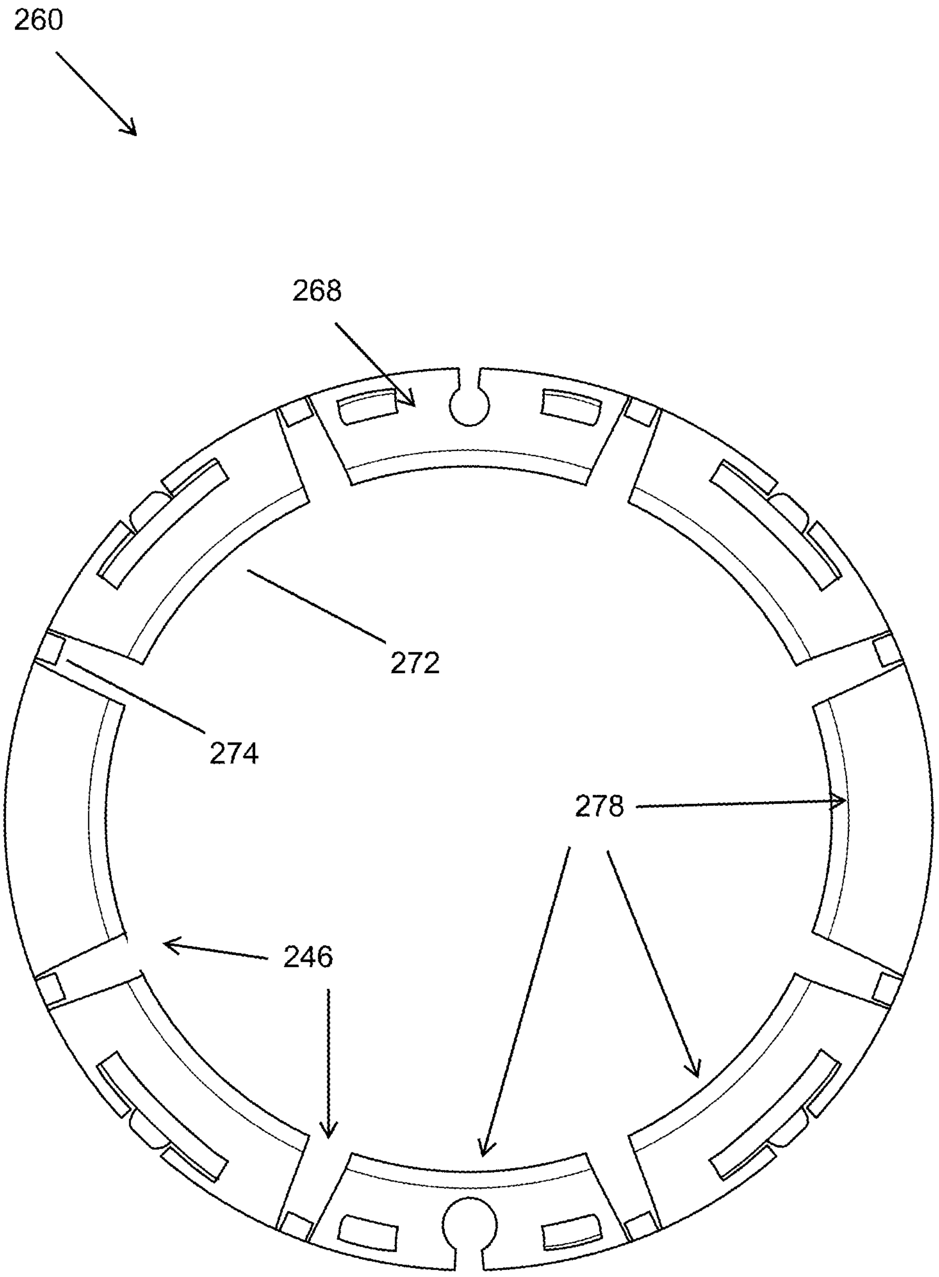
FIG. 78 shows a left side view of an end cap having flexible arms, as is shown in FIGS. 74, 75 and 76, in accordance with one or more embodiments.
Figure 79:
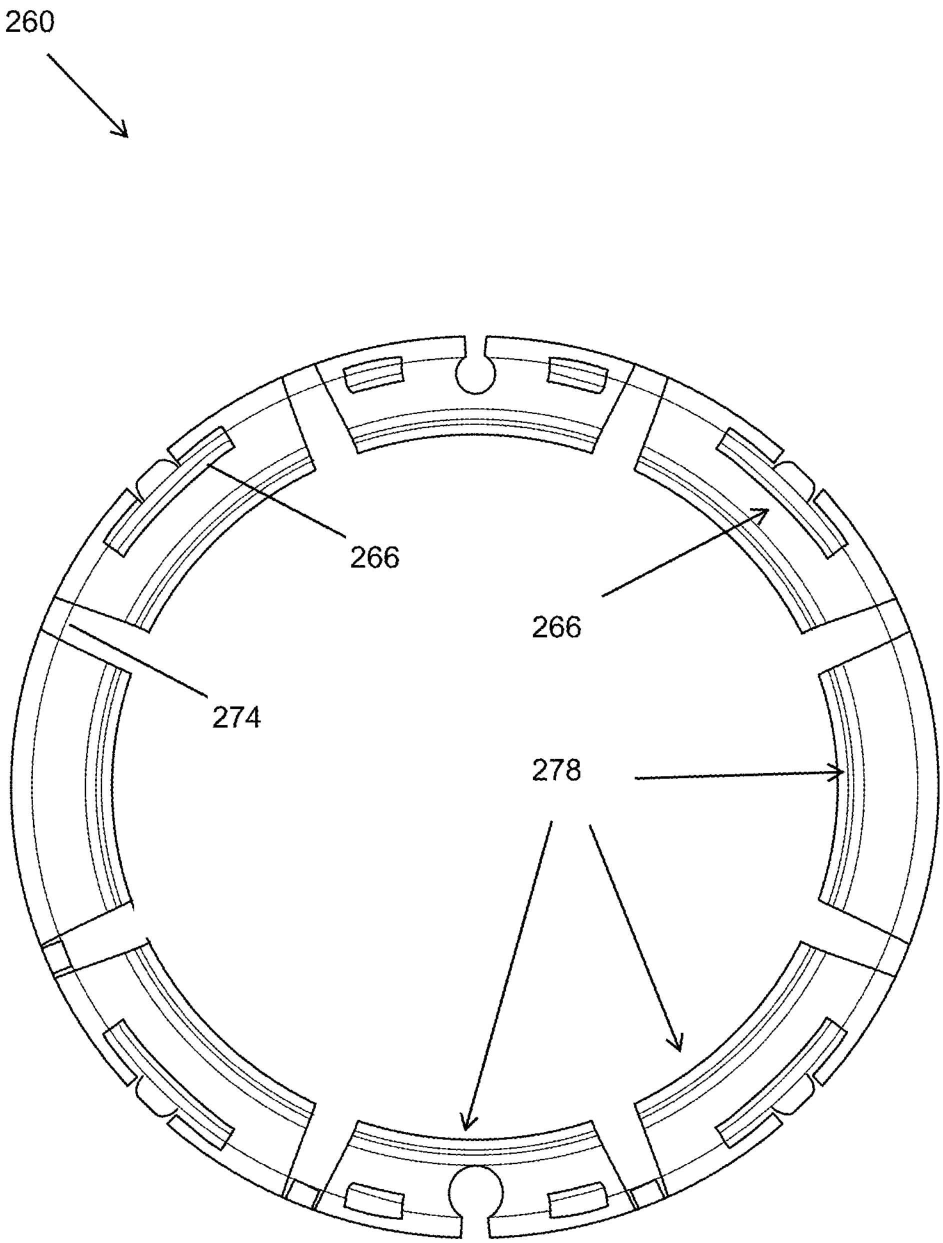
FIG. 79 shows a right side view of an end cap having flexible arms, as is shown in FIGS. 74, 75, 76 and 77, in accordance with one or more embodiments.

In some embodiments, exterior portion 262 of end cap 260 may be formed by a single piece of material with the curved portion encircling the entirety of exterior surface 268. However, such uniformity is not required. It is surprisingly discovered that an end cap 260 may include one or more gaps in exterior surface 268 of end cap 260 while providing adequate support to prevent creases or other defects from forming in screen 200. For example, FIG. 72B shows an end cap 260 having an exterior portion 262 formed by a pair of separate pieces configured to independently connect to the end of roller tube 32. As another example, FIGS. 73A and 73B show an end cap 260 having an exterior portion 262 formed by four separate pieces configured to independently connect to the end of roller tube 32. Alternatively, in some implementations, the separate pieces of exterior portion 262 of end cap 260 may be connected together by one or more support members 274 to form a single unitary member.

In the illustrated arrangement, for example, the gaps between the pieces of end cap 260 may permit a screen 200 to be connected to roller tube 32 at a receiver 40 using an interlock (e.g., keder), or removed therefrom, without removing the end cap 260. For example, collar 38/roller tube 32 may include two receivers 40 configured to accept two different shaped or sized interlocks. In this example arrangement, end cap 260 includes gaps at locations corresponding to receivers 40 to allow the interlocks to be inserted or removed without removal of the end cap 260. Some embodiments may include more or fewer receivers 40. Alternatively it is hereby contemplated that in some implementations no receivers 40 are used and instead screen 200 may be connected to roller tube assembly 26 by any other manner, method or means. Additionally or alternatively, in some embodiments, a roller tube 32 may employ various other mechanisms, methods, or means known in the art for attaching a screen (e.g., 200) to roller tube 32.

Flexible Arms 278:

In one or more arrangements, exterior portion 262 of end cap 260 is configured to flex to permit exterior surface 268 to be compressed inward to accommodate rolling of interlock 202/310 of screen 200. In the arrangement shown in FIGS. 74-79, as one example, exterior portion 262 of end cap 260 includes a plurality of separate flexible arms 278 extending outward from inner end 270 toward outer end. Flexible arms 278 are formed of any suitable size, shape, or design, and are configured to provide a curved surface to support interlock 202/310 and/or screen 200, while permitting flexible arms 278 to bend inward to accommodate and support interlock 202/310 and/or screen 200 as it stacks up upon itself as it is raised. In this example arrangement, flexible arms 278 have a generally petal shape that curves inward as flexible arms 278 extend from inner end 270 toward outer end or end cap 260. In this example arrangement, adjacent flexible arms 278 are connected together adjacent their inner end 270 by, for example, support members 274. In this example arrangement, gaps 246 or slots are positioned between adjacent flexible arms 278. These gaps 246 or slots extend from support members 274 to outward end 272 of end cap 260. In this example arrangement, gaps 246 expand as gaps extend outward from support members 274 toward outward end 272. In this example arrangement, gaps 246 between adjacent flexible arms 278 permits flexible arms 278 to be compressed inward toward each other as screen 200 and interlock 202/310 are rolled up around roller tube assembly 26.

Connection Member(s) 266:

Connection Member(s) are formed of any suitable size, shape, or design, and are configured to facilitate connection of end cap 260 with an end of collar 38 and/or roller tube 32. In the arrangement shown, as one example, end cap 260 includes a plurality of finger shaped connection members 266 that protrude from inner end 270 of exterior portion 262 of end cap 260 toward roller tube 32 and collar 38. In one or more arrangements, end cap 260 may be connected to the end of roller tube 32 or collar 38 by mating connection member 266 with recesses (not shown) located at complementary locations on the end of roller tube 32 or collar 38. Connection members 266 and recesses may be sized and shaped, for example, so connection members 266 are frictionally held in place once inserted into recesses.

Similarly, in some embodiments, connection member(s) 266 of end cap 260 may be configured to fit within an inner diameter of collar 38 or roller tube 32 and engage an interior surface thereof. Additionally or alternatively, in one or more arrangements, one or more connection members 266 may be configured to fit over an external surface of collar 38 (e.g., in a recess formed in the external surface of collar 38). Additionally or alternatively, in one or more arrangements, one or more connection members 266 may be configured to fit within and one or more connection members 266 may be configured to fit over an external surface of collar 38 (e.g., in a recess formed in the external surface of collar 38) in complimentary combination with one another.

Additionally or alternatively, in one or more arrangements, one or more connection members 266 may include features 276, such as protrusions or recesses, that are configured to engage complementary features of collar 38 or roller tube 32, such as recesses or protrusions, to secure the connection between connection members 266 and collar 38 or roller tube 32. In some various arrangements, features 276 may include but are not limited to, for example, protrusions, recess, holes, threads, clips, snaps, screws, bolts, interlocks, pins, or any other means or method for coupling objects. Additional or alternatively, in some embodiments, connection members 266 or other components of end cap 260 may be connected to the end of collar 38 by an adhesive, chemical bonding, welding, screwing, bolting, or connecting by any other manner, method or means.

Additionally or alternatively, in one of more embodiments, end caps 260 may be configured and arranged to connect to roller tube 32 directly. For instance, in one or more alternate embodiments, collar 38 and connection members 36 (or an axle through roller tube 32) may be omitted from one or both ends of roller tube 32. End caps 260 may be connected directly to the end(s) of roller tube 32 as described above. End caps 260 may be connected to roller tube 32 by connection members 266 using various connection techniques as previously described with reference to connection with collar 38 (e.g., features, couplings, screws, bolts, threading, interlocks clips, pins, adhesives and/or chemical bonding).

In one or more embodiments, in addition to or in lieu of end caps 260, collars 38 may be adapted to have a cured exterior surface similar to that of end caps 260. Additionally or alternatively, in one or more embodiments, collars 38 may be adapted to have a curved outer surface similar to end caps 260. In some various embodiments, for example, collars 38 may be configured so an outer surface of an inner edge of collar 38 is flush with an outer surface of roller tube 32 when connected. The illustrated collars 38 may be adapted have a curved portion that is shaped to reduce in diameter as collars 38 extend outward from the ends of roller tube 32. In one or more embodiments, the curved portion of collars 38 may be shaped to have a smooth curve substantially free of edges, bevels, and/or other transitions sharp enough to cause creases to form in a screen 200 overlaid thereon.

Exemplary Embodiments

In one or more embodiments, a retractable screen system is provided that comprises: a screen; the screen extending a height between an upper end and a lower end; the screen extending a length between a first side and a second side; a roller tube; the roller tube extending a length between a first end and a second end; the roller tube having an exterior surface; a first end cap; the first end cap connected adjacent the first end of the roller tube; the first end cap having an exterior surface; the exterior surface of the first end cap extending from an inner end to an outer end; wherein the exterior surface of the first end cap curves from a larger diameter at the inner end of the first end cap to a smaller diameter at the outer end of the first end cap; a second end cap; the second end cap connected to the second end of the roller tube; the second end cap having an exterior surface; the exterior surface of the second end cap extending from an inner end to an outer end; wherein the exterior surface of the second end cap curves from a larger diameter at the inner end of the second end cap to a smaller diameter at the outer end of the second end cap; wherein the upper end of screen is connected to the roller tube; wherein the screen is opened by rotating the roller tube in a first direction which causes the screen to wrap around the exterior surface of the roller tube; wherein when the screen wraps around the roller tube the first side of the screen wraps around the curved exterior surface of the first end cap when the screen wraps around the roller tube; and wherein when the screen wraps around the roller tube the second side of the screen wraps around the curved exterior surface of the second end cap when the screen wraps around the roller tube.

In one or more implementations, the larger diameter of the first end cap approximately matches the diameter of the roller tube.

In one or more implementations, the first end cap is connected to a collar that is connected to the roller tube. In one or more implementations, the position of the first end cap is adjustable towards and away from the first end of the roller tube.

In one or more implementations, the position of the first end cap is adjustable along a length of an axis of rotation that extends through the center of the roller tube.

In one or more implementations, the position of the first end cap is adjustable along a length of an axle that extends outward from the first end of the roller tube.

In one or more implementations, the position of the first end cap is adjustable relative to the first end of the roller tube.

In one or more implementations, the exterior surface of the first end cap and the exterior surface of the second end cap are convex surfaces.

In one or more implementations, the first end cap includes a plurality of segments, wherein the plurality of segments are configured and arranged to independently connect to an end surface of the first end of the roller tube.

In one or more implementations, the first end cap is connected to the first end of the roller tube by one or more first features configured and arranged to connect to one or more second features of the first end of the roller tube.

In one or more implementations, the first end cap is connected to the first end of the roller tube by one or more first features configured and arranged to connect to one or more second features of the first end of the roller tube; and wherein the one of more first features include one of more fingers, the one or more second features include one or more recesses, and the one or more fingers are configured and arranged to mate with the one or more recesses.

In one or more implementations, the first end cap includes a plurality of protrusions and the roller tube includes a plurality of openings, wherein the first end cap is connected to the first end of the roller tube by inserting the protrusions of the end cap into the openings of the roller tube.

In one or more implementations, the first end cap is connected to the first end of the roller tube by a first set of threads on the first end cap that are configured and arranged to engage a second set of threads on the first end of the roller tube.

In one or more implementations, the first end cap is connected to the first end of the roller tube by a first set of threads on the first end cap that are configured and arranged to engage a second set of threads on the first end of the roller tube.

In one or more implementations, wherein first end cap includes a plurality of flexible arms extending outward from the inner end of the first end cap toward the outer end of the first end cap.

In one or more implementations, the first end cap includes a plurality of flexible arms extending outward from the inner end of the first end cap to the outer end of the first end cap; and wherein the plurality of flexible arms are configured to flex inward toward an axis of rotation of the roller tube.

In one or more implementations, the screen includes a first interlock at the first side of the screen and a second interlock at the second side of the screen, the first and second interlocks having a thickness larger than a thickness of the screen.

In one or more implementations, the retractable screen system further comprises: a first track assembly positioned adjacent the first side of the screen; the first track assembly having a first elongate channel and a first screen receiver configured to receive the first interlock; a first magnet associated with one of the elongate channel and the screen receiver of the first track assembly; a first magnetic member associated with the other of the elongate channel and the screen receiver of the first track assembly; and wherein a magnetic bond is formed between the first magnet and the first magnetic member of the of the first track assembly.

In one or more implementations, the system further comprises: a first track assembly positioned adjacent the first side of the screen; the first track assembly having a second elongate channel and a second screen receiver configured to receive the second interlock; a first magnet associated with one of the elongate channel and the screen receiver of the first track assembly; a first magnetic member associated with the other of the elongate channel and the screen receiver of the first track assembly; and wherein a magnetic bond is formed between the first magnet and the first magnetic member of the of the first track assembly.

In one or more implementations, the system further comprises: a first length adjustment member associated with the first end cap; a second length adjustment member associated with the second end cap; and wherein the first length adjustment member is configured and arranged to facilitate the adjustment of the position of the first end cap relative to the first end of the roller tube; wherein the second length adjustment member is configured and arranged facilitate the adjustment of the position of the second end cap relative to the second end of the roller tube.

In one or more embodiments, a retractable screen system is provided that comprises: a screen; the screen extending a length between a first side and a second side; the screen extending a height between an upper end and a lower end; a roller tube, wherein the upper end of the screen is operably connected adjacent the roller tube and extends beyond the ends of the roller tube; a first end cap is operably connected adjacent a first end of the roller tube; a second end cap connected to a second end of the roller tube; wherein the first end cap has an exterior surface having a convex curved shape; and wherein the second end cap has an exterior surface having a convex curved shape.

In one or more implementations, the convex curved shape of the first end cap extends from a larger diameter adjacent that approximately matches the diameter of the roller tube to a smaller diameter.

In one or more implementations, the first end cap is connected to a collar that is connected to the roller tube.

In one or more implementations, the position of the first end cap is adjustable towards and away from the first end of the roller tube.

In one or more implementations, the position of the first end cap is adjustable along a length of an axis of rotation that extends through the center of the roller tube.

In one or more implementations, the position of the first end cap is adjustable along a length of an axle that extends outward from the first end of the roller tube.

In one or more implementations, the position of the first end cap is adjustable relative to the first end of the roller tube.

In one or more implementations, the first end cap includes a plurality of segments; wherein the plurality of segments are configured and arranged to independently connect adjacent the first end of the roller tube.

In one or more implementations, the first end cap is connected to the first end of the roller tube by one or more first features configured and arranged to connect to one or more second features of the first end of the roller tube.

In one or more implementations, the first end cap is connected to the first end of the roller tube by one or more first features configured and arranged to connect to one or more second features of the first end of the roller tube; and wherein the one of more first features of the first end cap include one of more fingers, the one or more second features of the first end of the roller tube include one or more recesses, and the one or more fingers are configured and arranged to mate with the one or more recesses.

In one or more implementations, the exterior surface of the first end cap extends from an inner end to an outer end; wherein first end cap includes a plurality of flexible arms extending outward from the inner end of the exterior surface of the first end cap to the outer end of the exterior surface of the first end cap.

In one or more implementations, the exterior surface of the first end cap extends from an inner end to an outer end; wherein first end cap includes a plurality of flexible arms extending outward from the inner end of the exterior surface of the first end cap to the outer end of the exterior surface of the first end cap; and wherein the plurality of flexible arms are configured to flex inward toward an axis of rotation of the roller tube.

In one or more implementations, wherein the first end cap is connected to the first end of the roller tube by an adhesive.

In one or more implementations, wherein the first end cap is connected to the first end of the roller tube by a first set of threads on the first end cap that are configured and arranged to engage a second set of threads on the first end of the roller tube.

In one or more implementations, the screen includes a first interlock at the first side of the screen and a second interlock at the second side of the screen, the first and second interlocks having a thickness larger than a thickness of the screen.

In one or more embodiments, a retractable screen system is provided that comprises: a first track assembly positioned adjacent the first side of the screen; the first track assembly having a first elongate channel and a first screen receiver configured to receive the first interlock; a first magnet associated with one of the elongate channel and the screen receiver of the first track assembly; a first magnetic member associated with the other of the elongate channel and the screen receiver of the first track assembly; and wherein a magnetic bond is formed between the first magnet and the first magnetic member of the of the first track assembly.

In one or more implementations, the system further comprises: a first track assembly positioned adjacent the first side of the screen; the first track assembly having a second elongate channel and a second screen receiver configured to receive the second interlock; a first magnet associated with one of the elongate channel and the screen receiver of the first track assembly; a first magnetic member associated with the other of the elongate channel and the screen receiver of the first track assembly; and wherein a magnetic bond is formed between the first magnet and the first magnetic member of the of the first track assembly.

In one or more embodiments, a retractable screen system is provided that comprises: a screen; the screen extending a length between a first side and a second side; the screen extending a height between an upper end and a lower end; a bottom bar; the bottom bar connected to the lower end of the screen; a roller tube; the upper end of the screen connected to the roller tube; a motor; the motor operatively connected to the roller tube; wherein operation of the motor causes rotation of the roller tube thereby opening or closing the screen; a first track assembly; the first track assembly positioned adjacent the first side of the screen; the first track assembly having an elongate channel and a screen receiver; a second track assembly; the second track assembly positioned adjacent the second side of the screen; the second track assembly having an elongate channel and a screen receiver; wherein the first track assembly and the second track assembly provide tension on the screen through magnetic attraction; a first end cap; the first end cap connected to the first end of the roller tube; the first end cap having an exterior surface the exterior surface of the first end cap extending from an inner end to an outer end; a second end cap; the second end cap connected to the second end of the roller tube; wherein the upper end of the screen is connected to the roller tube; the second end cap having an exterior surface; the exterior surface of the second end cap extending from an inner end to an outer end; wherein when the screen is connected to the roller tube, the screen wraps around the exterior surface of the roller tube; wherein when the screen is connected to the roller tube, the first side of the screen extends past the first end of the roller tube, and the second side of the screen extends past the second end of the roller tube; and wherein the exterior surface of the first end cap and the exterior surface of the second end cap curve from the exterior surface of the roller tube to a smaller diameter thereby providing a smooth transition for the screen and preventing creases in the screen when the screen wraps around the roller tube.

In one or more implementations, the system further comprises: a first length adjustment member associated with the first end cap; a second length adjustment member associated with the second end cap; and wherein the first length adjustment member is configured and arranged to facilitate the adjustment of the position of the first end cap relative to the first end of the roller tube; wherein the second length adjustment member is configured and arranged facilitate the adjustment of the position of the second end cap relative to the second end of the roller tube.

In one or more implementations, the system further comprises: a first track assembly positioned adjacent the first side of the screen; the first track assembly having a first elongate channel and a first screen receiver configured to receive a first interlock connected to the first side of the screen; a first magnet associated with one of the first elongate channel and the first screen receiver of the first track assembly; a first magnetic member associated with the other of the first elongate channel and the first screen receiver of the first track assembly; and wherein a magnetic bond is formed between the first magnet and the first magnetic member of the of the first track assembly.

In one or more implementations, the system further comprises: a second track assembly positioned adjacent the second side of the screen; the second track assembly having a second elongate channel and a second screen receiver configured to receive a second interlock connected to the second side of the screen; a first magnet associated with one of the second elongate channel and the second screen receive of the second track assembly; a first magnetic member associated with the other of the second elongate channel and the second screen receiver of the first track assembly; and wherein a magnetic bond is formed between the first magnet and the first magnetic member of the of the second track assembly.

In one or more implementations, the system further comprises: a roller tube; the roller tube extending a length from a first end to a second end; the roller tube having an exterior surface; a screen; the screen extending a length between a first side and a second side; the screen extending a height between an upper end and a lower end; the screen having a first interlock connected to the first side; the first interlock having a thickness that is greater than a thickness of the screen; a first end cap operably connected adjacent the first end of the roller tube; the first end cap having an exterior surface having a convex curved shape that extends from a larger diameter adjacent its inner end to a smaller diameter adjacent its outer end; a first length adjustment member associated with the first end cap; wherein the first length adjustment member is configured and arranged to facilitate the adjustment of the position of the first end cap relative to the first end of the roller tube; wherein when the roller tube is rotated in a first direction the screen is raised by wrapping the screen around the exterior surface of the roller tube; wherein when the roller tube is rotated in a second direction, opposite the first direction, the screen is lowered by unwrapping the screen from around the exterior surface of the roller tube; wherein when the screen is wrapped around the roller tube, the first interlock wraps around the curved exterior surface of the first end cap; wherein when the position of the first end cap is adjusted relative to the first end of the roller tube this affects where the first interlock wraps around the first end cap thereby affecting the effective rate at which the first interlock wraps around the first end cap.

In one or more implementations, when the first end cap is adjusted outward, away from the first end of the roller tube, the effective rate at which the first interlock wraps around the first end cap is increased. In one or more implementations, when the first end cap is adjusted inward, toward the first end of the roller tube, the effective rate at which the first interlock wraps around the first end cap is decreased. In one or more implementations, the larger diameter of the first end cap approximately matches the diameter of the exterior surface of the roller tube.

In one or more implementations, the first end cap is connected to a collar that is connected to the roller tube.

In one or more implementations, the position of the first end cap is adjustable along a length of an axis of rotation that extends through the center of the roller tube.

In one or more implementations, the position of the first end cap is adjustable along a length of an axle that extends outward from the first end of the roller tube.

In one or more implementations, first end cap includes a plurality of flexible arms extending outward from the inner end of the first end cap toward the outer end of the first end cap.

In one or more implementations, first end cap includes a plurality of flexible arms extending outward from the inner end of the first end cap to the outer end of the first end cap; and wherein the plurality of flexible arms are configured to flex inward toward an axis of rotation of the roller tube.

In one or more implementations, the system further comprises: a first track assembly positioned adjacent the first side of the screen; the first track assembly having a first elongate channel and a first screen receiver configured to receive the first interlock; a first magnet associated with one of the first elongate channel and the first screen receiver of the first track assembly; a first magnetic member associated with the other of the first elongate channel and the first screen receiver of the first track assembly; and wherein a magnetic bond is formed between the first magnet and the first magnetic member of the of the first track assembly.

In one or more embodiments, a retractable screen system is provided that comprises: a roller tube; the roller tube extending a length from a first end to a second end; a screen; the screen extending a length between a first side and a second side; the screen extending a height between an upper end and a lower end; the screen having a first interlock adjacent a first side of the screen; the screen having a second interlock adjacent a second side of the screen; the upper end of the screen operably connected to the roller tube; a first end cap; the first end cap having a curved exterior surface that extends from a larger diameter to a smaller diameter; the first end cap positioned adjacent the first end of the roller tube; a second end cap; the second end cap having a curved exterior surface that extends from a larger diameter to a smaller diameter; the second end cap positioned adjacent the second end of the roller tube; wherein when the roller tube is rotated in a first direction the screen wraps around the roller tube; wherein when the screen wraps around the roller tube the first interlock wraps around adjacent the first end cap; wherein when the screen wraps around the roller tube the second interlock wraps around adjacent the second end cap; wherein the position of the first end cap is adjustable relative to the first end of the roller tube so as to adjust where the first interlock engages the curved exterior surface of the first end cap; wherein the position of the second end cap is adjustable relative to the second end of the roller tube so as to adjust where the second interlock engages the curved exterior surface of the second end cap.

In one or more implementations, the system further comprises: a first magnetic track assembly; the first magnetic track assembly positioned adjacent the first end of the roller tube; wherein the first interlock of the screen is received within an opening in the first magnetic track assembly.

In one or more implementations, the larger diameter of the first end cap approximately matches a diameter of the roller tube.

In one or more implementations, the first end cap is connected to a collar that connects to the roller tube.

In one or more implementations, the position of the first end cap is adjustable towards and away from the first end of the roller tube.

In one or more implementations, the position of the first end cap is adjustable along a length of an axis of rotation that extends through the center of the roller tube.

In one or more implementations, the position of the first end cap is adjustable along a length of an axle that extends outward from the first end of the roller tube.

In one or more implementations, first end cap includes a plurality of flexible arms that extend outward from an inner end to an outer end.

In one or more implementations, when the first end cap is adjusted outward, away from the first end of the roller tube, the rate at which the first interlock wraps around the first end cap is increased.

In one or more implementations, when the first end cap is adjusted inward, toward the first end of the roller tube, the rate at which the first interlock wraps around the first end cap is decreased.

In one or more embodiments, a retractable screen system is provided that comprises: a roller tube; the roller tube extending a length from a first end to a second end; a screen; the screen extending a length between a first side and a second side; the screen extending a height between an upper end and a lower end; the upper end of the screen operably connected to the roller tube; a first end cap; the first end cap having a curved exterior surface; the first end cap positioned adjacent the first end of the roller tube; a second end cap; the second end cap having a curved exterior surface; the second end cap positioned adjacent the second end of the roller tube; wherein when the roller tube is rotated the screen wraps around the roller tube the side of the screen wraps around adjacent the first end cap and the second side of the screen wraps around adjacent the second end cap; wherein the position of the first end cap is adjustable relative to the first end of the roller tube so as to adjust where the first side of the screen engages the curved exterior surface of the first end cap; wherein the position of the second end cap is adjustable relative to the second end of the roller tube so as to adjust where the second side of the screen engages the curved exterior surface of the second end cap.

Further Alternative Arrangements:

With reference to FIGS. 81-87, various alternative arrangements of retractable screen systems 10 having magnetic track assemblies 100 are presented. Some components of motorized screen system 10 having magnetic track assemblies 100 presented in FIGS. 81-87 are similar to those of retractable screen system 10 having magnetic track assemblies 100 presented in FIGS. 1-80 and therefore the teaching presented herein with respect to FIGS. 1-80 may be applied to and is incorporated into the teaching presented in FIGS. 81-87 unless specifically stated otherwise.

Figure 80:
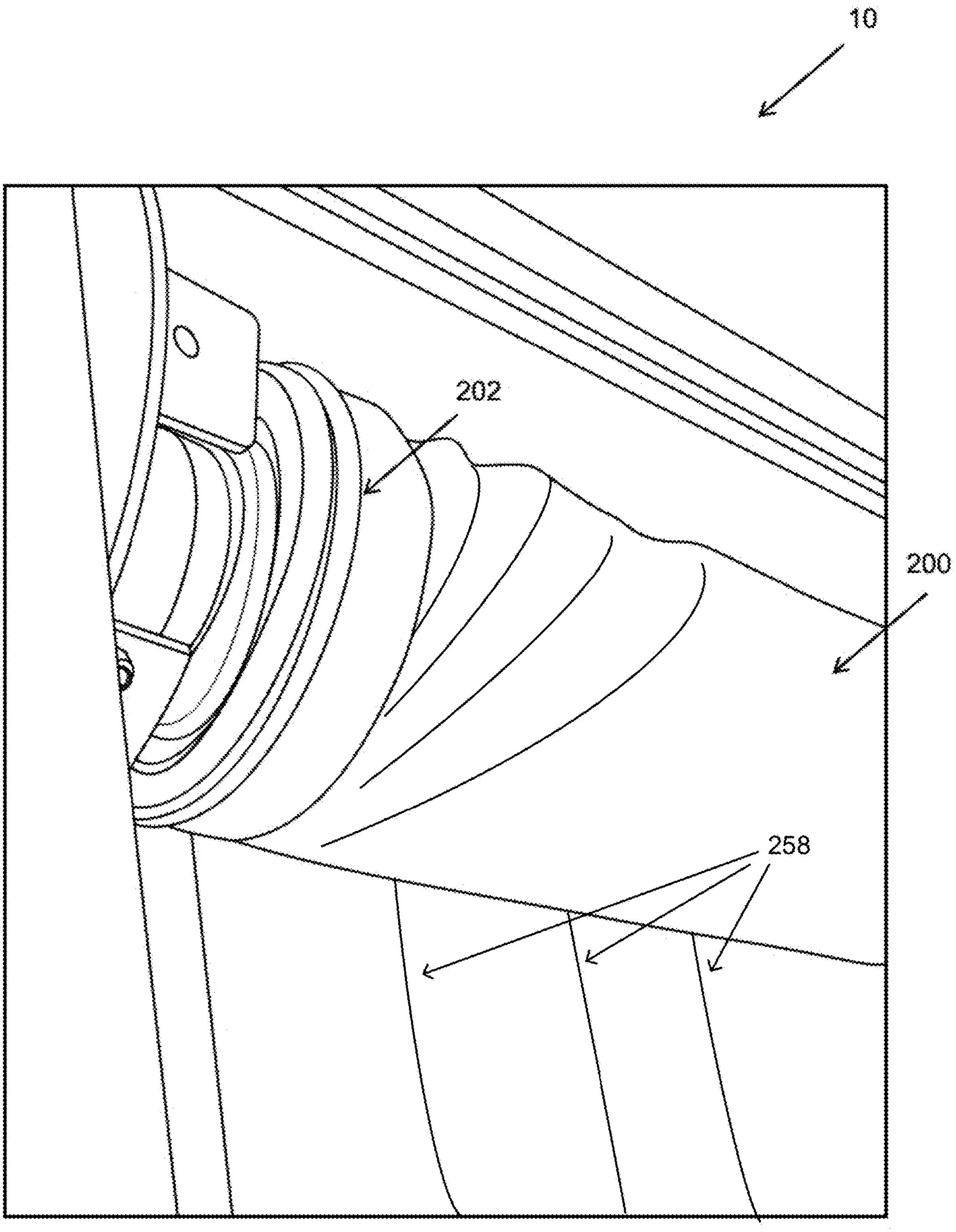
FIG. 80 shows a lower front right perspective view of a retractable screen system with the interlock of the screen bunching up on a roller tube; the view showing visible artifacts in the screen causes by the bunching.
Figure 81:
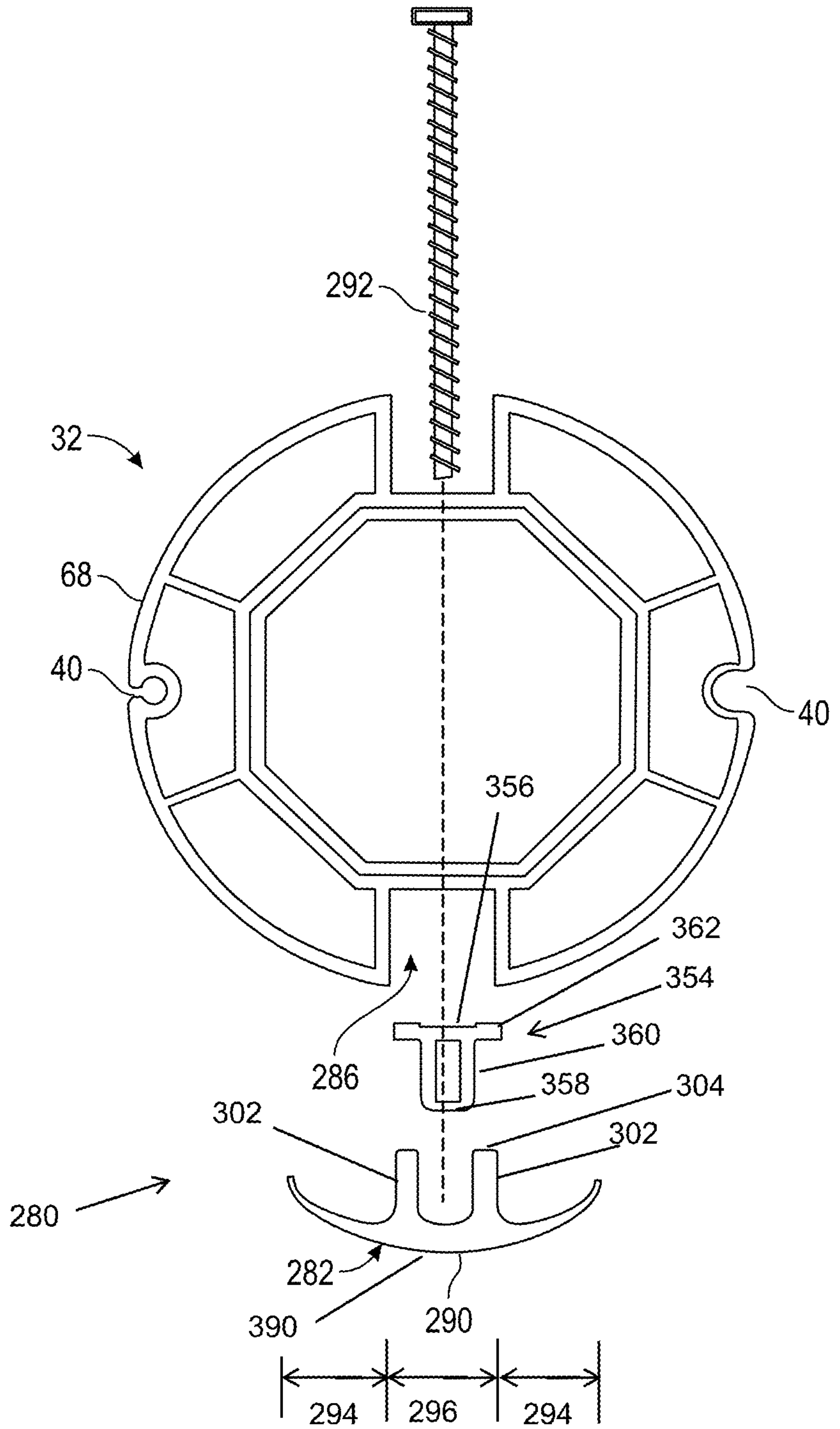
FIG. 81 shows a cross section exploded side view of a roller tube and circumference adjustment assembly, in accordance with one or more embodiments; the view showing the circumference adjustment assembly inserted in a channel of the roller tube; the view showing a control mechanism configured to adjust the position the circumference adjustment assembly infinitely between a fully raised position and a fully retracted position; the view showing the control mechanism being a threaded fastener and the adjustment member as a generally t-shaped member that has a curved exterior surface the moves inward and outward thereby adjusting the effective diameter of the roller tube.
Figure 82:
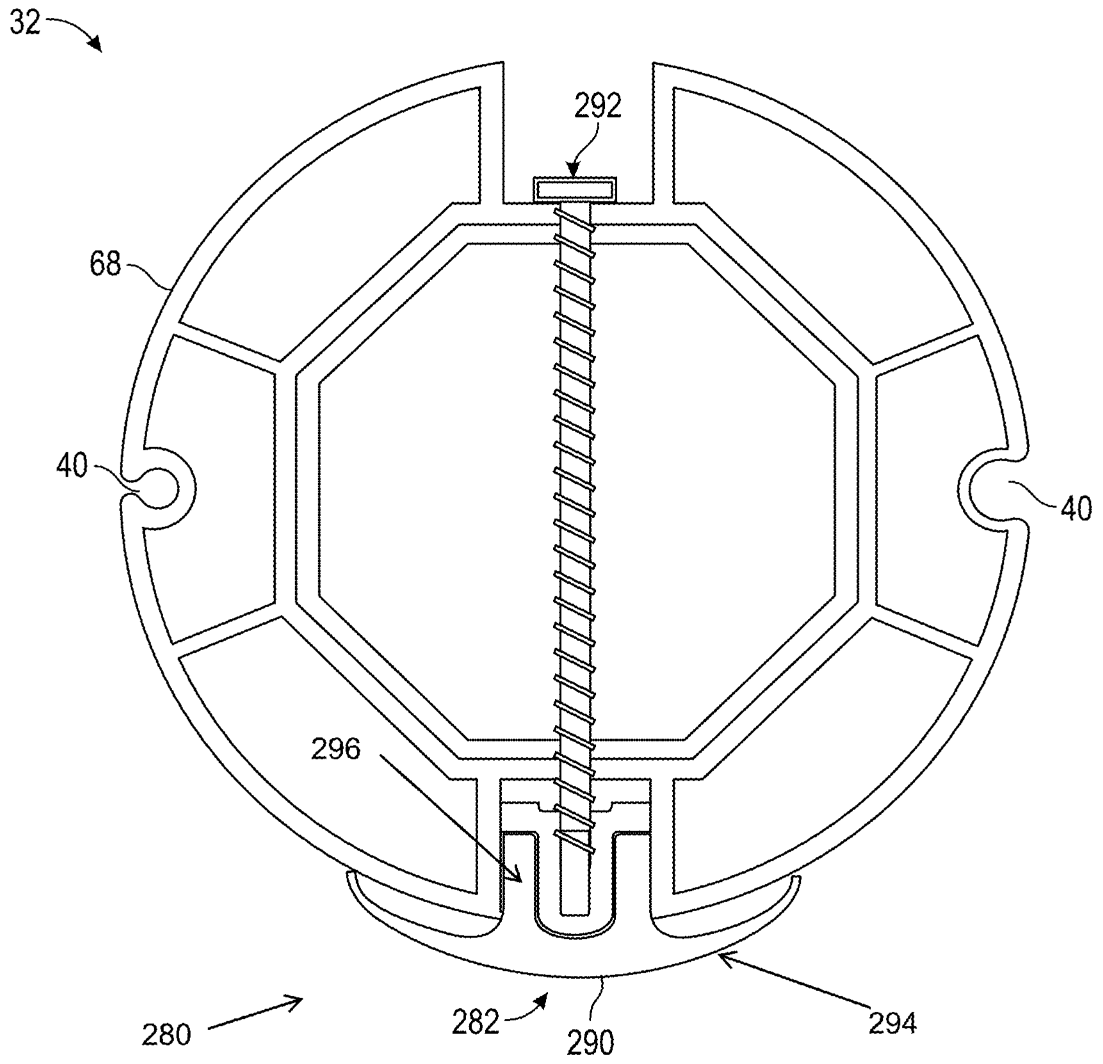
FIG. 82 shows a cross section side view of a roller tube and circumference adjustment assembly, as is shown in FIG. 82, in accordance with one or more embodiments; the view showing the adjustment member in a partially extended position.
Figure 83:
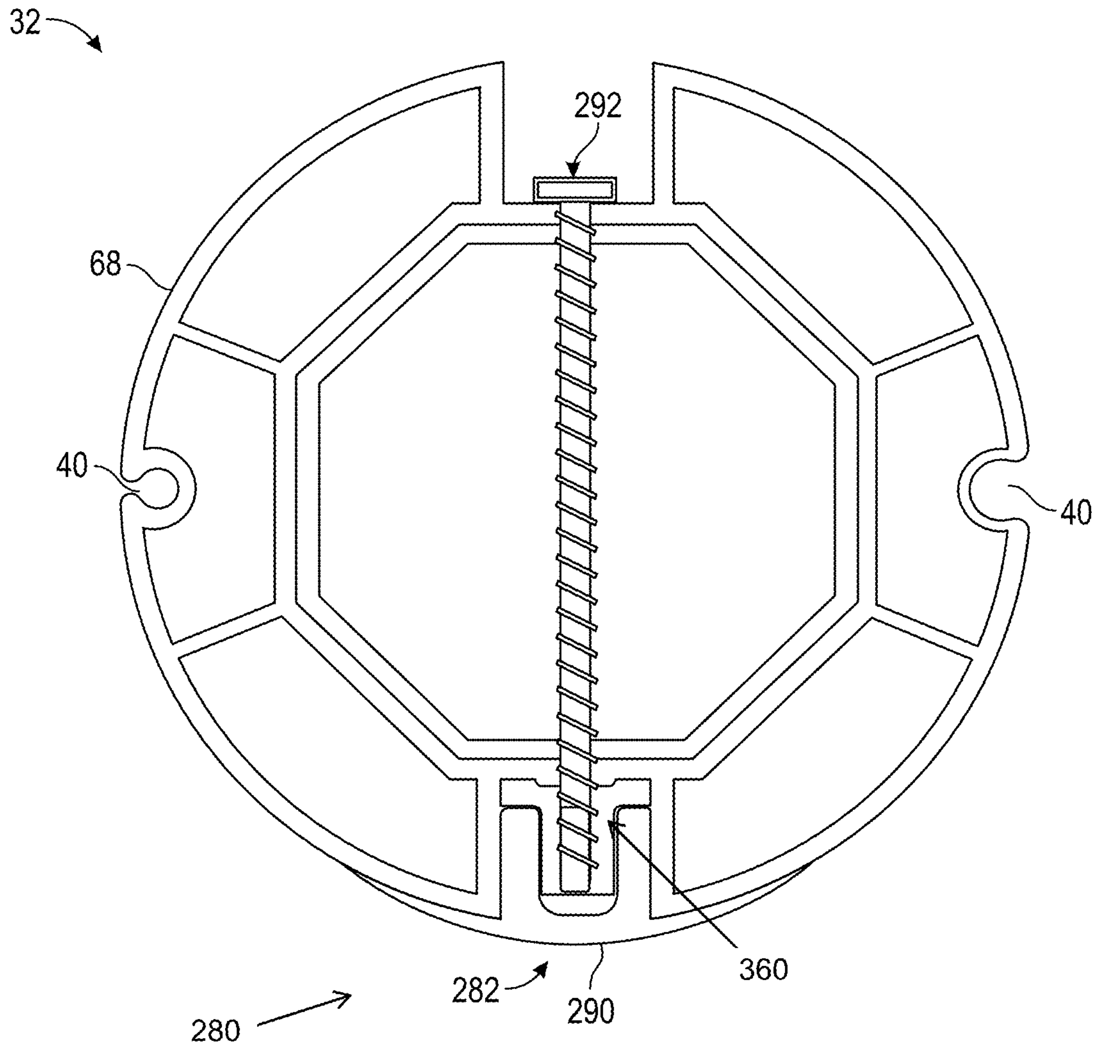
FIG. 83 shows a cross section side view of a roller tube and circumference adjustment assembly, in accordance with one or more embodiments; the view showing the circumference adjustment assembly inserted in a channel of the roller tube; the view showing control mechanism configured to position the circumference adjustment assembly in a fully inserted position.
Figures 84A, 84B, 84C:
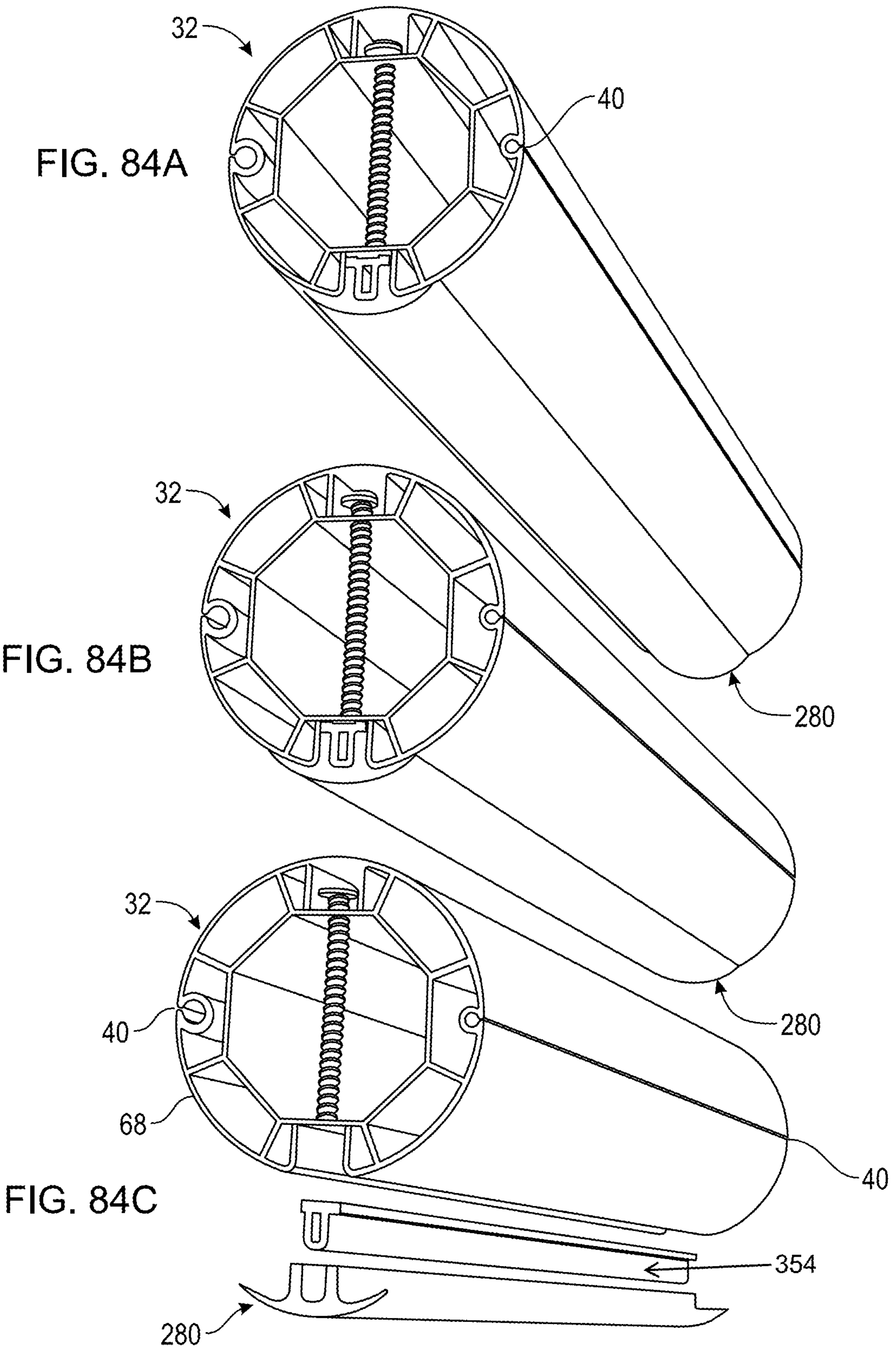
FIG. 84A shows a lower front right perspective view of a roller tube and circumference adjustment assembly, in accordance with one or more embodiments; the view showing the roller tube with the circumference adjustment assembly with the circumference adjustment assembly partially raised from the roller tube.
FIG. 84B shows a lower front right perspective view of a roller tube and circumference adjustment assembly, in accordance with one or more embodiments; the view showing the roller tube with the circumference adjustment assembly fully inserted in the roller tube.
FIG. 84C shows a lower front right perspective view of a roller tube and circumference adjustment assembly, in accordance with one or more embodiments; the view showing the roller tube with the circumference adjustment assembly exploded from the roller tube.
Figure 85:
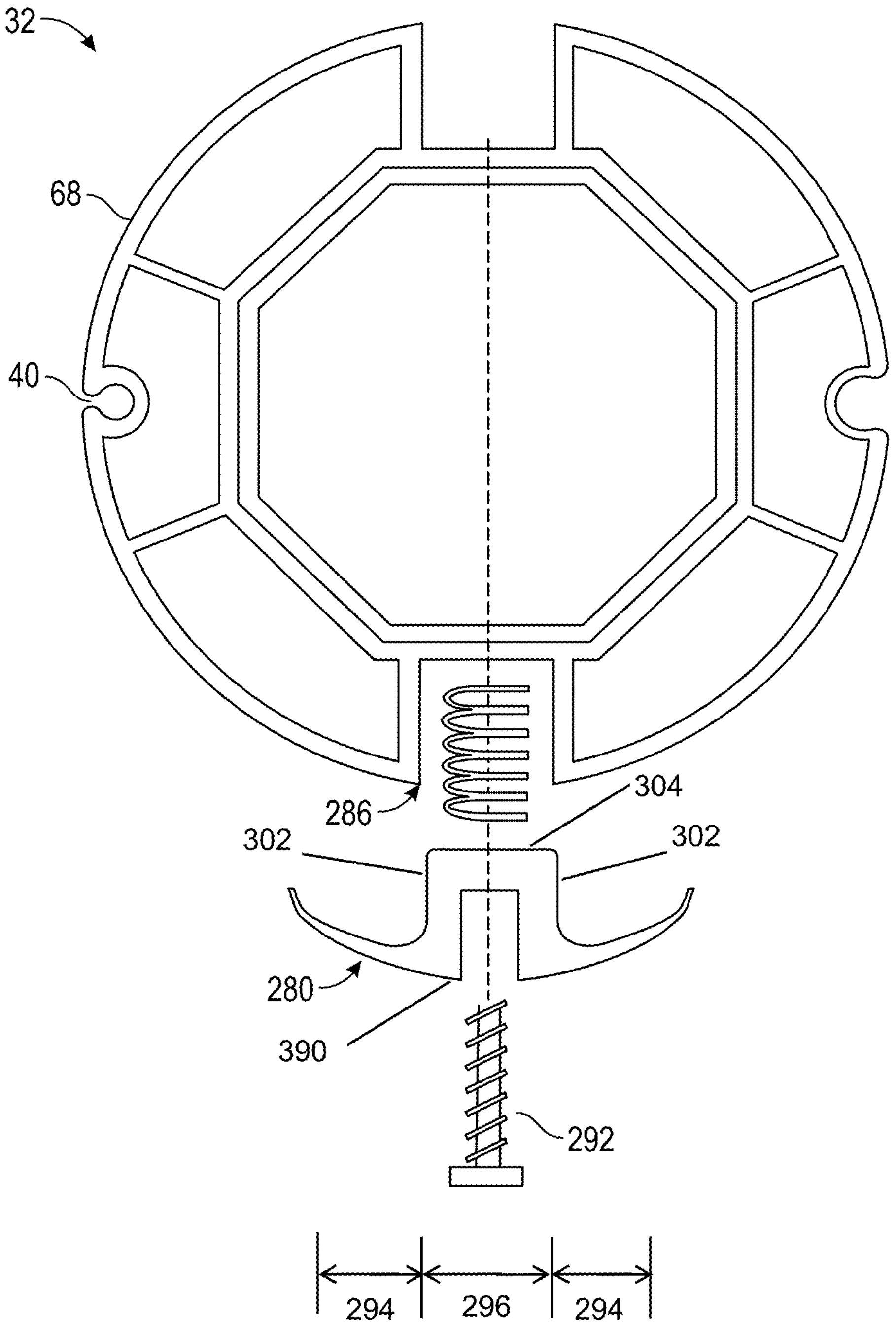
FIG. 85 shows a cross section exploded side view of a roller tube and a circumference adjustment assembly, in accordance with one or more embodiments; the view additionally showing a spring positioned around the fastener of the control assembly; the view showing the fastener of the control assembly extending through the exterior surface of the circumference adjustment assembly and into the roller tube.
Figure 86:
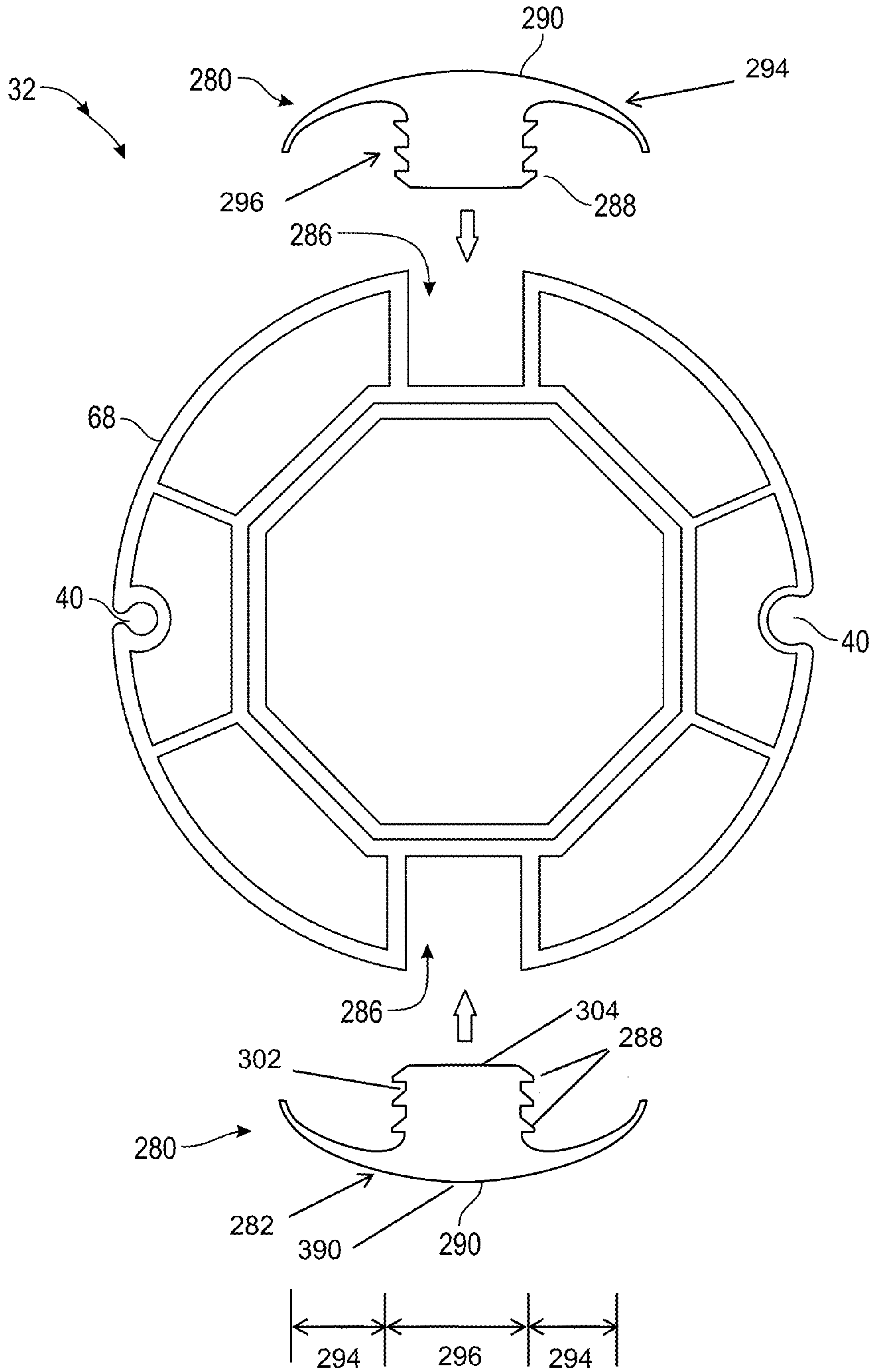
FIG. 86 shows a cross section exploded side view of a roller tube and a circumference adjustment assembly, in accordance with one or more embodiments, the view showing the sides of the circumference adjustment assembly having features, or fingers, that slide within the cavity of the roller tube thereby holding the circumference adjustment assembly in place once installed and adjusted.

Circumference Adjustment:

As described with reference to FIGS. 1-80, for example, in one or more arrangements, retractable screen system 10 may utilize an interlock 202/310 (e.g., a keder interlock, a zipper interlock, a rope, a beaded chain, or any similar interlock known in the art) to connect the upper end of screen 200 to receiver 40 of roller tube 32. The retractable screen system 10 may also utilize interlock 202/310 alongside edges of screen 200 to connect the screen 200 to magnetic track assemblies 100 and hold screen 200 material taut in a horizontal direction between magnetic track assemblies 100. A weighted bottom bar 46 may be connected to a bottom edge of screen 200 to hold screen 200 taut in a vertical direction. For larger screen sizes the weight of screen 200 and/or bottom bar 46 can cause a portion of roller tube 32 to sag under the weight. Weight of screen 200 and/or bottom bar 46 may additionally or alternatively cause stretching of material forming screen 200. As a result of such sagging and/or stretching, undesirable ripples 258, offsets and/or other visible artifacts may appear in screen 200 when deployed. It has been surprisingly discovered that such undesirable effects may be mitigated by slightly increasing the circumference of one or more portions of roller tube 32.

In one or more embodiments, a roller tube assembly 26 is additionally or alternatively configured to mitigate undesirable effects of sagging and/or stretching by taking up slack of screen 200 at one or more positions along roller tube 32. For example, in one or more embodiments, roller tube 32 includes a circumference adjustment assembly 280 configured to take up slack in screen 200 by increasing the circumference of roller tube 32, particularly at or near its middle. When roller tube 32 is rotated to cause screen 200 to wrap around roller tube 32, increased circumference in a portion of roller tube 32 causes that portion of roller tube 32 to take up a greater amount of screen 200 per rotation in comparison to portions of roller tube 32 having a smaller circumference. In this manner, roller tube 32 can be adjusted to take up slack in certain areas and reduce artifacts in screen 200.

Circumference Adjustment Assembly 280:

As shown in the disclosed arrangements, for example, one of more embodiments provide a retractable screen system 10 having a circumference adjustment assembly 280. Circumference adjustment assembly 280 is formed of any suitable size, shape, or design, and is configured to facilitate adjustment of an effective circumference of roller tube 32. As used herein, "effective circumference" refers to the circumference of an outer surface of a combination of roller tube 32 and any other materials or items (e.g., a circumference adjustment assembly 280) that are connected to roller tube 32 at a cross section at which circumference is being measured. As an illustrative example, consider a hypothetical tube with a 10 inch radius and circumference of 2*Pi*10 inches. If a 1 inch thick layer of material where wrapped around the entire circumference of hypothetical tube, the radius of the hypothetical tube and layer of material in combination would be 11 inches and the effective circumference would be 2*Pi*11 inches.

In one arrangement shown, as one example, circumference adjustment assembly 280 includes a cavity 286 in roller tube 32 and an adjustment member 282 that may be inserted into cavity 286 to adjust the effective circumference of roller tube 32 by changing the profile of a cross section of roller tube 32.

Cavity 286:

Cavity 286 is formed of any suitable, size, shape, or design, and is configured to facilitate connection of adjustment member 282 to roller tube 32 for adjustment of effective circumference. In the arrangement shown, as one example, cavity 286 is a generally rectangular shaped recessed channel formed in roller tube 32 and extending the length of roller tube 32 from end to end. However, embodiments are not so limited. Rather, it is contemplated that cavity 286 may include one or more channels, recess, holes, slots, or any other structure configured to receive and hold adjustment member 282.

Adjustment Member 282:

Adjustment member 282 is formed of any suitable, size, shape, or design, and is configured to increase the profile of the cross section and increase the effective circumference of roller tube 32 connected thereto. In the arrangement shown, as one example, adjustment member 282 has an elongated shape extending the length of roller tube 32 within cavity 286. In the arrangement shown, as one example, when viewed from the side, adjustment member 282 includes an outer portion 294 and an inner portion 296.

In this example arrangement, when viewed form the side, inner portion 294 has a generally rectangular shape extending between opposing sides 302 from an inner end 304 to an outer end 306. In this example arrangement, outer portion 294 of adjustment member 282 extends outward from outer end 306 of inner portion 296 and is configured to overlay a portion of the exterior surface 68 of roller tube 32 when inner portion 296 is placed within cavity 286 of roller tube 32, thereby increasing the profile of the cross section and increasing the effective circumference. Additionally or alternatively, outer portion 294 of adjustment member 282 may be configured to have an exterior surface 290 that extends outward from the exterior surface 68 of roller tube 32.

In one or more arrangements, adjustment member 282 is adjustable to increase effective circumference by different amounts. In an arrangement shown, as one example, adjustment member 282 is configured to adjust the amount that exterior surface 290 extends outward from the exterior surface 68 of roller tube 32 an infinite amount between a fully extended position and a fully retracted position. The farther out that adjustment member 282 extends, the more the effective circumference is increased.

In one or more arrangements, adjustment member 282 has a connection member 354 positioned in a channel 352 recessed in inner end 304 of inner portion 296. Connection member 354 is formed of any suitable size, shape, or design, and is configured to facilitate an operable connection with control assembly 284 to facilitate adjustment of the amount that exterior surface 290 extends outward from the exterior surface 68 of roller tube 32. In the arrangement shown, as one example, connection member 354 is an elongated shape extending the length of adjustment member 282. In this example arrangement, when viewed from the side, the connection member 354 has a tube portion having a generally rectangular shape having an outward end 358 and inward end 356, and opposing sides 360. In this example arrangement, connection member 354 has flanges 362 that extend outward from inward end 356. In this example arrangement, when connection member 354 is positioned in channel 352 that is recessed in inner end 304, outward surfaces of flanges 362 are in contact with inward surfaces of inner end 304 of inner position 296 of adjustment member 282.

In some various different arrangements, connection member 354 may be formed of various different materials including but not limited to metals, composite material such as plastic, fiberglass or the like, or a combination thereof. In some various arrangements, connection member 354 may provide a strong rigid component to facilitate connection with control assembly (e.g., but screwing fastener 292 through inward end 356 and between opposing sides 360). Connection member 354 may be attached within channel 352 of adjustment member 282 using various techniques known in the art, and/or various combinations thereof (e.g., adhesive bonding, chemical bonding, welding, stitching, sewing, staples, rivets, and/or any other connection means).

Control Assembly 284:

In one or more embodiments, circumference adjustment assembly 280 includes a control assembly 284 to control the amount that effective circumference is adjusted by adjustment member 282. Control Assembly 284 is formed of any suitable size, shape, or design, and is configured to adjust the amount that exterior surface 290 of adjustment member 282 extends outward from the exterior surface 68 of roller tube 32. In an arrangement shown, as one example, inner portion 296 of adjustment member 282 may be inserted into cavity 286 of roller tube 32 at different depths. In some implementations, the depth which inner portion 296 of adjustment member 282 is inserted into cavity 286 is controlled by a control assembly 284. In various embodiments, control assembly 284 may adjust the position of the circumference adjustment member 282 using various mechanisms known in the art. As one example implementation, control assembly 284 includes a fastener 292 (e.g., a screw, 292, threaded axle, or other type or fastener) having one end operationally attached to roller tube 32 and another end operationally attached to inner portion 296 or other portion of the circumference adjustment assembly 280. When fastener 292 is rotated in one direction, threads on one end of fastener 292 engage either roller tube 32 or circumference adjustment member 282 to cause roller tube 32 and circumference adjustment member 282 to move closer to one another. Conversely, when fastener 292 is rotated in the other direction, threads on one end of fastener 292 engage either roller tube 32 or circumference adjustment member 282 to cause roller tube 32 and circumference adjustment member 282 to move away from one another. By adjusting the position of circumference adjustment member 282 in cavity 286 of roller tube 32, the effective circumference may be adjusted.

In one or more embodiments, a retractable screen system 10 is configured with circumference adjustment assembly 280 that is inserted into cavity 286 of roller tube 32 and held in a fixed position. In such embodiments, adjustments to the effective circumference of roller tube 32 may be made by adding circumference adjustment assembly 280 to roller tube 32, removing a circumference adjustment assembly 280, from roller tube 32, and/or swapping out a circumference adjustment assembly 280 for a different circumference adjustment assembly 280 having a different size. The portion of circumference adjustment assembly 280 inserted into cavity 286 may be attached to roller tube 32 using a variety of techniques. In some implementations, cavity 286 and a portion of circumference adjustment assembly 280 may be sized and shaped to hold in place by friction once mated together. In some implementations, cavity 286 and inner portion 296 of adjustment member 282 may include one or more features 288 configured to hold circumference adjustment assembly 280 in place once inner portion 296 is inserted into cavity 286. Additionally or alternatively, in some embodiments, circumference adjustment assembly 280 may be connected to roller tube 32 by an adhesive or chemical bonding. Additional or alternatively, in some embodiments, circumference adjustment assembly 280 may be connected to roller tube 32 by one of more mechanical structures such as screws, bolts, threading, interlocks, clips, pins, or other coupling devices. Moreover, it is understood that circumference adjustment assembly 280 may be attached to roller tube 32 either directly or indirectly in various implementations.

Figure 87:
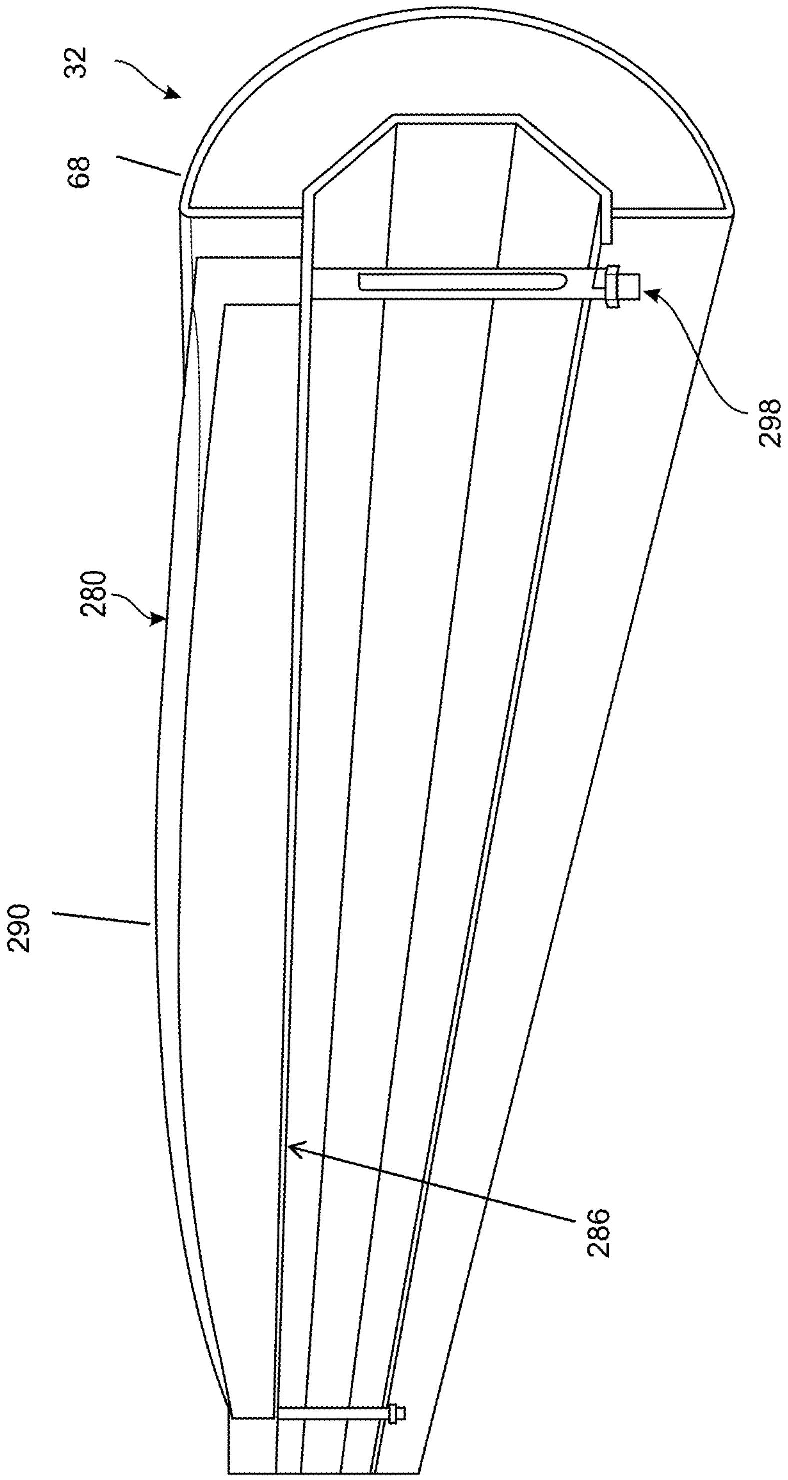
FIG. 87 shows a front left perspective view of cross section view of a roller tube and an inflatable circumference adjustment assembly, in accordance with one or more embodiments; the view showing the circumference adjustment assembly in an inflated state, the view showing a valve used to fill the circumference adjustment assembly.
Figure 88:
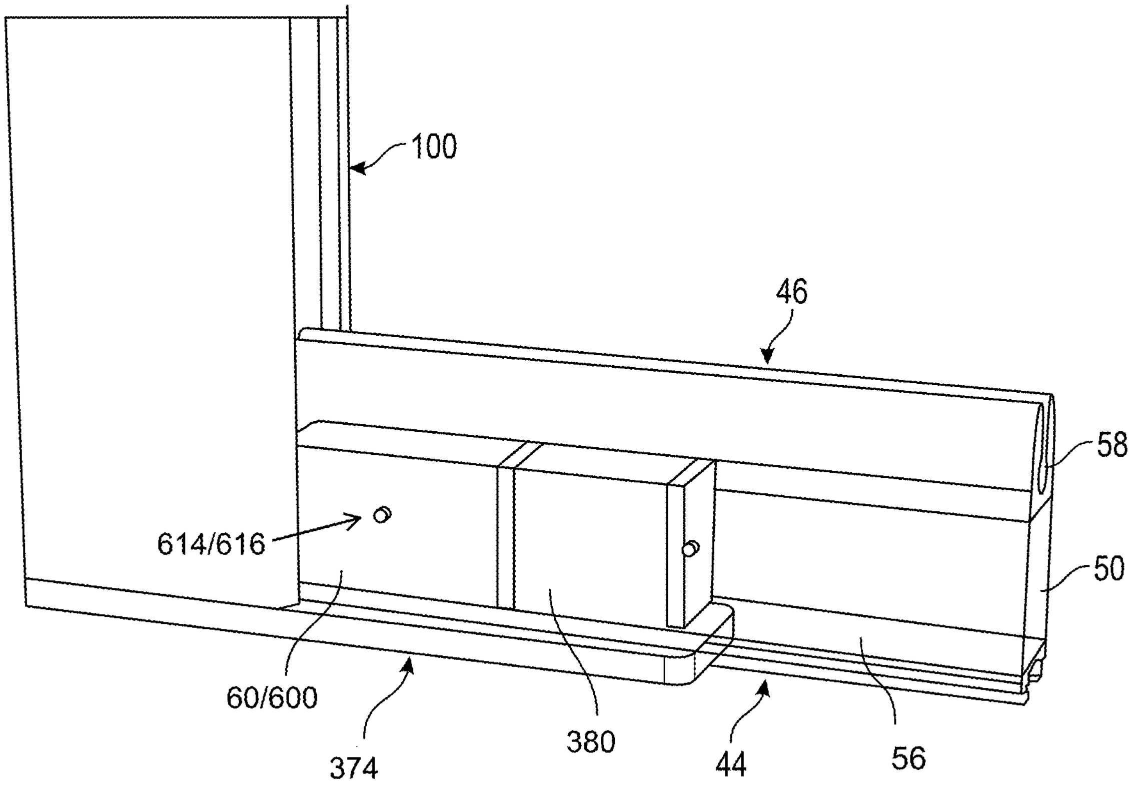
FIG. 88 shows an upper forward right side perspective view of a bottom bar assembly and a base plate of an anchor system, and track assembly, in accordance with one or more embodiments; the view showing bottom bar in a fully lowered position; the view showing the magnetic member of the bottom bar assembly magnetically attracted to the base plate thereby holding the bottom bar down.
Figure 89:
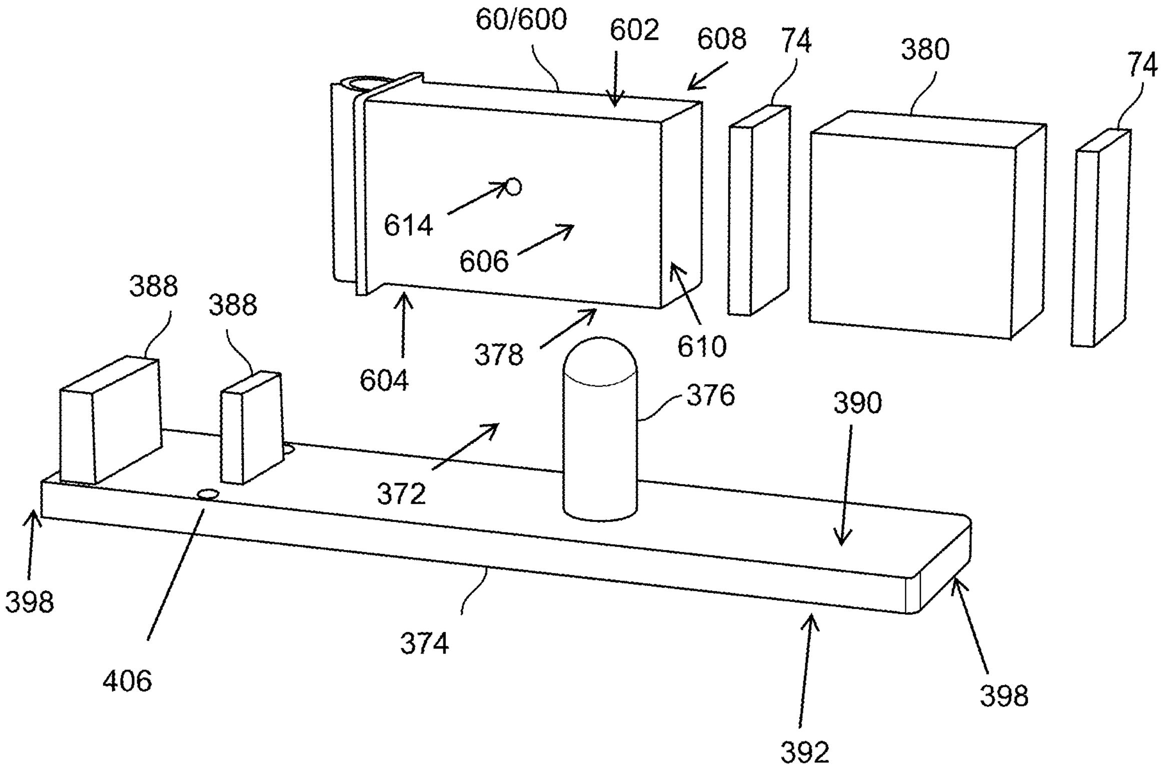
FIG. 89 shows an exploded upper forward right side perspective view of a bottom bar assembly and a base plate of an anchor system, in accordance with one or more embodiments; the view showing bottom bar omitted; the view showing the post extending upward from the base plate.
Figure 90:
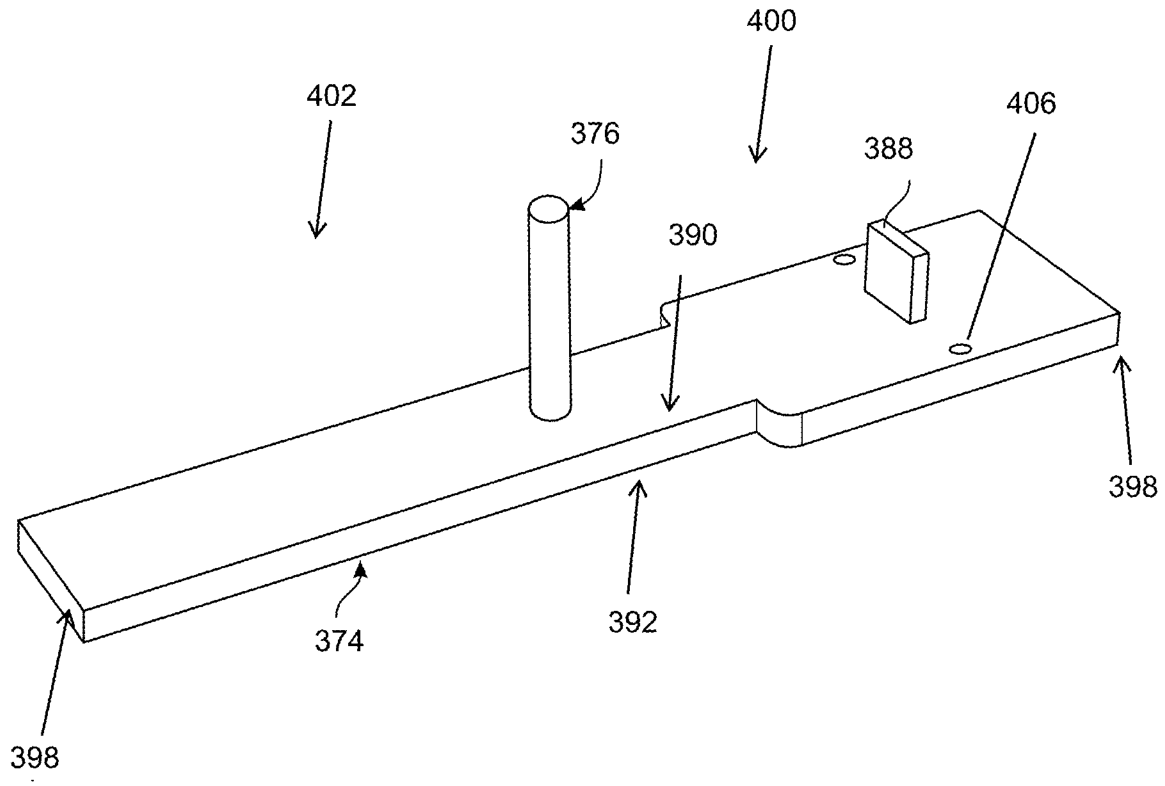
FIG. 90 shows an upper rear left perspective view of a base plate for use in an anchor system, in accordance with one or more embodiments.
Figure 91:
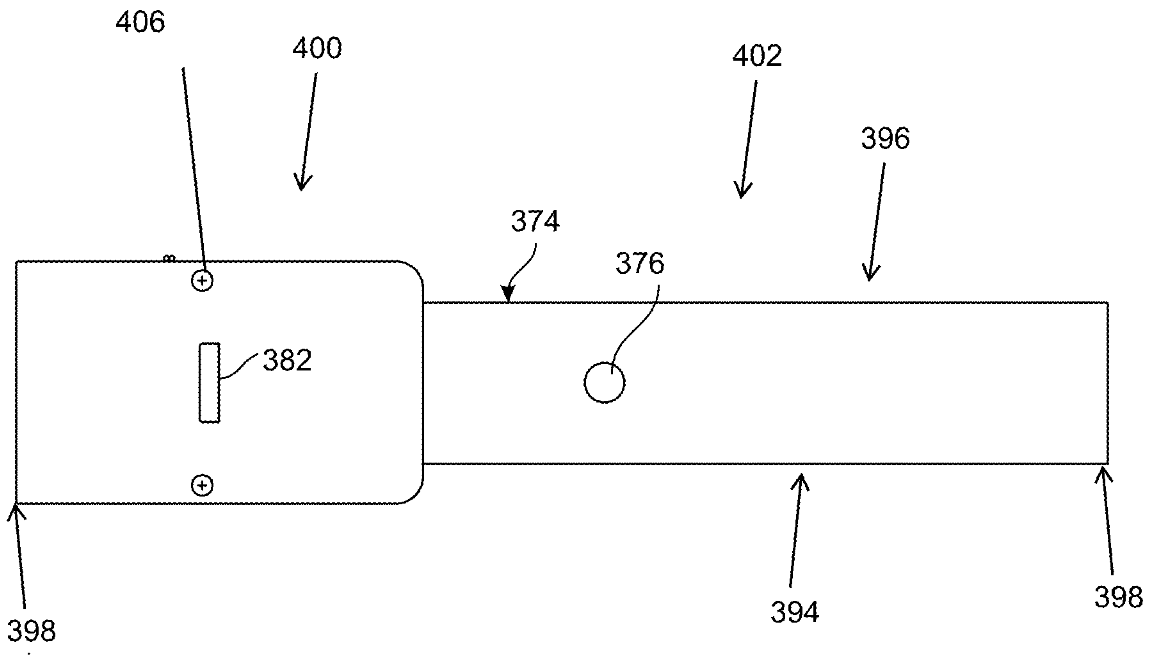
FIG. 91 shows a topside view of a base plate of an anchor system, in accordance with one or more embodiments.
Figure 92:
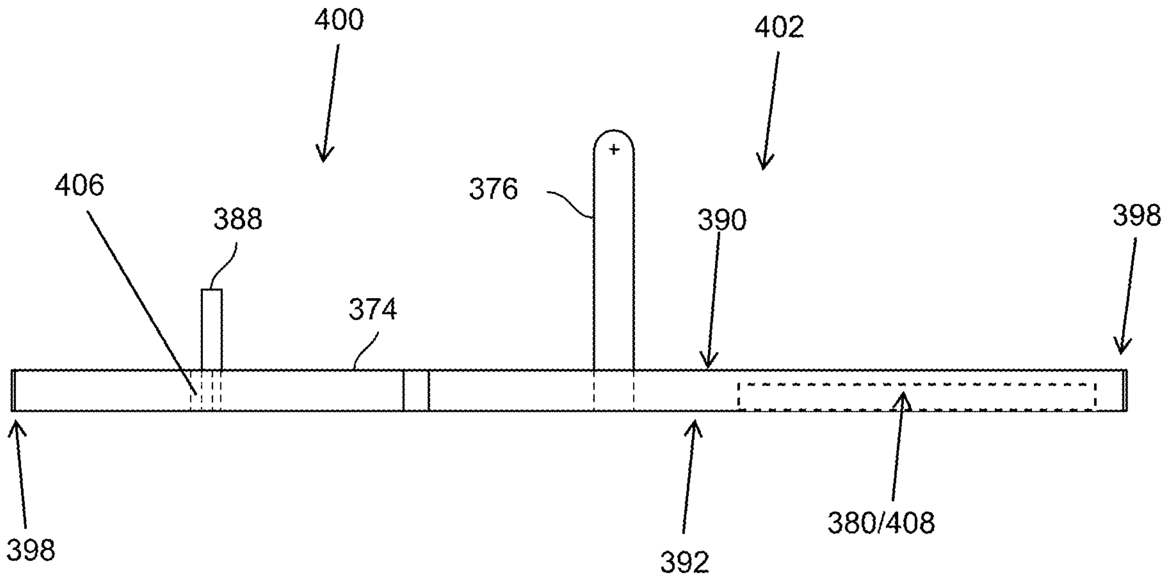
FIG. 92 shows a front view of a base plate of an anchor system, in accordance with one or more embodiments; the view showing a magnet or magnetic component positioned within the outward extension of the base plate which is configured to be positioned below the outward end of a ferrous weight bar in the bottom bar or below another magnet positioned in the end of the weight bar such that this magnetic member magnetically connects to the bottom bar and pulls the bottom bar toward the base plate.
Figure 93:
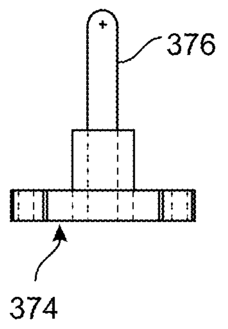
FIG. 93 shows a side view of a base plate of an anchor system, in accordance with one or more embodiments.
Figure 94A:
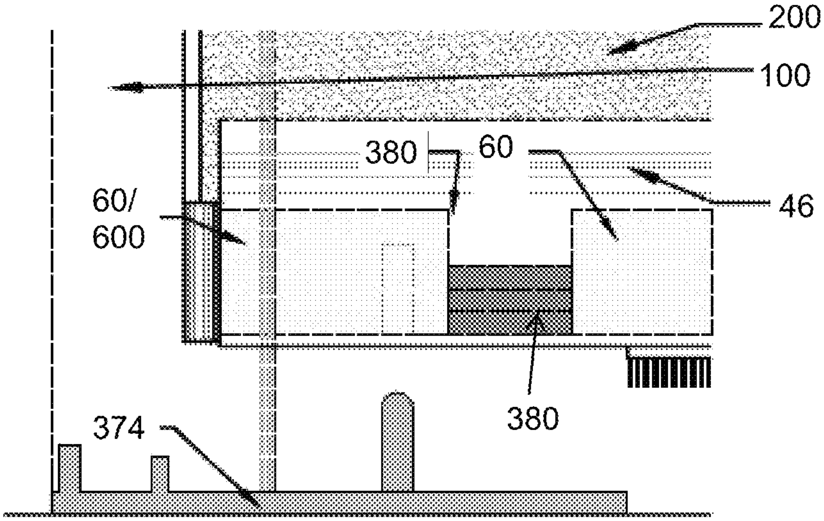
FIG. 94A shows forward view of a bottom bar assembly and a base plate of an anchor system and track assembly, in accordance with one or more embodiments; the view showing bottom bar assembly in a partially raised position.
Figure 94B:
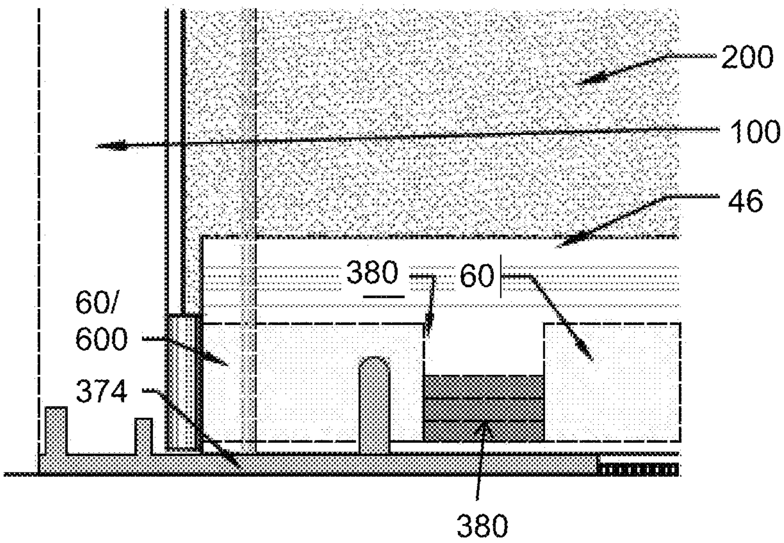
FIG. 94B shows forward view of a bottom bar assembly and a base plate of an anchor system and track assembly, in accordance with one or more embodiments; the view showing bottom bar assembly in a fully lowered position.
Figure 95:
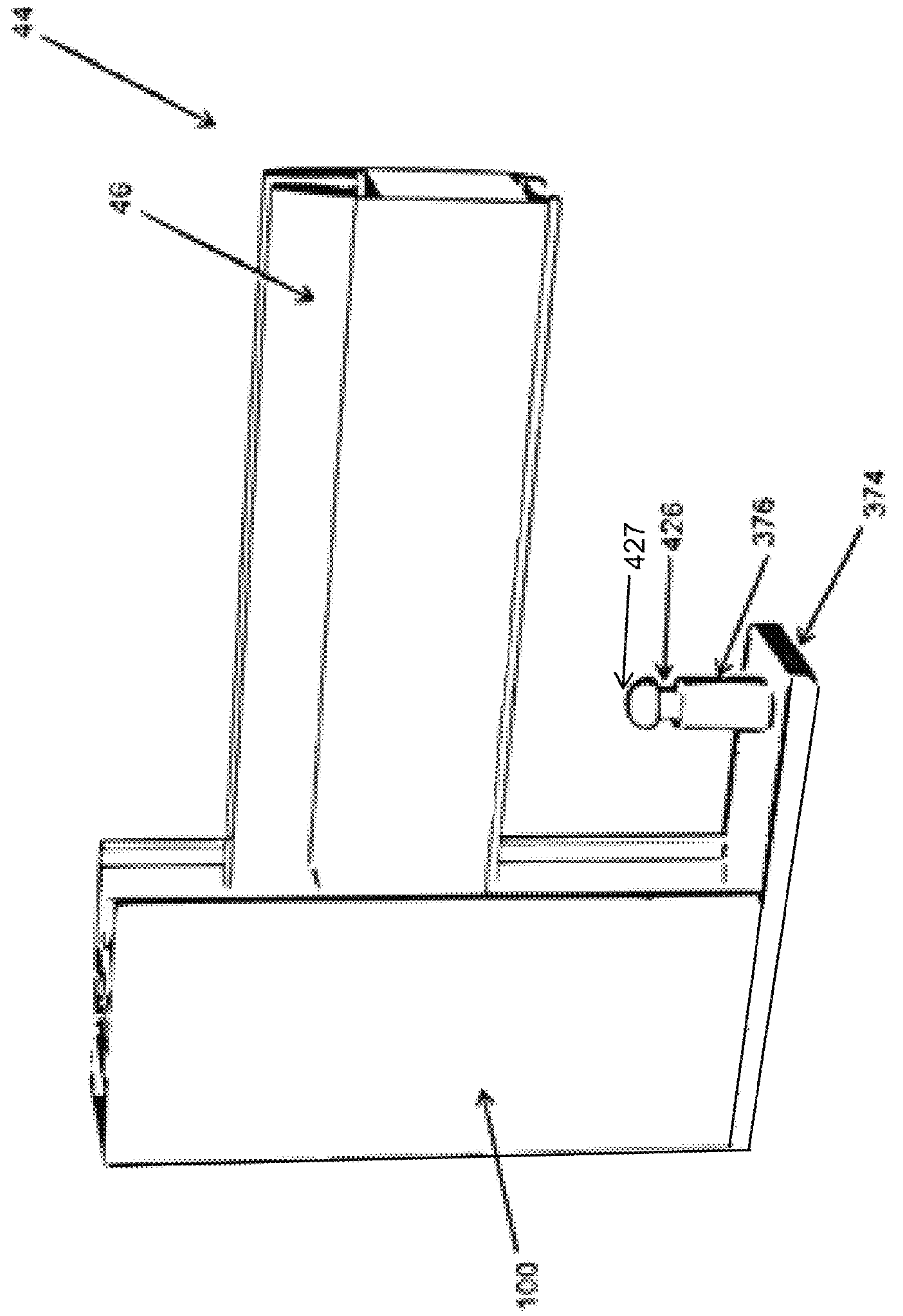
FIG. 95 shows an upper front left perspective view of a bottom bar assembly and a base plate of an anchor system and track assembly, in accordance with one or more embodiments; the view showing a mechanical interlock of the anchor system having a spring loaded latch that engages a groove or catch in the post of the base plate of the anchor system; the view showing bottom bar assembly in a raised position.
Figure 96:
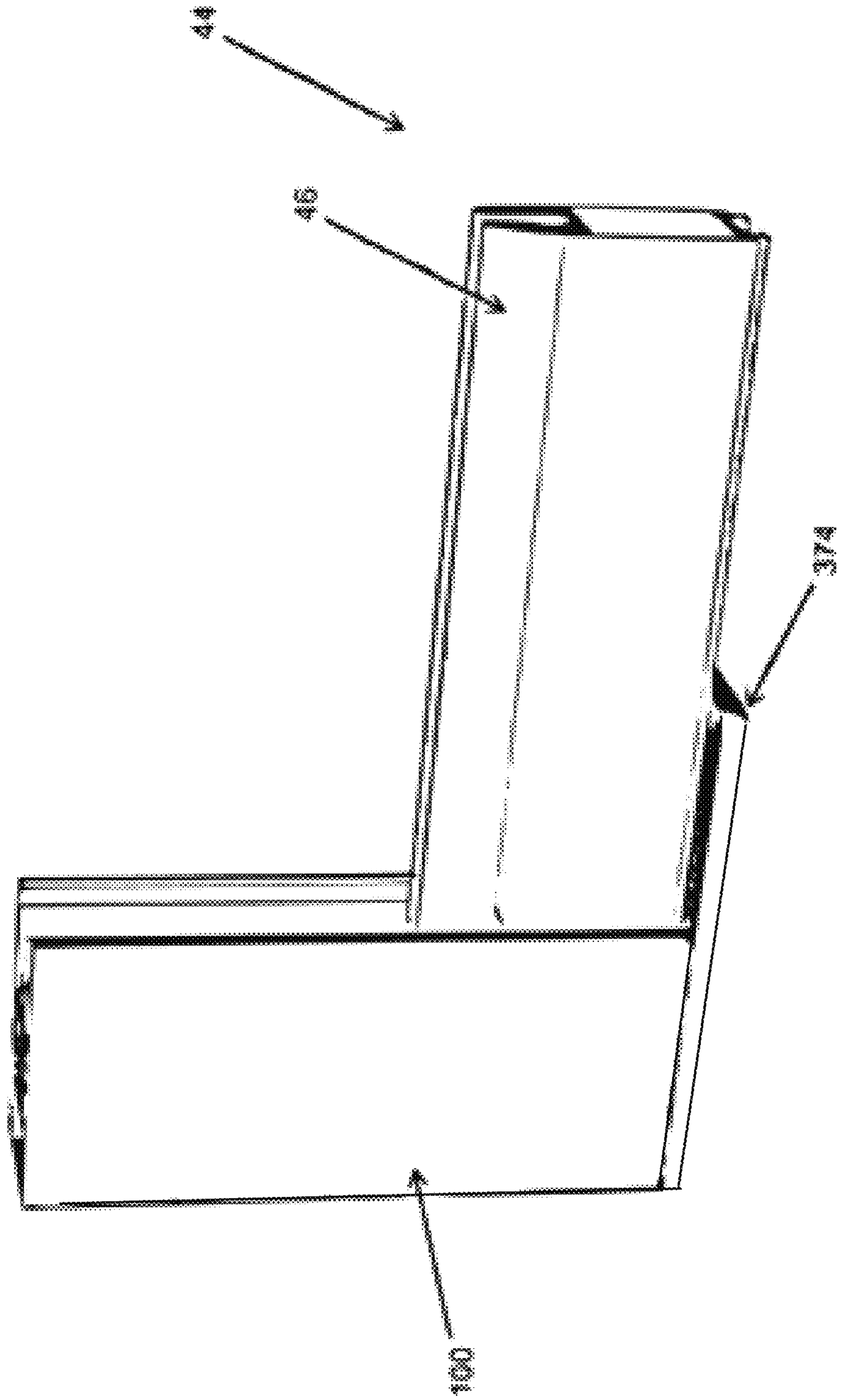
FIG. 96 shows an upper front left perspective view of a bottom bar assembly and a base plate of an anchor system and track assembly, in accordance with one or more embodiments; the view showing a mechanical interlock of the anchor system; the view showing bottom bar assembly in a fully lowered position with the spring loaded latch engaged with the groove or catch in the post of the base plate of the anchor system thereby locking the bottom bar in a lowered position.
Figure 97:
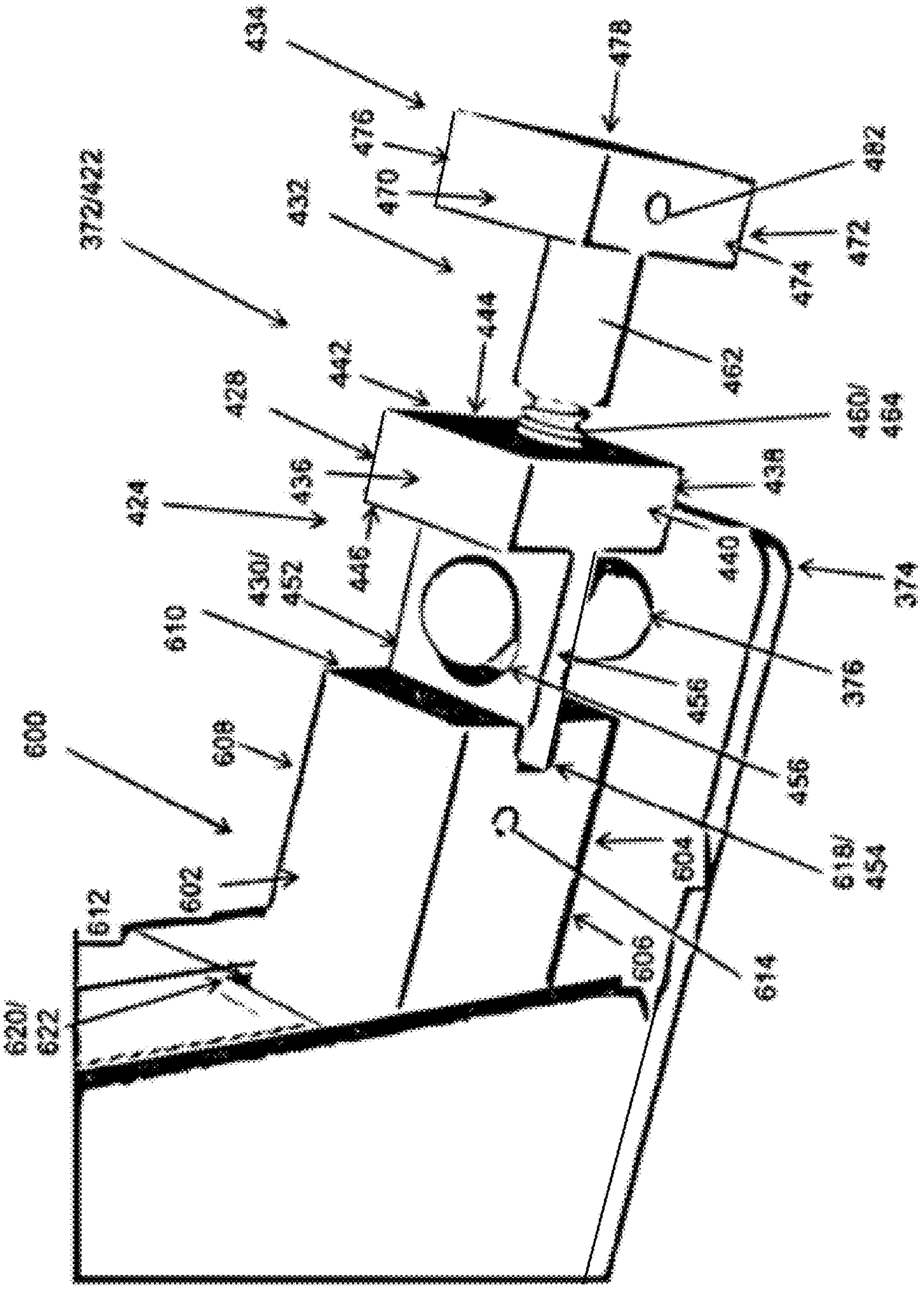
FIG. 97 shows an upper front left perspective view of a bottom bar assembly and a base plate of an anchor system and track assembly, in accordance with one or more embodiments; the view showing a mechanical interlock of the anchor system; the view showing bottom bar of bottom bar assembly omitted; the view showing bottom bar assembly in a fully lowered position with the spring loaded latch engaged with the groove or catch in the post of the base plate of the anchor system thereby locking the bottom bar in a lowered position.
Figure 98:
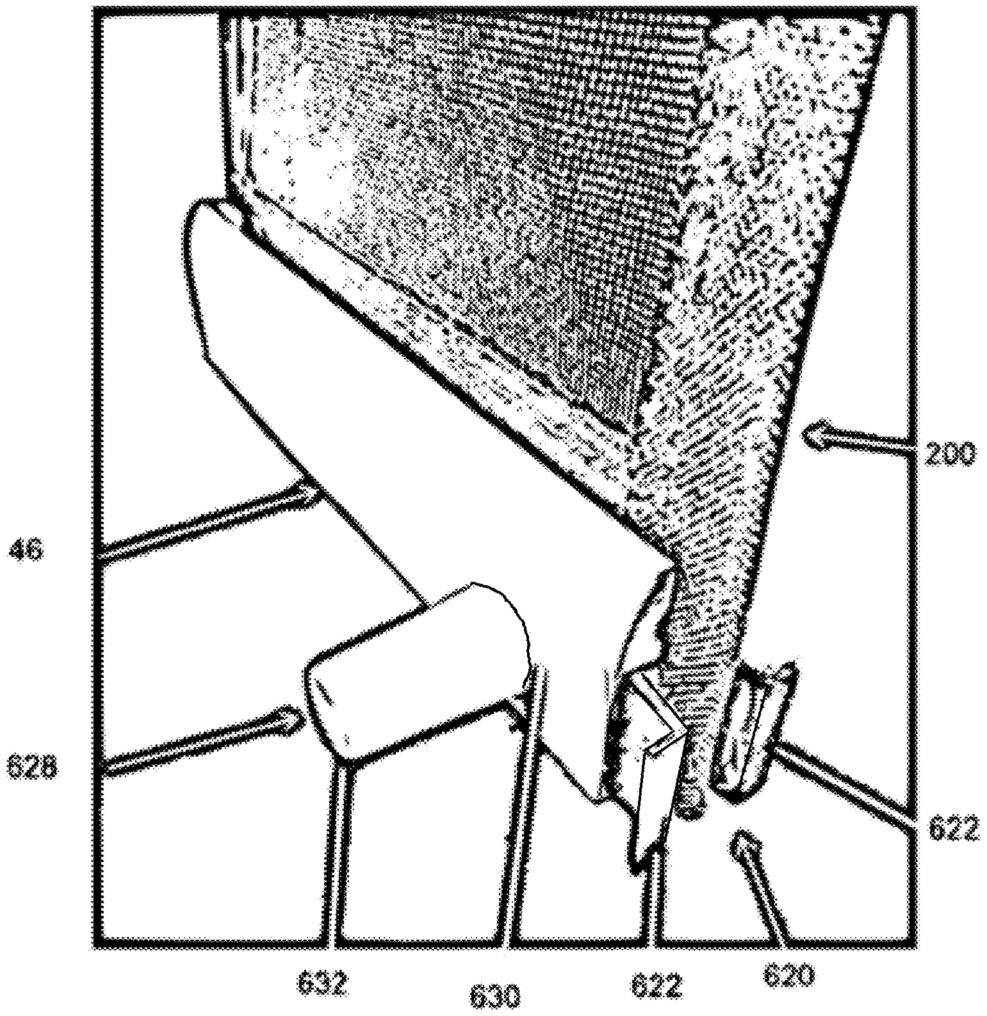
FIG. 98 shows an upper rearward right side perspective view of a bottom bar assembly and a base plate of an anchor system and track assembly, in accordance with one or more embodiments; the view showing bottom bar assembly having a screen stop that extends outward from one side of the bottom bar; the view showing the end of the bottom bar having and end bracket with a track guide having a pair of flanges that extend within the elongate channel on either side of the screen receiver thereby guiding the bottom bar as it travels up and down the magnetic track assembly.
Figures 99A, 99B, 99C, 99D, 99E, 99F:
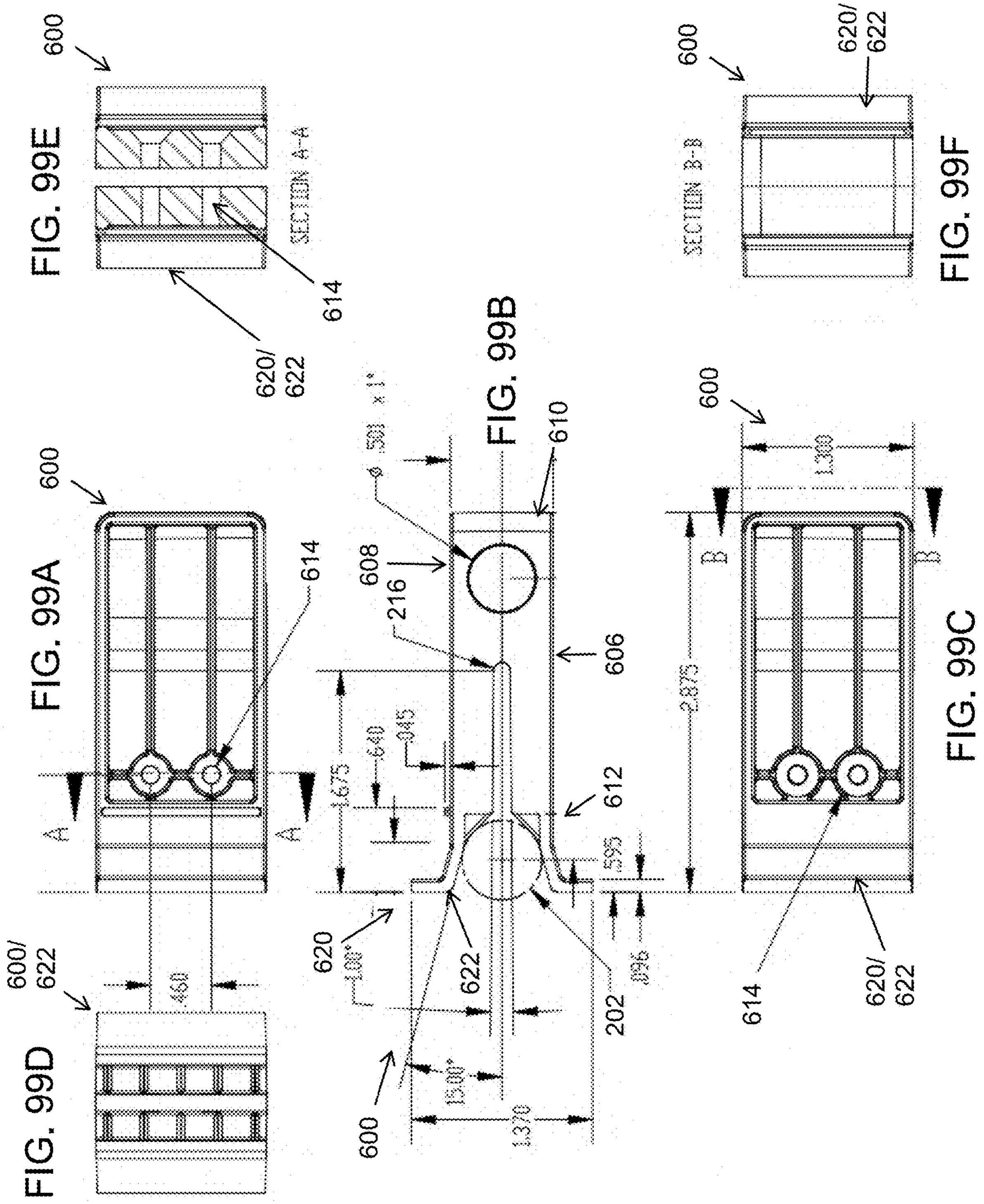
FIG. 99A shows a rearward view of an end bracket of a bottom bar assembly, in accordance with one or more embodiments; the view showing the end bracket having a track guide having flanges that extend outward from the end of the end bracket.
FIG. 99B shows a top view of an end bracket of a bottom bar assembly, in accordance with one or more embodiments; the view showing the end bracket having a track guide having flanges that extend outward from the end of the end bracket.
FIG. 99C shows a front view of an end bracket of a bottom bar assembly, in accordance with one or more embodiments; the view showing the end bracket having a track guide having flanges that extend outward from the end of the end bracket.
FIG. 99D shows a right side view of an end bracket of a bottom bar assembly, in accordance with one or more embodiments; the view showing the end bracket having a track guide having flanges that extend outward from the end of the end bracket.
FIG. 99E shows a cross sectional view of the end bracket shown in FIG. 99A, in accordance with one or more embodiments.
FIG. 99F shows a cross sectional view of the end bracket shown in FIG. 99C, in accordance with one or more embodiments.
Figure 100:
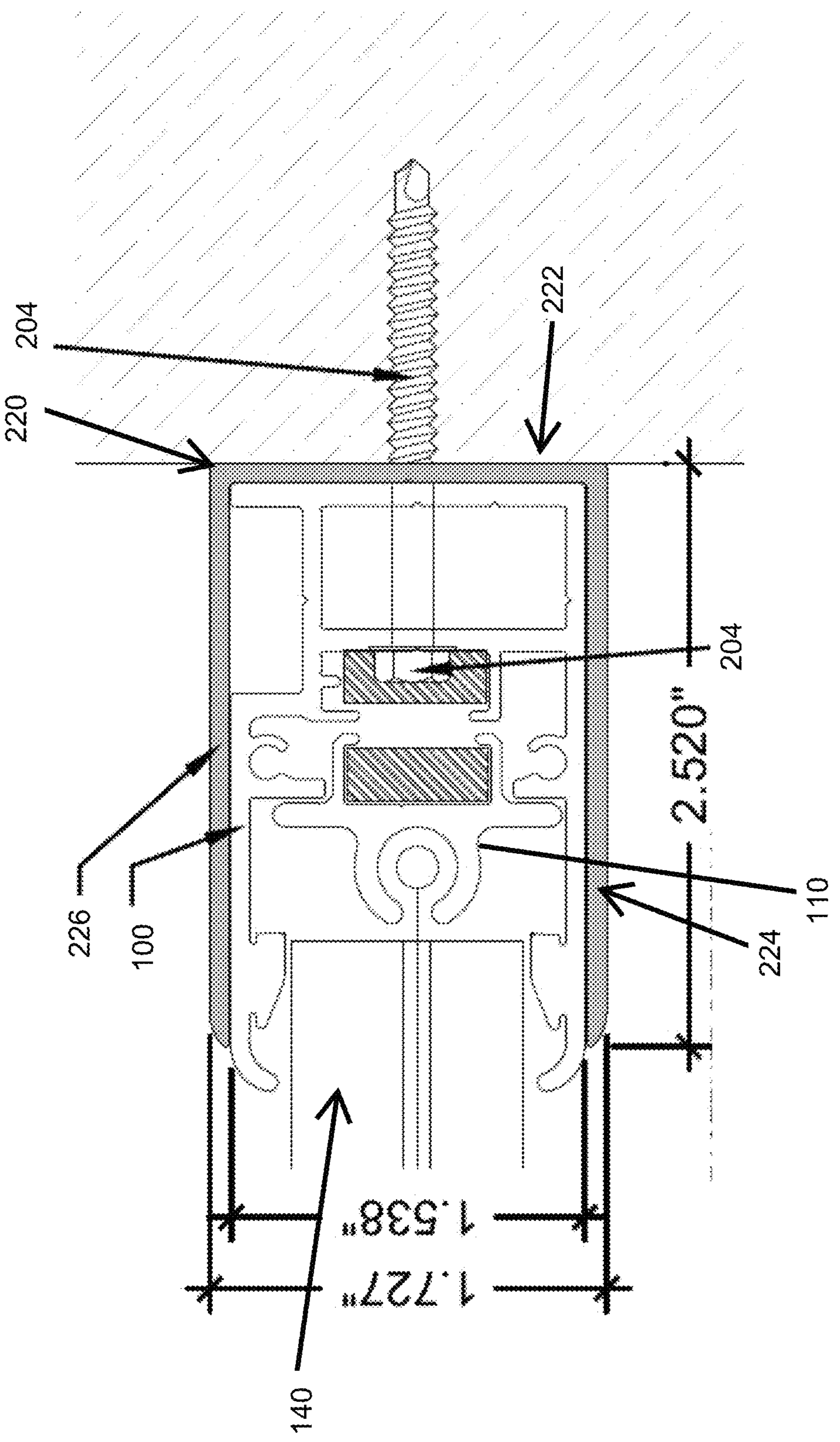
FIG. 100 shows a top view of a magnetic track assembly having a screen receiver configured to receive an interlock of a screen, the view showing the screen receiver positioned within an elongate channel; the view showing the elongate channel positioned within a hurricane bracket that surrounds the elongate channel on the front, back and end of the elongate channel for use in an end mount arrangement, the view showing a fastener extending through the end of the elongate channel and the end of the hurricane bracket, in accordance with one or more embodiments.
Figure 101:
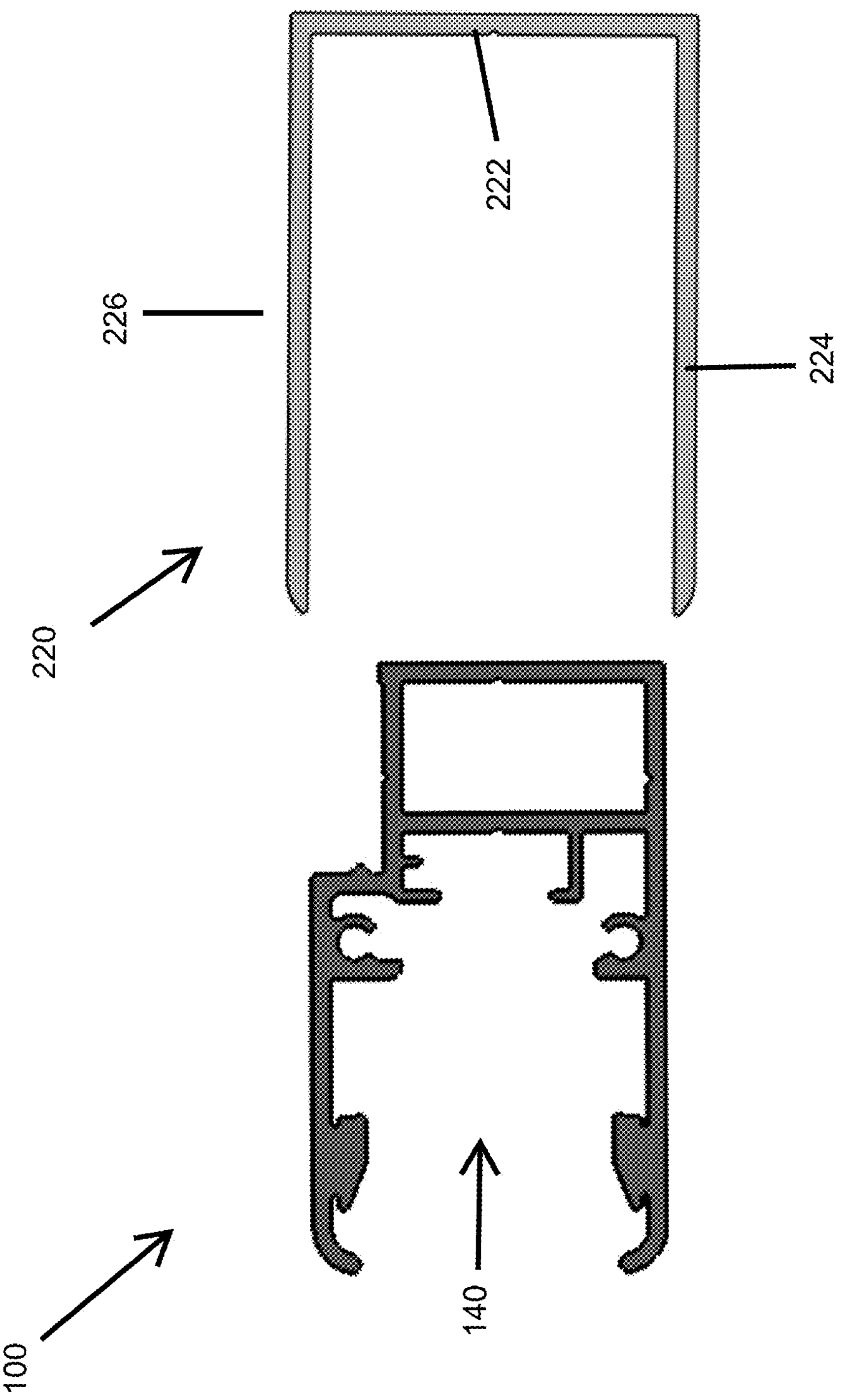
FIG. 101 shows a top exploded view of a magnetic track assembly and a hurricane bracket shown in FIG. 100, in accordance with one or more embodiments.
Figure 102:
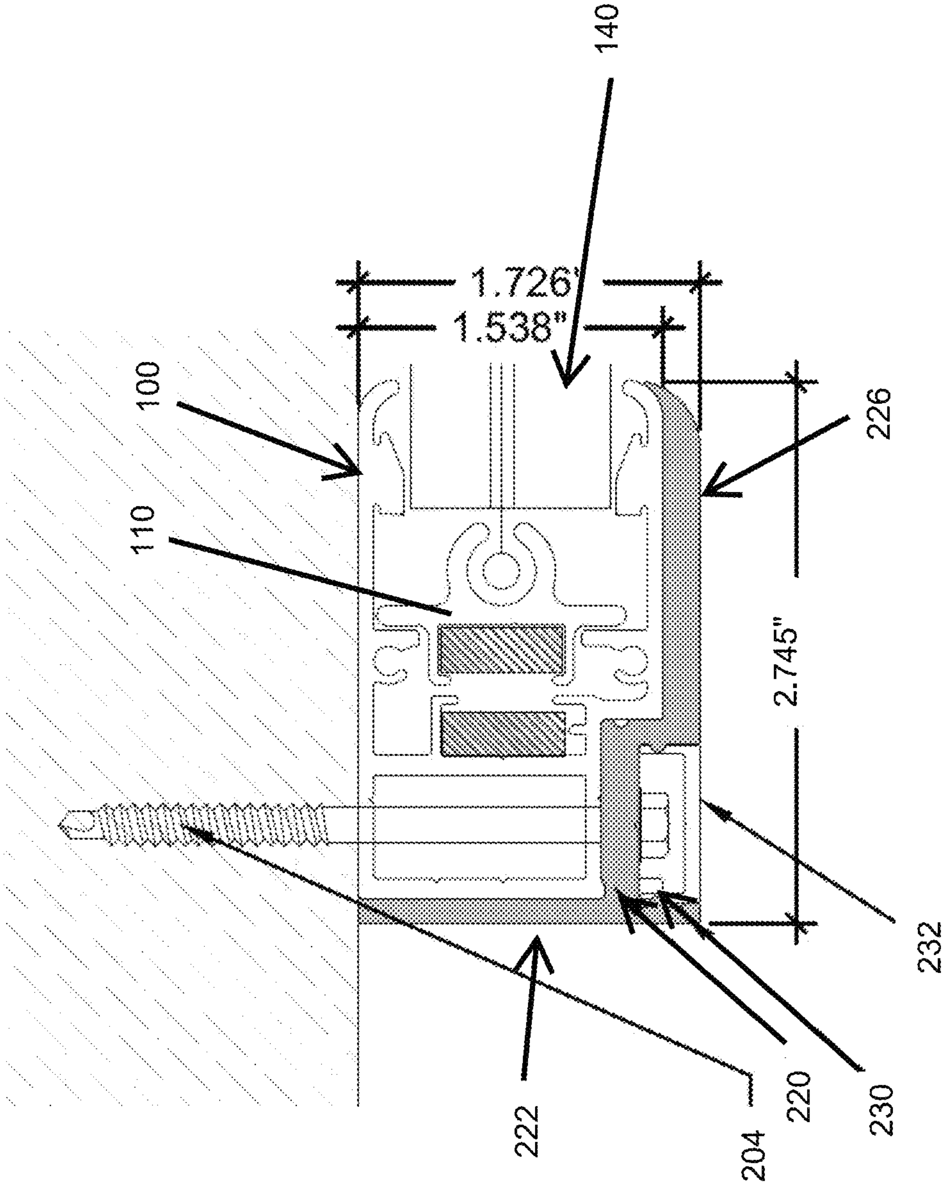
FIG. 102 shows top view of a magnetic track assembly and a hurricane bracket mounted on a structure in a side mount arrangement, in accordance with one or more embodiments; the view showing a magnetic track assembly having a screen receiver configured to receive an interlock of a screen, the view showing the screen receiver positioned within an elongate channel; the view showing the elongate channel positioned within a hurricane bracket that surrounds the elongate channel on the front side and end of the elongate channel for use in an side mount arrangement where the back side of the elongate channel is fastened against a structure, the view showing a fastener extending through the front side of the hurricane bracket and the elongate channel and into the structure, in accordance with one or more embodiments.
Figure 103:
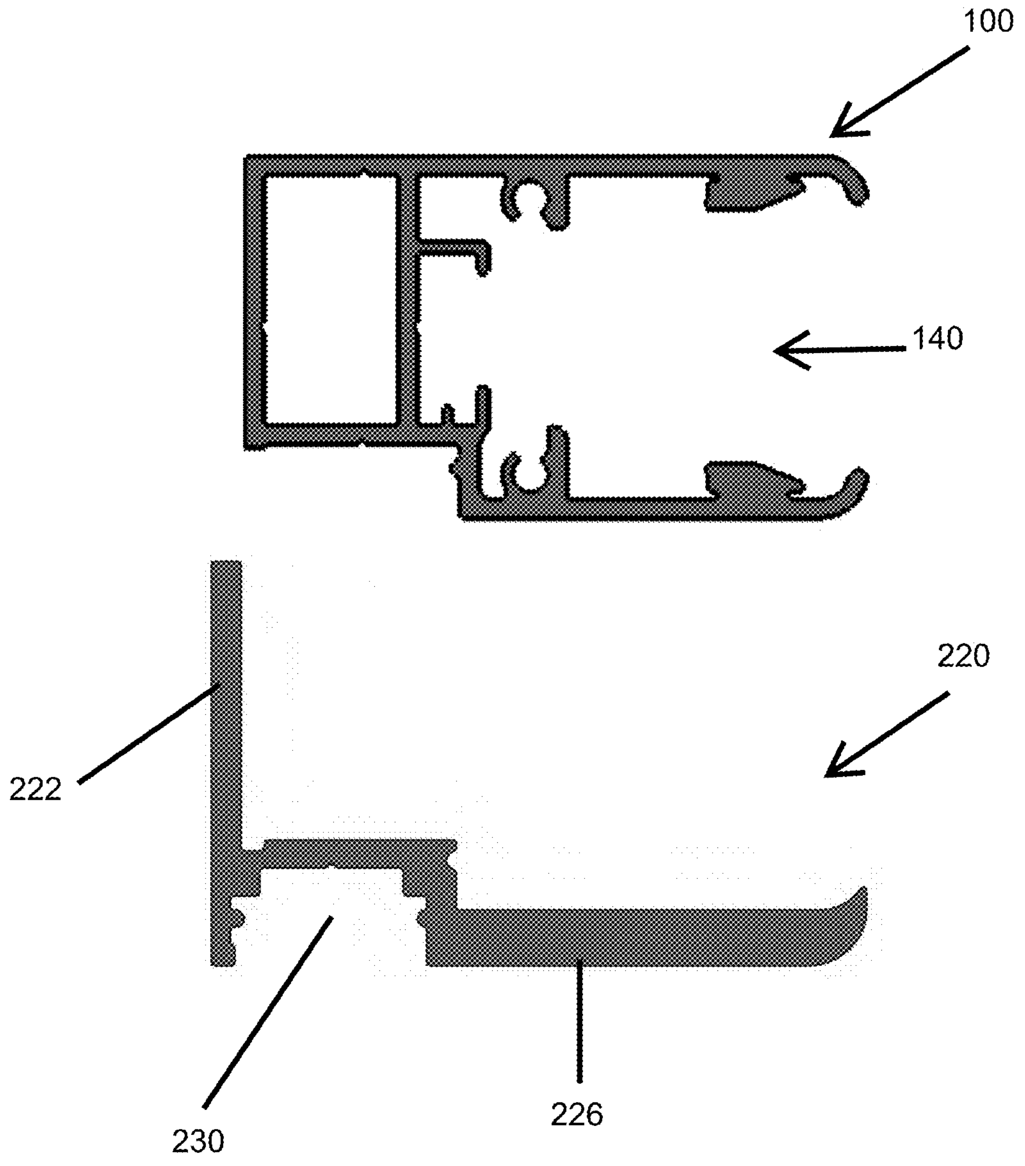
FIG. 103 shows an exploded top side view of a magnetic track assembly and a hurricane bracket shown in FIG. 102, in accordance with one or more embodiments.
Figure 104:
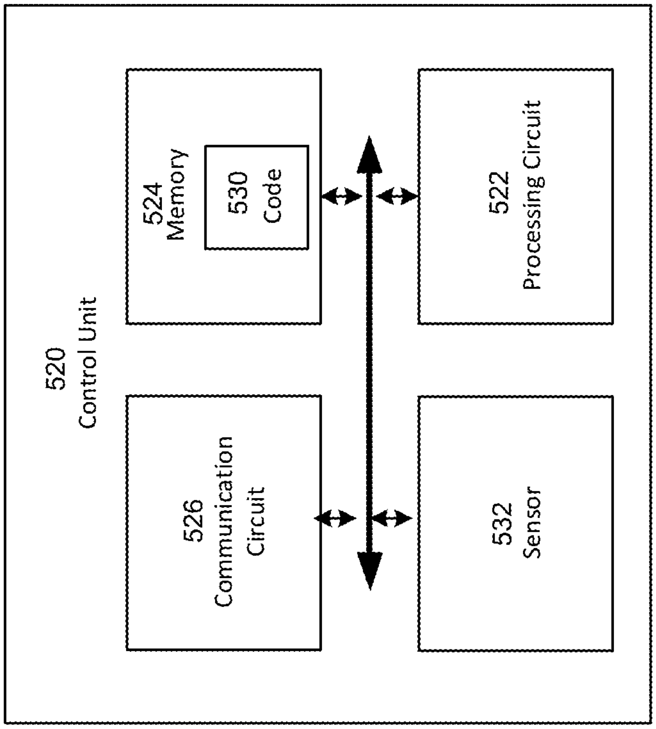
FIG. 104 shows a block diagram of a control circuit that may be used to control operation of various components of magnetic track assembly system, in accordance with one or more embodiments.

Inflatable Circumference Adjustment Member 282:

FIG. 87 shows an alternative arrangement having a circumference adjustment assembly 280 with an inflatable circumference adjustment member 282. Inflatable circumference adjustment member 282 is formed of any suitable size, shape, or design, and is configured to connect with roller tube 32 and increase effective circumference of roller tube 32 when inflated. In this example arrangement, inflatable circumference adjustment member 282 has an elongated shape configured to be held within cavity 286 of roller tube 32. In this example arrangement, inflatable circumference adjustment member 282 has an exterior surface 290 that is flush with exterior surface 68 of roller tube 32, when deflated.

Valve 298:

In this example arrangement, circumference adjustment assembly 280 includes a valve 298 positioned within roller tube assembly 26. Valve 298 is formed of any suitable size, shape, or design, and is configured to facilitate inflation/ deflation of inflatable circumference adjustment member 282. In the example shown, valve 298 is a Schrader valve, or auto/car valve, that is present on many bicycle and automobile tires. However, any other form of a valve 298 is hereby contemplated for use such as a Dunlop valve, a Presta valve, a Regina valve, or any other form of a valve. In some arrangements, multiple valves 298 may be included to facilitate inflation/deflation of inflatable circumference adjustment member 282 from various positions of system 10 for easier access and adjustment by an installer.

Valve 298 is fluidically connected to adjustment member 282 to facilitate inflation of adjustment member 282. When inflated, exterior surface 290 extends outward from exterior surface 68 of roller tube 32, thereby increasing effective circumference.

In various different arrangements, roller tube 32 may include a circumference adjustment assembly 280 (and/or recesses or features to receive a circumference adjustment assembly 280) at various positions along the length of roller tube 32. In some implementation, roller tube 32 may include a plurality of circumference adjustment assemblies 280 (and/or recesses or features to receive a plurality of circumference adjustment assemblies 280). In some embodiments, roller tube 32 may include a channel for insertion of a circumference adjustment assembly 280 along the entire length of roller tube 32. Additionally or alternatively, in some embodiments, roller tube 32 may include circumference adjustment assemblies 280 (and/or recesses or features to receive a circumference adjustment assembly 280) at multiple positions of the same cross section of roller tube 32. Additionally or alternatively, in some embodiments, roller tube 32 may include an independently controlled circumference adjustment assembly 280 positioned at the middle of roller tube 32, and an independently controlled circumference adjustment assembly 280 positioned at each outward side of the middle-positioned circumference adjustment assembly 280 thereby providing precise and specific control of the diameter of roller tube 32. Any number of an independently controlled circumference adjustment assemblies 280 are hereby contemplated for use along the length of roller tube 32.

Exemplary Embodiments

In one or more embodiments, a retractable screen system is provided that comprises: a screen; the screen extending a length between a first side and a second side; the screen extending a height between an upper end and a lower end; a roller tube; the roller tube extending a length between opposing ends; the roller tube having an exterior surface; the roller tube having an axis of rotation; a circumference adjustment assembly; the circumference adjustment assembly operably connected to the roller tube; the circumference adjustment assembly having an adjustment member; the circumference adjustment assembly having a control assembly; wherein the upper end of the screen is connected to the roller tube; wherein the screen is configured to wrap around the roller tube when the roller tube is rotated in a first direction; wherein the screen is configured to unwrap from around the roller tube when the roller tube is rotated in a second direction, wherein the second direction is opposite the first direction; and wherein the control assembly is configured to adjust the position of the adjustment member relative to the roller tube, thereby modifying an effective circumference of the roller tube.

In one or more implementations, the control assembly is configured to adjust the position of an outer surface of the adjustment member relative to the axis of rotation of the roller tube, thereby modifying the effective circumference of the roller tube.

In one or more implementations, the roller tube includes a recess; wherein the adjustment member includes a portion configured and arranged for insertion in the recess; and wherein the control assembly is configured and arranged to adjust the depth which the portion of the adjustment member is inserted into the recess.

In one or more implementations: the roller tube includes a recess; wherein the portion of the adjustment member is configured and arranged for insertion in the recess includes a threaded portion; and wherein the control assembly includes a fastener configured and arranged to engage the threaded portion; and wherein rotation of the fastener adjusts the depth to which the portion of the adjustment member is inserted into the recess.

In one or more implementations: the roller tube includes a recess; and the recess is a channel extending along at least a portion of the length the roller tube.

In one or more implementations, wherein the adjustment member is configured and arranged to overlay a portion of the exterior surface of the roller tube.

In one or more implementations, the circumference adjustment assembly is located at a first position along the length of the roller tube; and the system further comprises a second circumference adjustment assembly located at a second position along the length of the roller tube.

In one or more embodiments, a retractable screen system is provided that comprises: a screen; the screen extending a length between a first side and a second side; the screen extending a height between an upper end and a lower end; a roller tube; the roller tube extending a length between opposing ends; the roller tube having an exterior surface; the roller tube having an axis of rotation; a circumference adjustment assembly; the circumference adjustment assembly having an adjustment member, the adjustment member configured and arranged to increase an effective circumference of the roller tube at a position where the adjustment member is attached to the circumference adjustment assembly; and the circumference adjustment assembly having a fastener, the fastener configured and arranged connect the adjustment member to the roller tube.

In one or more implementations, the adjustment member is configured and arranged to overlay a portion of the exterior surface of the roller tube when the adjustment member is attached to the roller tube, thereby increasing effective circumference of the roller tube.

In one or more implementations, the fastener includes a first feature configured and arranged to interlock with a second feature of the roller tube.

In one or more implementations: the roller tube includes a recess; and wherein the fastener is attached to the adjustment member, the fastener is configured and arranged to mate with the recess in the roller tube.

In one or more implementations: the roller tube includes a recess; and wherein the fastener includes one or more features configured and arranged to hold the faster in place when mated with the recess of the roller tube.

In one or more implementations, the roller tube includes a recess; and wherein the recess is a channel extending along at least a portion of the length the roller tube.

In one or more implementations, the circumference adjustment assembly is located at a first position along the length of the roller tube; and the system further comprises a second circumference adjustment assembly, the second circumference adjustment assembly located at a second position along the length of the roller tube.

In one or more implementations, the circumference adjustment assembly is located at a first position along a cross section of the roller tube; and the system further comprises a second circumference adjustment assembly located at a second position of the cross section of the roller tube.

Further Alternative Arrangements:

With reference to FIGS. 88-99, various alternative arrangements of retractable screen systems 10 having magnetic track assemblies 100 are presented. Some components of motorized screen system 10 having magnetic track assemblies 100 presented in FIGS. 88-99 are similar to those of retractable screen system 10 having magnetic track assemblies 100 presented in FIGS. 1-87 and therefore the teaching presented herein with respect to FIGS. 1-87 may be applied to and is incorporated into the teaching presented in FIGS. 88-99 unless specifically stated otherwise.

Improved Bottom Bar and Anchor System

As described with reference to FIGS. 55 and 56, in many applications of system 10, hurricanes and other wind events are present. In one or more embodiments, system 10 includes a bottom bar assembly 44 and anchor system 370 that is configured to help hold bottom bar assembly 44 in a closed position, for example, to prevent damage from storms, help meet hurricane building codes, and/or otherwise secure openings covered by screen 200. In some various arrangements, bottom bar 46 and/or anchor system 370 include features configured and arranged to mechanically and/or magnetically anchor bottom bar 46 to the floor when screen 200 is in a fully lowered position. In the arrangement shown, bottom bar assembly 44 includes a bottom bar 46 and one or more base plates 374.

Bottom Bar Assembly 44:

Bottom bar assembly 44 is formed of any suitable size, shape and design and is configured to connect to the lower end of screen 200 while providing sufficient weight to the lower end of screen 200 to facilitate smooth opening and closing while also keeping the lower end of screen 200 flat and straight. In the arrangement shown, as one example, bottom bar assembly 44 includes a bottom bar 46 that is formed of an elongated member that extends a length between opposing ends 48 and includes a hollow interior 50 that is configured to receive a weight bar 52 therein that adds weight to bottom bar assembly 44.

The lower end of bottom bar 46 includes a channel 54 that is configured to receive and hold a sealing member 56 therein that is configured to seal the lower end of bottom bar 46 to the ground when bottom bar 46 is in a fully lowered or closed position. Sealing member 56 may be formed of any device that facilitates a seal such as a piece of woolpile, a strip of foam, a rubber strip, or any form of a sealing member or other compressible member or a combination thereof that helps to facilitate a seal when bottom bar 46 is in a fully lowered position.

In this example arrangement, bottom bar 46 includes a receiver 58. Receiver 58 is formed of any suitable size, shape and design and is configured to facilitate connection of the lower end of screen 200 to bottom bar assembly 44. In the arrangement shown, as one example, end bracket 600 and/or weight bar probes 60 are attached to the outward end of bottom bar 46.

In one or more arrangements, end bracket 600 and/or weight bar probes 60 are formed of any suitable, size, shape, or design, and are configured to connect with the outward end of bottom bar 46. In the arrangement shown, as one example, end bracket 600 and/or weight bar probes 60 have an elongated rectangular shape having a top 602, a bottom 604, a front 606, and a back 608, and extending from an inward end 610 to an outward end 612. In this example arrangement, a portion of end bracket 600 and/or weight bar probes 60 are configured to be positioned within hollow interior 50 of bottom bar 46. In one or more arrangements, end bracket 600 and/or weight bar probes 60 are configured to secure weight bar probes 60 and/or other components in place within hollow interior 50 of bottom bar 46. In various arrangements, end bracket 600 and/or weight bar probes 60 may be secured within hollow interior 50 using various means and/or methods including but not limited to, for example, frictional fittings, adhesive bonding, chemical bonding, welding, stitching, sewing, fasteners (e.g., staples, screws, nails, bolts, rivets, etc.), and/or any other connection means or method or any combination thereof. In the arrangement shown, as one example, end bracket 600 and/or weight bar probes 60 are secured in position within hollow interior 50 by a fastener 616 (not shown) that extends through holes 614 in bottom bar 46 and end bracket 600 and/or weight bar probes 60.

Track Guide 620:

In one or more arrangements, outward end 612 of end bracket 600 and/or weight bar probes 60 includes a track guide 620. Track guide 620 is formed of any suitable size, shape, or design, and is configured to operably guide bottom bar 46 relative to magnetic track assembly 100 while facilitating smooth movement of bottom bar 46 along magnetic track assembly 100 during opening and closing motion. In one arrangement shown, as one example, track guide 620 include a pair of flanges 622 that extend outward from the forward side and rearward side of outward end 612 of end bracket 600 and/or weight bar probes 60. In the arrangement shown, as one example, a flange 622 is positioned on each side of the lower end of screen 200, with screen 200 approximately equally spaced between opposing flanges 622. In this example arrangement, when track guide 620 is inserted into elongate channel 140 of magnetic track assembly 100, flanges 622 extend outward a distance in approximate parallel alignment to the length of bottom bar 46 before turning and extending in a direction away from one another (that is the forward positioned flange 622 turns away from the rearward positioned flange 622 and the rearward positioned flange 622 turns away from the forward positioned flange 622) before terminating in a free end. Flanges 622 are configured to fit within the hollow interior of elongate channel 140 and are configured to fit around screen receiver 110 positioned within elongate channel 140. As bottom bar 46 is raised and lowered these flanges slide along the interior surface of the hollow interior of elongate channel 140 and slide along the exterior surface of screen receiver 110 thereby guiding and aligning bottom bar 46 during opening and closing thereby providing smother, more-consistent, and quieter operation.

However, embodiments are not so limited. Rather, it is contemplated that track guide 620 may be implemented with various alternative structures and/or arrangements to facilitate operable connection of bottom bar 46 to magnetic track assembly 100.

Screen Stops 628:

In one or more arrangements, bottom bar assembly 44 includes one or more screen stops 628 connected to bottom bar 46. Screen stop(s) 628 are formed of any suitable size, shape, or design, and are configured to engage housing 12 when screen is rolled up to a fully retracted position. By engaging housing 12, screen stops 628 prevent bottom bar 46 from being pulled into housing 12 and becoming stuck. In the arrangement shown, as one example, screen stop(s) 628 have an elongated cylindrical shape extending from a first end 630, where screen stop 628 is connected to bottom bar 46, to a second end 632. In some arrangements, screen stop 628 may taper slightly or narrow slightly as it extends from first end 630 at bottom bar 46 to second end 632

In various arrangements, screen stop 628 may be connected to bottom bar 46 using various means and/or methods including but not limited to, for example, frictional fittings, adhesive bonding, chemical bonding, welding, stitching, sewing, fasteners (e.g., staples, screws, nails, bolts, rivets, etc.), and/or any other connection means or method). In the arrangement shown, as one example, screen stop(s) 628 may be connected to bottom bar 46 by fastener 616, which is used to secure end bracket 600 and/or weight bar probes 60 within hollow interior 50 of bottom bar 46. However, it is contemplated that screen stop(s) 628 may be connected to bottom bar 46 by any means and/or methods and/or may be connected at various other positions of bottom bar 46.

Anchor System 370:

Anchor system 370 is formed of any suitable size, shape, or design, and is configured to operably connect and/or hold bottom bar assembly 44 to the floor when screen 200 is in a fully lowered position. In the arrangement shown, as one example, anchor system 370 includes one or more base plates 374, a mechanical interlock 372, and a magnetic component 380, among other components.

In the arrangement shown, as one example, anchor system 370 includes one or more base plates 374 configured to engage and secure bottom bar 46 when screen 200 is in a fully lowered position. In the arrangement shown, as one example, anchor system 370 includes a first base plate 374 to secure one end 48 of bottom bar 46 and a second base plate 374 to secure the other end 48 of bottom bar 46. However, embodiments are not so limited. Rather, it is contemplated that in various arrangements, anchor system may include a greater or lesser number of base plates 374. For example, in some embodiments, a single base plate 374 may span the entire width of the screen opening. In yet some other embodiments, three or more base plates 374 may be used.

Base Plate(s) 374:

Base plate(s) 374 are formed of any suitable size, shape, or design, and are configured to facilitate a secure connection with the floor and with other components of anchor system 370. In the arrangement shown, as one example, base plate(s) 374 has a generally planar shape having an upper surface 390 and a lower surface 392 extending between a front end 394, a rear end 396, and between opposing sides 398. In this example, base plate(s) 374 have a wide portion 400, where base plate(s) 374 are configured to connect with a lower end of magnetic track assemblies 100, and a narrow portion 402, where base plate(s) 374 align with the outward end of bottom bar 46 when screen 200 is in a fully deployed position.

In the arrangement shown, as one example, base plate(s) 374 include a set of holes 406, through which base plate(s) 374 may be secured to the floor. In some implementations, base plate(s) 374 may be mounted with lower surface 392 resting on a surface of the floor. Additionally or alternatively, one or more base plates 374 may be recessed into a floor (e.g., with upper surface 390 flush with the surface of the floor).

Mechanical Interlock 372:

Mechanical interlock 372 is formed of any suitable size, shape, or design and is configured to provide a mechanical interconnection between base plate(s) 374 and bottom bar 46 to inhibit horizontal movement of bottom bar 46 relative to base plate(s) 374.

In the arrangement shown, as one example, mechanical interlock 372 includes a vertical post 376 connected to base plate(s) 374 and a hole 378 in bottom bar 46 that is configured to receive and mate with vertical post 376. In the arrangement shown, vertical post 376 extends upward from base plate 374 just outward from where the lower end of elongate channel 140 connects to base plate 374. This position minimizes the trip hazard that post 376. In the arrangement shown, as one example, narrow portion 402 extends forward a distance from post 376 before terminating in a free end. However, in some various arrangements, base plate(s) 374 and bottom bar 46 may include different or additional features formed of other shapes known in the art to form mechanical interlock 372. When mated, interlock feature 376 of base plate(s) 374 and the corresponding interlock feature 378 of bottom bar 46 inhibit horizontal movement of bottom bar 46.

Latch 422:

In some arrangements, mechanical interlock 372 includes a latch 422. Latch 422 is formed of any suitable size, shape, or design, and is configured to prevent bottom bar 46 from being lifted off of base plate(s) 374 when latched. In various arrangements, latch 422 may be implemented using various types of manual and/or electronic latches including but not limited to, for example, spring latches, cam latches, slam latches, bolt latches, Norfolk latches, Suffolk latches, cross-bar latches, hook latches, toggle latches, and/or any other type of latch. In one arrangement shown, as one example, latch 422 is a spring type latch having a bolt 424, a bias member 432, and a bracket 434 among other components.

Bolt 424:

Bolt 424 is formed of any suitable size, shape, or design, and is configured to slide within hollow interior 50 of bottom bar 46 between a latched position and an unlatched position and engage catch 426 in the latched position. When bolt 424 engages catch 426 on vertical post 376, vertical post 376 is secured in place within hole 378. In the arrangement shown, as one example, bolt 424 has a guide member 428 and an engagement member 430.

Guide member 428 is formed of any suitable size, shape, or design, and is configured to guide and facilitate smooth movement of bolt 424 within hollow interior 50 of bottom bar 46. In this example arrangement, guide member 446 has an elongated rectangular shape having a top 436, a bottom 438, a front 440, a back 442, a first side 444, and a second side 446.

In this example arrangement, bolt 424 also has an engagement member 430 connected to second side 446 of guide member 428. Engagement member 430 is formed of any suitable size, shape, or design, and is configured to facilitate engagement with catch 426 when bolt 424 is in the latched position. In this example arrangement, engagement member 430 is a generally rectangular plate extending outward from second side 446 of guide member 428, between a front edge 450, a rear edge 452, to an outward end 454. In this example arrangement, engagement member 430 also includes a circular opening 456 configured to receive vertical post 376 and thereafter engage catch 426 when moved to the latched position.

In the arrangement shown, outward end 454 of engagement member 430 is configured to be received within a channel 618 of end bracket 600 when bolt 424 is moved to the latched position. Channel 618 provides additional strength and support to engagement member 430 when strong upward forces are applied to bottom bar 46 while bolt 424 of latch 422 is in the latched position.

In the arrangement shown, vertical post 376 connected to base plate 374 has shaped top end 427 configured to facilitate insertion of vertical post 376 into hole 378 of bottom bar 76 and through circular opening 456 in engagement member 430 of bolt 424. That is, in the arrangement shown, as one example, top end 427 is curved, angled or generally semi-circular shaped so as to facilitate engagement member 430 to slide over top end 427 before being captured within catch 426. Top end 427 of vertical post 376 is formed of any suitable size, shape, or design, and is configured to move bolt 424 from the latched position when engaged by top end 427 to permit insertion of vertical post 376 through circular opening. However, embodiments are not so limited. Rather it is contemplated that in various different arrangements, top end 427 may be implemented with various different shapes including but not limited to, for example, spherical shape, cone shape, wedge shape, or any other shape configured to move bolt 424 to permit insertion of vertical post 376.

In this example arrangement, as vertical post 376 is inserted through circular opening 456, bolt 424 is moved aside by top end 427 until catch 426 of vertical post 376 becomes aligned with engagement member 430 of bolt 424. At which time, bolt 424 is moved by bias member 432 to the latched position, where engagement member 430 engages catch 426 of vertical post 376 and secures vertical post 376 withing circular opening 456. This arrangement permits screen 200 to be lowered to the fully deployed positioned and bottom bar 46 secured to anchor system 370 without first unlatching latch 422.

Bias Member 432:

In the arrangement shown, latch 422 includes a biasing member 432 configured to bias bolt 424 toward the latched position unless an opposing force is applied, for example, by a control member 458 (not shown) attached to bolt 424. Bias member 432 is formed of any suitable size, shape and design and is configured to attach to and between bolt 424 and bracket 434 and provide a bias force between bolt 424 and bracket 434 sufficient to move bolt 424 to the latched position in absence of an opposing force. In various arrangements, bias member 432 may utilize various mechanisms to push or pull bolt 424 to the retracted position including but not limited to, for example, one or more springs, one or more gas pistons, one or more gas springs, one or more hydraulic pistons, one or more actuators, one or more solenoids, one or more pneumatic members, and/or any other force generating means or combination thereof.

In the arrangement shown, as one example, bias member 432 is a telescoping unit having an inner shaft 460, an outer collar 462, and a spring 464. In this example arrangement, inner shaft 460 has a generally cylindrical elongated shape extending between opposing ends. In this example arrangement, outer collar 462 has a generally cylindrical tube shape extending between opposing ends and has a hollow interior shaped to match the shape of inner shaft 460. In this example arrangement, one end of inner shaft 460 is connected to a first side 444 of guide member 428 of bolt 424 and the other end is inserted into one end of outer collar 462. The other end of outer collar 462 is attached to bracket 434. In this example arrangement, spring 464 is positioned to apply a biasing force to push inner shaft 460/bolt 424 away from outer collar 462/bracket 434 to cause move bolt to be moved to the latched position in absence of an opposing force.

Bracket 434:

Bracket 434 is formed of any suitable size, shape and design and is configured to operably connect bias member 432 to bottom bar 46. In the arrangement shown, as one example, bracket 434 has a generally rectangular shape having a top 470, a bottom 472, a front 474, a back 476, and opposing sides 478. In various arrangements, bracket 434 may be connected to bottom bar 46 using various means and/or methods including but not limited to, for example, frictional fittings, adhesive bonding, chemical bonding, welding, stitching, sewing, fasteners (e.g., staples, screws, nails, bolts, rivets, etc.), and/or any other connection means or method). In the arrangement shown, as one example, end bracket 434 is connected to bottom bar 46 by a fastener 480 that extends through holes 482 in in bottom bar 46 and bracket 434.

Control Member 458:

Control Member 458 (not shown) is formed of any suitable size, shape and design and is configured to operably connect with bolt 424 to facilitate movement of bolt 424 between the latched position and unlatched positioned by a user. In various embodiments, control member 458 may be an electronic mechanism (e.g. a motor, solenoid, electromagnet, or any other electronic means for inducing movement of an object) controlled for example by control circuit 520 or other device. In some other various arrangements, control member 458 may be a manually operated mechanism (e.g., a knob, post, handle, shaft, lever, latch, lock, or any other mechanism for manual user control). In one or more arrangements, control member 458 includes a post (not shown) that is connected to bolt 424 and extends rearward therefrom through a slot (not shown) in bottom bar 46. In this example arrangement, when bolt 424 is in the latched position, the post is positioned at one end of the slot and when bolt 424 is in the unlatched position, the post is positioned at the opposite end of the slot. However, arrangements are not so limited. Rather, it is contemplated that control member 458 may be configured and positioned at any location on bottom bar 46 to facilitate latching and unlatching of latch 422.

As one alternative example, in one or more arrangements, control member 458 may include a keyed lock configured to move bolt 424 to the unlatched position when unlocked and move bolt 424 to the latched position when locked. In one or more arrangements, such keyed lock may be operated by a user from the front or rear of bottom bar 46 to facilitate keyed locking/locking from inside or outside of a structure. Additionally or alternatively, in one or more arrangements, control member 458 may include a keyed lock accessible on an exterior side of the bottom bar 46 and a slidable post on an interior side of the bottom bar 46 such that the bottom bar 46 may be locked from the outside but unlocked from the inside. It is contemplated, that in some various arrangements, control member 458 may use any other means or method for controlling latch 422.

Magnetic Components 380:

Additionally or alternatively, in one or more embodiments, bottom bar 46 and base plate(s) 374 may include one or more pairs of magnetic components 380 configured and arranged to form a magnetic latch when screen 200 is in a fully lowered position. Each pair of magnetic components 380 includes a first magnet (arranged with one of the bottom bar 46 and base plate 374) and either a ferrous material or a second magnet (arranged with the other of the bottom bar 46 and base plate 374). One component of each pair is attached to or forms part of bottom bar 46 and the other is attached to or forms part of base plate(s) 374. With base plate(s) 374 secured to the floor, magnetic attraction between magnetic components 380 help to ensure that bottom bar 46 remains coupled base plate 374 and vertical post 376 of base plate(s) 374 remains within the opening in the bottom of end bracket 600. Additionally or alternatively, in one of more embodiments, magnetic track assemblies 100 may include magnets components 380 configured and arranged to form a magnetic latch with bottom bar 46 when screen 200 is fully lowered.

In one or more arrangements, base plate(s) 374 includes a magnetic component 380 inserted in a recess 408 in lower surface 392 of base plate(s) 374. Additionally or alternatively, in one or more arrangements, bottom bar 46 includes a magnetic component 380 inserted in hollow interior 50. In one or more embodiments, hollow interior 50 of bottom bar 46 may include a number of steel weights (not shown) to help keep screen 200 taut in high wind conditions. In some implementations, bottom bar 46 may include isolators 74 adjacent to magnetic component 380 within hollow interior 50 to mitigate interference of steel weights with functionality of magnetic component 380. In some other implementations, isolators 74 may be omitted. In some embodiments, portions of bottom bar 46 and/or base plate(s) 374 adjacent to magnetic components 380 may include windows or openings (not shown) to increase magnetic attraction between the magnetic components 380 and to prevent attenuation of the magnetic forces.

In some embodiments, base plate(s) 374 may include one or more connection members 388 configured and arranged to connect base plate(s) 374 to a lower end of magnetic track assemblies 100, which are configured to receive the sides of screen 200. By connecting base plate(s) 374 and magnetic track assemblies 100, base plate(s) 374 are further secured (e.g., to a wall) by magnetic track assemblies 100. Conversely, magnetic track assemblies 100 may be further secured to the floor via base plate(s) 374.

Anchor System In Operation:

As an illustrative example, system 10 having anchor system 370 installed in an opening of an outdoor bar at a resort to secure and protect contents, for example, from unauthorized use and/or inclement weather while providing an aesthetically pleasing view of offerings and stock of the bar. In this example, system 10 is installed with housing 12 and roller tube assembly 26 positioned at a top end of the opening, magnetic track assemblies 100 positioned along the sides of the opening and anchor system 370 positioned along the lower end of the opening (e.g., a floor, bar top, or counter). In this illustrative example, screen may be raised by rotating roller tube 32 to a fully retracted position, while the outdoor bar is open. When the outdoor bar is to be closed, screen 200 may be manually or automatically lowered to a fully lowered position (e.g., by an employee or a control circuit 520) to close the opening. When bottom bar 46 engages anchor system 382 while screen 200 is lowered, vertical post 376 of anchor system 370 is inserted into hole 378 of bottom bar 76 and through circular opening 456 in engagement member 430 of bolt 424, as previously described, until engagement member 430 of bolt 424 engages catch 426 of vertical post 376 and is moved to the latched position (e.g. by bias member 432), thereby latching latch 422. In this manner, the opening may be easily secured by an employee to protect the contents contained within the outdoor structure. Moreover, employees can avoid needing to pack bar contents into closed cabinets but rather can leave such contents on display saving them time. In this manner, the opening is secured while retaining a view of the full bar for advertising and to provide an aesthetically pleasing environment.

Continuing with this illustrative example, when it is time to reopen the outdoor bar, the employee may quickly and easily unlatch latch 422 using control member 458 and cause system to raise screen 200.

Exemplary Embodiments

In one or more embodiments, a retractable screen system is provided that comprises: a screen; the screen extending a length between a first side and a second side; the screen extending a height between an upper end and a lower end; a bottom bar; the bottom bar connected to the lower end of the screen; wherein the screen is configured to move between a fully opened position and a fully closed position; a first base plate; a first magnetic component operatively connected with the bottom bar; the first base plate positioned adjacent the fully closed position; and wherein when the bottom bar is moved to a fully closed position, the base plate and the bottom bar mechanically interlock with one another as well as magnetically attract to one another thereby securing the bottom bar in position.

In one or more implementations, the system further comprises: a second magnetic component operatively attached to the first base plate and configured to magnetically couple with the first magnetic component when the screen is fully lowered.

In one or more implementations, the system further comprises a first feature operatively connected to the bottom bar and a second feature operatively connected to the first base plate; wherein first feature is configured to mate with the second feature.

In one or more implementations, the system includes a first feature operatively connected to the bottom bar and a second feature operatively connected to the first base plate; wherein one of the first and second features is a post and the other one of first and second features in a hole.

In one or more implementations, the system includes a first feature operatively connected to the bottom bar and a second feature operatively connected to the first base plate; wherein one of the first and second features is a male feature and the other one of the first and second features is a female feature.

In one or more implementations, the system includes a first feature operatively connected to the bottom bar and a second feature operatively connected to the first base plate; wherein one of the first and second features is magnetic and the first and second features are magnetically attracted to one another.

In one or more implementations, the system further comprises second base plate; the second base plate having a third feature; the bottom bar having a fourth feature; and wherein when the screen moves to a fully closed position, the third and fourth features engage one another.

In one or more implementations, the system further comprises a first track assembly; the first track assembly positioned adjacent the first side of the screen; the first track assembly having an elongate channel and a screen receiver that is configured and arranged to receive the first side of the screen; wherein the screen receiver of the first track assembly is magnetically attracted toward an end wall of the elongate channel of the first track assembly; a second track assembly; the second track assembly positioned adjacent the second side of the screen; the second track assembly having an elongate channel and a screen receiver that is configured and arranged to connect with the second side of the screen; wherein the screen receiver of the second track assembly is magnetically attracted toward an end wall of the elongate channel of the second track assembly; and wherein the magnetic attraction of the screen receiver of the first track assembly toward the end wall of the elongate channel of the first track assembly, as well as the magnetic attraction of the screen receiver of the second track assembly toward the end wall of the elongate channel of the second track assembly provides tension on the screen.

In one or more implementations, the system further comprises a first track assembly, a second track assembly, and a second base plate; wherein the first base plate includes a member configured and arranged to operably connect to a bottom end of the first track assembly; and wherein the second base plate includes a member configured and arranged to operably connect to a bottom end of the second track assembly.

In one or more implementations, the system further comprises a first track assembly and a second magnetic component operatively attached to the first track assembly, the second magnetic component configured and arranged to magnetically couple with the first magnetic component when the screen is fully lowered.

In one or more embodiments, a retractable screen system is provided, which comprises: a screen; the screen extending a length between a first side and a second side; the screen extending a height between an upper end and a lower end; a roller tube; the roller tube extending a length between opposing ends; the roller tube having an exterior surface; the roller tube having an axis of rotation; the upper end of the screen connected to the roller tube; wherein the screen is configured to wrap around the roller tube when the roller tube is rotated in a first direction, thereby raising the screen; wherein the screen is configured to unwrap from around the roller tube when the roller tube is rotated in a second direction, thereby lowering the screen, wherein the second direction is opposite the first direction; a bottom bar; the bottom bar connected to the lower end of the screen; a base plate; the base plate having a first feature; the bottom bar having a second feature; and wherein when the screen moves to a fully closed position, a first feature of the bottom bar and a second feature of the base plate engage one another thereby securing the bottom bar in position.

In one or more implementations, the first feature is configured to mate with the second feature.

In one or more implementations, the first and second features are configured and arranged to prevent vertical separation of the first and second features when horizontal forces are exerted on the features.

In one or more implementations, one of the first and second features is a post and the other one of first and second features in a hole.

In one or more implementations, one of the first and second features is a male feature and the other one of the first and second features is a female feature.

In one or more implementations, one of the first and second features is magnetic and the first and second features are magnetically attracted to one another.

In one or more implementations, the system further comprises a second base plate; the second base plate having a third feature; the bottom bar having a fourth feature; and wherein when the screen moves to a fully closed position, the third and fourth features engage one another.

In one or more implementations, the system further comprises a first track assembly; the first track assembly positioned adjacent the first side of the screen; the first track assembly having an elongate channel and a screen receiver that is configured and arranged to receive the first side of the screen; and wherein the screen receiver of the first track assembly is magnetically attracted toward an end wall of elongate channel of the first track assembly.

In one or more implementations, the system further comprises a first track assembly and a first base plate having a member configured and arranged to operably connect to a bottom end of the first track assembly.

In one or more implementations, the system further comprises: a first magnetic component operably connected to the bottom bar; a first track assembly; and a second magnet operatively attached to the first track assembly, the second magnetic component configured and arranged to magnetically couple with the first magnetic component when the screen is fully lowered.

In one or more implementations, the system further comprises: a first magnetic component operably connected to the bottom bar; a first track assembly; a second magnetic component operatively attached to the base plate, the second magnetic component configured and arranged to magnetically couple with the first magnetic component when the screen is fully lowered.

In one or more embodiments a retractable screen system is provided that comprises: a screen; the screen extending a length between a first side and a second side; the screen extending a height between an upper end and a lower end; a bottom bar; the bottom bar connected to the lower end of the screen; wherein the screen is configured to move between a fully opened position and a fully closed position; a base plate; the base plate positioned adjacent the fully closed position; wherein when the bottom bar is moved to a fully closed position, the base plate and the bottom bar interlock with one another thereby securing the bottom bar in position; a roller tube; the roller tube extending a length between opposing ends; the roller tube having an exterior surface; the roller tube having an axis of rotation; the upper end of the screen connected to the roller tube; wherein the screen is configured to wrap around the roller tube when the roller tube is rotated in a first direction, thereby raising the screen; wherein the screen is configured to unwrap from around the roller tube when the roller tube is rotated in a second direction, thereby lowering the screen, wherein the second direction is opposite the first direction; and wherein when the screen moves to a fully closed position, a first feature of the bottom bar and a second feature of the base plate engage one another.

In one or more implementations, one of the first and second features is a post and the other one of first and second features in a hole.

In one or more implementations, one of the first and second features is a male feature and the other one of the first and second features is a female feature.

In one or more implementations, one of the first and second features is magnetic and the first and second features are magnetically attracted to one another.

In one or more embodiments a retractable screen system is provided that comprises: a screen; the screen extending a length between a first side and a second side; the screen extending a height between an upper end and a lower end; a bottom bar; the bottom bar connected to the lower end of the screen; wherein the screen is configured to move between a fully opened position and a fully closed position; a first magnetic component operatively connected with the bottom bar; a first base plate; the base plate positioned adjacent the fully closed position; wherein when the bottom bar is moved to a fully closed position, the first magnetic component of the bottom bar magnetically attracts to the base plate thereby securing the bottom bar in position; a roller tube; the roller tube extending a length between opposing ends; the roller tube having an exterior surface; the roller tube having an axis of rotation; the upper end of the screen connected to the roller tube; wherein the screen is configured to wrap around the roller tube when the roller tube is rotated in a first direction, thereby raising the screen; wherein the screen is configured to unwrap from around the roller tube when the roller tube is rotated in a second direction, thereby lowering the screen, wherein the second direction is opposite the first direction; the base plate having a first feature; and the bottom bar having a second feature; and wherein when the screen moves to a fully closed position, the feature of the bottom bar and the feature of the base plate engage one another.

In one or more implementations, one of the first and second features is a post and the other one of first and second features in a hole.

In one or more implementations, one of the first and second features is a male feature and the other one of the first and second features is a female feature.

In one or more implementations, one or more of the above claims, wherein one of the first and second features is magnetic and the first and second features are magnetically attracted to one another.

In one or more embodiments a retractable screen system is provided that comprises: a screen; the screen extending a length between a first side and a second side; the screen extending a height between an upper end and a lower end; a bottom bar; the bottom bar connected to the lower end of the screen; the bottom bar extending a length between a first end and a second end; wherein the screen is configured to move between a fully opened position and a fully closed position; a first base plate; the first base plate positioned adjacent the first side of the screen adjacent the fully closed position; a second base plate; the second base plate positioned adjacent the second side of the screen adjacent the fully closed position; wherein when the bottom bar is moved to a fully closed position, the first base plate and the second base plate interlock with the bottom bar thereby securing the bottom bar in position; a roller tube; the roller tube extending a length between opposing ends; the roller tube having an exterior surface; the roller tube having an axis of rotation; the upper end of the screen connected to the roller tube; wherein the screen is configured to wrap around the roller tube when the roller tube is rotated in a first direction, thereby raising the screen; wherein the screen is configured to unwrap from around the roller tube when the roller tube is rotated in a second direction, thereby lowering the screen, wherein the second direction is opposite the first direction; the base plate having a feature; the bottom bar having a feature; and wherein when the screen moves to a fully closed position, the feature of the bottom bar and the feature of the base plate engage one another.

In one or more implementations, one of the first and second features is a post and the other one of first and second features in a hole.

In one or more implementations, one of the first and second features is a male feature and the other one of the first and second features is a female feature.

In one or more implementations, one of the first and second features is magnetic and the first and second features are magnetically attracted to one another.

In one or more embodiments a retractable screen system is provided that comprises: a screen; the screen extending a length between a first side and a second side; the screen extending a height between an upper end and a lower end; a bottom bar; the bottom bar connected to the lower end of the screen; the bottom bar extending a length between a first end and a second end; a first magnetic component operatively connected with the bottom bar adjacent the first end; a second magnetic component operatively connected with the bottom bar adjacent the second end; wherein the screen is configured to move between a fully opened position and a fully closed position; a first base plate; the first base plate positioned adjacent the first side of the screen adjacent the fully closed position; a second base plate; the second base plate positioned adjacent the second side of the screen adjacent the fully closed position; wherein when the bottom bar is moved to a fully closed position, the first magnetic component of the bottom bar magnetically attracts to the first base plate and the second magnetic component of the bottom bar magnetically attracts to the second base plate thereby securing the bottom bar in position; a roller tube; the roller tube extending a length between opposing ends; the roller tube having an exterior surface; the roller tube having an axis of rotation; the upper end of the screen connected to the roller tube; wherein the screen is configured to wrap around the roller tube when the roller tube is rotated in a first direction, thereby raising the screen; wherein the screen is configured to unwrap from around the roller tube when the roller tube is rotated in a second direction, thereby lowering the screen, wherein the second direction is opposite the first direction; the base plate having a feature; the bottom bar having a feature; and wherein when the screen moves to a fully closed position, the feature of the bottom bar and the feature of the base plate engage one another.

In one or more implementations, one of the first and second features is a post and the other one of first and second features in a hole.

In one or more implementations, one of the first and second features is a male feature and the other one of the first and second features is a female feature.

In one or more implementations, one of the first and second features is magnetic and the first and second features are magnetically attracted to one another.

In one or more embodiments a retractable screen system is provided that comprises: a screen; the screen extending a length between a first side and a second side; the screen extending a height between an upper end and a lower end; a roller tube; the roller tube extending a length between opposing ends; the roller tube having an exterior surface; the roller tube having an axis of rotation; the upper end of the screen connected to the roller tube; wherein the screen is configured to wrap around the roller tube when the roller tube is rotated in a first direction, thereby raising the screen; wherein the screen is configured to unwrap from around the roller tube when the roller tube is rotated in a second direction, thereby lowering the screen, wherein the second direction is opposite the first direction; a bottom bar; the bottom bar connected to the lower end of the screen; a base plate; the base plate having a first feature extending vertically from the base plate; the bottom bar having a second feature configured and arranged to connect with the first feature of the base plate when the bottom bar is lowered to the base plate, wherein the first and second features are configured and arranged to physically inhibit horizontal movement of the bottom bar when the first feature is connected with the second feature; wherein the base plate includes a first magnetic component; wherein the bottom bar has a second magnetic component; and wherein the first magnetic component is configured and arranged to magnetically couple with the second magnetic component when the first feature is connected with the second feature.

In one or more implementations, the first feature is configured to mate with the second feature.

In one or more implementations, one of the first and second features is a post and the other one of first and second features in a hole.

In one or more implementations, one of the first and second features is a male feature and the other one of the first and second features is a female feature.

In one or more implementations, one of the first and second features is magnetic and the first and second features are magnetically attracted to one another.

In one or more implementations, the system further comprises a seal attached to the bottom of the bottom bar; wherein the seal is a woolpile.

Control Circuit

In one or more arrangements, system 10 includes a control circuit 520 to facilitate control of, for example motor assembly 42, lighting 116, or other components of system 10.

In some various arrangements, control circuit 520 may be configured, for example, deploy and retract screen 200, to turn lighting 116 on/off, adjust light levels, adjust light color, etc. In some embodiments, the control circuit 520 may be configured to communicate with, report status events/information to, receive commands from, and/or send or receive commands to or from one or more devices over a communication network.

Control Circuit 520:

Control circuit 520 is formed of any suitable size, shape, design, technology, and in any arrangement and is configured to control operation of other components of system 10 to facilitate control of various components of system 10. In the arrangement shown, as one example implementation, system 10 control circuit 520 includes a processing circuit 522 and memory 524 having software code 530 or instructions that facilitates the computational operation of system 10. Processing circuit 522 may be any computing device that receives and processes information and outputs commands according to software code 530 or instructions stored in memory 524.

Memory 524 may be any form of information storage such as flash memory, ram memory, dram memory, a hard drive, or any other form of memory. Processing circuit 522 and memory 524 may be formed of a single combined unit. Alternatively, processing circuit 522 and memory 524 may be formed of separate but electrically connected components. Alternatively, processing circuit 522 and memory 524 may each be formed of multiple separate but electrically connected components. Software code 530 or instructions is any form of information or rules that direct processing circuit 522 how to receive, interpret and respond to information to operate as described herein. Software code 530 or instructions is stored in memory 524 and accessible to processing circuit 522.

Communication Circuit 526

Communication circuit 526 is formed of any suitable size, shape, design, technology, and in any arrangement and is configured to facilitate communication with devices to be controlled, monitored, and/or alerted by system 10 in one or more arrangements, as one example, communication circuit 526 is a includes a transmitter (for one way communication) or transceiver (for two way communication). In the arrangement shown, as one example, communication circuit 526 is connected to an antenna (not shown), which may be a monopole antenna, dipole antenna, a loop antenna, a fractal antenna, or any other form of an antenna, to facilitate transmission and/or reception of signals in the form of electromagnetic radio frequencies. Additionally or alternatively, in one or more arrangements, communication circuit may be connected to a light emitting diodes (or other light emitting device) and/or a light sensor to facilitate communication of signals using light (e.g., infrared communication). Although the disclosed arrangements are primarily described with reference to wireless communication by system 10, the embodiments are not so limited. Rather, it is contemplated that in various arrangements, communication circuit 526 may be configured to communicate using various wired and/or wireless communication technologies and protocols over various networks and/or mediums including but not limited to, for example, RFID, Near Field Communication (NFC), infrared and optical communication, 802.3/Ethernet, 802.11/WIFI, Wi-Max, Bluetooth, Bluetooth low energy, UltraWideband (UWB), 802.15.4/ZigBee, ZWave, GSM/EDGE, UMTS/HSPA+/HSDPA, CDMA, LTE, FM/VHF/UHF networks, and/or any other communication protocol, technology or network.

The control circuit 520 may be configured to provide automated control of one or more features, functions, and/or operations in response to data from one or more sensors 532. In some various arrangements, sensors may include but are not limited to, for example, light sensors, sound sensors, motion sensors, presence sensors, wind sensors, temperature sensors and/or any other type of sensor. As an illustrative example, in some embodiments, the control circuit 520 may be configured to turn off lighting 116 if no motion is detected by one or more motion detectors for a threshold period of time. As another example, in some embodiments, the control circuit 520 may be configured to turn off raise or lower the screen to maintain passive light levels within a user preference range based on readings of one or more light meters communicatively connected to the control circuit 520. Additionally or alternatively, in some embodiments, the control circuit 520 may be configured to provide such automated control of the features, functions, and/or operations based on data received from other devices and/or third parties over one or more communication networks (e.g., from user's smart-phone, user's car, security system, weather reporting services, and/or social networking sites).

In one or more embodiments, a control circuit 520 may be configured and arranged to monitor, learn, and modify automated control of one or more features, functions, and/or operations of the system. For instance, a control circuit 520 may be configured to monitor and locally or remotely store data relating to user commands and operation of the system. The control circuit 520 may be configured to analyze the data and learn, over time, a desired operational behavior. Such learning may include, for example, generation and refinement of classifiers and/or state machines configured to map input data values to desired operations to be performed by the control circuit 520. In various embodiments, analysis by the control circuit 520 may include various guided and/or unguided artificial intelligence/machine learning techniques including, but not limited to: neural networks, genetic algorithms, support vector machines, k-means, kernel regression, discriminant analysis and/or various combinations thereof. In different implementations, analysis may be performed locally, remotely, or a combination thereof.

Not Limited to Individual Arrangements Described Herein:

It will be appreciated by those skilled in the art that other various modifications could be made to the device without parting from the spirit and scope of this disclosure. For instance, although aspects and features may be illustrated in or described with reference to certain figures or arrangements, it will be appreciated that features from one figure or embodiment may be combined with features of another figure or arrangement even though the combination is not explicitly shown or explicitly described as a combination.

For example, one or more embodiments may provide a retractable screen system having: a magnetic track using a low profile interlock to hold the screen within the track; sound dampening features; a bottom bar and anchor system; and a screen roller that may be adjusted in length, circumference, and/or shape of the roller edge; along with any other features or aspects disclosed herein.

All such modifications and changes fall within the scope of the claims and are intended to be covered thereby.

The invention claimed is:

1. A retractable screen system, comprising:

a screen;

the screen extending a height between an upper end and a lower end;

the screen extending a length between a first side and a second side;

the screen having a first interlock extending along the first side;

the screen having a second interlock extending along the second side;

a roller tube assembly;

the roller tube assembly including a roller tube;

the roller tube extending between a first end and a second end;

a first axle operably connected to and extending outward from the first end to a first outward end;

a second axle operably connected to and extending outward from the second end to a second outward end;

the roller tube having an exterior surface;

a first end cap;

the first end cap connected adjacent the first end of the roller tube;

the first end cap having an exterior surface;

the exterior surface of the first end cap extending from an inner end to an outer end;

wherein the exterior surface of the first end cap curves from a larger diameter at the inner end of the first end cap to a smaller diameter at the outer end of the first end cap;

a second end cap;

the second end cap connected adjacent the second end of the roller tube;

the second end cap having an exterior surface;

the exterior surface of the second end cap extending from an inner end to an outer end;

wherein the exterior surface of the second end cap curves from a larger diameter at the inner end of the second end cap to a smaller diameter at the outer end of the second end cap;

wherein the upper end of the screen is connected to the roller tube;

wherein the screen is opened by rotating the roller tube in a first direction which causes the screen to wrap around the exterior surface of the roller tube;

wherein the screen is closed by rotating the roller tube in a second direction, opposite the first direction, which causes the screen to unwrap from around the exterior surface of the roller tube;

wherein the first side of the screen is longer than the second side of the screen such that when the screen is closed, the lower end of the screen is oriented at an angle relative to the roller tube;

wherein the roller tube assembly is configured to permit an installer to adjust a first rate that the first side of the screen wraps around the exterior surface of the roller tube when the roller tube is rotated in the first direction to be greater than a second rate that the second side of the of the screen wraps around the exterior surface of the roller tube when the roller tube is rotated in the first direction so that when the screen is opened, the lower end of the screen is oriented parallel to the roller tube;

wherein the position of the first end cap is adjustable relative to the first end of the roller tube so as to adjust where the first interlock engages the surface of the first end cap and thereby adjusting the first rate that the first side of the screen wraps around the exterior surface of the roller tube;

wherein the position of the second end cap is adjustable relative to the second end of the roller tube so as to adjust where the second interlock engages the surface of the second end cap and thereby adjusting the second rate that the second side of the screen wraps around the exterior surface of the roller tube.

2. The system of claim 1, wherein the larger diameter of the first end cap approximately matches the diameter of the roller tube.

3. The system of claim 1, wherein the first end cap is connected to a collar that is connected to the roller tube.

4. The system of claim 1, wherein the position of the first end cap is adjustable towards and away from the first end of the roller tube.

5. The system of claim 1, wherein the position of the first end cap is adjustable along the axis of rotation of the roller tube.

6. The system of claim 1, wherein the exterior surface of the first end cap and the exterior surface of the second end cap are convex surfaces.

7. The system of claim 1, wherein the first end cap is connected to the first end of the roller tube by one or more first features configured and arranged to connect to one or more second features of the first end of the roller tube.

8. The system of claim 1, wherein the first end cap includes a plurality of flexible arms extending outward from the inner end of the first end cap toward the outer end of the first end cap.

9. The system of claim 1, wherein the first end cap includes a plurality of flexible arms extending outward from the inner end of the first end cap to the outer end of the first end cap; and wherein the plurality of flexible arms are configured to flex inward toward the axis of rotation of the roller tube.

10. The system of claim 1, wherein the first interlock and the second interlock each have a thickness larger than a thickness of the screen.

11. The system of claim 1, further comprising:

a first track assembly positioned adjacent the first side of the screen;

the first track assembly having a first elongate channel and a first screen receiver configured to receive the first interlock;

a first magnet associated with one of the first elongate channel and the first screen receiver of the first track assembly;

a first magnetic member associated with the other of the first elongate channel and the first screen receiver of the first track assembly; and wherein a magnetic bond is formed between the first magnet and the first magnetic member of the first track assembly.

12. A retractable screen system, comprising:

a screen;

the screen extending a length between a first side and a second side;

the screen extending a height between an upper end and a lower end;

the screen having a first interlock extending along the first side;

wherein the first interlock includes a thicker outer portion and a thinner inner portion;

wherein the inner portion of the first interlock is connected to the first side of the screen;

a roller tube;

a first end cap operably connected adjacent a first end of the roller tube;

wherein the position of the first end cap is adjustable in position along a length between the first end of the roller tube and a first one of a pair of brackets operably connected to the first end so as to adjust whether the screen, the thinner portion of the first interlock, or the thicker portion of the first interlock engages and rolls up on the surface of the first end cap and thereby adjusting a rate that the first side of the screen wraps around roller tube;

and wherein the first end cap has an exterior surface having a convex curved shape.

13. The system of claim 12, wherein the convex curved shape of the first end cap extends from a larger diameter that approximately matches a diameter of the roller tube to a smaller diameter.

14. The system of claim 12, wherein the first end cap is connected to a collar that is connected to the roller tube.

15. The system of claim 12, wherein the first end cap is connected to the first end of the roller tube by one or more first features configured and arranged to connect to one or more second features of the first end of the roller tube; and wherein the one or more first features of the first end cap include one or more fingers, the one or more second features of the first end of the roller tube include one or more recesses, and the one or more fingers are configured and arranged to mate with the one or more recesses.

16. The system of claim 12, wherein the exterior surface of the first end cap extends from an inner end to an outer end;

wherein the first end cap includes a plurality of flexible arms extending outward from the inner end of the exterior surface of the first end cap to the outer end of the exterior surface of the first end cap.

17. The system of claim 12, wherein the exterior surface of the first end cap extends from an inner end to an outer end;

wherein first end cap includes a plurality of flexible arms extending outward from the inner end of the exterior surface of the first end cap to the outer end of the exterior surface of the first end cap; and wherein the plurality of flexible arms are configured to flex inward toward the axis of rotation of the roller tube.

18. The system of claim 12, further comprising:

a first length adjustment member associated with the first end cap;

wherein the first length adjustment member is configured and arranged to facilitate adjustment of the position of the first end cap along the axis of rotation of the roller tube.

19. The system of claim 12, wherein the screen includes a second interlock at the second side of the screen, the first interlock and the second interlock having a thickness larger than a thickness of the screen.

20. The system of claim 12, further comprising:

a first track assembly positioned adjacent the first side of the screen;

the first track assembly having a first elongate channel and a first screen receiver configured to receive the first interlock connected to the first side of the screen;

a first magnet associated with one of the first elongate channel and the first screen receiver of the first track assembly;

a first magnetic member associated with the other of the first elongate channel and the first screen receiver of the first track assembly; and wherein a magnetic bond is formed between the first magnet and the first magnetic member of the of the first track assembly.

21. A retractable screen system, comprising:

a roller tube;

the roller tube extending a length from a first end to a second end;

a first axle operably connected to and extending outward from the first end to a first outward end;

the roller tube having an exterior surface;

a screen;

the screen extending a length between a first side and a second side;

the screen extending a height between an upper end and a lower end;

the screen having a first interlock connected to the first side;

the first interlock having a thickness that is greater than a thickness of the screen;

a first end cap operably connected adjacent the first end of the roller tube;

the first end cap having an exterior surface;

a first length adjustment member associated with the first end cap;

wherein the first length adjustment member is configured and arranged to facilitate the adjustment of the position of the first end cap along the first axle relative to the position of the first end of the roller tube and relative to the position of the first outward end of the first axle;

wherein when the roller tube is rotated in a first direction the screen is raised by wrapping the screen around the exterior surface of the roller tube;

wherein when the roller tube is rotated in a second direction, opposite the first direction, the screen is lowered by unwrapping the screen from around the exterior surface of the roller tube;

wherein when the first end cap is adjusted outward, away from the first end of the roller tube and toward the first outward end of the first axle, an effective rate at which the first side of the screen wraps around the exterior surface of the roller tube as the roller tube is rotated in the second direction is increased;

wherein when the first end cap is adjusted inward, toward the first end of the roller tube and away from the first outward end of the first axle, the effective rate at which the first side of the screen wraps around the exterior surface of the roller tube as the roller tube is rotated in the second direction is decreased.

22. The system of claim 21, wherein when the position of the first end cap is adjusted relative to the first end of the roller tube this affects where the first interlock wraps around the first end cap thereby affecting an effective rate at which the first interlock wraps around the first end cap.

23. The system of claim 21, wherein a larger diameter of the first end cap approximately matches a diameter of the exterior surface of the roller tube.

24. The system of claim 21, wherein the first end cap is connected to a collar that is connected to the roller tube.

25. The system of claim 21, wherein the position of the first end cap is adjustable along the axis of rotation.

26. The system of claim 21, wherein first end cap includes a plurality of flexible arms extending outward from an inner end of the first end cap toward an outer end of the first end cap.

27. The system of claim 21, wherein first end cap includes a plurality of flexible arms extending outward from an inner end of the first end cap to an outer end of the first end cap; and wherein the plurality of flexible arms are configured to flex inward toward the axis of rotation of the roller tube.

28. The system of claim 21, further comprising:

a first track assembly positioned adjacent the first side of the screen;

the first track assembly having a first elongate channel and a first screen receiver configured to receive the first interlock;

a first magnet associated with one of the first elongate channel and the first screen receiver of the first track assembly;

a first magnetic member associated with the other of the first elongate channel and the first screen receiver of the first track assembly; and wherein a magnetic bond is formed between the first magnet and the first magnetic member of the first track assembly.

29. A retractable screen system, comprising:

a roller tube;

the roller tube positioned within a housing;

the housing having an elongated shape extending between a first side wall and a second side wall;

the roller tube extending a length from a first end to a second end;

a pair of connection members configured to operably connect the first end of the roller tube with the first side wall of the housing and connect the second end of the roller tube with the second side wall of the housing in a manner that permits the roller tube to rotate about an axis of rotation;

a screen;

the screen extending a length between a first side and a second side;

the screen extending a height between an upper end and a lower end;

the screen having a first interlock adjacent a first side of the screen;

the screen having a second interlock adjacent a second side of the screen;

the upper end of the screen operably connected to the roller tube;

a first end cap;

the first end cap having a curved exterior surface that extends from a larger diameter to a smaller diameter;

the first end cap positioned adjacent the first end of the roller tube;

a second end cap;

the second end cap having a curved exterior surface that extends from a larger diameter to a smaller diameter;

the second end cap positioned adjacent the second end of the roller tube;

wherein when the roller tube is rotated in a first direction the screen wraps around the roller tube;

wherein when the screen wraps around the roller tube the first interlock wraps around adjacent the first end cap;

wherein when the screen wraps around the roller tube the second interlock wraps around adjacent the second end cap;

wherein the position of the first end cap is adjustable relative to the first end of the roller tube and the first side wall of the housing so as to adjust where the first interlock engages the curved exterior surface of the first end cap, thereby adjusting an effective rate at which the first side of the screen wraps around an exterior surface of the roller tube as the roller tube is rotated in the first direction;

wherein the position of the second end cap is adjustable relative to the second end of the roller tube and the second side wall of the housing so as to adjust where the second interlock engages the curved exterior surface of the second end cap, thereby adjusting an effective rate at which the second side of the screen wraps around the exterior surface of the roller tube as the roller tube is rotated in the first direction;

wherein the first interlock includes a thicker outer portion and a thinner inner portion;

wherein the inner portion of the first interlock is connected to the first side of the screen;

wherein the first end cap is movable between a plurality of positions including an inner position, an outer position, and an intermediate position;

wherein when the first end cap is in the inner position, the screen engages and rolls up on the first end cap and neither the inner portion of the first interlock nor the outer portion of the first interlock engage the first end cap as the screen wraps around the roller tube, thereby causing the first end of the screen to wrap around the roller tube at a first rate as the roller tube is rotated;

wherein when the first end cap is in the intermediate position, the inner portion of the first interlock engages and rolls up on the first end cap and the outer portion of the first interlock does not engage the first end cap as the screen wraps around the roller tube, thereby causing the first end of the screen to wrap around the roller tube at a second rate as the roller tube is rotated;

wherein when the first end cap is in the outer position, the outer portion of the first interlock engages and rolls up on the first end cap as the screen wraps around the roller tube, thereby causing the first end of the screen to wrap around the roller tube at a third rate as the roller tube is rotated;

wherein the first rate is smaller than the second rate and the second rate is smaller than the third rate.

30. The system of claim 29, further comprising:

a first magnetic track assembly;

the first magnetic track assembly positioned adjacent the first end of the roller tube;

wherein the first interlock of the screen is received within an opening in the first magnetic track assembly.

31. The system of claim 29, wherein the larger diameter of the first end cap approximately matches a diameter of the roller tube.

32. The system of claim 29, wherein the first end cap is connected to a collar that connects to the roller tube.

33. The system of claim 29, wherein the position of the first end cap is adjustable towards and away from the first end of the roller tube.

34. The system of claim 29, wherein the position of the first end cap is adjustable along the axis of rotation of the roller tube.

35. The system of claim 29, wherein the position of the first end cap is adjustable along a length of an axle that extends outward from the first end of the roller tube.

36. The system of claim 29, wherein first end cap includes a plurality of flexible arms that extend outward from an inner end to an outer end.

37. The system of claim 29, wherein when the first end cap is adjusted outward, away from the first end of the roller tube, an effective rate at which the first interlock wraps around the first end cap is increased.

38. The system of claim 29, wherein when the first end cap is adjusted inward, toward the first end of the roller tube, an effective rate at which the first interlock wraps around the first end cap is decreased.

39. A retractable screen system, comprising:
a roller tube;
the roller tube extending a length from a first end to a second end;
a screen;
the screen extending a length between a first side and a second side;
the screen extending a height between an upper end and a lower end;
the upper end of the screen operably connected to the roller tube;
a first end cap;
the first end cap having a curved exterior surface;
the first end cap positioned adjacent the first end of the roller tube;
a second end cap;
the second end cap having a curved exterior surface;
the second end cap positioned adjacent the second end of the roller tube;
wherein when the roller tube is rotated the screen wraps around the roller tube, the first side of the screen wraps around adjacent the first end cap and the second side of the screen wraps around adjacent the second end cap;
wherein the first end cap is adjustable in position between the first end of the roller tube and a first bracket so as to adjust where the first side of the screen engages the curved exterior surface of the first end cap, thereby adjusting an effective rate at which the first side of the screen wraps around an exterior surface of the roller tube as the roller tube is rotated in a first direction;
wherein the second end cap is adjustable in position between the second end of the roller tube and a second bracket so as to adjust where the second side of the screen engages the curved exterior surface of the second end cap, thereby adjusting an effective rate at which the second side of the screen wraps around the exterior surface of the roller tube as the roller tube is rotated in the first direction.

40. A motorized screen system, comprising:
a roller tube;
the roller tube having an elongated generally cylindrical shape;
the roller tube extending a length between a first end and a second end;
a first axle positioned adjacent the first end of the roller tube;
a second axle positioned adjacent the second end of the roller tube;
a first end cap assembly;
the first end cap assembly positioned adjacent the first end of the roller tube;
the first end cap assembly positioned over the first axle;
wherein the first end cap assembly is adjustably positionable relative to the first end of the roller tube along a length of the first axle;
wherein the first end cap assembly includes a cylindrical portion positioned toward the first end of the roller tube and wherein the first end cap assembly includes a first curved portion positioned away from the first end of the roller tube;
wherein the first curved portion curves from a larger diameter at an inner end of the first curved portion to a smaller diameter at an outer end of the first curved portion;
a second end cap assembly;
the second end cap assembly positioned adjacent the second end of the roller tube;
the second end cap assembly positioned over the second axle;
wherein the second end cap assembly is adjustably positionable relative to the second end of the roller tube along a length of the second axle;
wherein the second end cap assembly includes a cylindrical portion positioned toward the second end of the roller tube and wherein the second end cap assembly includes a second curved portion positioned away from the second end of the roller tube;
wherein the second curved portion curves from a larger diameter at an inner end of the second curved portion to a smaller diameter at an outer end of the second curved portion;
wherein the first end cap assembly is adjusted by sliding the first end cap assembly along the first axle and securing the first end cap assembly to the first axle;
wherein the second end cap assembly is adjusted by sliding the second end cap assembly along the second axle and securing the second end cap assembly to the second axle;
wherein the first end cap assembly is configured to permit an installer to adjust a first rate that a first side of a screen wraps around an exterior surface of the roller tube when the roller tube is rotated in a first direction;
wherein the second end cap assembly is configured to permit an installer to adjust a second rate that a second side of the screen wraps around the exterior surface of the roller tube when the roller tube is rotated in the first direction;
wherein the first end cap assembly and second end cap assembly are configurable to set the first rate independent of the second rate;
wherein the cylindrical portion of the first end cap assembly and the cylindrical portion of the second end cap assembly are non-adjustable in diameter.

41. The system of claim 40, wherein the fixed diameter of the cylindrical portion is equal to a diameter of the roller tube.

* * * * *